(12) United States Patent
Abe et al.

(10) Patent No.: US 7,301,672 B2
(45) Date of Patent: Nov. 27, 2007

(54) INFORMATION PROCESSING APPARATUS AND INFORMATION PROCESSING METHOD

(75) Inventors: Toshio Abe, Kanagawa (JP); Hiroyuki Namiki, Nagano (JP); Masaru Kageura, Kanagawa (JP); Atsushi Mizukami, Kanagawa (JP); Takahiro Nakagawa, Kanagawa (JP); Naoki Nakanishi, Saitama (JP); Kenichi Inaho, Tokyo (JP); Reiko Horikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 11/006,728

(22) Filed: Dec. 8, 2004

(65) Prior Publication Data

US 2005/0168778 A1    Aug. 4, 2005

Related U.S. Application Data

(62) Division of application No. 09/257,064, filed on Feb. 25, 1999, now Pat. No. 6,975,425.

(30) Foreign Application Priority Data

| Feb. 26, 1998 | (JP) | ................... 10-045410 |
| Oct. 16, 1998 | (JP) | ................... 10-295932 |
| Oct. 16, 1998 | (JP) | ................... 10-295933 |
| Oct. 16, 1998 | (JP) | ................... 10-295935 |
| Feb. 9, 1999  | (JP) | ................... 11-031286 |

(51) Int. Cl.
*G06K 1/00*   (2006.01)
*G06K 15/00*  (2006.01)
*G06K 9/00*   (2006.01)
*G03F 3/08*   (2006.01)

(52) U.S. Cl. ............ 358/1.9; 358/1.16; 358/520; 382/162; 382/165

(58) Field of Classification Search ............ 358/1.9, 358/1.16, 520; 382/162, 165
See application file for complete search history.

(56) References Cited

U.S. PATENT DOCUMENTS 4,237,541 A    12/1980    Mikada ................. 364/710

(Continued)

FOREIGN PATENT DOCUMENTS

EP    0347254    12/1989

(Continued)

OTHER PUBLICATIONS

Patent Abstracts of Japan, vol. 1995, No. 8 (Sep. 29, 1995) of JP 07-130609.

*Primary Examiner*—King Y. Poon
*Assistant Examiner*—Thomas Lett
(74) *Attorney, Agent, or Firm*—Fitzpatrick, Cella, Harper & Scinto

(57) ABSTRACT

Information that is required for laying out character string data is entered, as are character string data. The printing attributes for the data are then edited, and are employed to extract contour information. Thereafter, the extracted contour information is employed to determine the information that is to be used as a reference when laying out the character string data, and a layout position is specified. Then, the various data that are obtained are stored as printing data, and the character string data are laid out in a drawing area. Therefore, the printing data can be precisely and easily prepared, without the work efficiency of a user being deteriorated.

25 Claims, 143 Drawing Sheets

U.S. PATENT DOCUMENTS

| | | | |
|---|---|---|---|
| 4,467,322 A | 8/1984 | Bell et al. | 340/701 |
| 4,648,028 A | 3/1987 | DeKlotz et al. | 364/188 |
| 4,810,614 A | 3/1989 | Sangyoji et al. | 430/138 |
| 5,270,688 A | 12/1993 | Dawson et al. | 345/150 |
| 5,363,212 A | 11/1994 | Taniuchi et al. | 358/452 |
| 5,583,978 A | 12/1996 | Collins et al. | 395/170 |
| 5,739,827 A | 4/1998 | Nagano et al. | 345/473 |
| 5,862,257 A | 1/1999 | Sekine et al. | 382/199 |
| 6,035,059 A * | 3/2000 | Kurosawa et al. | 382/164 |

FOREIGN PATENT DOCUMENTS

| | | |
|---|---|---|
| EP | 0554985 | 8/1993 |
| EP | 0690415 | 1/1996 |
| EP | 0716381 | 6/1996 |
| JP | 09018710 | 1/1997 |

* cited by examiner

| GRAPHIC DATA PRINTING ATTRIBUTE EDITING |
|---|

LINE TYPE: ● SOLID LINE  ○ BROKEN LINE  ○ ONE CHAIN LINE  ○ TWO-DOT CHAIN LINE

LINE WIDTH: [ 0.01 ] mm  [ 0.000394 ] inch

LINE WIDTH DIRECTION: ● CENTER  ○ OUTSIDE  ○ INSIDE

END EDGE SHAPE: ○ ROUND  ● FLAT  ○ SQUARE

CONNECTION SHAPE: ● MITER  ○ ROUND  ○ BEVEL

[ LINE PITCH ]  [ DELETE ]  [ SET ]

| SYMBOL STATE SELECTION |
|---|
| AFTER STORAGE OF FILE SOME SYMBOLS ARE CHANGED PLEASE SELECT STATE OF SYMBOL TO BE READ OUT |
| [STORAGE TIME]  [LATEST]  [ARBITRARY] |

| SYMBOL DATE INPUT |
|---|
| WHAT IS DATE OF SYMBOL FOR READ OUT ? PLEASE INPUT DATE AND TIME |
| DATE: 97/01/01 ~3202 |
| TIME: 00:00:00 ~3203 |
| [DELETE]  [EXECUTE] |

{ CeEg
  ceg

FIG. 35

| TEXT EDITING | |
|---|---|
| TYPEFACE NAME LIST — 3502 | REFERENCE POSITION — 3503 |
| KAKU GOTHIC | ○ TOP LEFT  ○ TOP  ○ TOP RIGHT |
| MARU GOTHIC | ○ LEFT  ○ CENTER  ○ RIGHT |
| HELVETICA 1 | ● BOTTOM LEFT  ○ BOTTOM  ○ BOTTOM RIGHT |
| HELVETICA 2 | LINE JUSTIFICATION — 3504 |
| COURIER 1 | ● LEFT  ○ CENTER |
| COURIER 2 | ○ RIGHT  ○ FULL |
| TIMES 1 | |

PRINTING ATTRIBUTE — 3505

REFERENCE CHARACTER HEIGHT: [10] mm
CHARACTER SIZE: [39,701] point
VERTICAL SCALE: [100] %
HORIZONTAL SCALE: [75] %

BASE LINE ROTATE ANGLE: [0] deg
OBLIQUE ANGLE: [0] deg
CHARACTER SPACING: [0] mm
LINE SPACING: [0] mm CHARACTER STRING:
[Efg] — 3506

[DELETE] [EXECUTE]

3501

LAYOUT POSITION

FIG. 48
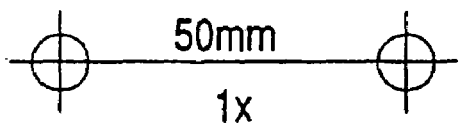
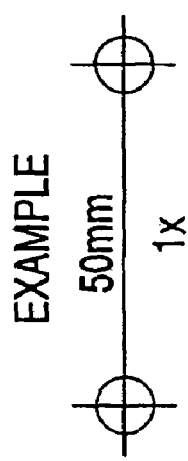
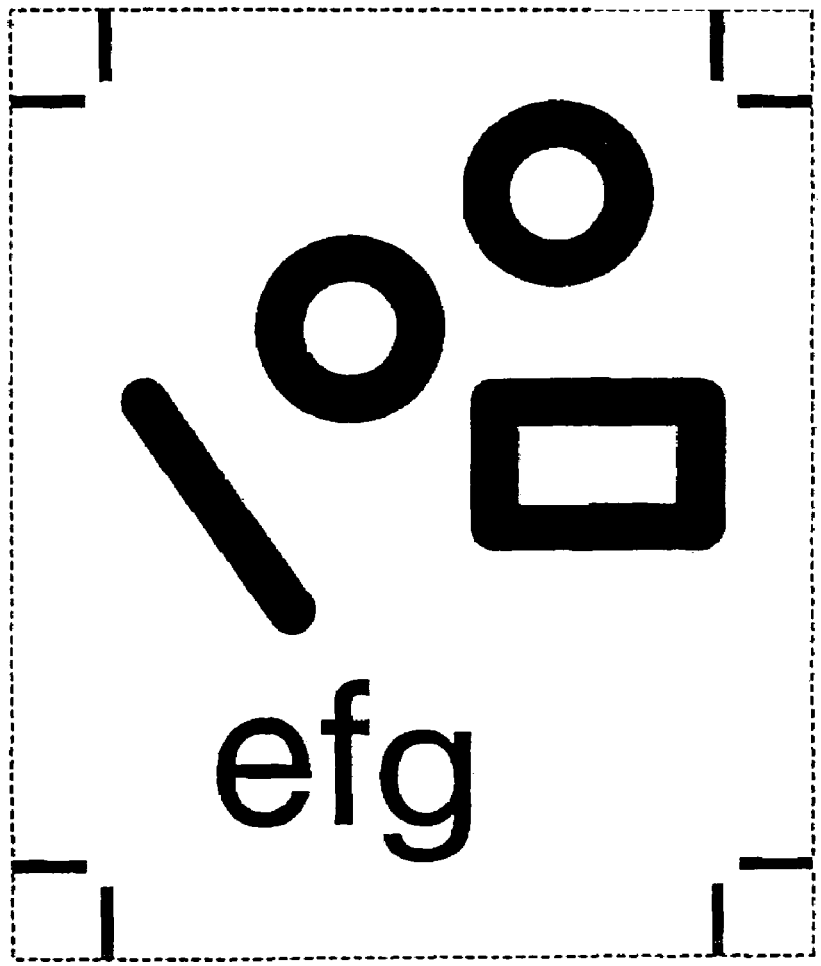
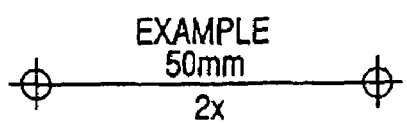

FIG. 50

```
┌─────────────────────────────────────────────┐
│              BAR CODE SETTING               │
│  ┌─CLASSIFICATION──────┐ ┌─SIZE───────────┐ │
│  │ ● JAN/EAN STANDARD  │ │                │ │
│  │ ○ CODE39            │ │ MAGNIFICATION: 1     TIMES │ │
│  │ ○ UPC STANDARD      │ │ HEIGHT: 26.57  mm  │ │
│  │ ○ ITF STANDARD      │ │ ANGLE:  0      deg │ │
│  └─────────────────────┘ └────────────────┘ │
│                     5002                5003 │
│  ┌─REFERENCE POSITION──┐ ┌─CODE NOTATION──┐ │
│  │ ○TOP   ○TOP  ○TOP   │ │ ● YES          │ │
│  │  LEFT         RIGHT │ │ ○ NO           │ │
│  │ ○LEFT ○CENTER ○RIGHT│ │                │ │
│  │ ●BOTTOM ○BOTTOM ○BOTTOM │ └────────────┘ │
│  │  LEFT           RIGHT│           5005    │
│  └─────────────────────┘ CODE: 12341234123  │
│                     5006              5004  │
│                          [DELETE] [EXECUTE] │
└─────────────────────────────────────────────┘
                                         5001
```

FIG. 53

| PROOF SHEET OUTPUT CONDITION SETTING |
|---|

MAGNIFICATION: [ 2 ] TIMES  NUMBER OF COPIES: [ 1 ] COPY

PAPER SIZE
● A4  ○ A3  ○ A2

PAPER DIRECTION
● VERTICAL  ○ HORIZONTAL  ○ AUTO

[ DELETE ]  [ EXECUTE ]

FIG. 58

FAIR COPY OUTPUT CONDITION SETTING

MAGNIFICATION: [ 2 ] 5802 TIMES    NUMBER OF COPIES: [ 1 ] 5803 COPY

┌─ LABEL ─────────┐    ┌─ DRAWING FRAME ──┐
● YES   ○ NO            ● YES   ○ NO
        5804                       5805

[DELETE]   [EXECUTE]

| PHOTOENGRAVING BLOCK COPY (PACKING MATERIAL) ||||| 
|---|---|---|---|---|
| BLOCK COPY NO. ABC-1234-00 || PARTS NO. A0011 |||
| INFORMALITY CARTRIDGE |||||
| APPROVAL || INSPECTION | CREATION ||
| PRODUCT SYMBOL A0011 | CODE | DATE | CORRECTION ITEMS | IN CHARGE |
| | 01 | 02/02 | SIZE CHANGE | ∞ |
| DATE 97/01/01 | 02 | 03/03 | LINE WIDTH CHANGE | ∞ |
| MEASURE 1/1 | | | | |

FIG. 60

| FILE STORAGE |
|---|

BLOCK COPY NO: ABC-1234-00  PARTS NO: A0011

INFORMALITY: CARTRIDGE

PRODUCER NAME: ∞ ∞   DATE: 97/01/01   MEASURE: 1/1

— CORRECTION RECORD —
CODE: 01  CORRECTION ITEMS: SIZE CHANGE   [REGISTRATION] [REFERENCE]

— APPROVAL —
APPROVED BY NAME: ∞ ∞  [APPROVAL]

— INSPECTION —
INSPECTED BY NAME: ∞ ∞  [INSPECTION]

[DELETE] [STORAGE]

6001

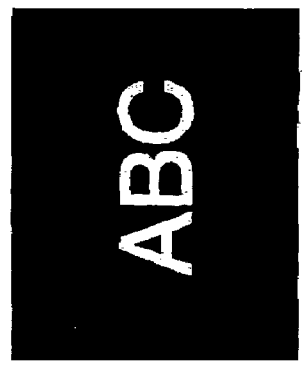
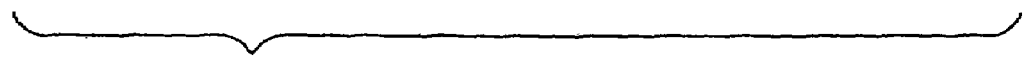
FIG. 80

H → H
S → S
B → B'

H → H
S → S'
B → B

COLOR 1

COLOR 2

FIG. 107

| (1) | (2) | (3) | (4) | (5) | (6) | (7) |
|-----|------|------|-------|------|------|-----------------------|
| 21  | OBUN | 20.5 | 15.0  | 14.6 | 20.5 | Helvetica-Bold |
| 22  | OBUN | 18.3 | 12.65 | 10.6 | 18.3 | Helvetica-BoldOblique |
| 23  | OBUN | 15.5 | 13.2  | 13.2 | 13.5 | Helvetica-Condensed-Bold |

| OUTPUT DEVICE INPUT |
|---|

PLEASE DESIGNATE OUTPUT DEVICE

- ☐ LBP 730 PS
- ■ LBP 430 PS
- ☐ LBP 330 PS
- ☐ LBP 230 PS
- ☐ LBP 130 PS

[ DELETE ]  [ DECIDE ]

FIG. 131

| ENLARGEMENT · REDUCTION SIZE INPUT |

PLEASE INPUT ENLARGEMENT REDUCTION SIZE

■ HEIGHT DESIGNATION

☐ WIDTH

[         ] mm

[ DELETE ]  [ DECIDE ]

| PRINT DATA STORAGE |
|---|
| SAVE PRINT DATA ? |
| NO      YES |

FIG. 148

| NEW TEXT CREATION |
|---|

TYPEFACE NAME LIST
- KakuGothic-Bold
- MaruGothic-Medium
- HelveticaNeue-Bold
- HelveticaRounded-Bold
- Times-Roman CHARACTER SIZE
REFERENCE CHARACTER HEIGHT: 10 mm
CHARACTER SIZE: 39.701 point TYPEFACE NAME: —3902
HelveticaNeue-Bold BASE LINE ROTATE ANGLE: 0 deg
OBLIQUE ANGLE: 0 deg VERTICAL SCALE: 100 %
CHARACTER SPACING: 0 mm HORIZONTAL SCALE: 100 %
LINE SPACING: 0 mm
OVERALL LENGTH: 0 mm LAYOUT REFERENCE POSITION
- ○ TOP LEFT   ○ TOP   ○ TOP RIGHT
- ○ LEFT   ○ CENTER   ○ RIGHT
- ● BOTTOM LEFT   ○ BOTTOM   ○ BOTTOM RIGHT

3903

LINE JUSTIFICATION
- ● LEFT   ○ CENTER
- ○ RIGHT   ○ FULL

3907

SET FORM
● LANDSCAPE   ○ PORTRATE —3906

HEIGHT PREFERENCE
● YES   ○ NO —3904

AUTOMATIC KERNING
● YES   ○ NO —3905

DELETE  |  RETRIEVE CHARACTER STRING  |  INPUT CHARACTER STRING

CHARACTER STRING INPUT

CHARACTER STRING:

ABC

TYPEFACE NAME: HelveticaNeue-Bold
CHARACTER SIZE: REFERENCE CHARACTER HEIGHT 10.00 mm,
　　　　　　　　CHARACTER SIZE 39.70 point
BASE LINE ROTATE ANGLE: 0.00 deg　　OBLIQUE ANGLE: 0.00 deg
VERTICAL SCALE: 100.00 %　　　　　　CHARACTER SPACING: 0.00 mm
HORIZONTAL SCALE: 100.00 %　LINE SPACING: 0.00 mm　OVERALL LENGTH: 0.00 mm
LAYOUT REFERENCE POSITION: BOTTOM LEFT　　SET FORM: LANDSCAPE
LINE JUSTIFICATION: LEFT　　HEIGHT PREFERENCE: YES
AUTOMATIC KERNING: YES

| INPUT KERNING | CHANGE TYPEFACE INFORMATION | RETRIEVE CHARACTER STRING |

| CHANGE INITIAL VALUE | RECOVER INITIAL VALUE |

| DELETE | SET |

```
┌─────────────────────────────────────────────────────────┐
│                    KERNING INPUT                         │
│  ┌───────────────────────────────────────────────────┐  │
│  │ HORIZONTAL                                        │  │
│  │ CHARACTER                                         │  │
│  │ SPACING:                                          │  │
│  │  ┌──────┐  /96 CHARACTER                          │  │
│  │  │  >2  │    WIDTH                                │  │
│  │  └──────┘                                         │  │
│  │ VERTICAL                                          │  │
│  │ CHARACTER                                         │  │
│  │ SPACING:                                          │  │
│  │  ┌──────┐  /96 CHARACTER                          │  │
│  │  │  ^2  │    HEIGHT                               │  │
│  │  └──────┘                                         │  │
│  │ VERTICAL                                          │  │
│  │ LINE SPACING:                                     │  │
│  │  ┌──────┐  /96 CHARACTER   ┌────────┐ ┌────────┐  │  │
│  │  │  v2  │    HEIGHT        │ DELETE │ │  SET   │  │  │
│  │  └──────┘                  └────────┘ └────────┘  │  │
│  └───────────────────────────────────────────────────┘  │
└─────────────────────────────────────────────────────────┘
                                                    ~4101
```

FIG. 151

Kerning Input screen (4101) and Character String Retrieval screen (4201) with Registered Name List (4202), Registered Name field INFORM1 (4203), Typeface Information (4204) YES/NO, Kerning Information (4205) YES/NO, and CONFIRM / DELETE / RETRIEVE buttons.

| REGISTERED NAME LIST | |
|---|---|
| WARNING1 | WARNING1 NOTE |
| WARNING2 | WARNING2 NOTE |
| INFORM1 | INFORM1 NOTE |
| INFORM2 | INFORM2 NOTE |
| MESSAGE1 | MESSAGE1 NOTE |

REGISTERED NAME: INFORM1

TYPEFACE INFORMATION  ● YES  ○ NO
KERNING INFORMATION  ● YES  ○ NO

[ CONFIRM ] [ DELETE ] [ RETRIEVE ]

FIG. 152

| RETRIEVE CONTENTS CONFIRMATION |
|---|

REGISTERED CHARACTER STRING:

ABC\t>8@DE\t>2FGH

TYPEFACE NAME: HelveticaNeue-Bold

CHARACTER SIZE: REFERENCE CHARACTER HEIGHT 10.00 mm,
CHARACTER SIZE 39.70 point

BASE LINE ROTATE ANGLE: 0.00 deg   OBLIQUE ANGLE: 0.00 deg

VERTICAL SCALE: 100.00 %   CHARACTER SPACING: 0.00 mm

HORIZONTAL SCALE: 100.00 %   LINE SPACING: 0.00 mm   OVERALL LENGTH: 0.00 mm

LAYOUT REFERENCE POSITION: BOTTOM LEFT   SET FORM: LANDSCAPE

LINE JUSTIFICATION: LEFT   HEIGHT PREFERENCE: YES

AUTOMATIC KERNING: YES

[ CONFIRM ]

| TYPEFACE INFORMATION CHANGE | |
|---|---|
| TYPEFACE NAME LIST | CHARACTER SIZE |
| KakuGothic-Bold | REFERENCE CHARACTER HEIGHT: 10 mm |
| MaruGothic-Medium | |
| *HelveticaNeue-Bold* (selected) | CHARACTER SIZE: 39.701 point |
| HelveticaRounded-Bold | |
| Times-Roman | |

TYPEFACE NAME: ~4402
HelveticaNeue-Bold

OBLIQUE ANGLE: 0 deg

VERTICAL SCALE: 100 %  CHARACTER SPACING: 0 mm

HORIZONTAL SCALE: 100 %  LINE SPACING: 0 mm  OVERALL LENGTH: 0 mm

[DELETE] [SET]

TEXT CORRECTION

| TYPEFACE NAME LIST |
|---|
| KakuGothic-Bold |
| MaruGothic-Medium |
| ▓▓▓▓▓▓▓▓▓▓▓▓ |
| HelveticaRounded-Bold |
| Times-Roman |

CHARACTER SIZE
REFERENCE CHARACTER HEIGHT: [10] mm
CHARACTER SIZE: [39.701] point TYPEFACE NAME: ~4502
[HelveticaNeue-Bold]

BASE LINE ROTATE ANGLE: [0] deg   OBLIQUE ANGLE: [0] deg

POINT LAYOUT PERFORMED ~4509

VERTICAL SCALE: [100] %   CHARACTER SPACING: [0] mm

HORIZONTAL SCALE: [100] %   LINE SPACING: [0] mm   OVERALL LENGTH: [0] mm

LAYOUT REFERENCE POSITION
○ TOP LEFT  ○ TOP  ○ TOP RIGHT
○ LEFT  ○ CENTER  ○ RIGHT
● BOTTOM LEFT  ○ BOTTOM  ○ BOTTOM RIGHT
4503

SET FORM
● LANDSCAPE  ○ PORTRATE   ~4506

HEIGHT PREFERENCE
● YES  ○ NO   ~4504

LINE JUSTIFICATION
● LEFT  ○ CENTER
○ RIGHT  ○ FULL
4507

AUTOMATIC KERNING
● YES  ○ NO   ~4505

TEXT LINE HEIGHT · TEXT LINE WIDTH:

|   |      |        |
|---|------|--------|
| 1 | 4.01 | 133.02 |
| 2 | 4.33 | 120.83 |
| 3 | 4.07 | 100.53 |

TEXT HEIGHT: [12.41] mm
TEXT WIDTH: [133.02] mm

~4508

[RE-CALCULATE]   [DELETE]   [CORRECT CHARACTER STRING]   [SET]   /-4501

FIG. 155

| CHARACTER STRING REGISTRATION | |
|---|---|
| REGISTERED NAME LIST ~4602 | |
| WARNING1 | WARNING1 NOTE |
| WARNING2 | WARNING2 NOTE |
| INFORM1 | INFORM1 NOTE |
| INFORM2 | INFORM2 NOTE |
| MESSAGE1 | MESSAGE1 NOTE |

REGISTERED NAME:
INFORM1 — 4603

NOTE:
INFORM1 NOTE — 4604

[ DELETE ]  [ REGISTER ]  — 4601

BASE LINE ROTATE ANGLE

CHARACTER DIRECTION

LAYOUT POSITION

INFORMATION PROCESSING APPARATUS AND INFORMATION PROCESSING METHOD

RELATED APPLICATION

This application is a divisional of application Ser. No. 09/257,064, filed Feb. 25, 1999, now U.S. Pat. No. 6,975,425 the entire contents of which are hereby incorporated herein by reference.

BACKGROUND OF THE INVENTION

1. Field of the Invention

The present invention relates to an information processing apparatus having an editing function, an information processing method therefor, and a storage medium. The present invention is preferable, for example, for an information processing apparatus and an information processing method for creating very delicate block copy, and a storage medium therefor.

2. Related Background Art

An example information processing apparatus having an editing function is an interactive drawing system, such as a CAD or a DTP (Desk Top Publishing) system, for preparing print data, in particular, printing data for a block copy for graphic patterns, characters and illustrations that are displayed on the main bodies of products or on their external packages, or in manuals. The following methods are conventionally employed by the above system to prepare such print data.

(1) A method whereby interactive graphic patterns and characters are edited and are laid out, while presented on a display device are rough images that differ from images that are printed, and whereby printing data are separately prepared, by adding attributes required for printing, and are printed using a printer.

(2) A method whereby interactive graphic patterns and characters are edited and are laid out, while presented on a display device are rough images that differ from images that are printed, and whereby when a printer is used to reproduce the images presented on the display device, the shapes of the reproduced images are substantially the same as those on the display.

Method (2) is a technique called WYSIWYG (What You See Is What You Get), whereby an image presented on a display device has the same display form as has an image reproduced by a printer.

In addition, the following method is employed to prepare printing data, without using the interactive drawing system.

(3) A method whereby a markup language, such as $T_EX$, is employed to process source text in which are described attributes required for printing, and layout information as well as graphic data and character data, and whereby, when the processing of the source text is performed by way of batch processing, printing data are obtained that are output to a printer and are used to produce printed matter.

However, the above described examples of prior art methods have the following problems, which are assigned numbers that correspond to those provided for the individual examples described above.

(1) Since an image printed by a printer differs considerably from that which is presented on a display device, a user must repeat the printing process many times and repetitiously perform corrections until a desired image is obtained, and further, a satisfactory user interface is not available.

Also, since display data must be prepared in addition to print data, the efficiency of the data preparation process is not fully satisfactory.

(2) When the above described WYSIWYG function is employed to interactively lay out the graphic patterns and characters, a user must perform a layout operation in accordance with an image displayed on the display device.

However, the accuracy of the operation depends on the resolution of the display device. Therefore, when an image is produced by a printer that has a resolution that is considerably higher than that of the display device, errors occur because of the difference in the resolutions, and what is provided on the display device differs from the results that are provided by the printer.

Assume, for example, that a detailed layout, such as, "end points of a circumscribed rectangle for the visible portion of a character or a figure are aligned along the conventional points," is required to prepare the printing data for a block copy. Even when the layout of an image on the display device seems correct to a user, small errors occur in the image that is actually printed by a printer having 30 to 50 times the resolution of the display device, and this renders correct position alignment very difficult.

(3) When a markup language, such as a Tex, is employed, unlike method (2) errors error due to a difference in resolution do not occur so long as the correct layout is instructed. However, since the processing is not performed interactively, a user can not perform a layout operation while observing the results of the layout, so that the user interface is even less satisfactory than is the one in method (1). Since the layout must always be precisely described, even when a detailed layout is not required, to prepare the printing data extra labor must be expended and the number of unnecessary operations that are performed is increased, and the efficiency of the work performed by a user is deteriorated.

When a special image processing program is employed to fetch a screen image, or to convert a photo image into digital information using a scanner and to hold it as raster information, the raster image can be edited as dots. However, the special image processing program edits an image as a rasterized image, i.e., as an image made up of dots. Thus, if the image is modified by enlarging or reducing it, the resultant image becomes jagged and representation accuracy can not be maintained.

In addition, assume that the positioning of a character string having the same color as that of the background is to be performed while a printed image is displayed on the display device. Especially when monochrome block copy is being prepared, situations frequently arise where reverse video characters, that is, characters produced by employing the reverse video mode only for the characters themselves, are superimposed on a figure (pattern) filled with a solid color (paint out).

According to one method, a solid color figure is drawn first and then characters are drawn that have the same color as that which is designated for the background.

In this case, if a string comprising reverse video characters is placed directly on the background, or if the solid color figure that constitutes the background for the reverse video character string, or for a reverse video graphic figure, is moved or deleted during interactive editing processing, the reverse video character string, or figure, can not be distinguished from the background, thus rendering the editing job very difficult.

Assume that, as is shown in FIG. 80, reverse video characters (characters having the same color as the background), such as ABC, are superimposed on a solid color figure. When the color filled figure is moved to the right and upward during interactive processing, the characters ABC become invisible.

A specific color can be temporarily set for a character string, or for a graphic figure, so that it can be used to support the interactive editing process when the string is in a temporarily specific state, such as when it is being selected. In this case, when the solid color background figure and the reverse video character string are set to the temporarily specific state at the same time, they can not be distinguished, one from the other, and again the editing job is very difficult.

When, as is shown in FIG. 81, a solid color figure and reverse video characters are selected, and when both of them are shifted to the same temporarily specific state, the reverse video characters become invisible.

Conventionally, to position a character string so that a specific character is displayed at a designated location, an information processing apparatus of this type generally employs a method according to which a tab position is regarded as a designated location for the left end of the body of the specific character at the designated position.

However, the following conventional problem has arisen.

If, for example, the specific character is a period and the periods for numerical data written on a plurality of lines are aligned with designated positions, a thick type face (Bold) or a large character size may be employed, or an oblique angle may be set in order to exaggerate specific numerical data. In this case, in the above prior art, the left end of the body of the period, i.e., the left end of a box wherein an empty portion is the equivalent of a specific ratio for the relationship of a circumscribed rectangle to the contour of a character, is situated at the designated position. Therefore, when character strings having different attributes are present, for each character string the size of the empty portion in the box changes, the shape of the character contour varies, depending on the oblique angle, or the periods are so aligned that they disappear.

Furthermore, since the location of a specific character corresponds to a tab position, precise positioning is difficult to achieve.

SUMMARY OF THE INVENTION

To resolve the various conventional shortcomings described above, it is a first objective of the present invention to precisely and easily prepare accurate printing data without the work efficiency of a user being deteriorated.

It is a second objective of the present invention to designate an adequate output color for a reverse video element for which a reverse video attribute is set, and to easily and consistently identify the reverse video element in, for example, an interactive editing process.

It is a third objective of the present invention to accurately determine the location of a character string.

It is a fourth objective of the present invention to accurately change the magnification rate for of a figure in association with printing data, without the work efficiency of a user being deteriorated.

To achieve the first objective, an information processing apparatus according to the present invention comprises:

storage means for storing printing data to which a printing attribute has been added;

contour information extraction means for extracting contour information for the printing data based on the printing attribute added to the printing data that are stored in the storage means;

layout reference information setting means for employing the contour information, extracted by the contour information extraction means, to determine layout reference information to be used as a reference when laying out the printing data; and layout means for laying out the printing data based on the information determined by the layout reference information setting means.

To achieve the first objective, an information processing method according to the present invention comprises:

a contour information extraction step of extracting contour information for printing data based on a printing attribute that has been added to the printing data stored in storage means;

a layout reference information setting step of employing the contour information, extracted at the contour information extraction step, to determine layout reference information to be used as a reference when laying out the printing data; and a layout step of laying out the printing data based on the information determined at the layout reference information setting step.

Further, to achieve the second objective, an information processing apparatus according to the present invention comprises:

determination means for determining an output destination for a reverse video element for which a reverse video attribute is set;

acquisition means for obtaining a background color, for the output destination, determined by the determination means; and output color setting means for designating for the reverse video element a color that differs from the background color obtained by the acquisition means.

To achieve the second objective, an information processing method according to the present invention comprises:

a determination step of determining an output destination for a reverse video element for which a reverse video attribute is set;

an acquisition step of obtaining the background color at the output destination, which was determined at the determination step; and an output color setting step of designating for the reverse video element a color that differs from the background color obtained at the acquisition step.

To achieve the third objective, an information processing apparatus according to the present invention comprises:

storage means for storing character data to which a printing attribute has been added;

holding means for holding, for a specific character, information for a position in a character pattern body;

extraction means for employing the printing attribute, which has been added to the character data stored in the storage means, to extract body information for characters, or a character string that is represented by the character data;

position designation means for designating the location of the specific character in the characters or in a character string that is to be laid out; and layout means for, when the specific character in the characters or in the character string is located at the position designated by the position designation means, employing the body information and the information for a position in a character pattern body to determine the head position of a body that corresponds to the characters or the character string, and for laying out the character string.

To achieve the third objective, an information processing method according to the present invention comprises:

a storage step of storing in a memory character data to which a printing attribute has been added;

a holding step of holding in-body location information for the character pattern of a specific character;

an extraction step of employing the printing attribute that is added to the character data stored in the memory to extract body information for characters or for a character string that is represented by the character data;

a position designation step of designating the location of the specific character in characters or in a character string to be laid out; and a layout step of, when the specific character in the characters or in the character string is located at the position designated at the position designation step, employing the body information and the in-body location information to determine the head position of a body that corresponds to the characters or to the character string, and of laying out the character string.

To achieve the fourth objective, a graphic processing apparatus according to the present invention comprises:

storage means for storing graphic data to which a printing attribute has been added;

contour information extraction means for extracting contour information for the graphic data based on the printing attribute that has been added to the graphic data stored in the storage means; and magnification-change means for changing the magnification power for the graphic data based on the contour information extracted by the contour information extraction means.

To achieve the fourth objective, a graphic processing method according to the present invention comprises:

a storage step of storing in storage means graphic data to which a printing attribute has been added;

a contour information extraction step of extracting contour information for the graphic data based on the printing attribute that has been added to the graphic data stored in the storage means; and a magnification change step of changing a magnification power for the graphic data based on the contour information extracted at the contour information extraction step.

BRIEF DESCRIPTION OF THE DRAWINGS

FIG. 7 is a diagram showing an example printing data file;

FIG. 11 is a diagram showing a graphic data printing attribute-editing panel;

FIG. 31 is a diagram showing a symbol state selection panel;

FIG. 32 is a diagram showing a symbol date input panel;

FIG. 33 is a diagram showing example text;

FIG. 35 is a diagram showing a text editing panel;

FIG. 48 is a diagram showing an example dragonfly scale setting;

FIG. 50 is a diagram showing a bar code setting panel;

FIG. 53 is a diagram showing a proof sheet output condition setting panel;

FIG. 58 is a diagram showing a fair copy outputs condition setting panel;

FIG. 59 is a diagram showing an example fair copy label;

FIG. 60 is a diagram showing a file storage panel;

FIG. 80 is a diagram showing an example defect concerning the display of a reverse video element;

FIG. 107 is a diagram showing an example file concerning the arrangement position information included in a character box having standard character attributes;

FIG. 120 is a flowchart showing the contour extraction processing performed according to the eighth embodiment of the present invention;

FIG. 121 is a flowchart showing the multi-line contour extraction processing performed according to the eighth embodiment of the present invention;

FIG. 122 is a flowchart showing the contour extraction processing performed for a III class graphic pattern according to the eighth embodiment of the present invention;

FIG. 123 is a flowchart showing the processing performed to calculate the number of divided segments in a Bezier curve in accordance with the resolution for an output device according to the eighth embodiment of the present invention;

FIG. 124 is a diagram for explaining the state wherein the De Casteljau algorithm is employed to divide a Bezier curve;

FIG. 125 is a diagram showing line segments prepared while taking into consideration a printing attribute (preparation of offset line segments);

FIGS. 126A, 126B and 126C are diagrams showing the preparation of a virtual circle having a round connection shape;

FIG. 127 is a diagram showing the resolution input screen (window) of the output device;

FIGS. 128A, 128B and 128C are diagrams showing the end edge shape square capping processing;

FIGS. 129A, 129B and 129C are diagrams showing the end edge shape round capping processing;

FIG. 130 is a diagram showing the input screen (window) of the output device;

FIG. 131 is a diagram showing an enlarged/reduced size input screen (window);

Figure 132:
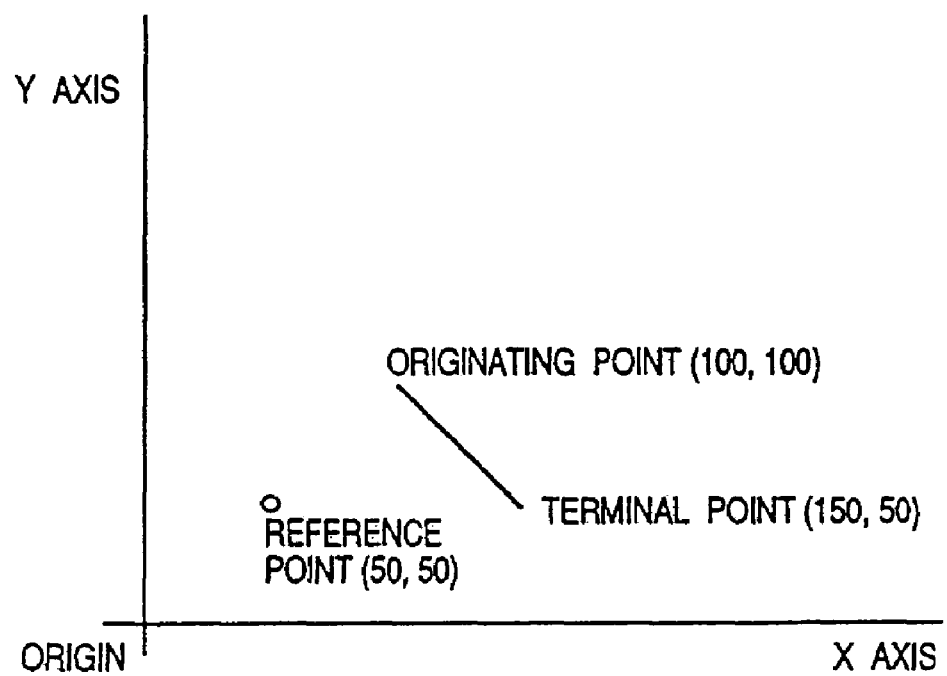
Figure 133:
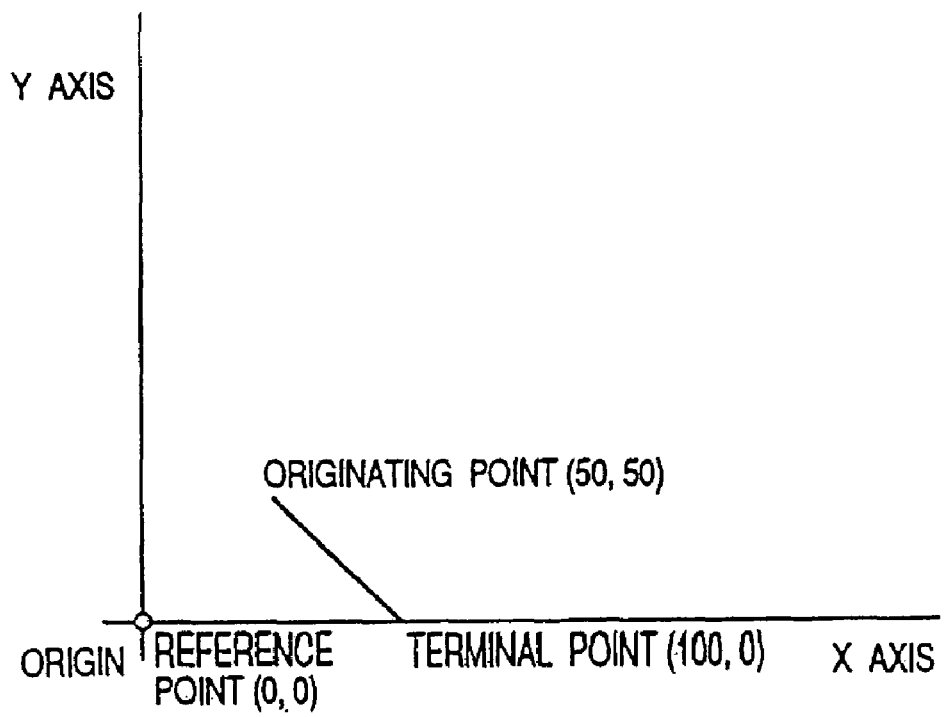
Figure 134:
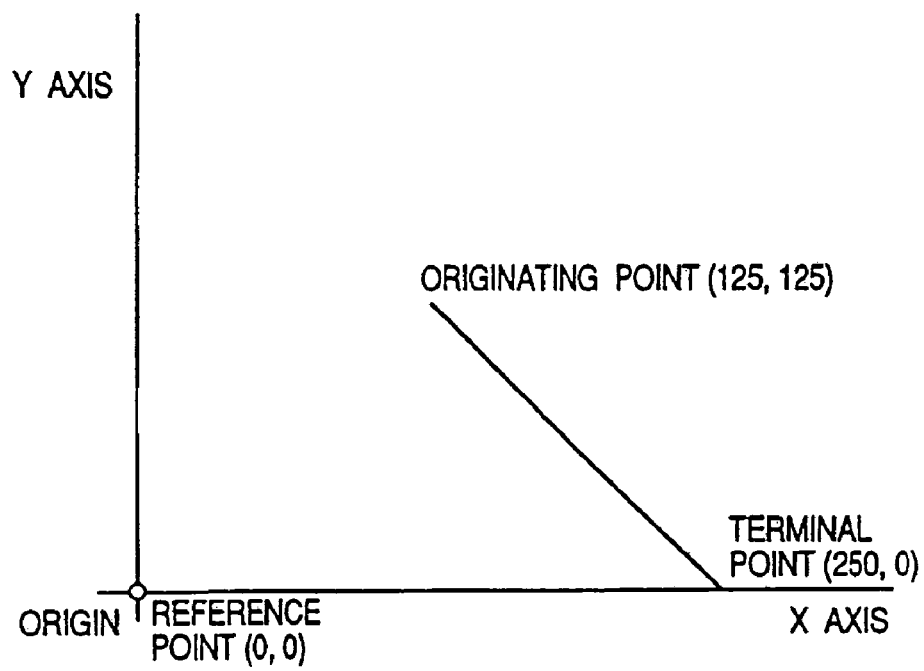
Figure 135:
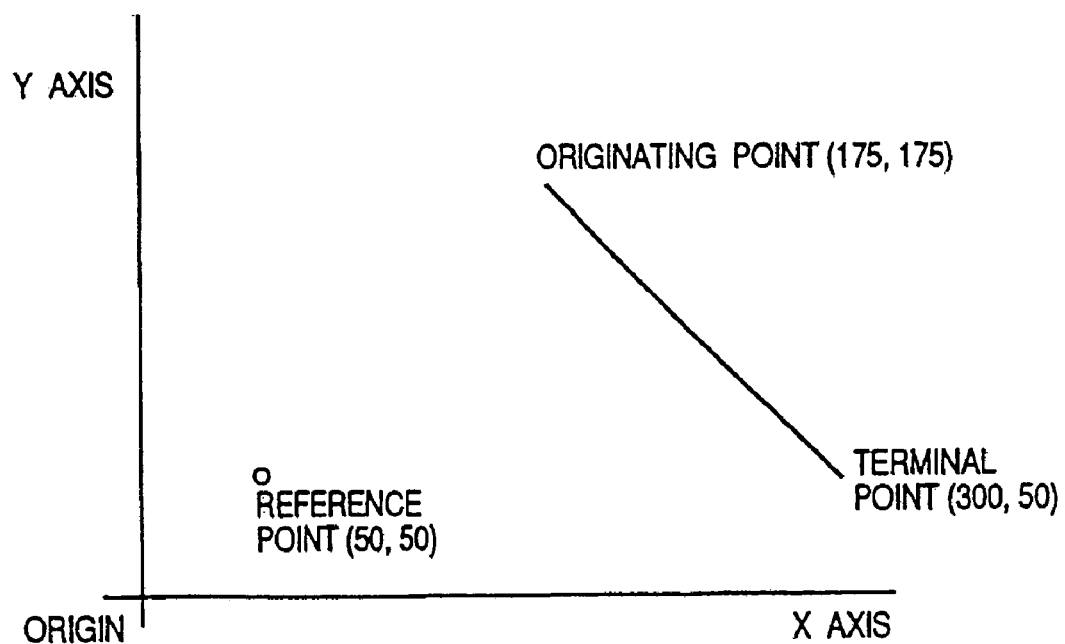
Figures 136, 137:
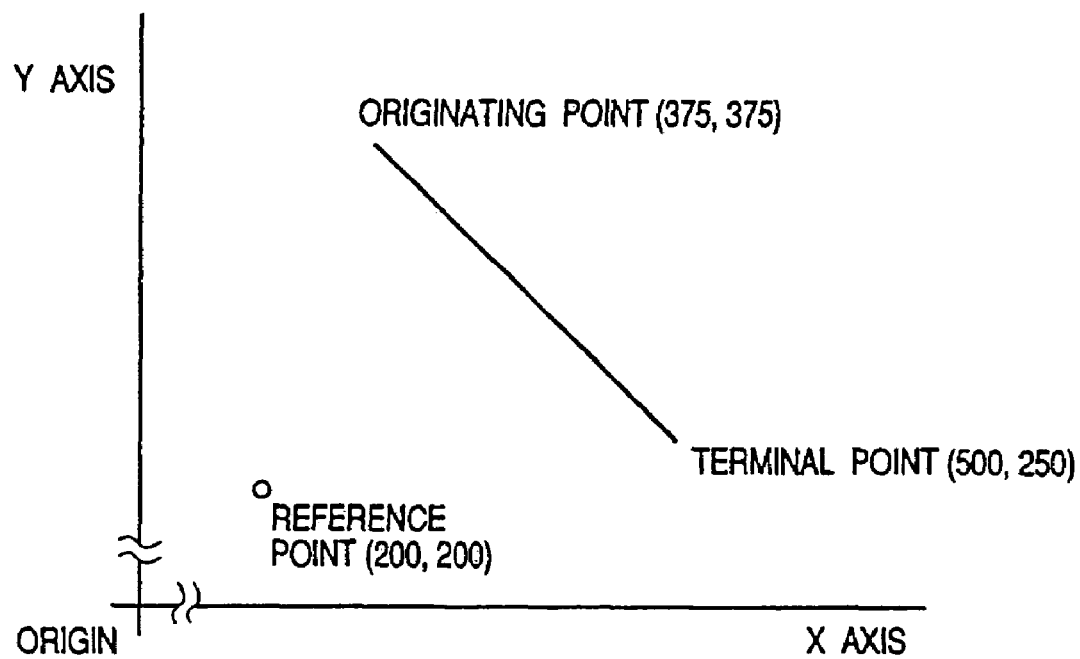
Figure 138C:
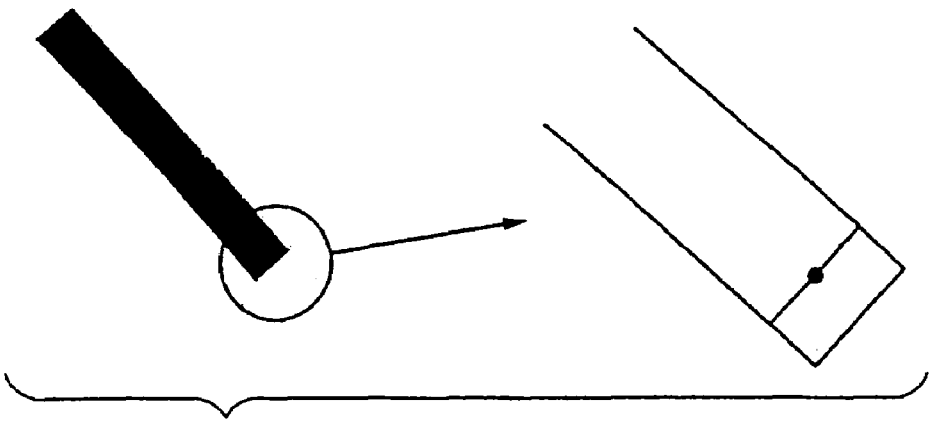
Figure 138B:
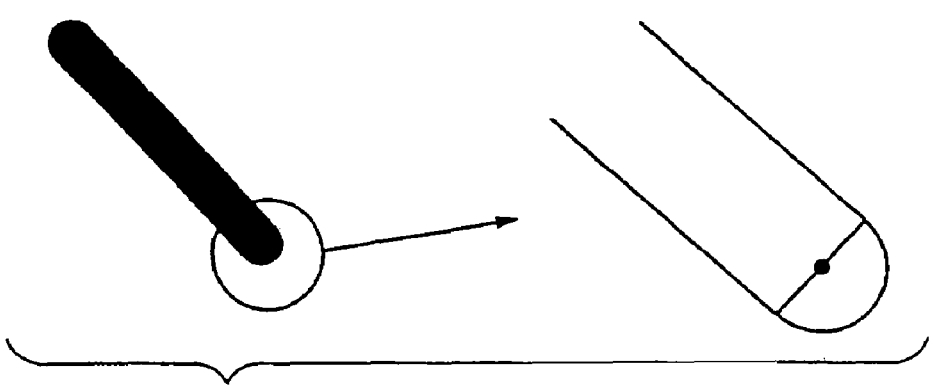
Figure 138A:
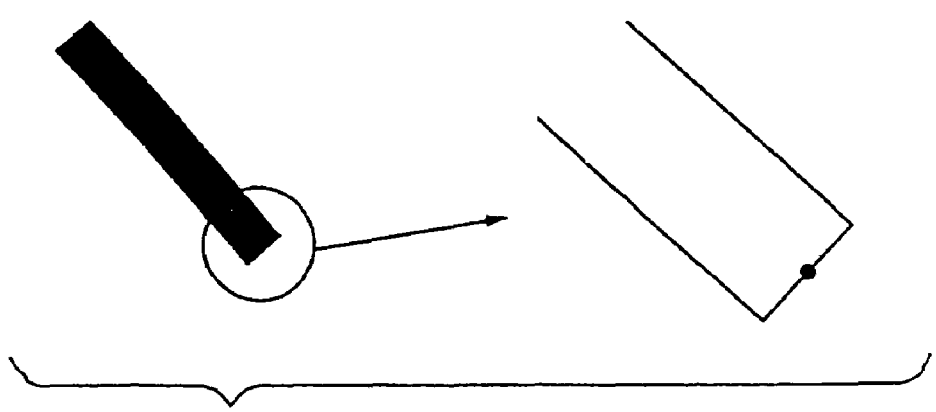
Figure 139:
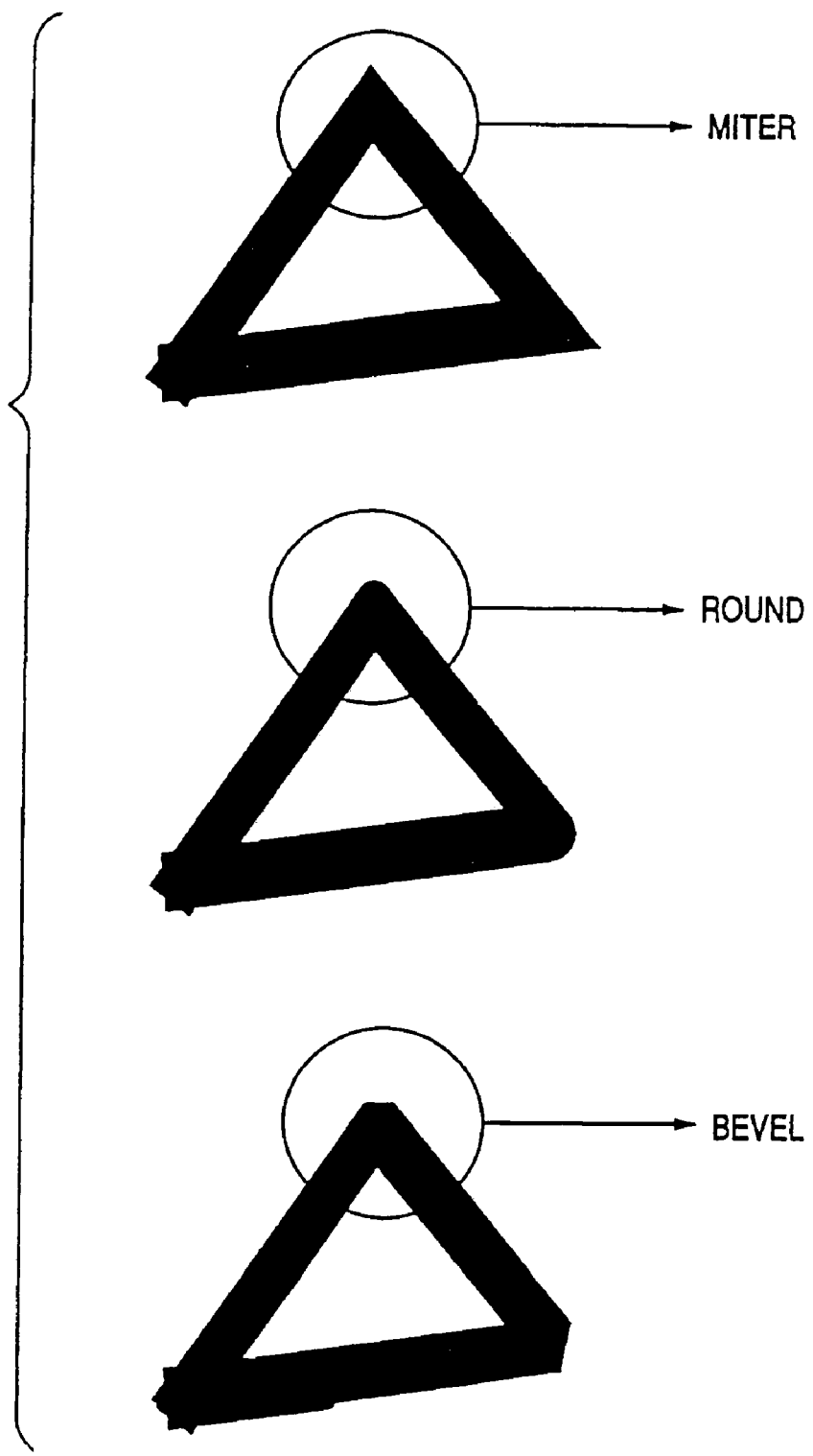
Figure 140:
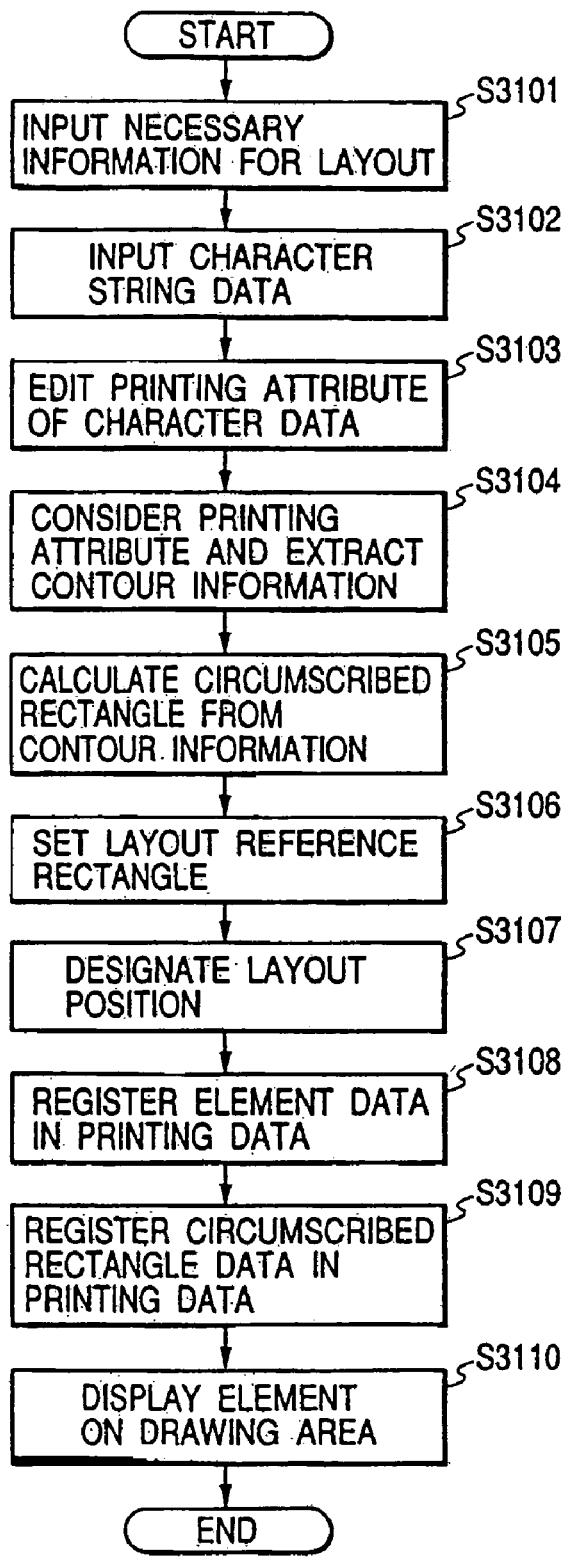
Figure 141:
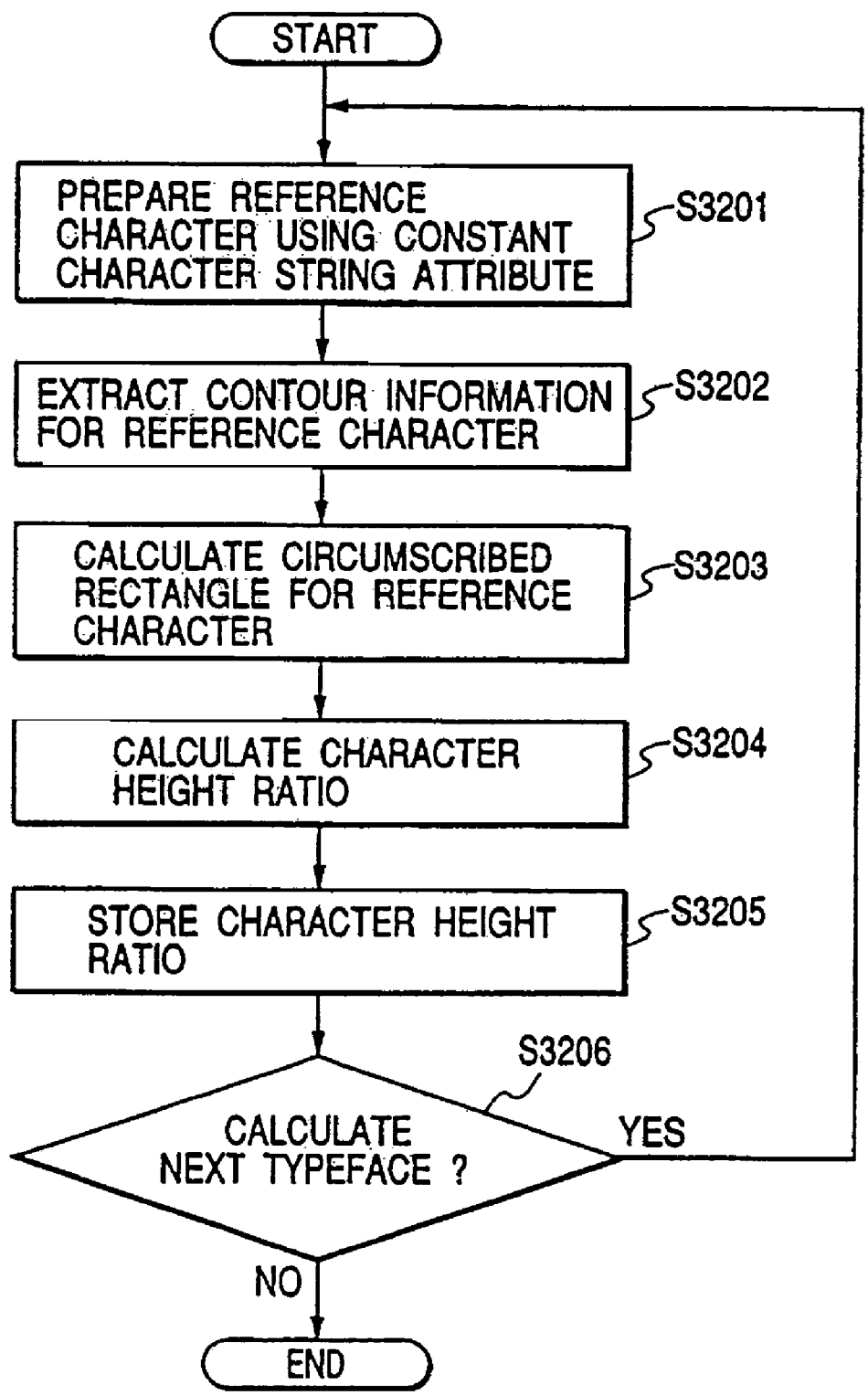
Figure 142:
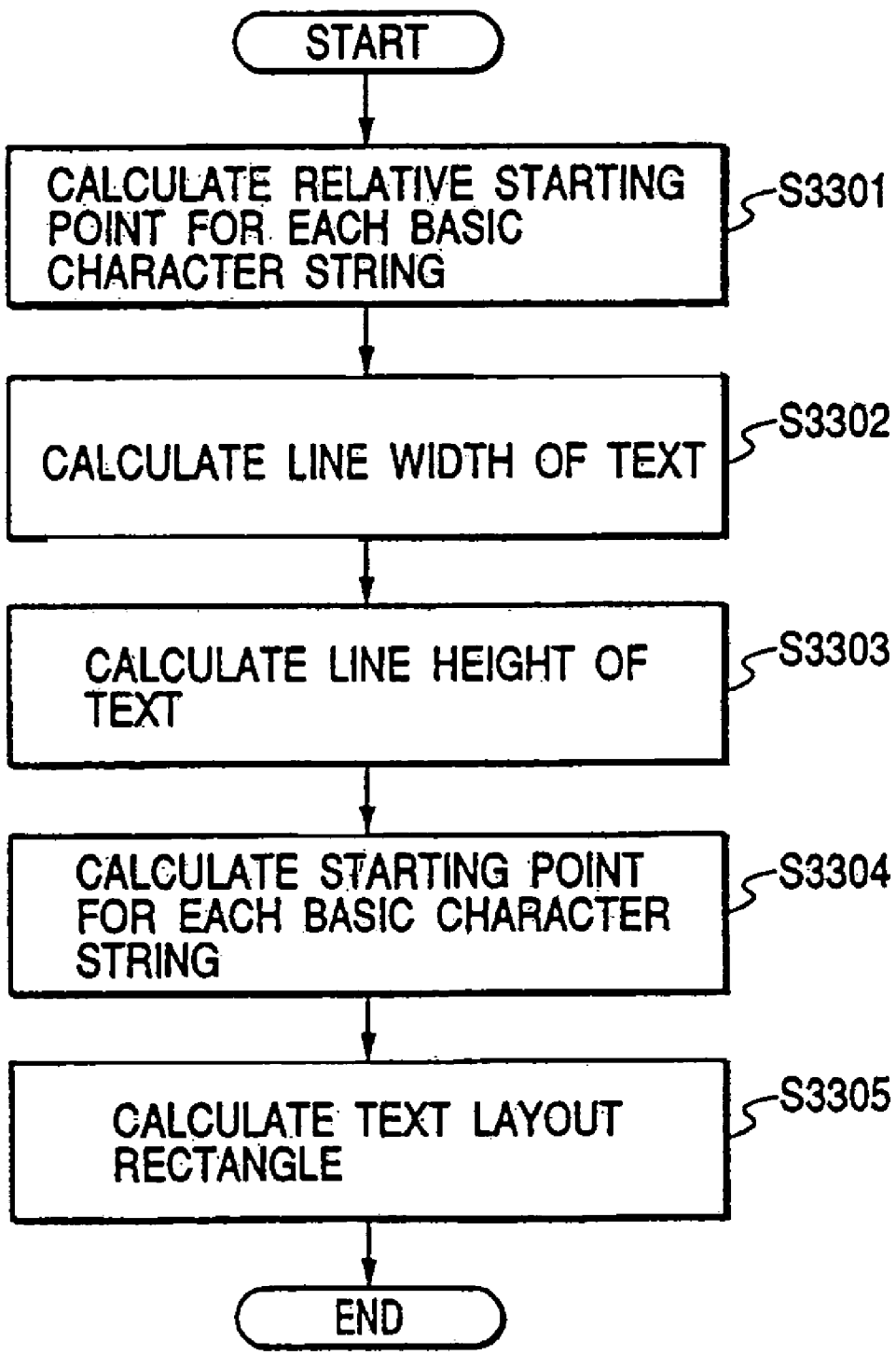
Figure 143:
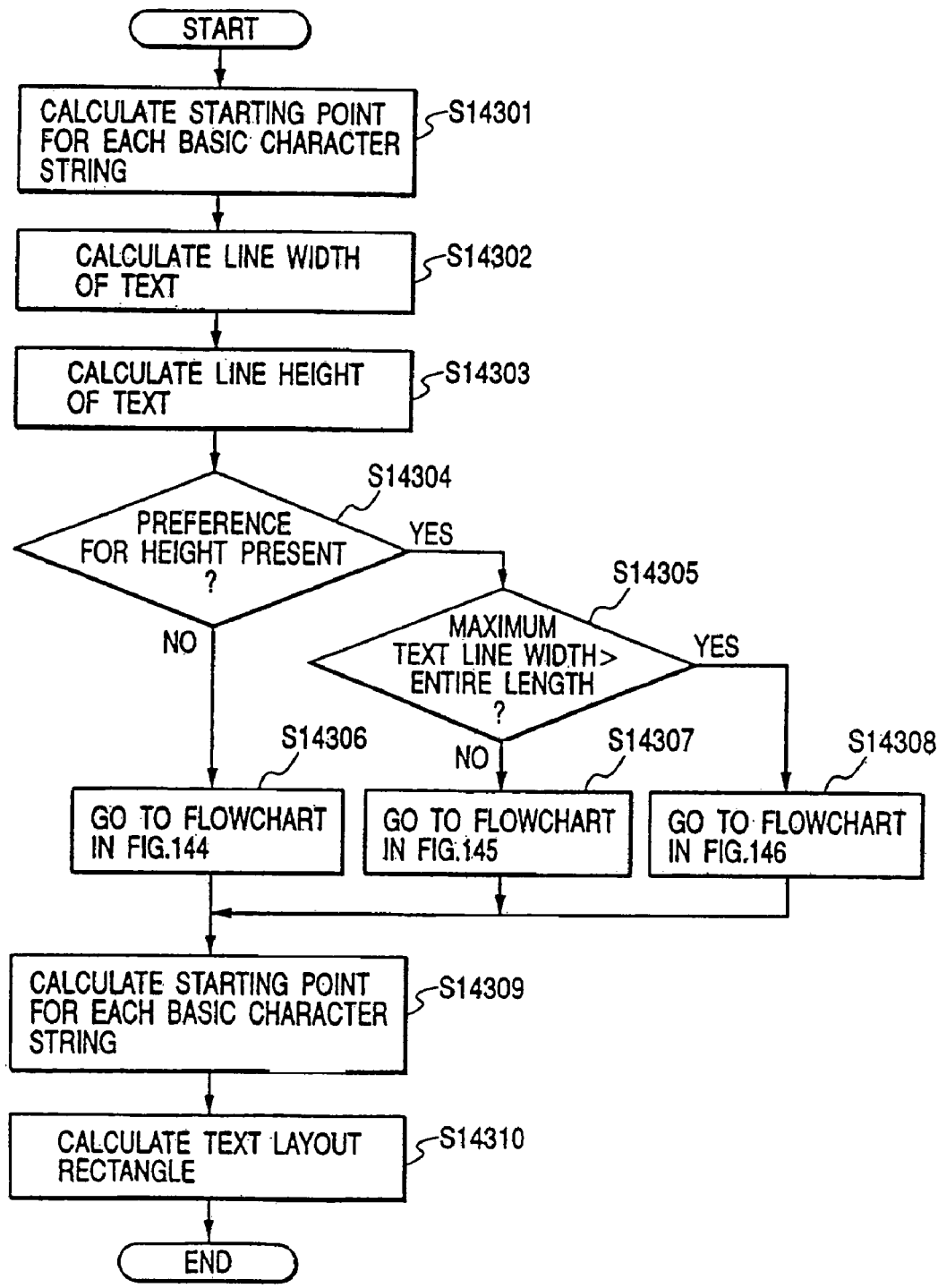
Figure 144:
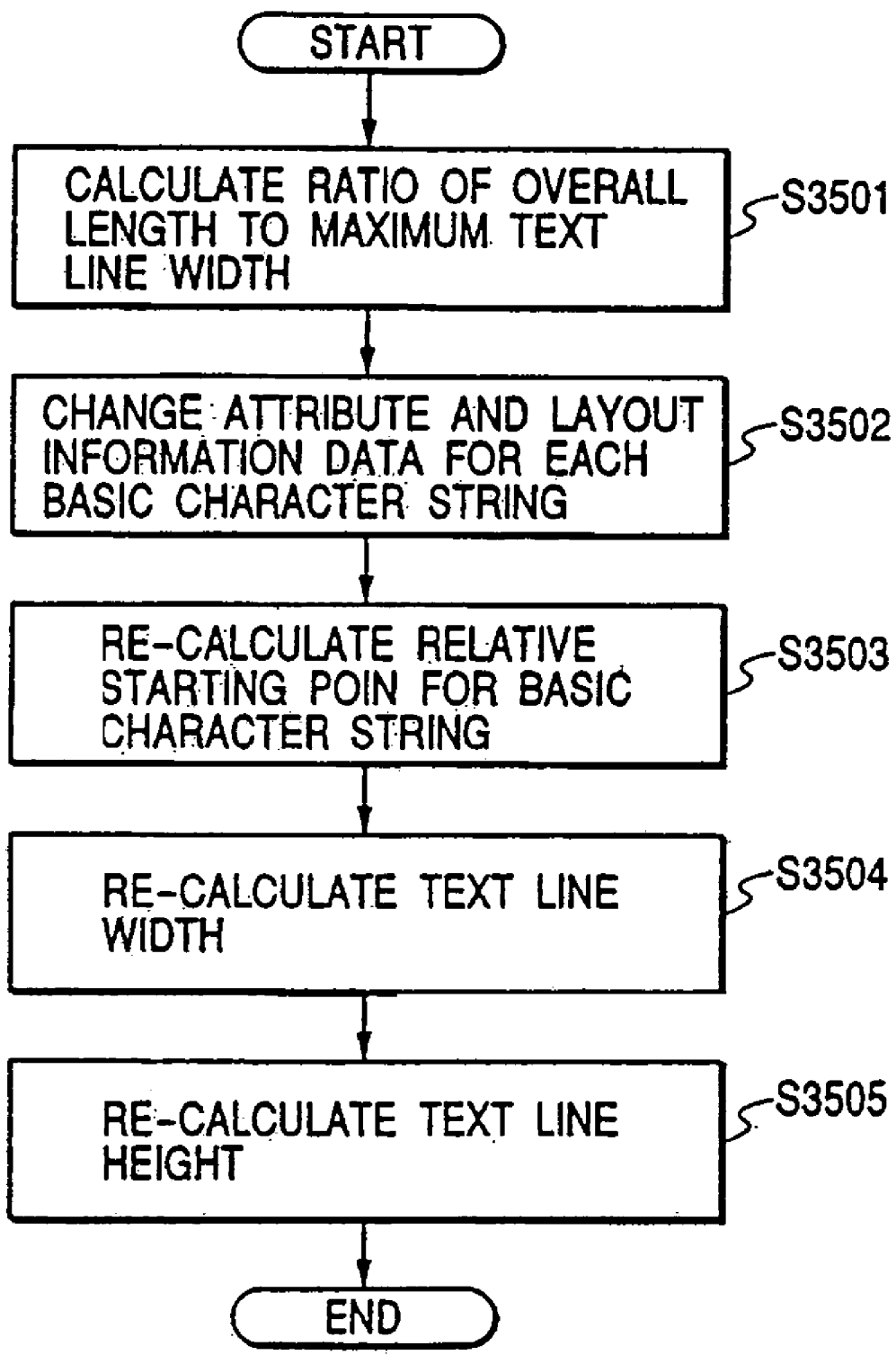
Figure 145:
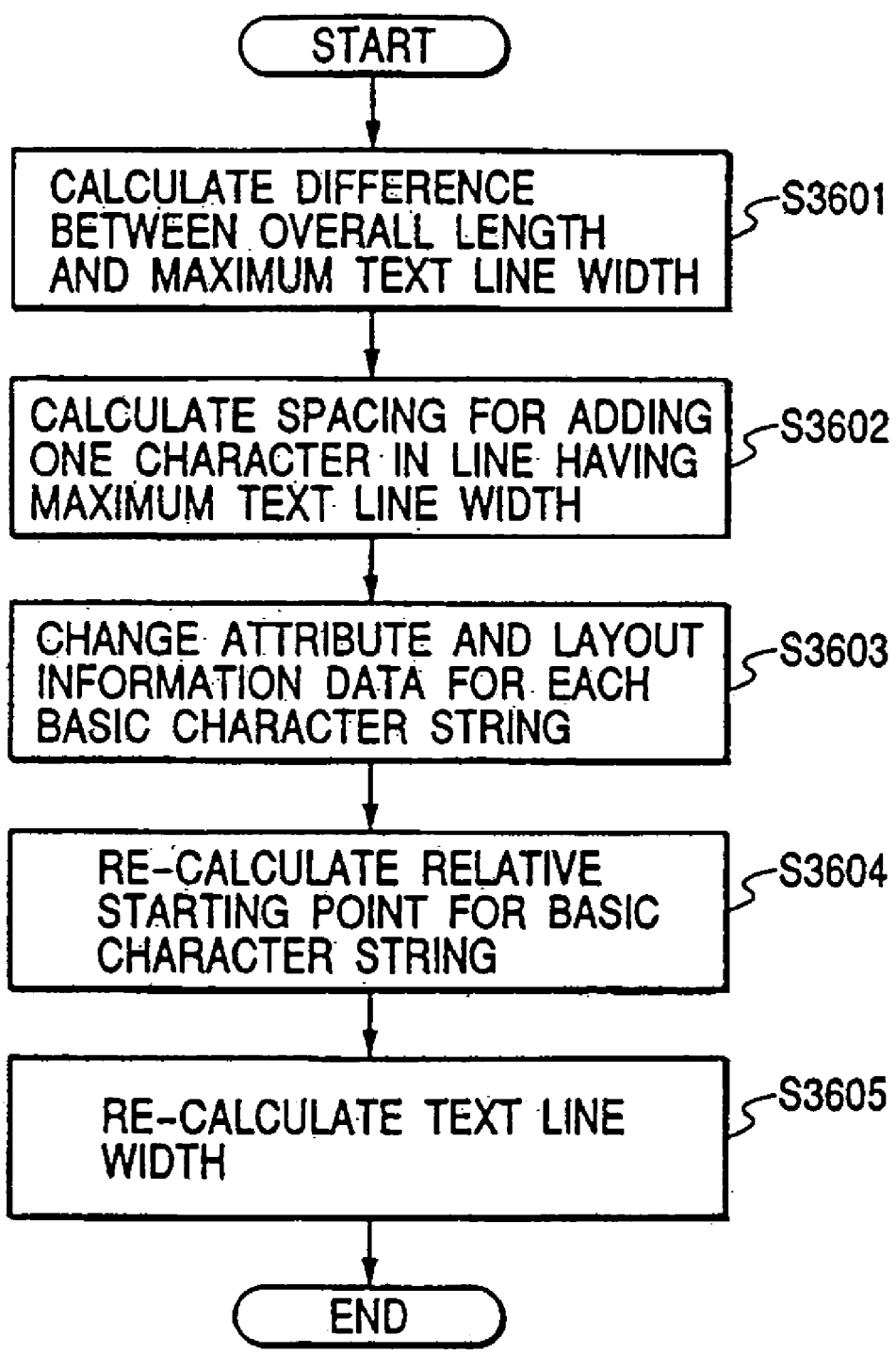
Figure 146:
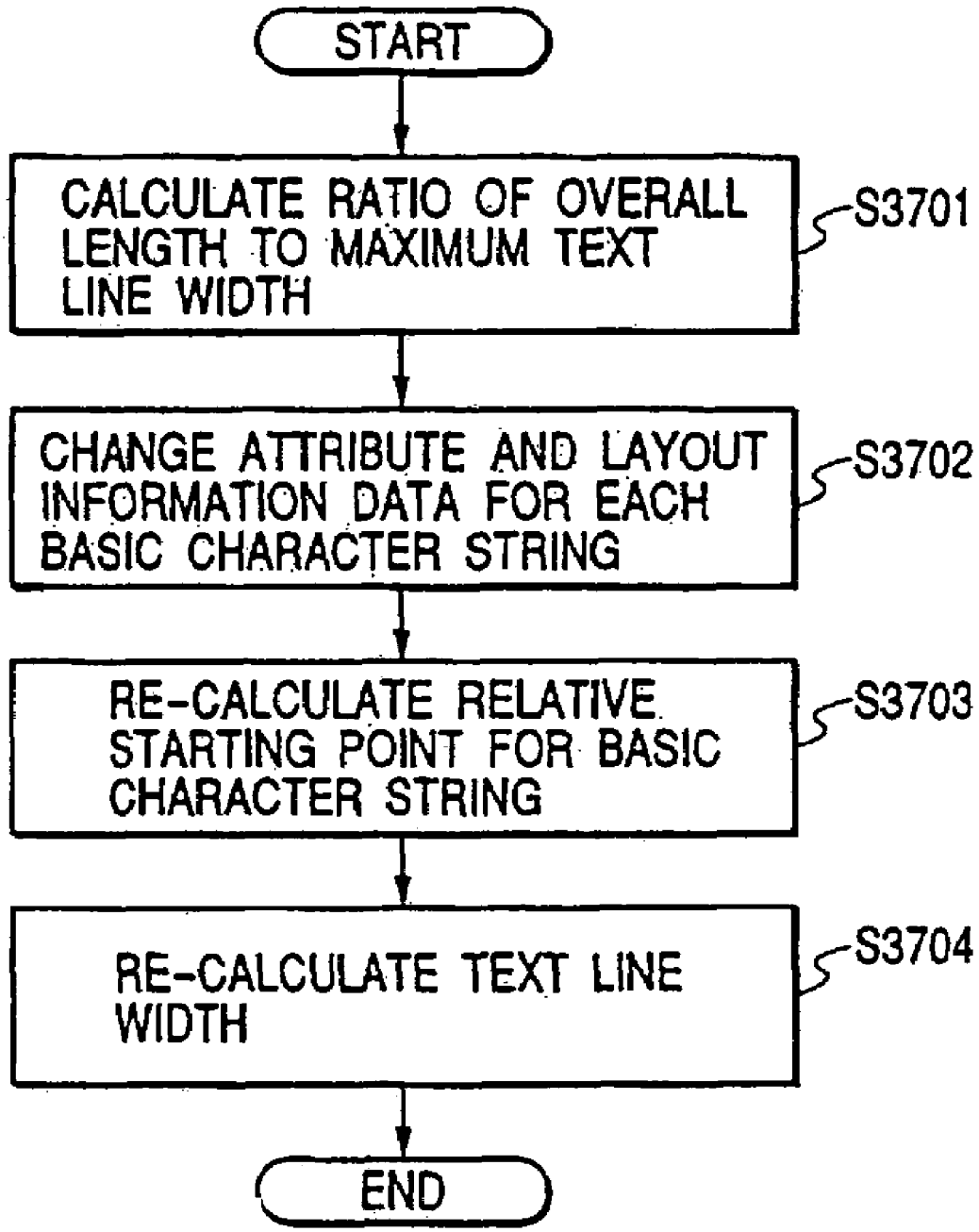
Figure 147:
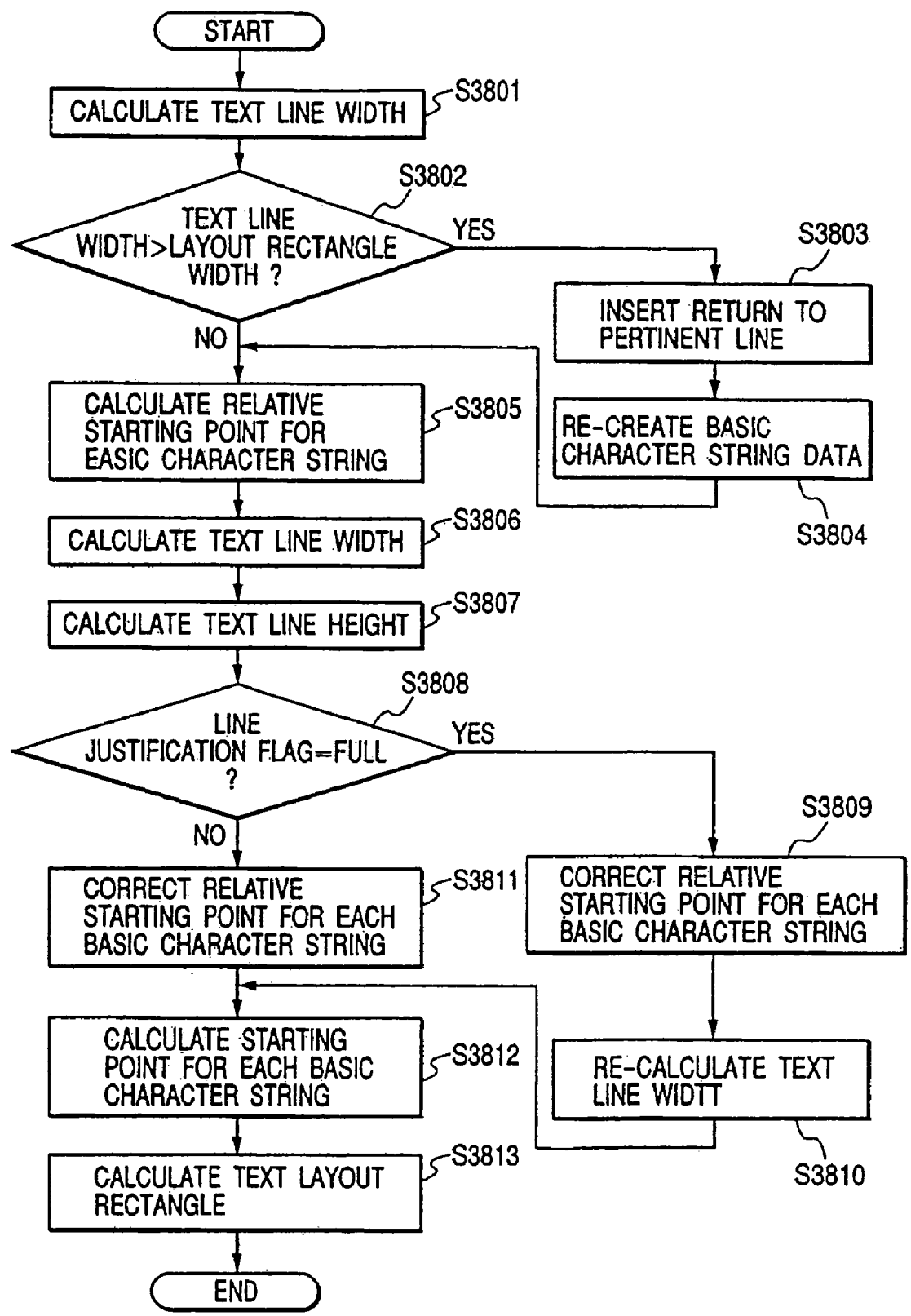
Figure 156:
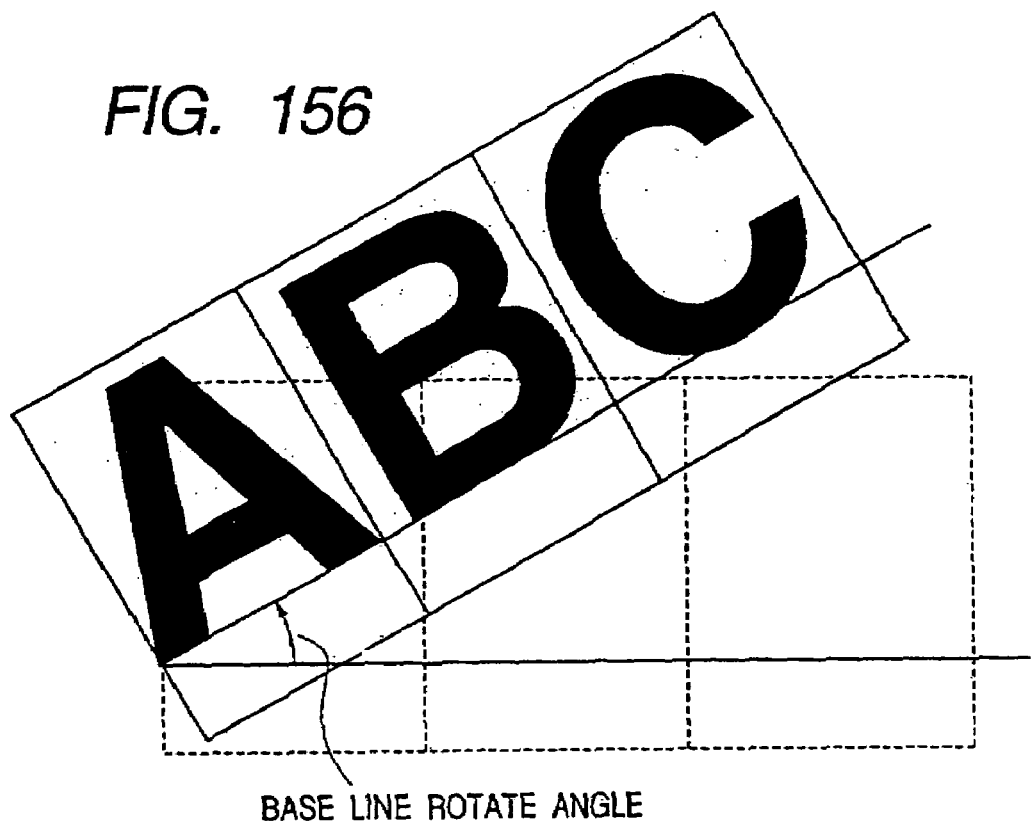
Figure 157:
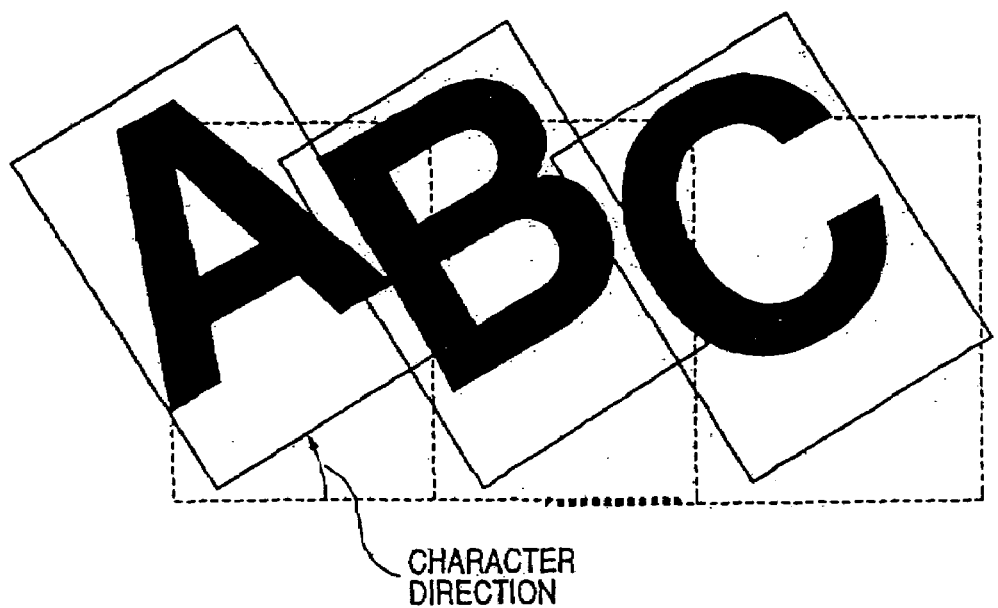
Figure 158:
Figure 160:
Figure 159:
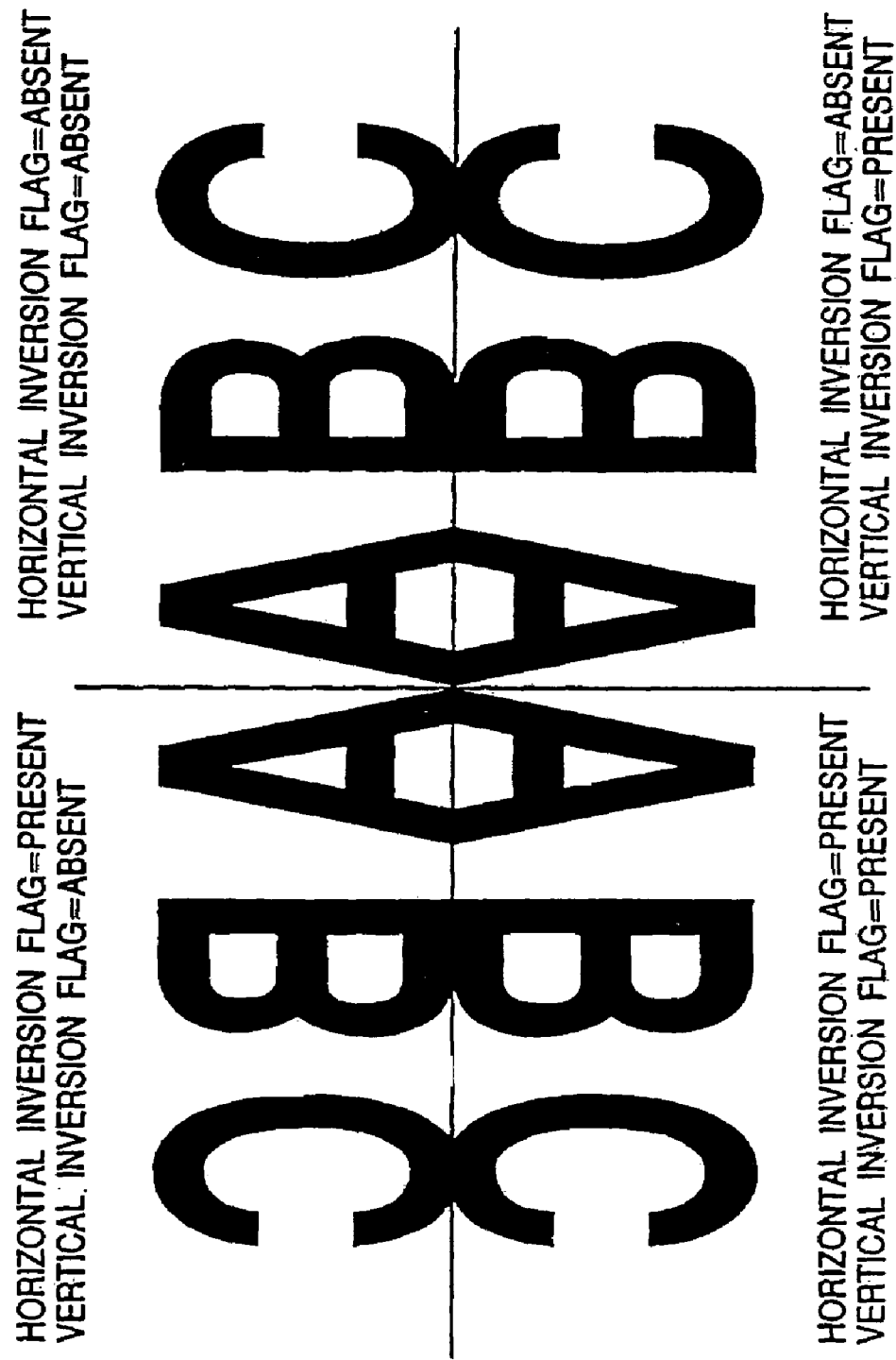
Figure 161:
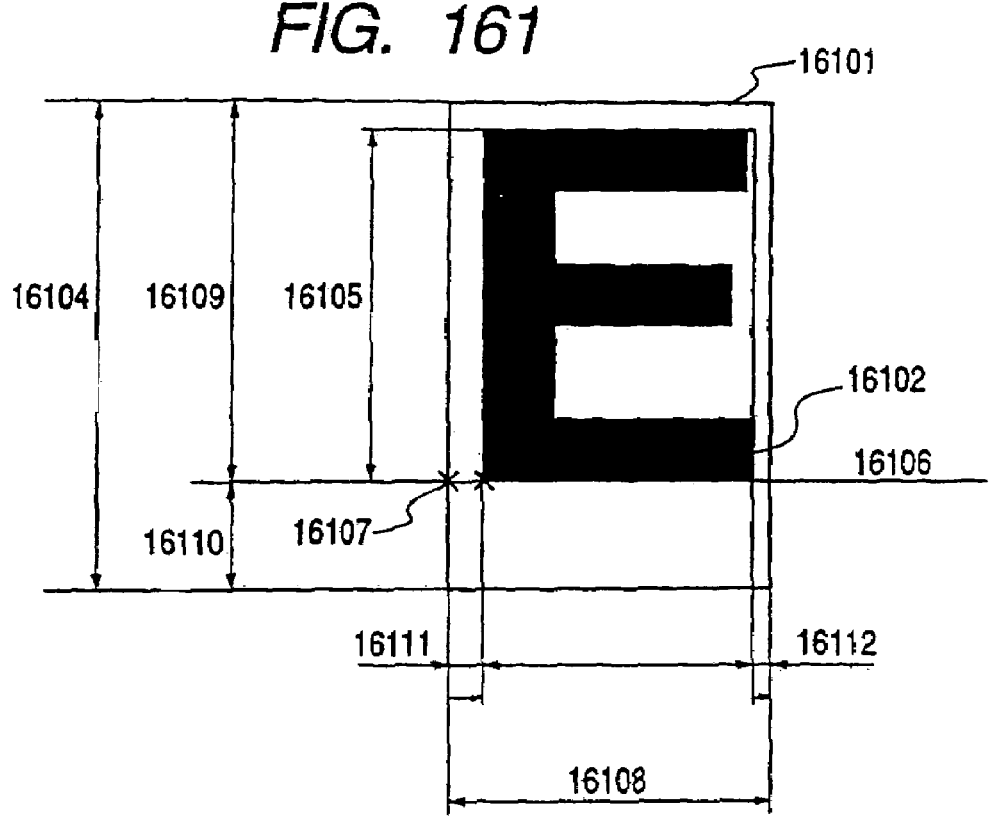
Figure 162:
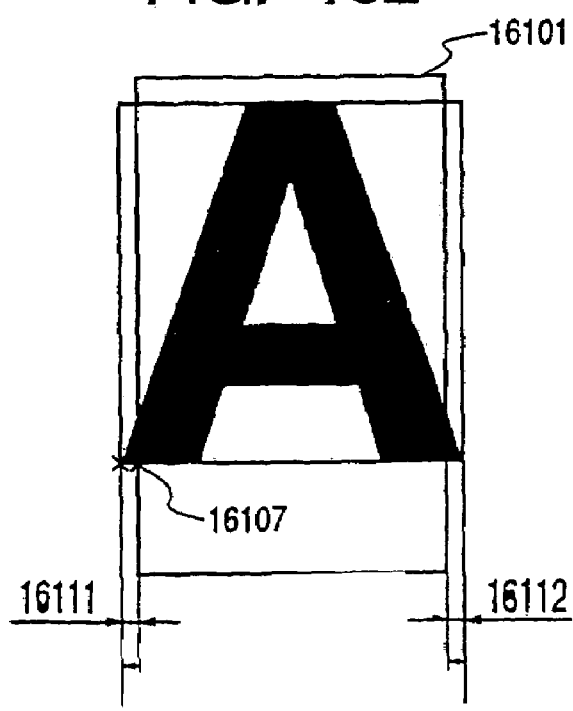
Figure 163A:
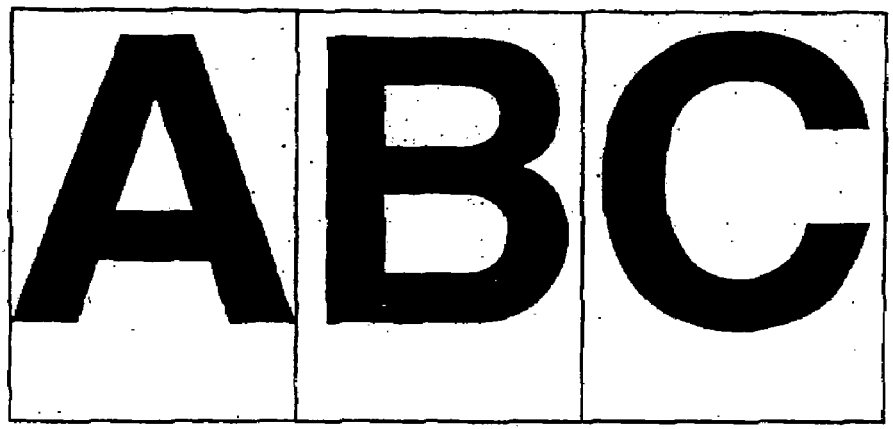
Figure 163B:
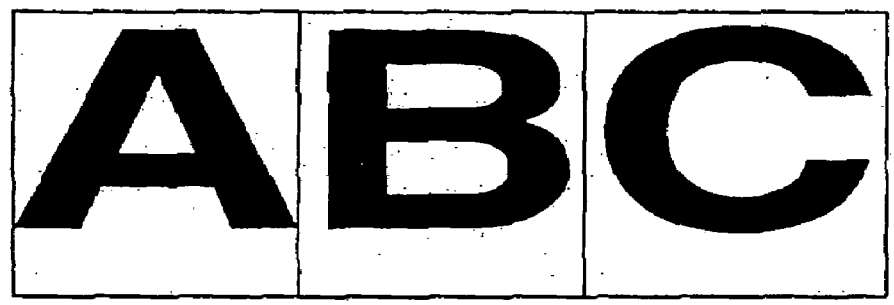
Figure 163C:
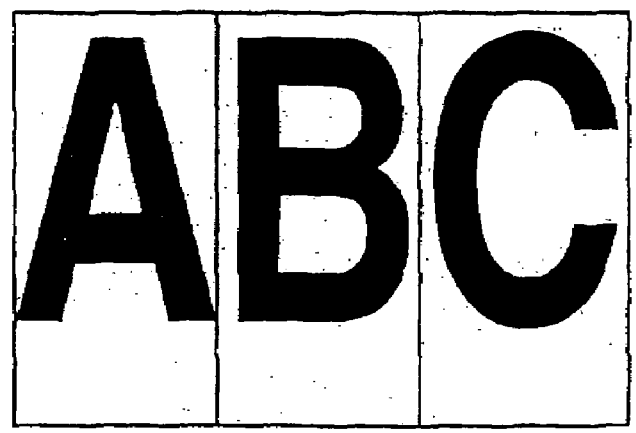
Figure 164:
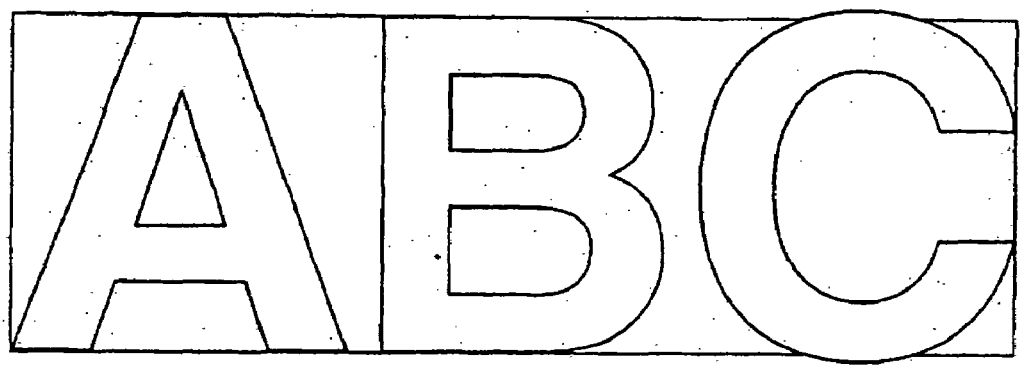
Figure 165:
Figure 166:
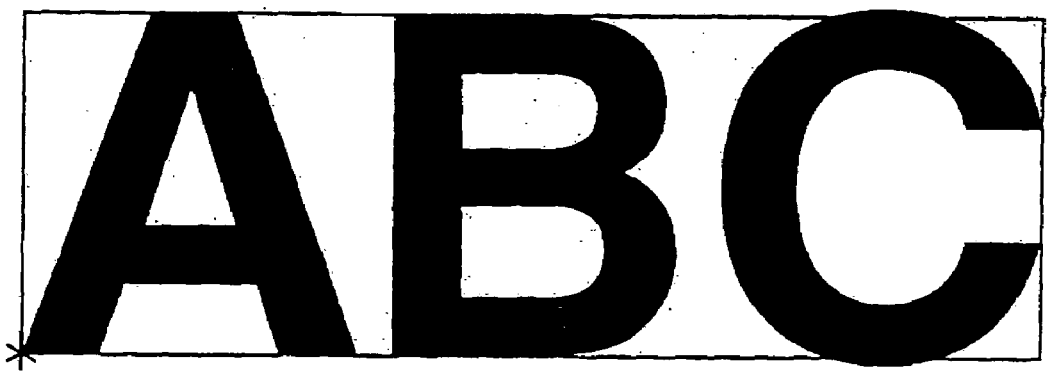
Figure 167A:
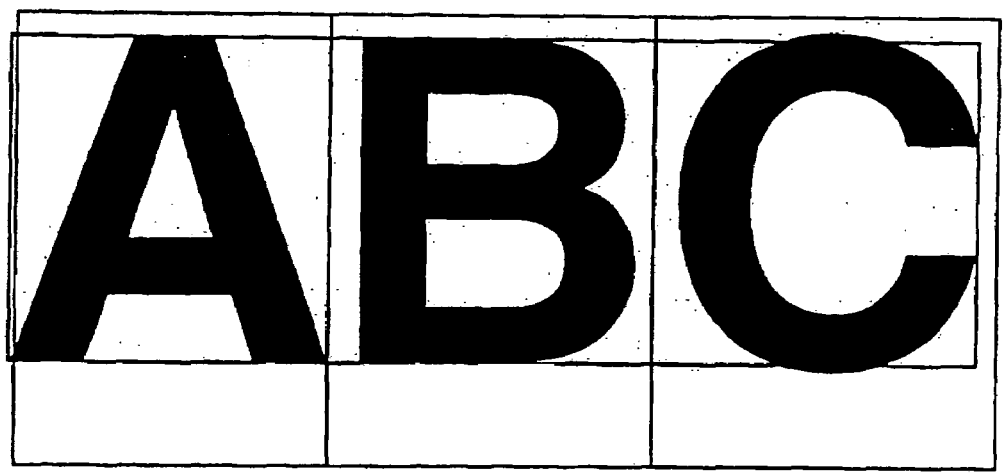
Figure 167B:
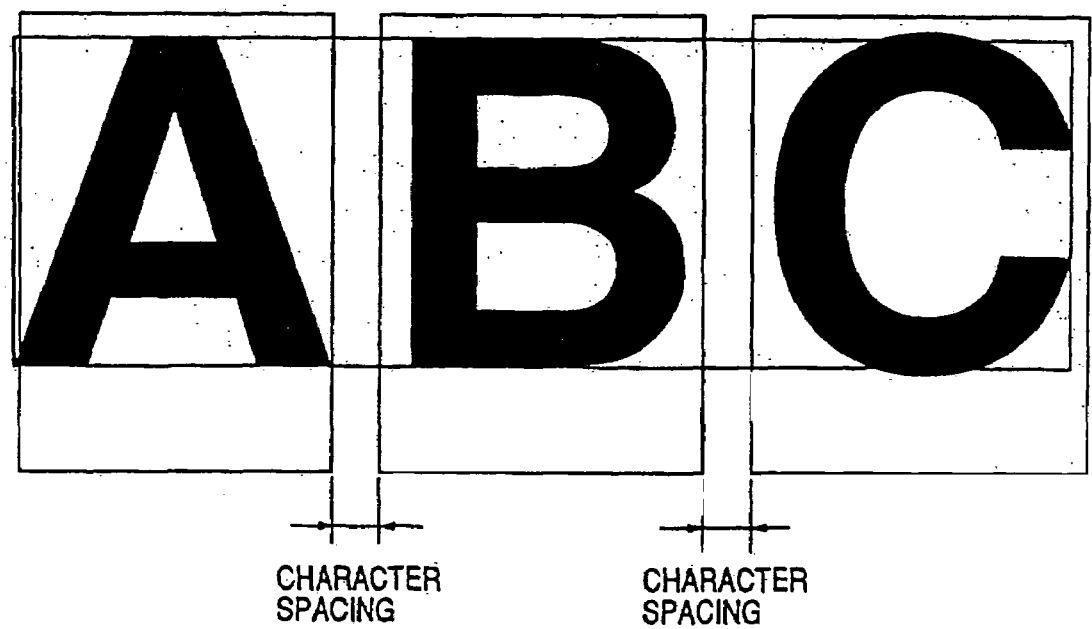
Figure 168A:
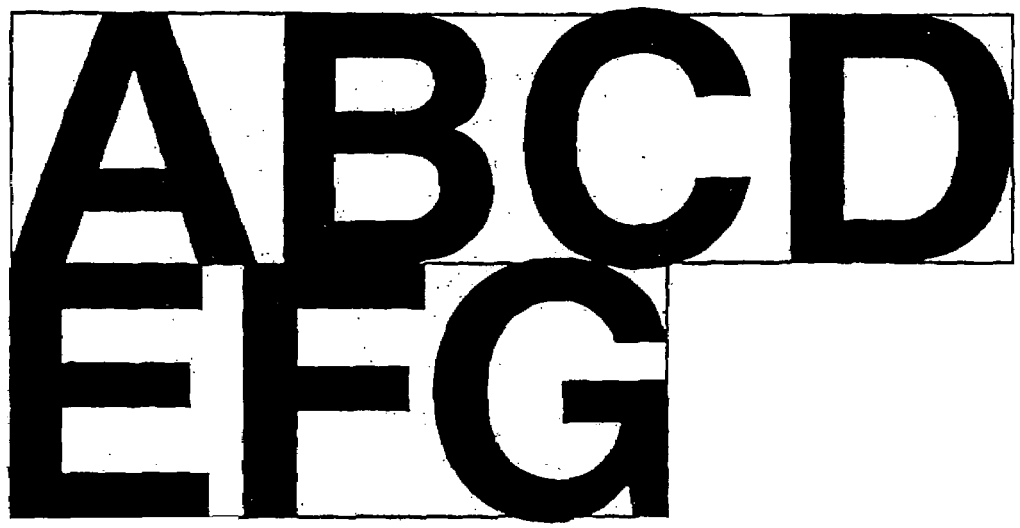
Figure 168B:
Figure 169A:
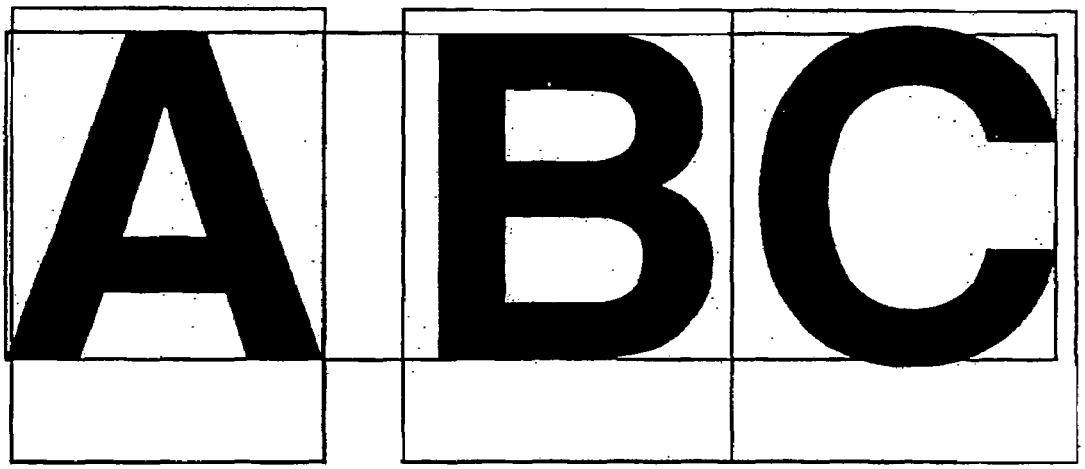
Figure 169B:
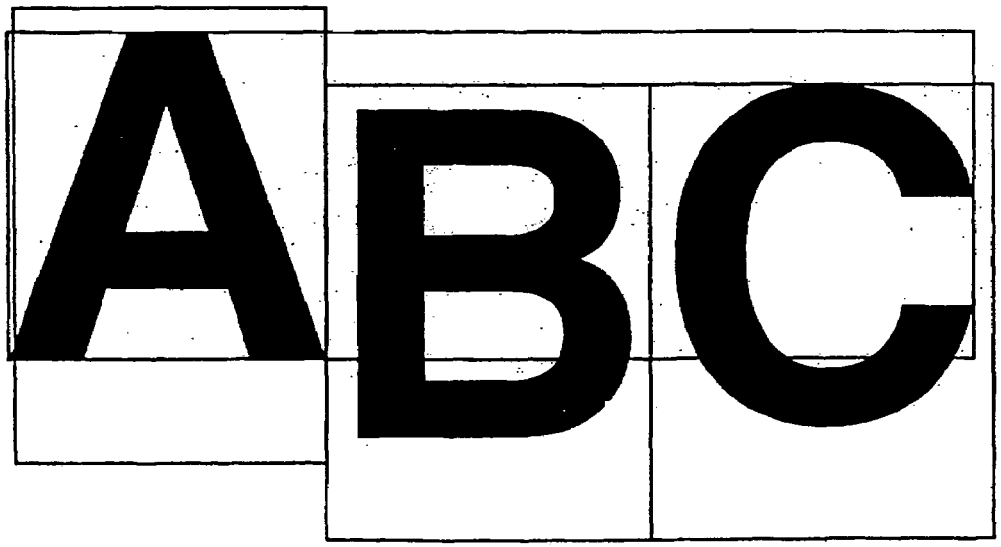
Figure 170A:
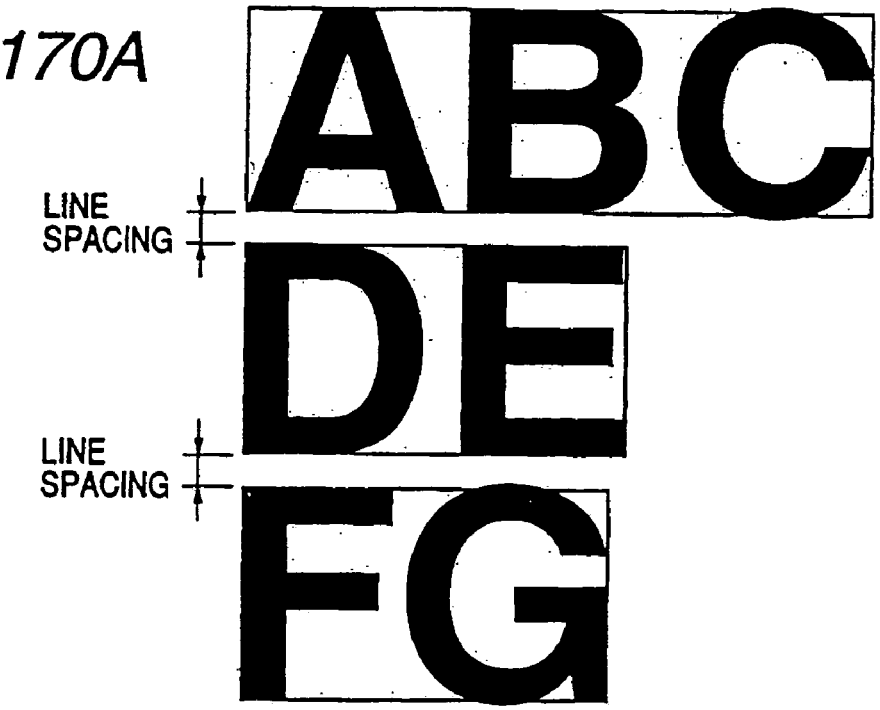
Figure 170B:
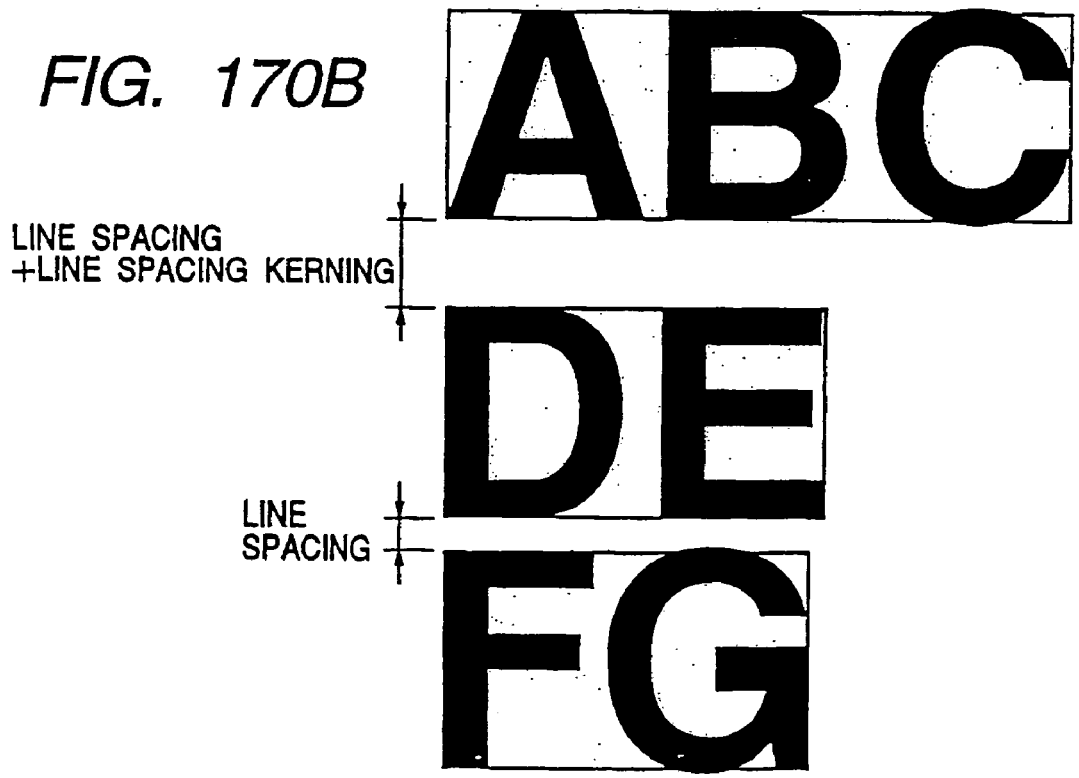
Figure 171A:
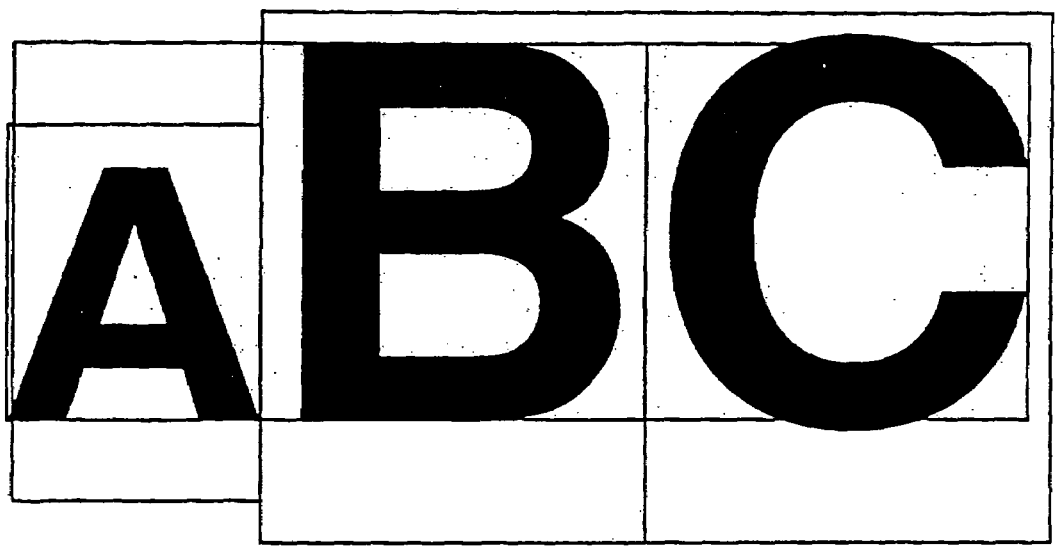
Figure 171B:
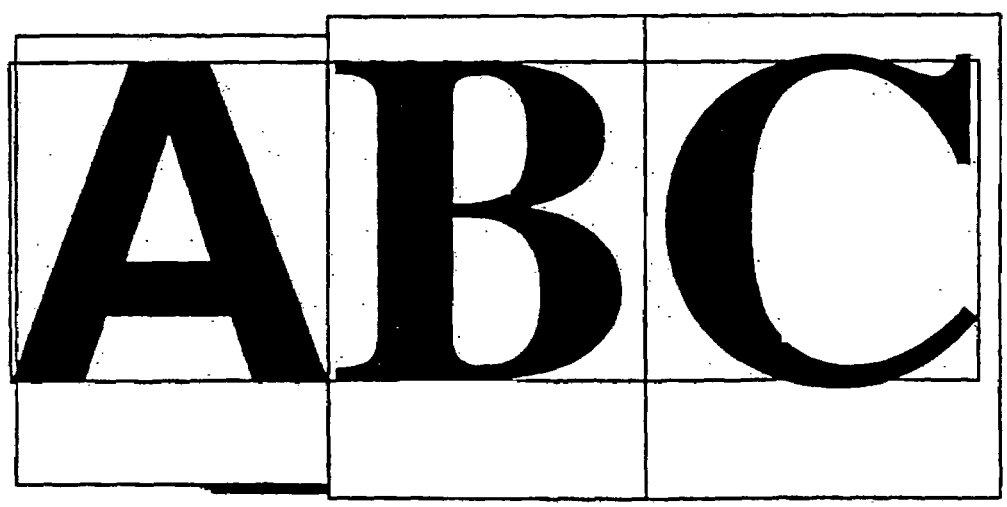
Figure 172:
Figure 173:
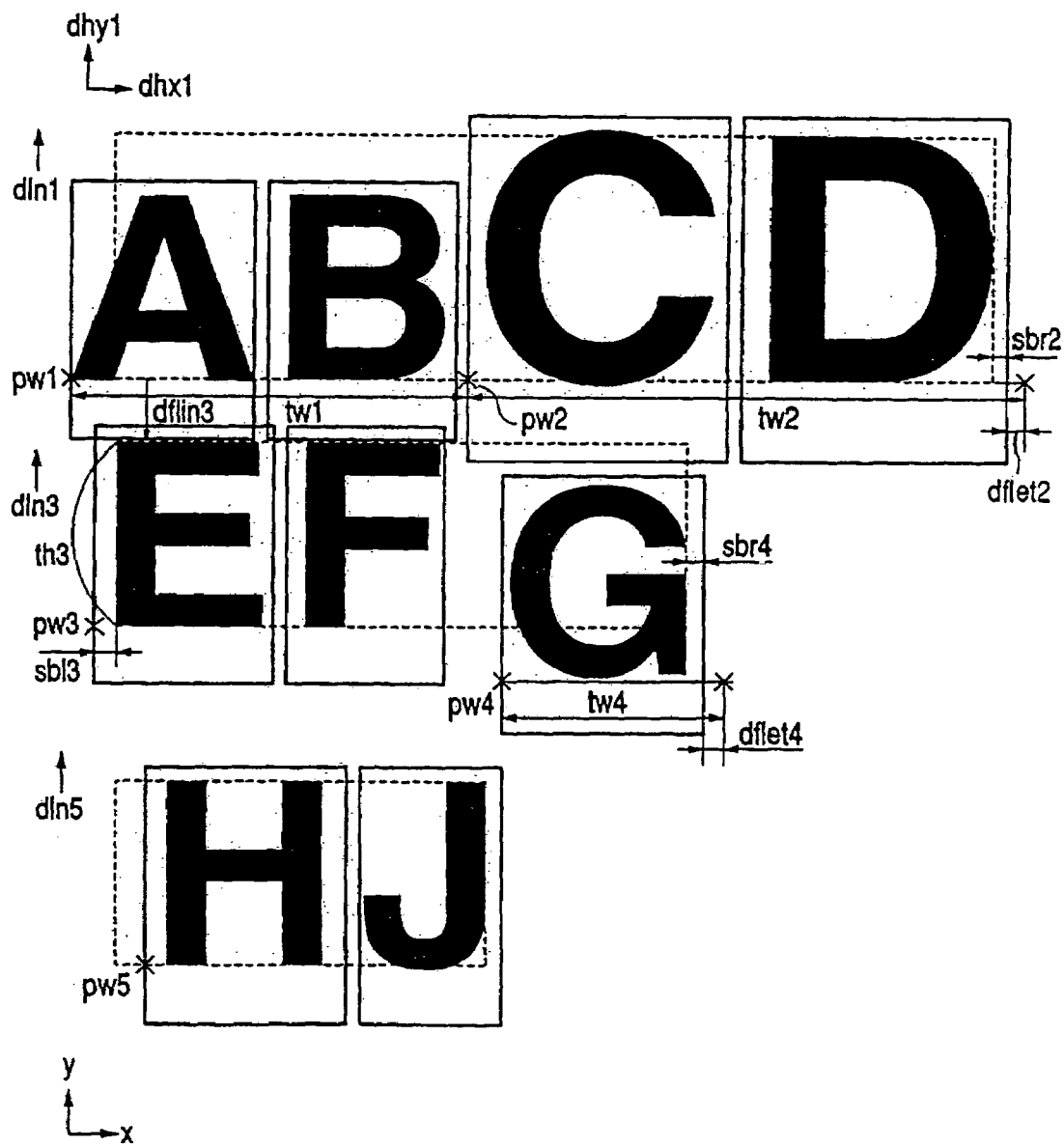
Figure 175A:
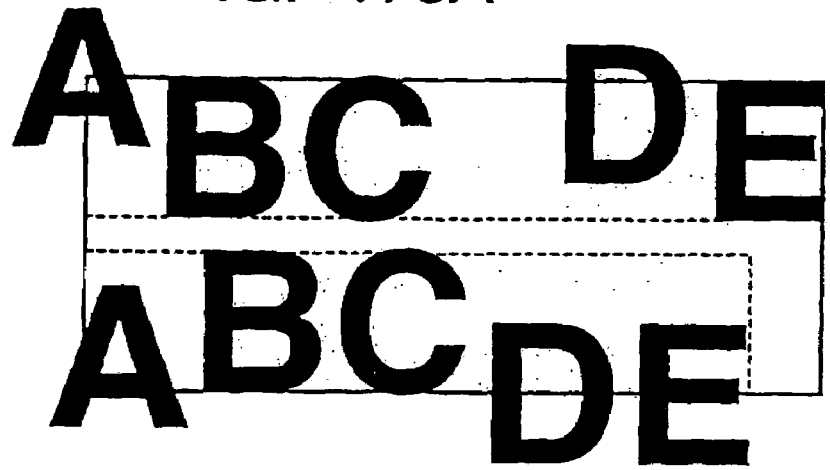
Figure 175B:
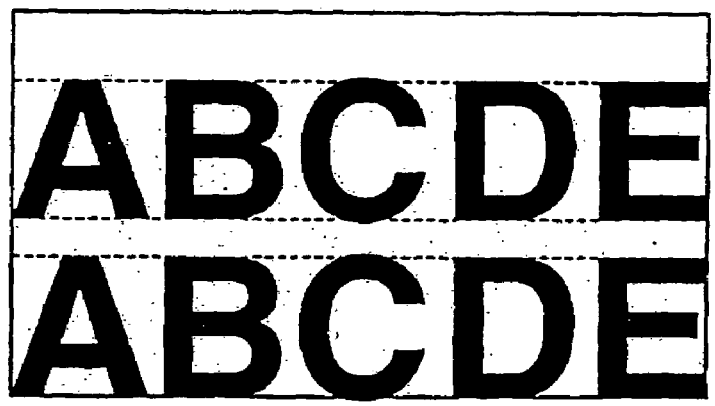
Figure 175C:
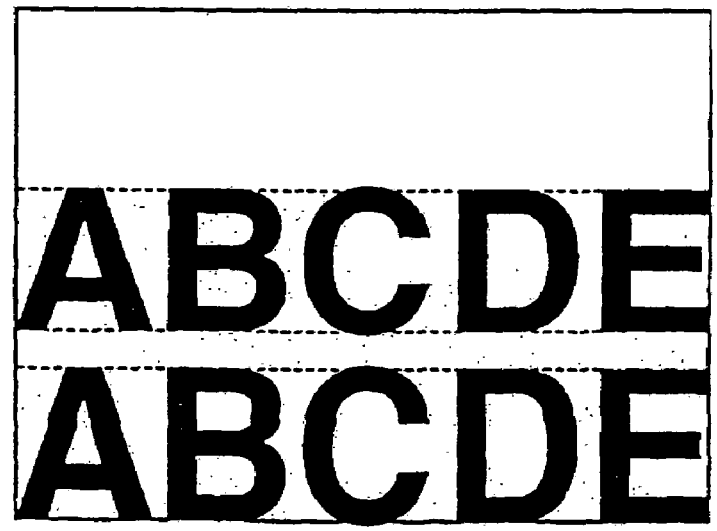

FIG. 132 is a graph for explaining the line segment enlargement process according to the eighth embodiment;

FIG. 133 is a graph for explaining the line segment enlargement process according to the eighth embodiment;

FIG. 134 is a graph for explaining the line segment enlargement process according to the eighth embodiment;

FIG. 135 is a graph for explaining the line segment enlargement process according to the eighth embodiment;

FIG. 136 is a graph for explaining the line segment enlargement process according to the eighth embodiment;

FIG. 137 is a diagram showing a printing data storage confirmation screen (window);

FIGS. 138A, 138B and 138C is a diagram for explaining the types of end edge shape;

FIG. 139 is a diagram for explaining the types of connection shape;

FIG. 140 is a flowchart for explaining the processing performed to lay out text as printing data;

FIG. 141 is a flowchart for explaining the processing performed to calculate a character height ratio;

FIG. 142 is a flowchart for explaining the data preparation processing performed to lay out text using points;

FIG. 143 is a flowchart for explaining the data preparation processing performed when the overall length and the height preference are designated in the point layout of the text;

FIG. 144 is a flowchart for explaining the data preparation processing performed when the height preference is not designated;

FIG. 145 is a flowchart for explaining the data preparation processing performed when the height preference is designated and when a maximum text line width≦the overall length is established;

FIG. 146 is a flowchart for explaining the data preparation processing performed when the height preference is designated and when a maximum text line width>the overall length is established;

FIG. 147 is a flowchart for explaining the data preparation processing performed to lay out text using a rectangle;

FIG. 148 is a diagram showing a new text creation panel;

FIG. 149 is a diagram showing a character string input panel;

FIG. 150 is a diagram showing a kerning input panel;

FIG. 151 is a diagram showing a character string retrieval panel;

FIG. 152 is a diagram showing a retrieved contents confirmation panel;

FIG. 153 is a diagram showing a typeface information change panel;

FIG. 154 is a diagram showing a text correction panel;

FIG. 155 is a diagram showing a character string registration panel;

FIG. 156 is a diagram for explaining a baseline rotation angle as a character string attribute;

FIG. 157 is a diagram for explaining a character direction as a character string attribute;

FIG. 158 is a diagram for explaining an oblique angle as a character string attribute;

FIG. 159 is a diagram for explaining as character string attributes a horizontal inverted flag and a vertical inverted flag;

FIG. 160 is a diagram showing example text;

FIG. 161 is a diagram for explaining terms concerning a character;

FIG. 162 is a diagram showing an example character whose side bearing is negative;

FIGS. 163A, 163B and 163C are diagrams for explaining a vertical scale and a horizontal scale;

FIG. 164 is a diagram showing example results obtained by extracting text contour information;

FIG. 165 is a diagram showing a layout reference rectangle and a layout reference position for text;

FIG. 166 is a diagram showing an example wherein text is laid out by using points;

FIGS. 167A and 167B are diagrams showing examples where the character spacing of text is designated;

FIGS. 168A and 168B are diagrams showing examples where the line spacing of text is designated;

FIGS. 169A and 169B are diagrams showing examples where the character spacing kerning of text is designated;

FIGS. 170A and 170B are diagrams showing examples wherein the line spacing kerning of text is designated;

FIGS. 171A and 171B are diagrams showing examples wherein the typeface information for text is changed;

FIG. 172 is a diagram showing an example wherein the typeface information for text is returned to the initial value;

FIG. 173 is a diagram showing example prepared data when text is laid out using points;

FIGS. 174A, 174B 174C, 174D and 174E are diagrams showing example results obtained by calculating the text line width;

FIGS. 175A, 175B and 175C are diagrams showing example results obtained by calculating the text layout rectangle;

FIGS. 176A, 176B, 176C, 176D and 176E are diagrams showing examples wherein the overall length and the height preference are designated for the point layout of text; and FIGS. 177A, 177B, 177C and 177D are diagrams showing example prepared data when text is laid out using rectangles.

DETAILED DESCRIPTION OF THE PREFERRED EMBODIMENTS

The preferred embodiments of the present invention will now be described in detail, while referring to the accompanying drawings.

(a) First Embodiment

[Explanation for Hardware Arrangement]

Figure 1:
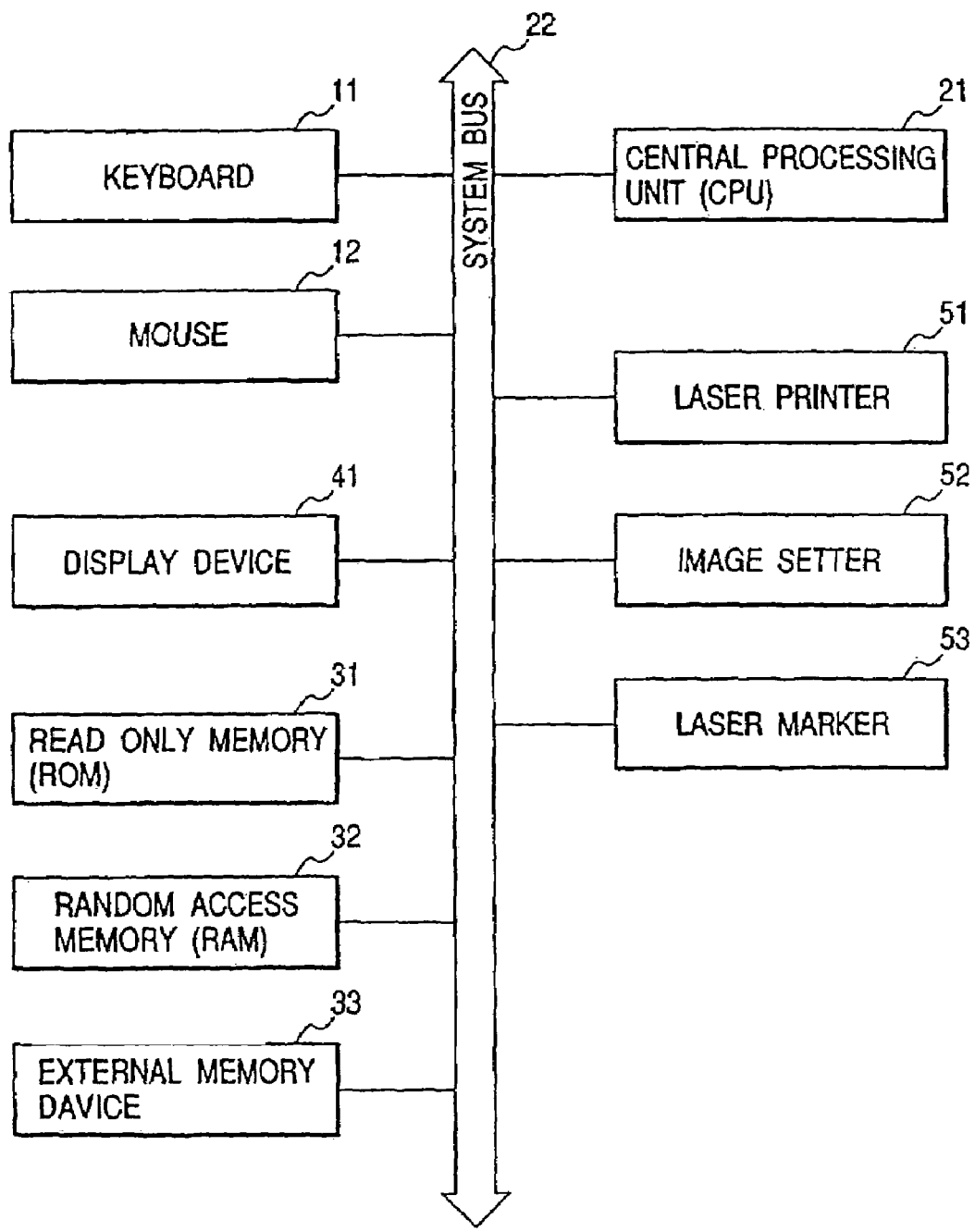
FIG. 1 is a block diagram illustrating the hardware arrangement of an information processing apparatus according to a first embodiment of the present invention.

FIG. 1 is a block diagram illustrating the hardware arrangement of an information processing apparatus according to a first embodiment of the present invention.

In FIG. 1, a central processing unit (CPU) 21 exercises overall control of the apparatus and performs computation processes. A keyboard 11 is used to input characters and numerical values, and a mouse 12 is used to point to coordinates and to graphic patterns. A display device 41 displays graphic data, character data, and various operation panels and buttons.

A program according to this embodiment is stored in read only memory (ROM) 31 and is executed by the CPU 21. While executing the program for this embodiment, the CPU 21 reads data from or writes data in random access memory (RAM) 32, as needed. And an external storage device 33 is either a floppy disk device (FD) or a hard disk device (HD) used for the storage of data, such as character typeface information and code information.

The program for this embodiment may be stored in the external storage device 33 and may be loaded into the RAM 32 and executed by the CPU 21. The character typeface information and code information may be stored in the ROM 31, so that the CPU 21 can read those data as needed.

A laser printer 51 outputs a proof sheet using printing data that are prepared by this information processing apparatus (the printing data are output for confirmation), and prints the contents of a printing log file. An image setter 52 outputs a fair copy of the printing data that are prepared by the apparatus (outputs an accurate image that is used as a block copy). A laser marker 53 employs a laser to attach, directly to a product, the printing data that are prepared by the apparatus.

The differences between the laser printer 51, the image setter 52 and the laser marker 53 will now be described.

First, the laser printer 51 employs a laser beam to irradiate the surface of a photosensitive drum to which toner is thereafter attracted, and then transfers the toner to a sheet of paper. At the maximum, the resolution provided is approximately 1500 DPI. The image setter 52, however, employs a laser beam to directly irradiate the surface of photosensitive paper, and can provide a maximum resolution of approximately 4000 DPI on a sheet of paper that can range in size up to about that of A1 stock. While the laser marker 53 employs a laser beam to directly irradiate a product and to melt a resin material thereon that turns black, or to develop a color in a composition consisting of a special material mixed with a filler.

The hardware components of the apparatus exchange programs or data across a system bus 22.

The display function of the display device 41 will now be described.

The information processing apparatus in this embodiment has a so-called WYSIWYG function, i.e., displays graphic data and character data on the display device 41 in the same form as that produced when the data are printed. This function is shown in FIGS. 2A to 2C.

Figure 2A:
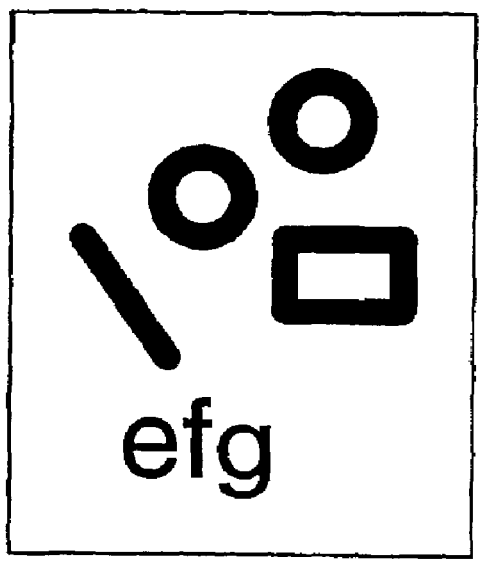
FIGS. 2A, 2B and 2C are diagrams for explaining the WYSIWYG function.
Figure 2B:
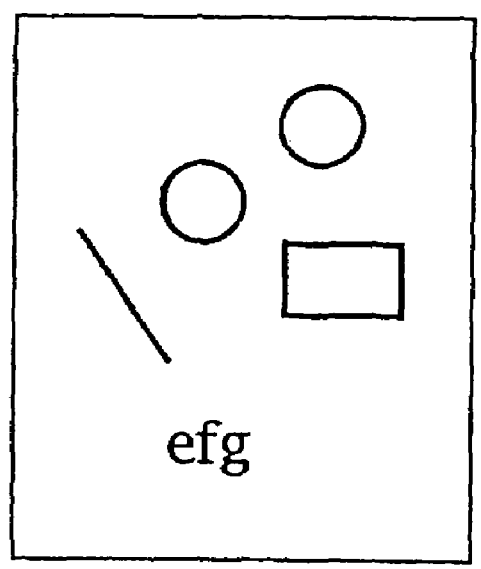
Figure 2C:
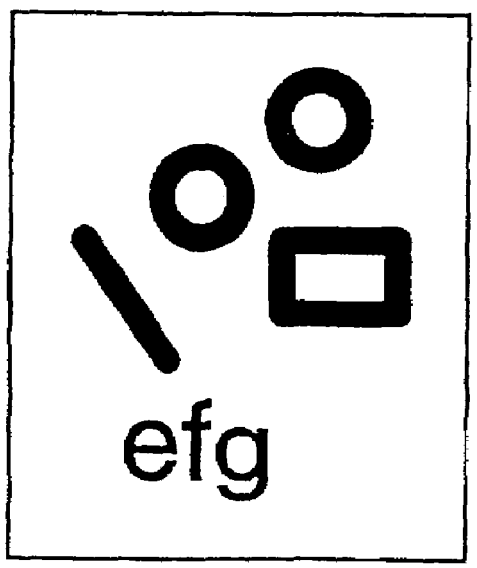

A WYSIWYG display example is shown in FIG. 2A. The forms shown for the display in FIG. 2A are the same as the forms output in FIG. 2C, which is an example printed result. The example in FIG. 2B is not a WYSIWYG display, and differs from the forms output in FIG. 2C, that is, the printing results.

The operating screen of the display device 41 in this embodiment will now be explained.

Figure 3:
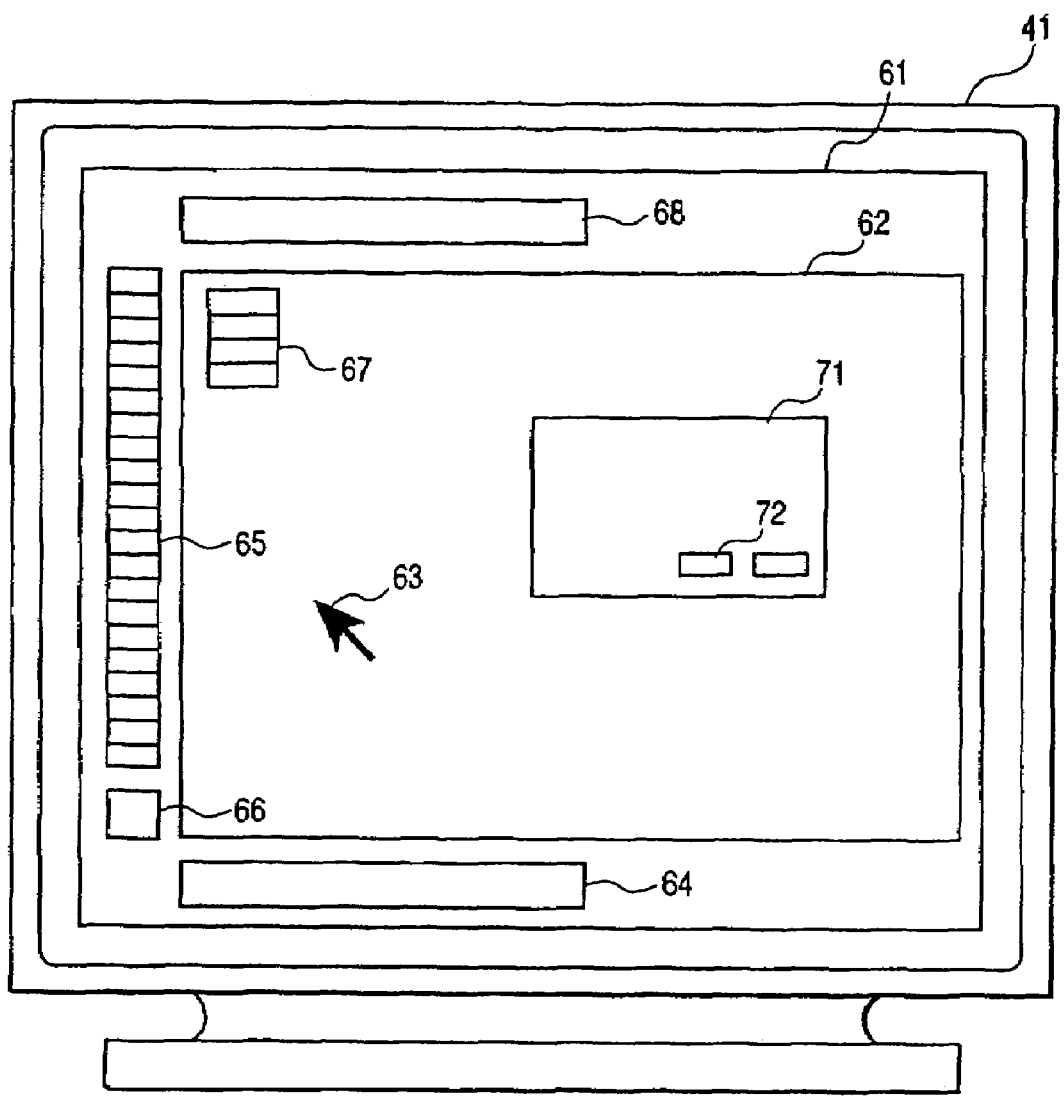
FIG. 3 is a diagram showing the main panel of a program according to the first embodiment of the present invention.

FIG. 3 is a diagram showing a main panel 61 displayed by the display device 41 when the program according to this embodiment is executed.

In FIG. 3, on the main panel 61 are provided a drawing area 62, a mouse pointer 63, a character input area 64, a button group 65, a general-purpose button 66, a command menu 67, a guidance area 68, a panel 71 other than the main panel 61, and buttons 72 on the panel 71. All the buttons in FIG. 3 are software keys.

The printing data are interactively prepared and edited by operating an input device, such as the keyboard 11 or the mouse 12, and inputting data to the main panel 61. The printing data that are thus obtained are displayed on the drawing area 62.

Further, the panel 71 may be displayed in addition to the main panel 61, and printing data may be prepared or edited on the panel 71.

Various input methods according to this embodiment will now be described while referring to FIG. 3.

To employ the keyboard for input, the character input area 64 is selected using the mouse 12 or the keyboard 11, and characters or numerical values are entered.

To employ the mouse 12 for input, the following methods are employed.

Two methods, (1) and (2), are used to select a specific element or to select (activate) a button.

(1) Selection of an element: The mouse pointer 63 is moved to where printing data are displayed on the drawing area 62, and at that location, the left mouse button, for example, is clicked to select an element to be processed.

(2) Selection of a button: The mouse pointer 63 is moved to one of the buttons 65, the general-purpose button 66, or one of the buttons 72 in the panel 71, which is displayed as needed, and at that location the left mouse button, for example, is clicked to activate the button to perform the processing.

Five methods, (3) to (7), are used to select a specific position in the drawing area 62.

(3) Arbitrary designation: The mouse pointer 63 is moved to an arbitrary position in the drawing area 62, and the right mouse button, for example, is clicked to select the position.

(4) Point designation: A point displayed in the drawing area 62 is designated the selected position.

(5) Feature point designation: An element other than a point is designated in the drawing area 62, and the CPU 21 extracts, as the feature of the element, a point that is selected as the position.

When a plurality of feature points are present, a specific point is selected using a method whereby the CPU 21 automatically extracts the feature point closest to the position of the mouse pointer 63 when the element is selected, or by a method for selecting one further point from among the feature points that are available.

Figure 4:
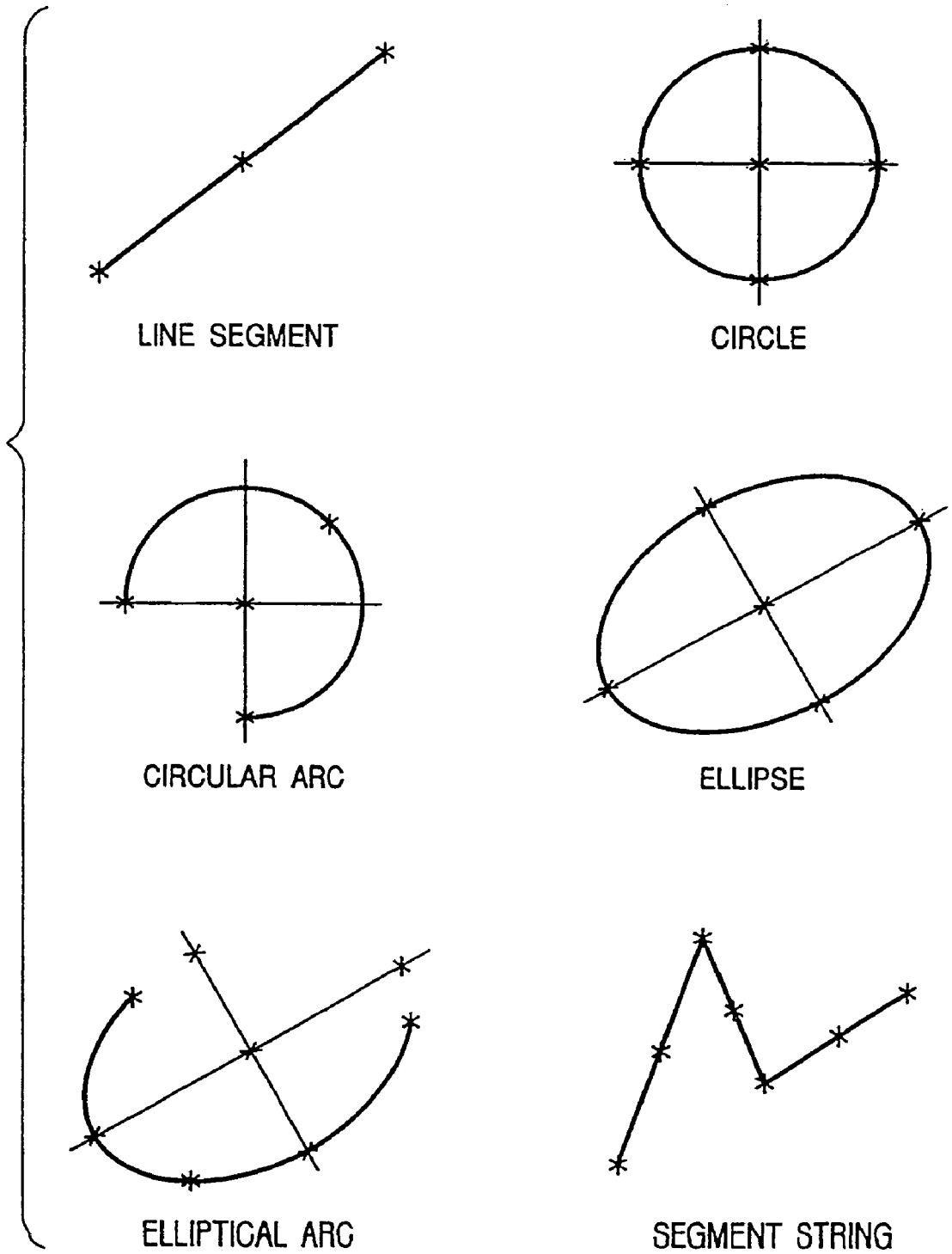
FIG. 4 is a diagram showing the feature point for each element.

Example feature points on the individual elements of graphic data are shown in FIG. 4. A point indicated by an * is a feature point. The specific positions of these feature points are as follows.

Line segments: both end points, and the midpoint
Circle: the center point, and the intersections of a circle and a line that is extended from the center of the circle in the X and the Y axial directions (four points)
Circular arc: the center point, both end points, and the midpoint (the point on the arc that divides the distance spanned by the arc)
Ellipse: the center point, and the intersections of the ellipse and its short axis and its long axis (four points)
Elliptical arc: the center point, both end points, the intersections of the ellipse, including an elliptical arc, and its short axis and its long axis (four points), and the midpoint (the point on the elliptical arc that divides the distance spanned by the elliptical arc)
Line segment string: both end points, and the midpoints of the line segments that constitute a line segment string
Free curve: both ends, the control points of the curve, and the midpoint (the point that divides the distance spanned by the free curve).

(6) Intersection designation: One or two line elements, such as line segments or circles, are designated in the drawing area 62, and the CPU 21 calculates the points at which these elements intersect and they are designated the selected positions.

When a single line element includes an intersection, i.e., the line element is intersected by itself, only one element need be selected. In the other cases, two line elements are selected.

When there are a plurality of intersections, one point is specified using a method whereby the CPU 21 automatically extracts the intersection that is closest to the position of the mouse pointer 63 either before or after an element is selected, or a method for selecting one further point from among the plurality of intersections.

Figure 5:
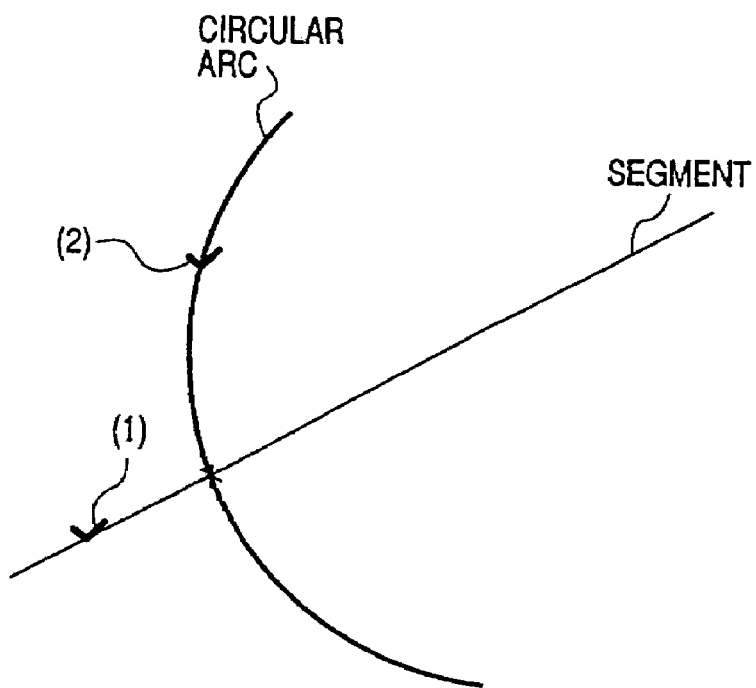
FIG. 5 is a diagram showing an example for designating a position using an intersection.

In FIG. 5 is shown an example wherein a line segment and an arc are designated, and their intersection is designated the selected position. The line segment and the arc are selected in the order (1) and (2), at the positions indicated by the ticks in FIG. 5, and their intersection is designated the selected position *.

(7) Designation of point on line: One line segment, such as a line segment or a circle, is designated in the drawing area 62, and the CPU 21 calculates a point, on the line element, that is closest to the current position of the mouse pointer 63 and that point is designated the selected position.

Figure 6:
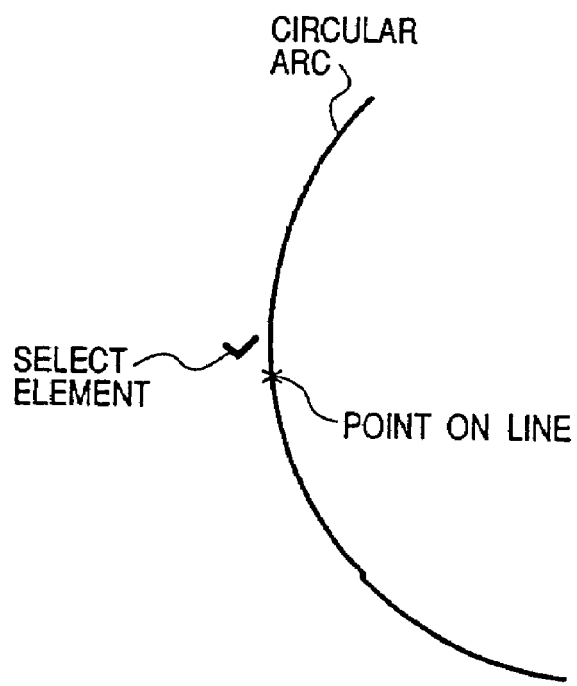
FIG. 6 is a diagram showing an example for designating a position using a point on a line.

FIG. 6 is a diagram showing an example wherein an arc is designated and a point on the line of the arc is designated the selected position. In FIG. 6, the element is selected at a position indicated by a tick, and the position * is selected by designating the point on the line. The point at the tick represents a point in the vicinity of the arc, while the point indicated by the * represents a point on the arc.

"Commands" used for this embodiment will now be described. In this embodiment, each job unit for preparing and editing printing data is called a "command."

The commands used in this embodiment are commands (drawing commands) for preparing the individual elements, such as points, straight lines, circles and curves; commands (correction commands) for correcting the shapes and attributes of the elements, such as moving, copying and deleting; and commands concerning filing, printing, a dragonflies and bar codes.

To prepare or to edit printing data, first, one arbitrary command is selected in accordance with the job unit. To select a command, the keyboard 11 is used to enter the name of the command in the character input area 64, or one of the buttons 65 on the main panel 61, in which the names of commands are set in advance, is activated.

When a command is selected while a previously selected command is being executed, an end process is performed for the old command. Then, the new selected command is initialized, and the processing for that command is performed.

When a command is selected, the command menu 67 is displayed on the display device 41 in order to permit the selection of a detailed job unit in the selected command. A user can perform various editing jobs by activating a button for an arbitrary menu item in the command menu 67. Since instructions for how a user should proceed with an operation is displayed in the guidance area 68 each time in accordance with the condition of the job, the user need only follow the instructions to perform the operation.

[Explanation of Printing Data]

<Elements of Printing Data>

A specific explanation will be given for the types of graphic data and character data elements that constitute the printing data that can be prepared by the information processing apparatus according to this embodiment.

Roughly there are five types, (A) to (E), of graphic data and character data elements that can be prepared by the information processing apparatus of this embodiment.

(A) Basic graphic patterns: points, line segments, line segment strings (open/closed), circles, arcs, ellipses, elliptical arcs, free curves (open/closed)
(B) Solid black graphic patterns
(C) Other graphic patterns: dragonflies, bar codes
(D) Text
(E) Group graphic patterns: symbols, illustrations An element is unit data that is obtained by adding an attribute to graphic data or character data that is required for printing data (called a printing attribute) and that is actually laid out as printing data. A plurality of elements that are laid out as printing data can be grouped together as one element. The method used for grouping the elements together will be described later.

A detailed explanation will be given for the five types (A) to (E).

First, the basic graphic pattern (A) is an element of graphic data that is the most essential. In addition, a rectangle (a rectangle in which each side is parallel to the X or the Y axis) or an equilateral polygon that is constituted by a line segment string can be used as an element for a basic graphic pattern. A free curve can be represented using a Bezier, rational Bezier, B-spline, Hermite or NURBS display form.

The solid black graphic pattern (B) is an element for graphic data in which a closed area is formed by independently employing an element (A) (excluding a point), or by linking together a plurality of elements (A), and is painted a solid color inside. The following four painting methods can be employed.

(1) Area filling: Painting the inside uniformly.
(2) Hatching: Painting the inside using a plurality of line segments having a constant inclination and a constant interval. A specific point in the solid painted graphic pattern can be designated as a reference point for the hatching.
(3) Meshing: Painting the inside by repeating a graphic pattern having a constant shape, such as a circle, a rectangle or an equilateral polygon. A specific point in the painted graphic pattern can be designated as a reference point for a mesh.
(4) Patterning: Painting the inside by repeating a bit pattern that is prepared in advance.

The other graphic patterns (C) are a dragonfly and a bar code. These elements include both graphic data and character data. The method for preparing a dragonfly and a bar code will be described later.

The text (D) is a character data element. The character data element, as well as the graphic data element, can be laid out as printing data; however, the printing attribute type and the layout method filler from those used for the graphic data element.

Finally, the group graphic pattern (E) is provided by selecting one or an arbitrary number of basic graphic patterns (A), solid black graphic patterns (B), other graphic patterns (C) and text (D), and by grouping the selected elements together as a single element. The group graphic patterns (E) are symbols and illustrations.

<Printing Attribute of Printing Data>

A specific explanation will be given for the types of printing attributes provided for graphic data and character data, which, according to the present invention, are prepared as printing data by the information processing apparatus.

Roughly, there are seven types, (a) to (g), of printing attributes for graphic data and character data that can be prepared by the information processing apparatus of this embodiment.

First, the following printing attributes (a) to (c) are used in common for the graphic data and character data.

(a) Display attribute: Designates whether an element should be displayed, and the relationship (called display priority) for the display.
(b) Selection attribute: Designates whether the selection of an element is enabled. If the element selection is disabled, an operation for that element is inhibited.
(c) Color attribute: The color of an element is expressed by providing a color model type, such as RGB or HLS, and color code values. When the monochrome display device 41 or the laser printer 51 that represents only black and white is employed, the data are converted to provide either white or black text in accordance with the color attribute, and the results are output.

The following three types, (d) to (f), are printing attributes inherent to graphic data.

(d) Point attribute: For a point element, a sign or a character string can be displayed at the location of the point.
(e) Line attribute: For a basic graphic pattern element (line element) other than a point, the attributes of the various lines mentioned below can be represented.

Line type: Describes the shape of a line element. The line types include a solid line, a broken line, a one-dot chain line, and a two-dot chain line.

Line width: Describes the length of a line element in the normal line direction. A predetermined line type, such as a fine line, an intermediate thick line or a thick line, can be designated, or the actual size can be employed for the designation.

Line width direction: Describes a side along a normal line direction for which an offset, the equivalent of a line width, is required when the line width is not taken into account.

End edge shape: The end edge shape of an open graphic pattern, such as a line segment or an arc. There are round, flat and square shapes.

Connection shape: The shape of the corner of a graphic pattern, such as a line segment string or a rectangle. There are mitered, round and beveled shapes.

Line pitch: For a line type other than a solid line, the length of a portion wherein a line is present and the length of a portion wherein no line is present can be provided in accordance with the actual size or a parameter.

(f) Solid black attribute: The types of methods used for painting the inside of a graphic pattern, such as area filling, hatching, meshing and patterning, are provided for a solid black graphic element. Further, detailed data are also provided when hatching or meshing is employed, and when the patterning is employed, a pattern number is also provided.

Only one type of printing attribute, (g), is inherent to the character data.

(g) Character string attribute: For a text element, the following variety of attributes for a character and for an overall character string can be expressed.

Typeface: Represents the design of one character set. There are courier, helvetica, gothic, etc.

Character size: Represents the size of a character. Generally, the character size is equal to the height, in the direction in which lines are fed, of a rectangular area that one character occupies,=body.

Vertical scale: Represents the reduction for a character in the direction in which a line is fed.

Horizontal scale: Represents the reduction for a character in the direction in which a character is fed.

Baseline rotate angle: Represents an angle formed by the X axis and the direction in which characters are fed.

Oblique angle: Represents an oblique angle of a character relative to the direction in which the characters are fed.

Character spacing: Represents the interval between the bodies of two adjacent characters on one line.

Line spacing: Represents the interval between the bodies of characters on two adjacent lines.

Character string inversion: Displays an inverted character string (mirror image).

<Structure of Printing Data>

The structure of printing data according to the embodiment will now be described. Generally, the printing data include data for a plurality of elements and data for a plurality of printing attributes, as was previously described.

Basically, the element data include data type code, a data number, the data required for each element, and a data number for printing the attribute data required for each element.

The type of element data included in the printing data can be specified by using the data type code uniquely provided in the printing data. The element data in the printing data can be specified by using the data number. While the required data and printing attribute types differ, depending on the element, the CPU 21 can use the data type code to identify them.

In addition, the printing attributes are not stored for the individual data elements, and only the data number for the required printing attribute is stored. Therefore, the overlapping of the printing attributes can be avoided, the memory capacity required for the printing data can be reduced, and the printing attributes for a plurality of sets of element data can be changed during one operation.

The data structure for each element for graphic data and character data will be specifically described.

(A) Basic Graphic Pattern (1) Point
Data Type Code
Data number
Point coordinate: c[2]
Data number for display attribute
Data number for selection attribute
Data number for color attribute
Data number for point attribute (2) Line segment
Data type code
Data number
Starting point coordinates: s[2]
End point coordinates: e[2]
Data number for display attribute
Data number for selection attribute
Data number for color attribute
Data number for line attribute (3) Line segment string
Data type code
Data number
Number of passing points: np
Passing point coordinates: pp[2] (np sets)
Data number for display attribute
Data number for selection attribute
Data number for color attribute
Data number for line attribute (4) Circle
Data type code
Data number
Center coordinates: c[2]
Radius: r
Data number for display attribute
Data number for selection attribute
Data number for color attribute
Data number for line attribute (5) Arc
Data type code
Data number
Starting point coordinates: s[2]
End point coordinates: e[2]
Center coordinates: c[2]
Rotation flag (clockwise/counterclockwise)
Data number for display attribute
Data number for selection attribute
Data number for color attribute
Data number for line attribute (6) Ellipse
Data type code
Data number
Major axis vector: a[2]
Minor axis vector: b[2]
Data number for display attribute
Data number for selection attribute
Data number for color attribute
Data number for line attribute (7) Elliptical Arc
Data type code
Data number
Starting point coordinates: s[2]
End point coordinates: e[2]
Center coordinates: c[2]
Major axis vector: a[2]
Minor axis vector: b[2]
Rotation flag (clockwise/counterclockwise)
Data number for display-attribute
Data number for selection attribute
Data number for color attribute
Data number for line attribute (8) Free Curve (Bezier Curve)
Data type code
Data number
Number of curves: nv
Control point data for each curve (nv):
    Number of control points: nc
    Control point coordinates: pc[2] (nc sets)
    Weight coefficient: w
Number of passing points: np
Passing point coordinates: pp[2] (np sets)

Data number for display attribute
Data number for selection attribute
Data number for color attribute
Data number for line attribute (B) Solid Black Graphic Pattern
Data type code
Data number
Layout reference rectangle bottom left point coordinates: p1[2]
Layout reference rectangle top right point coordinates: p1[2]
Number of loops: n1
Element data for each loop (n1 sets):
  Number of elements: nd
  Element data: basic graphic element data except
for point (nd sets)
Passing reference point coordinates: pp[2]
Data number for display attribute
Data number for selection attribute
Data number for color attribute
Data number for solid black attribute
Data number for frame display attribute
Data number for frame color attribute
Data number for frame line attribute
(For the solid black graphic pattern, the printing attributes include a frame printing attribute for a solid black graphic pattern, in addition to a printing attribute for the inside of the solid black graphic pattern. The graphic pattern can be displayed with a color attribute for the inside and a frame color attribute that differ from each other.)

(C) Other Graphic Patterns (1) Dragonfly
Data type code
Data number
Dragonfly type flag (dragonfly/scale dragonfly)
Dragonfly shape flag (11 types for a dragonfly and three types for a scale dragonfly)
Dragonfly offset flag (offset required/not required) Printing data name (case for a dragonfly)
Dragonfly length (case for a scale dragonfly)
Layout reference point coordinates: pb[2]
Output magnification rate: sc
Layout reference rectangle bottom left point coordinates: p1[2]
Layout reference rectangle top right point coordinates: p2[2]
Number of elements: nd
Element data: element data for line segment for a dragonfly, and element data for either a line segment, a circle or text for a scale dragonfly (nd sets)

(2) Bar Code
Data type code
Data number
Bar code type flag (four types)
Code data
Code notation flag (code notation required/not required)
Layout reference position flag (nine types, such as bottom left, center and top right)
Layout reference point coordinates: pb[2]
Layout angle: ang
Layout scale: sc
Layout reference rectangle bottom left point coordinates: p1[2]
Layout reference rectangle top right point coordinates: p2[2]
Number of elements: nd
Element data: data for either a line segment or text (nd sets)

(D) Text (1) Basic Character String (Element Constituting Text)
Data type code
Data number
Character string starting point coordinates: pt[2]
Number of bytes of a character string: nch
Character string data: str (nch bytes)
Layout angle: ang
Layout scale: sc
Data number for display attribute
Data number for selection attribute
Data number for color attribute
Data number for character string attribute (2) Text
Data type code
Data number
Layout reference position flag (nine types, such as bottom left, center and top right)
Layout reference point coordinates: pb[2]
Layout reference rectangle bottom left point coordinates: p1[2]
Layout reference rectangle top right point coordinates: p2[2]
Number of elements: nd
Element data: element data for a basic character string (nd sets)
(The text element is obtained by combining a plurality of basic character string elements. Therefore, a character string having a plurality of character string attributes can be processed as a single text element. For example, the typeface for a character, or the height or the width of a character can be changed during one text.)

(E) Group Graphic Pattern (1) Symbol
Data type code
Data number
Folder name:
File name:
Layout reference position flag (nine types, such as bottom left, center and top right)
Layout reference point coordinates: pb[2]
Layout angle: ang
Layout scale: Sc
Layout reference rectangle bottom left point coordinates: p1[2]
Layout reference rectangle top right point coordinates: p2[2]
Inversion flag (inverted/not inverted)
Line width scale flag (line width scale present/absent)
Line width scale value (2) Illustration
Data type code
Data number
Folder name
File name
Layout reference position flag (nine types, such as bottom left, center and top right)
Layout reference point coordinates: pb[2]
Layout angle: ang
Layout scale: sc
Layout reference rectangle bottom left point coordinates: p1[2]
Layout reference rectangle top right point coordinates: p2[2]
Inversion flag (inverted/not inverted)
Number of elements: nd
Element data: arbitrary element data (nd sets)

(An explanation will be given later for the feature of the data structures of a symbol and an illustration, and for the file structures of a symbol data file and an illustration data file.)

An explanation will now be given for the data structure of print attribute data relative to element data that have the above described data structure.

Essentially, the print attribute data includes data type code, a data number, an attribute setup flag, and data required for each print attribute.

The type for the print attribute data included in the printing data can be specified by examining the data type code that is uniquely provided for the print data. In addition, the print attribute data in the printing data can be specified by examining the data number that is uniquely provided for the print data. The required data differ depending on the print attributes, and the CPU 21 can identify these data by using the data type code.

The attribute setup flag indicates whether the print attribute data are valid. The element data that identify the print attribute data for which the attribute setup flag is valid are displayed in accordance with the pertinent print attribute data. For the element data that identify the print attribute data for which the attribute setup flag is invalid, it is assumed that the pertinent print attribute is not set, and the element is displayed in accordance with a default print attribute that is stored in advance in the ROM 31 or in the external storage device 33.

When the data structure in which individual element data can be located hierarchically is employed, the element can be displayed in accordance with the print attribute for an element at a high rank (or at a low rank).

The data structure of each set of print attribute data will be specifically described.

(a) Display Attribute
Data type code
Data number
Attribute setup flag (valid/invalid)
Display flag (display/non-display)
Display priority (b) Selection Attribute
Data type code
Data number
Attribute setup flag (valid/invalid)
Element selection flag (enable/disable)

(c) Color Attribute
Data type code
Data number
Attribute setup flag (valid/invalid)
Color code type flag (RGB/HLS)
Color code 1, 2, 3

(d) Point Attribute
Data type code
Data number
Attribute setup flag (valid/invalid)
Marker character string (e) Line Attribute
Data type code
Data number
Attribute setup flag (valid/invalid)
Line type flag (solid line/broken line/one-dot chain line/two-dot chain line/arbitrary broken line/arbitrary one-dot chain line/arbitrary two-dot chain line)
Line width flag (fine line/intermediate thick line/thick line/extremely thick line/arbitrary line width)
Line widthwise flag (center/inside/outside)
End edge shape flag (round/flat/square)
Connection shape flag (miter/round/bevel)
Line type data 1, 2, 3, 4 (when line type=arbitrary)
Line width data (when line width=arbitrary)

(f) Solid Black Attribute
Data type code
Data number
Attribute setup flag (valid/invalid)
Solid black type flag (solid black/not solid black/hatching/mesh number/pattern number)
Number of data groups: nd
Solid black data 1, 2, 3 (nd sets)

(g) Character String Attribute
Data type code
Data number
Attribute setup flag (valid/invalid)
Typeface
Character size
Vertical scale
Horizontal scale
Baseline rotate angle
Oblique angle
Character spacing
Line spacing
Character string inversion flag (inverted/not inverted)

In FIG. 7 is shown an example printing data file that is prepared by the information processing apparatus of this embodiment based on the above described print data structure.

Figure 8:
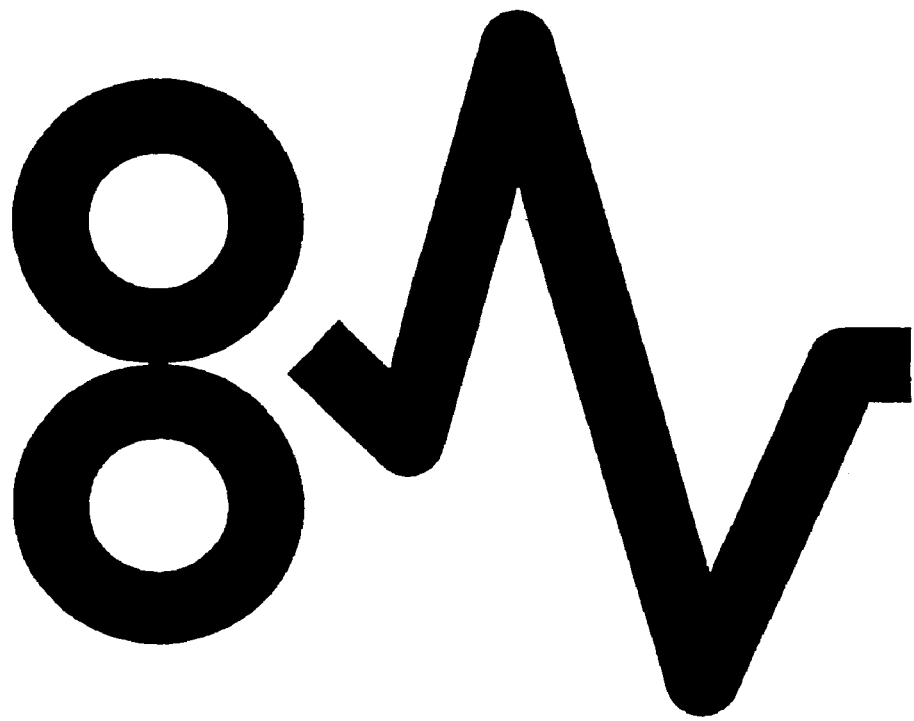
FIG. 8 is a diagram showing example symbols.

The printing data shown in FIG. 7 are used to print the graphic pattern shown in FIG. 8. In the first embodiment, a graphic pattern that is expressed by the printing data in FIG. 7 consists of basic graphic elements, i.e., one line segment string, two circles, and the bottom left point and top right point of the circumscribed rectangle inclosing these three elements (these two points can not be selected as they are not displayed). In addition, the line segment string and the two circles have the same display attribute (displayed), selection attribute (selectable) and line attribute (solid line having a width of 20 mm), but have different color attributes.

<Data Structure of Group Graphic Pattern)

Selected from among the above described data structures, a detailed explanation will now be given for the data structures of a symbol and an illustration that constitutes a group graphic pattern.

First, the data structure of a symbol will be described.

In this embodiment, a symbol is a graphic pattern, such as a sign prepared in accordance with specifications or a logo, that is repeatedly employed, and that is created by combining a graphic data element (a line segment or a circle) and a character data element (text).

When the contents of a symbol data file are changed by altering the standards, a pertinent symbol that has been laid out as one part of the printing data is updated to maintain the data synchronization.

The information processing apparatus in this embodiment employs the following data structure to hold the symbol data.

To specify the location of the symbol data file, only the folder name, the file name and information required for the layout of the symbol are stored in the printing data Further, a symbol data file is prepared in addition to the printing data file in which printing data are stored. The symbol data file has the following file structure.

Layout reference rectangle bottom left coordinates: p1[2]
Layout reference rectangle top right coordinates: p2[2]
Element data: a plurality of sets of arbitrary element data
Print attribute data: a plurality of sets of necessary print attribute data The layout reference rectangle will be described later. If this layout reference rectangle is defined, information concerning its position and its size can be specified that is required for the layout of the symbol as print data. A smaller rectangle (called a circumscribed rectangle) that, for example, encloses the visible portion of a symbol, can be designated the layout reference rectangle.

When the data for the circumscribed rectangle of a pertinent symbol is registered as a layout reference rectangle before the symbol data file is prepared, the circumscribed rectangle of the symbol need not be re-calculated when the symbol data file is again loaded.

The individual element data of the symbol are expressed using the relative coordinate values, while the layout reference rectangle bottom left point is used as a reference.

As are the print data, the print attribute data that are required to display the element data are stored separately from the element data.

Therefore, only when the pertinent printing data file is again loaded into the RAM 32 from the external storage device 44 are the symbol data in the printing data replaced by the contents of the updated symbol data file. As a result, the synchronization of data can be automatically obtained, and the printing data file, including the symbol that is changed, need not be updated.

The data structure of an illustration that constitutes another group graphic pattern will now be described.

In this embodiment, the illustration is a graphic pattern, such as a template graphic pattern, that is repeatedly employed. As is the symbol, the illustration is created by combining a graphic data element (a line segment or a circle) and character data element (text).

Unlike the symbol, after the illustration is laid out as one part of the print data, the illustration data that are used can be freely changed without synchronization being required with the contents of the original illustration data file.

Therefore, even when the contents of the illustration data file are changed, the pertinent illustration that has been laid out as one part of the printing data is not updated to maintain the synchronization.

The information processing apparatus in this embodiment employs the following data structure for holding the illustration data.

The folder name, the file name, information required for the layout of the illustration, and element data that are loaded from the illustration data file and actually constitute the illustration are included in the printing data to specify the location of the illustration data file.

The illustration data file is prepared separately from the printing data file. The illustration data file has the following file structure.

Layout reference rectangle bottom left coordinates: p1[2]
Layout reference rectangle top right coordinates: p2[2]
Element data: a plurality of sets of arbitrary element data
Print attribute data: a plurality of sets of required print attribute data This structure is the same as that provided for the symbol data file. However, to read the illustration data file into the print data, while designated layout reference point coordinates are employed as the origin, the individual element data in the illustration data file are developed (transformed) in accordance with a designated layout angle and a layout scale, and all the resultant data are stored as illustration element data for the print data. This differs from the procedures followed for the symbol data.

[Creation of Print Data]

The processing for creating printing data will be described in detail for four cases: graphic data, character data, a dragonfly and bar code. In this embodiment, a symbol is created as graphic data, and text is created as character data.

<Creation of Symbol>

An explanation will now be described for a case in which a symbol shown in FIG. 8 is created as graphic data.

The symbol shown in FIG. 8 is constituted by basic graphic patterns: two circle elements and one line segment string. An explanation will be given for the following three processes:

(A) performing the layout of the basic graphic pattern as print data;
(B) grouping the elements of a symbol and registering the group as a symbol; and
(C) retrieving a registered symbol and performing the layout of it as print data.

The processing for laying out the basic graphic pattern as printing data will be explained first.

(A) Layout of Basic Graphic Pattern.

Figure 9:
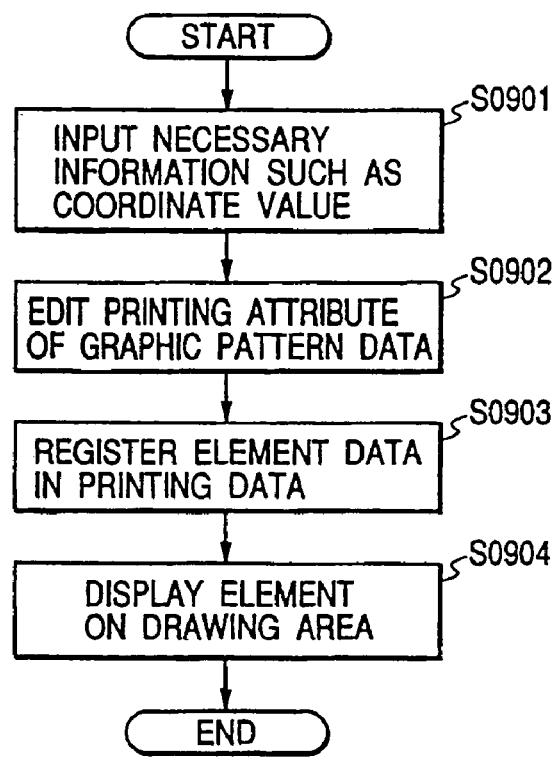
FIG. 9 is a flowchart for explaining the processing performed to lay out a basic graphic pattern as printing data.

FIG. 9 is a flowchart for explaining the processing for laying out a basic graphic pattern as print data.

Information is input, such as a coordinate value and a radius, that is required to create a basic graphic pattern (step S0901). The input process employed for the necessary information will be described in detail later.

Then, a print attribute is added to the graphic pattern data so that it can be used as printing data (step S0902). The addition process for the print attribute will be described in detail later.

When at step S0902 the print attribute is added, the CPU 21 registers in the RAM 32, as print data, the data for the obtained graphic pattern element (step S0903). Thereafter, the CPU 21 displays the basic graphic pattern element in the drawing area 62 (step S0904).

The input process for the necessary information at step S0901 will be described.

This operation differs depending on the type of basic graphic pattern.

For example, to create a circle, the following operation is performed.

(1) A point that is already present, or an arbitrary point, is selected by using the mouse 12, or the X and Y coordinate values are entered at the keyboard 11 so that the center of the circle is designated the selected position.

(2) A point that is already present, or an arbitrary point, is selected by using the mouse 12, or the X and Y coordinate values are entered at the keyboard 11 so that one point on the circumference of the circle is designated the selected position. Or, the radius is entered using the keyboard 11.

Besides the above methods for selecting the center and one point on the circumference or for selecting the center and the radius, there are methods for selecting three different points on the circumference and for selecting two different points on the circumference and the radius.

Since instructions for these operating procedures are displayed in the guidance area 68, a user need only follow the instructions.

The following processing is performed to create a line segment string.

(1) A point that is already present, or an arbitrary point, is selected using the mouse 12, or the X and Y coordinate values are entered at the keyboard 11, so that the starting point of a line segment string is designated the selected position.

(2) A desired number of passing points are selected in the same way.

(3) The general-purpose button 66 is used when the selection of passing points is terminated.

The addition process for the print attribute at step S0902 will now be explained.

The types of print attributes used for the graphic pattern data are as previously described.

Figure 10A:
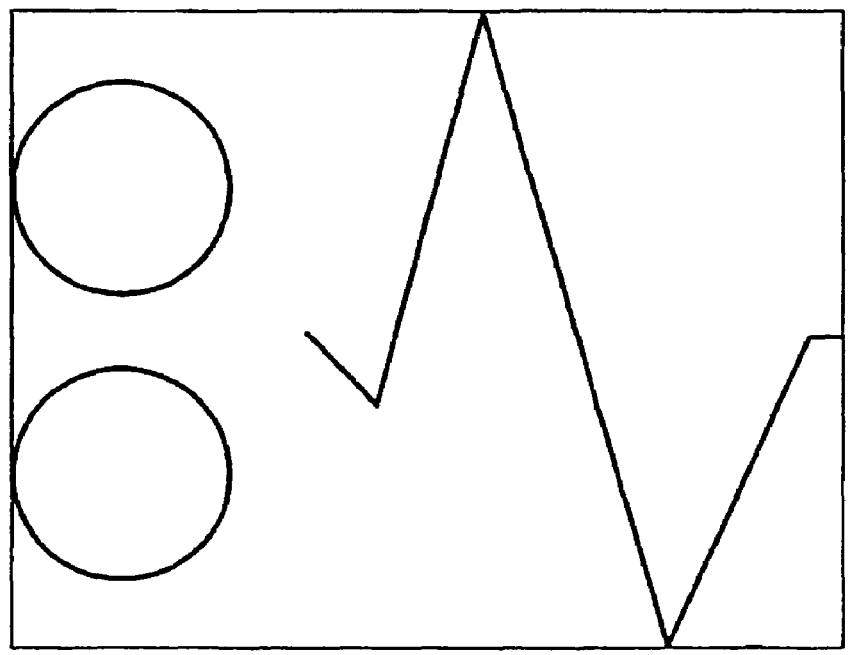
FIGS. 10A and 10B are diagrams showing an example in which a printing attribute is added to graphic data.
Figure 10B:
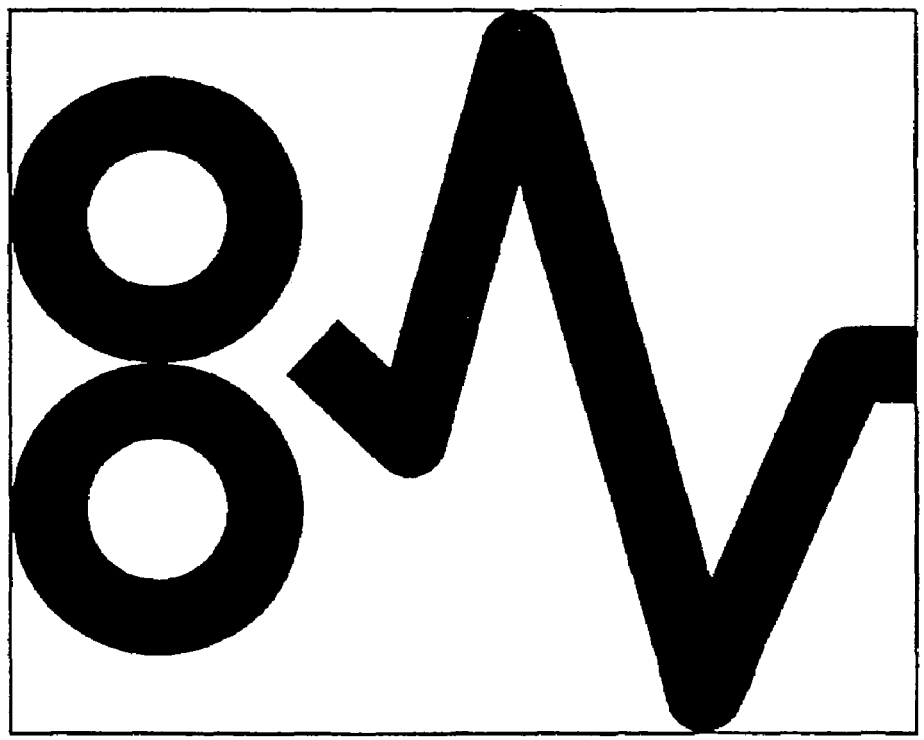

In FIGS. 10A and 10B, respectively, are shown the graphic pattern data to which a print attribute has not been added, and the graphic pattern data to which a print attribute has been added. It is apparent that differences in line widths, end edge shapes and connection shapes can not be expressed for the graphic pattern data to which no print attribute has been added. The state wherein no print attribute has been added to the data is a case where the attribute setup flag in the above described print attribute data structure is invalid. It should be noted that, even when the attribute setup flag is invalid, the shape of the graphic pattern data can be output if a predetermined print attribute is available.

A special panel, displayed on the display device 41, is required to add the print attribute to the graphic data element.

FIG. 11 is a diagram showing the graphic data print attribute editing panel 1101 that is used to add the print attribute to the graphic pattern data element. A user can edit the print attribute on the graphic data print attribute editing panel 1101.

Figure 12:
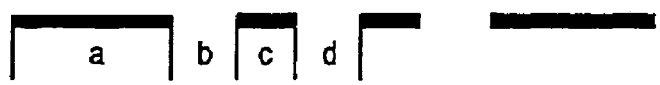
FIG. 12 is a diagram showing a line pitch editing panel (two-dot chain line example)

While the graphic data print attribute editing panel 1101 is displayed, a line type button for other than a solid line, and a "line pitch" button are activated on the graphic data print attribute editing panel 1101. Then, a line pitch editing panel 1201 is displayed, as is shown in FIG. 12, in consonance with a broken line, a one-dot chain line or a two-dot chain line. The line pitch data can be edited on the line pitch editing panel 1201. In FIG. 12, a two-dot chain line is displayed as an example.

To edit the print attribute, the mouse 12 or the Keyboard 11 is used to select for a desired print attribute a character input area on the graphic data print attribute editing panel 1101. Then, a numerical value is entered at the keyboard 11, or the button for a desired item is activated, following which the "set" button is activated.

To set a print attribute for printing data that are to be created, the individual print attributes are entered according to the above methods using the graphic data print attribute editing panel 1101, and graphic data elements are prepared.

Once the print attributes have been designated, the CPU 21 stores them as current print attributes in the RAM 32. Thus, the print attributes need not be set each time an element is created.

When a program is to be terminated, the CPU 21 stores the current print attributes in the external storage device 33, so that it can load them into the RAM 32 when the program is again-executed. Therefore, the current print attributes need not be set again each time the program is executed. Both the print attributes that are used in common by all users, and the print attributes that are set and used by individual users can be separately stored as current print attributes in the RAM 32 and in the external storage device 33.

In order to edit print attributes for the printing data that have been prepared, an element displayed in the drawing area 62 must be selected. Then, the CPU 21 determines whether the element is graphic data or character data; and when the element is graphic data, the graphic data print attribute editing panel 1101 is displayed on the display device 41.

At this time, the current print attributes for the selected element are displayed on the graphic data print attribute editing panel 1101. Therefore, the above method can be used to edit the print attributes and a set button can be selected. As a result, the element in the drawing area 62 is redrawn in accordance with the new print attributes.

An explanation has been given for the processing performed to lay out a basic graphic pattern as print data.

Next, an explanation will be given for the processing performed to group together the elements of a symbol, and to register the element group as a symbol.

(B) Grouping of Elements and Registration of Symbol

Figure 13:
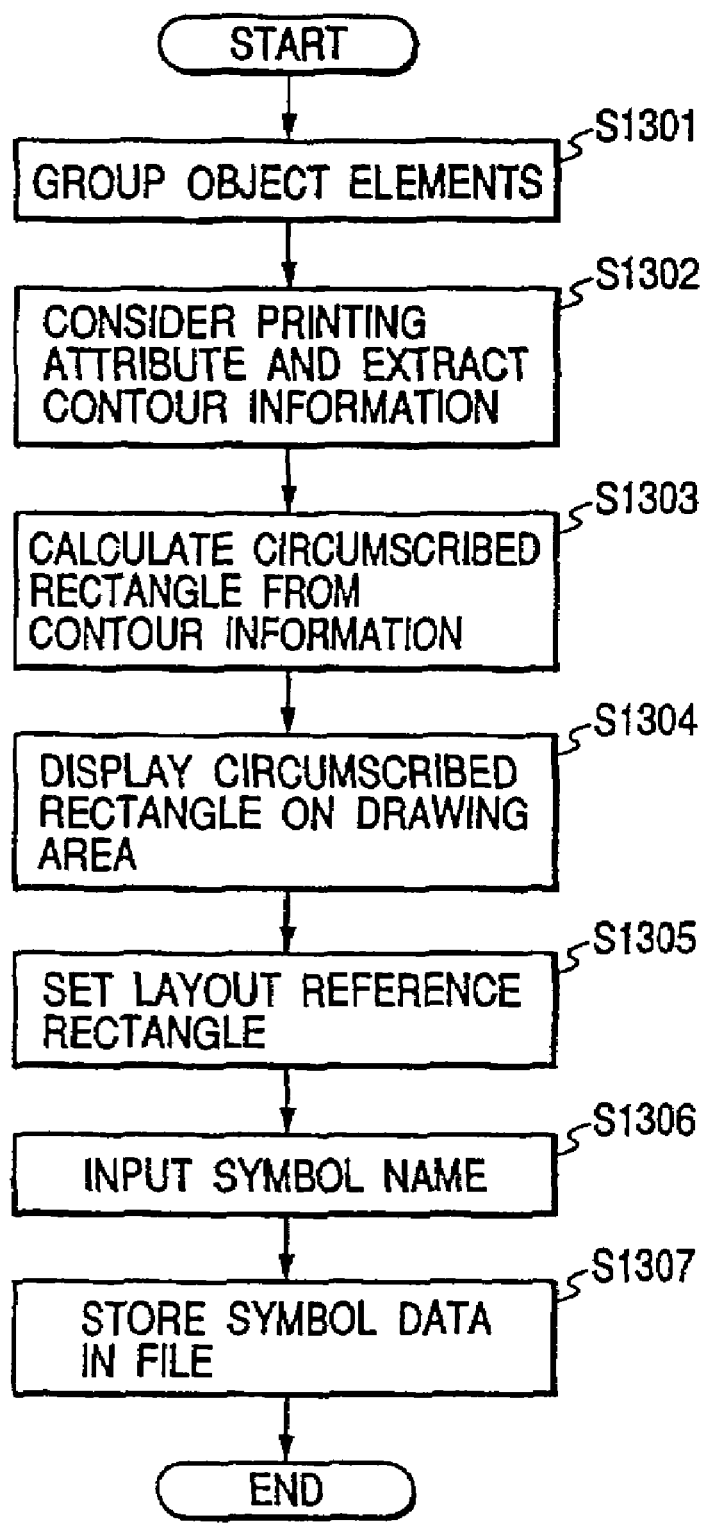
FIG. 13 is a flowchart for explaining the processing performed to group elements and to register symbols.

FIG. 13 is a flowchart for explaining the processing for grouping together the elements for a symbol, and for registering the element group as a symbol.

First, the elements to be registered as a symbol are assembled into a group (step S1301). The process employed for assembling the object elements will be described in detail later.

After the object elements have been specified at step S1301, the CPU 21 extracts contour information for the individual elements, while taking into consideration the print attributes (step S1302). The process employed for extracting the contour information will be explained in detail later.

Following the extraction of the contour information for the object elements at step S1302, the CPU 21 employs the contour information to perform the calculations for a circumscribed rectangle (step S1303).

The circumscribed rectangle is the smallest rectangle that can be employed to enclose the visible portion of an element, and is specified by providing two diagonal X and Y coordinates.

Since the circumscribed rectangle for an element can be specified by using two diagonal points, the maximum X and Y coordinate values and the minimum X and Y coordinate values are calculated using the contour information. Then, when the bottom left point and the top right point of the circumscribed rectangle are defined as:

bottom left point (minimum X coordinate value of contour information, minimum Y coordinate value of contour information) and top right point (maximum X coordinate value of contour information, maximum Y coordinate value of contour information)

the circumscribed rectangle can easily be constructed

When, at step S1303, the circumscribed rectangle for the grouped elements is constructed, the CPU 21 displays the circumscribed rectangle by superimposing it on the grouped elements that are displayed in the drawing area 62 (step S1304). Such a display is shown, for example, in FIG. 21.

Following this, a layout reference rectangle is set to define layout reference information for the grouped elements (step S1305). The process for setting up the layout reference rectangle will be described in detail later.

By performing the procedures in the above processing sequence, the elements are grouped together for registration as a symbol, and the layout reference rectangle is constructed. Then, a character string, entered by a user at the keyboard 11 as a key for identifying the symbol, is selected as the name for the symbol (step S1306).

Finally, in the external storage device 33, the CPU 21 stores data concerning the pertinent symbol as a symbol data file having the structure previously shown in FIG. 7, (step S1307).

When the layout reference rectangle is thus set, the layout reference position in the symbol data file structure in FIG. 7 is not clearly specified. However, once the symbol data are stored in the symbol data file, to describe a specific layout reference position only the bottom left point, for example, of the layout reference rectangle need be employed.

The coordinate data for each element that constitutes the symbol are expressed by using the relative coordinates for the layout reference position.

The process performed at step S1301 for grouping together the object elements will now be explained.

The following method is used for grouping together the object elements. This method can be employed not only to group elements, but can also be employed to collectively perform copying, movement and deletion processes for a plurality of elements.

(1) Sequential Selection of Elements:

Elements to be grouped together are selected one by one. To terminate the selection process, the general-purpose button 66 on the main panel 61 is activated, or one of the mouse buttons is double-clicked (the button is quickly depressed twice) in the drawing area 62.

(2) Designation of Rectangular Area:

An area in which elements to be grouped together are displayed is designated by enclosing it with a rectangle. To establish the limits of the rectangle, the locations of only two diagonal points must be established using the arbitrary designation method or the point designation method. In this case, the elements that are completely inclosed by the rectangle are the objects that are to be grouped together.

Figure 14:
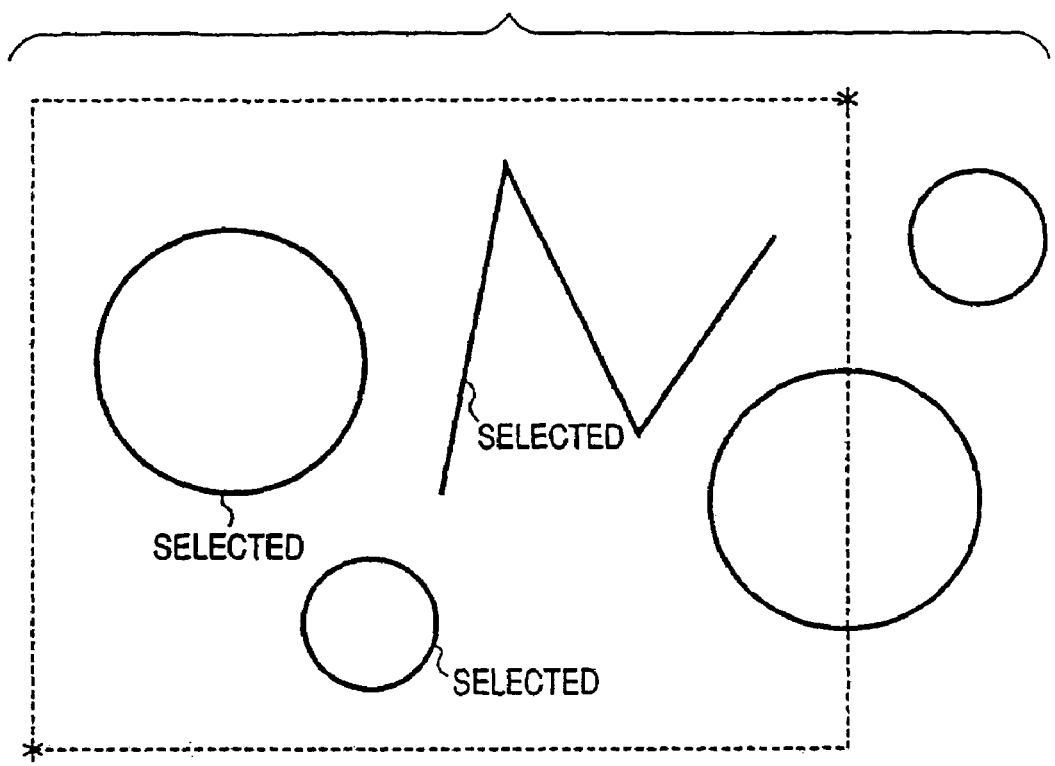
FIG. 14 is a diagram showing the state wherein target elements are selected by designating a rectangular area.

FIG. 14 is a diagram showing an example where the object elements are selected using the above method.

In FIG. 14, after the point positions, each of which is indicated by an *, are designated, a rectangle enclosing an area is displayed in the drawing area 62. In FIG. 14, "selected" elements are so labeled, and so that these elements can be identified they are displayed in red.

An element only a part of which lies in a specified rectangle, or an element all of which lies outside the limits of the rectangle may be employed as an object.

(3) Designation of Arbitrary Area:

An area wherein are located elements to be grouped together is delimited by enclosing it with a polygon, and the locations of the individual points that constitute the polygon can be designated by using the arbitrary designation method or the point designation method. In this embodiment, an element only part of which lies within the limits of a designated polygon is regarded as and object to be included in a group.

Figure 15:
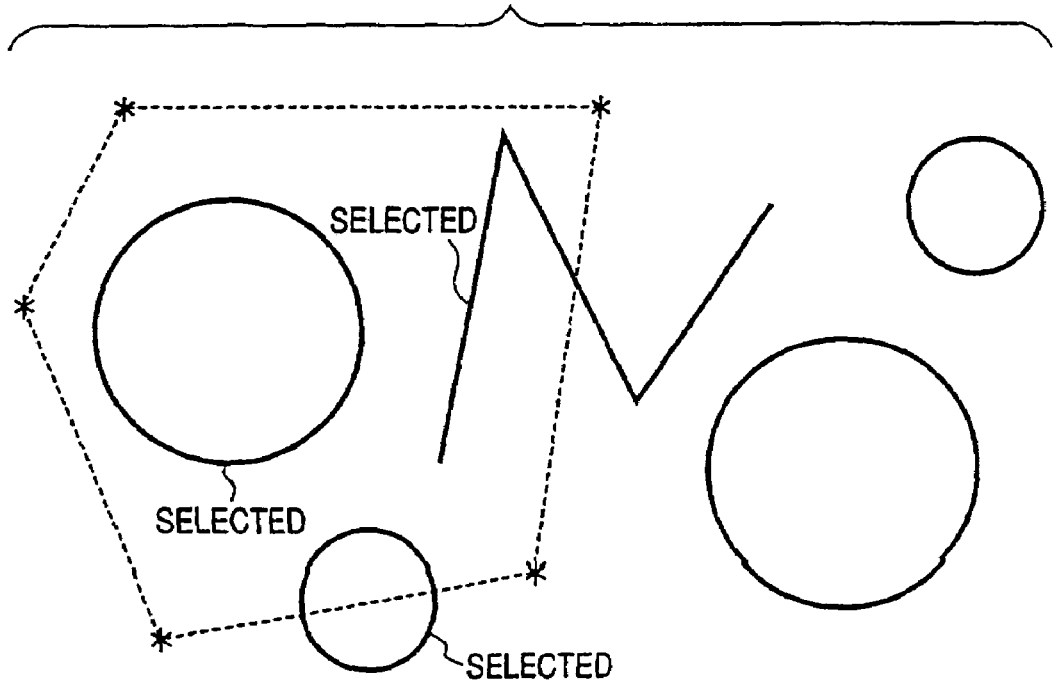
FIG. 15 is a diagram showing the state wherein target elements are selected by designating an arbitrary area.

FIG. 15 is a diagram showing an example wherein the object elements are selected using the above method.

In FIG. 15, after point positions, each of which is indicated by an *, are designated, a polygon that represents an area is displayed in the drawing area 62. In FIG. 15, "selected" elements are so labeled, and so that these elements can be identified they are displayed in red.

An element all of which is inside the specified polygon, or an element a part of which lies outside the limits of the polygon may be employed as an object.

The process at step S1302 for extracting the contour information will be explained.

Figure 16:
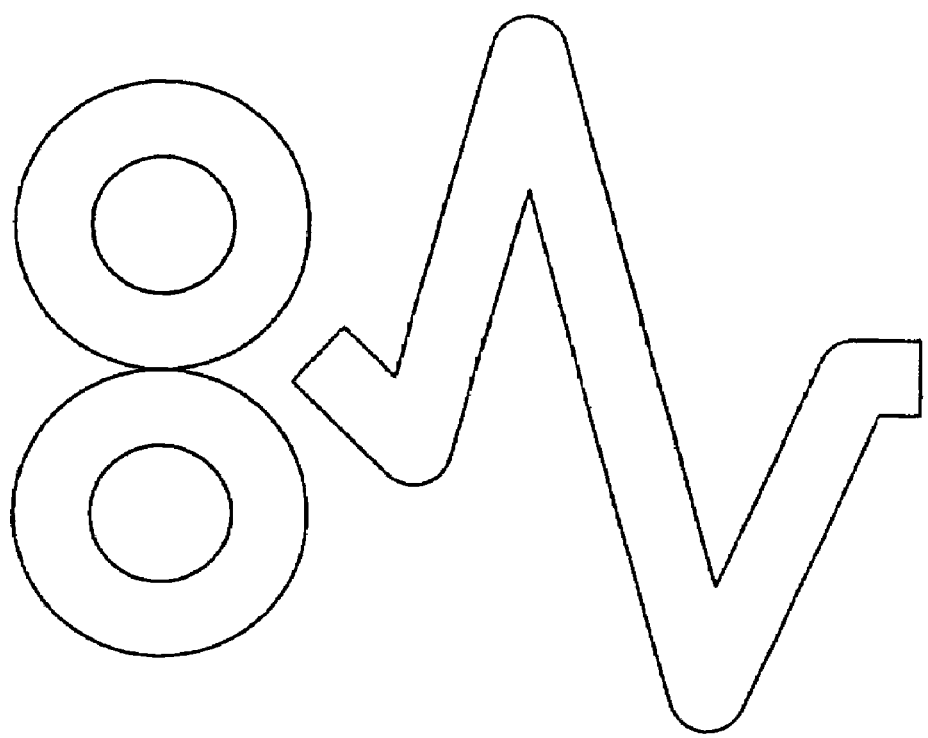
FIG. 16 is a diagram showing example results obtained by extracting contour information for symbols.

FIG. 16 is a diagram showing the results obtained by extracting the contour information for the symbol in FIG. 8.

The contour information can be expressed as a connection of line elements, such as line segments, circles, arcs, ellipses, elliptical arcs and free curves. It should be noted, however, that a print attribute, such as a line width, need not be taken into consideration for the contour information, and that the contour itself is regarded as a graphic pattern that does not have an area.

The following methods are used to extract contour information for graphic data and character data to which a print attribute is added.

(1) Method for Displaying Data Unchanged on the Display Device:

Since as is shown in FIG. 2 the information processing apparatus for this embodiment implements the WYSIWYG function, the data to which a print attribute has bee added are displayed on the display device 41 using the same image form as that which is used when it is printed.

When the WYSIWYG function is implemented by, for example, Display PostScript (DPS), only a PostScript (PS) command (an operator), for extracting graphic data or character data contour information, need be provided for the graphic data or the character data on the display.

The obtained coordinate data for the contour information are qnantized data for which the size of a dot on the screen of the display device 41 is the minimum unit. Therefore, generally a coordinate value includes an error.

Figure 17:
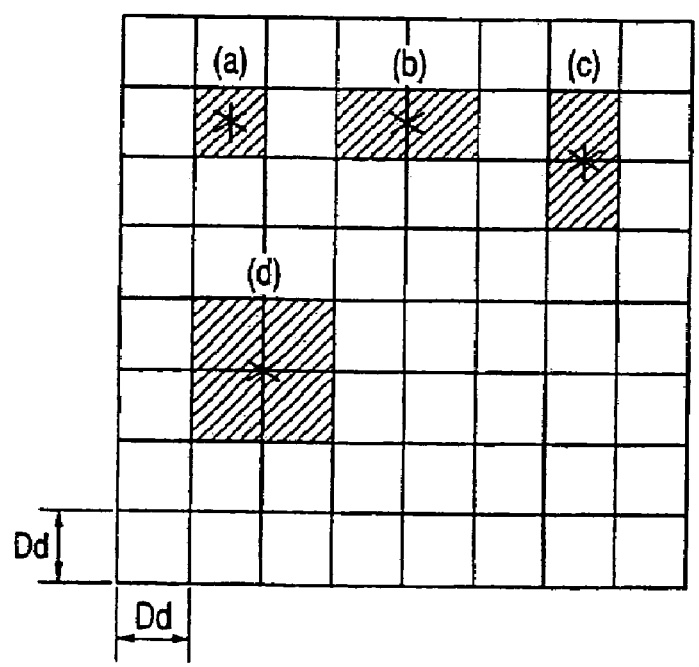
FIG. 17 is a diagram for explaining quantization of coordinate data.

Assume that the width and the height of one dot on the display device 41 is Dd inches. The error in the obtained coordinate data is Dd*2 inches at the maximum, while taking into account that, as is shown in FIG. 17, the actual coordinates represent the border between two dots, as in (b) and (c), or that the coordinates correspond to the location whereat the corners of four dots converge, as in (d).

Each location identified by an * represents an actual coordinate position that is not quantized, and each of the shaded rectangles represents a dot on the current screen, i.e., a quantized value.

When the resolution Rd of the display device 41 is approximately Rd=100 (DPI), the error is approximately $$Dd*2=(1/Rd)*2=1/50 \text{ (inches)} \tag{1}.$$

A printer having a high resolution, such as the image setter 52, has a resolution Rp of approximately 3000 (DPI). When the width and the height of one dot is Dp (inches), the error at the output time is approximately $$Dp*2=(1/Rp)*2=1/1500 \text{ (inches)} \tag{2}.$$

Therefore, the coordinate data that are obtained from the results displayed on the display device 41 are not always satisfactory nor accurate.

However, according to this method, the contour information for the graphic data or the character data can be easily obtained merely by calling the PS operator. Therefore, using this method the contour information can be satisfactorily extracted in a case where there is no special requirement for the creation of printing data having a resolution that is higher than that of the display device 41, i.e., the creation of print data for printed matter or for wrapping paper, and in a case where printing data need not be output accurately in consonance with another element, or a specific coordinate value, even though included in the printing data is a portion for which a resolution is required that is higher than that of the display device 41.

(2) Method for Displaying a Temporarily Enlarged Image on the Display Device:

Method (1), however, can not adequately perform the processing required to employ printing data for which is needed a high accuracy corresponding to the resolution of a printer such as the imagesetter 52, and that must be output precisely in consonance with another element, or a specific coordinate value. Since the resolution of the display device 41 differs from that of the imagesetter 52, even when contour information on the display device 41 seems to have been correctly extracted, a visible error may appear when that information is used for printed matter produced by a printer such as the imagesetter 52.

With method (1), an error of one dot on the display device 41 appears as an error of 30 dots when the information is used for printing by the imagesetter 52.

Therefore, during the extraction of contour information for graphic data or character data, before a postscript (PS) command (operator) is issued for the information for either of them object data are temporarily enlarged and displayed. As a result, errors due to the difference in the resolutions are reduced.

The "display" in this case means the transmission of data to the display device 41, and is not necessarily a visible process.

Figure 18:
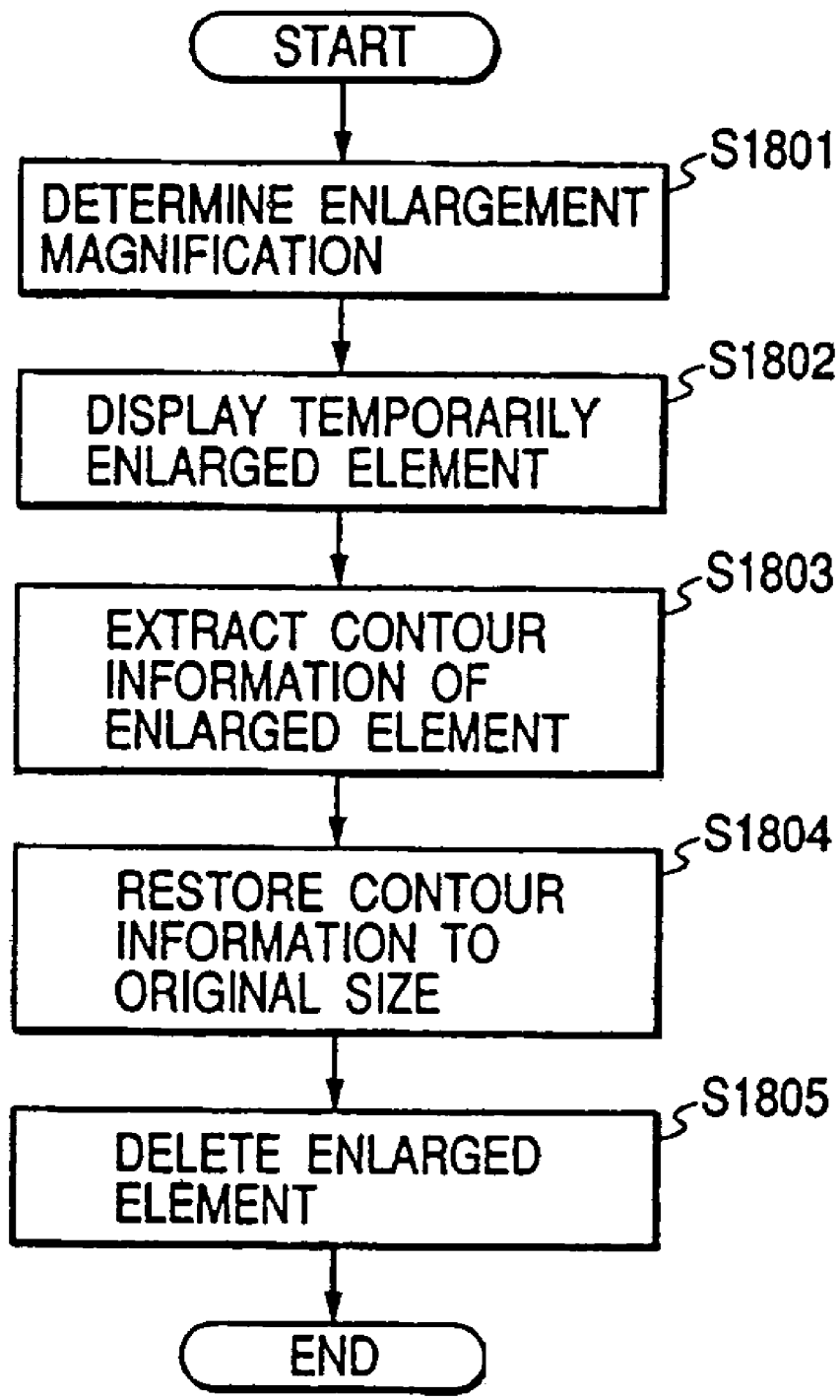
FIG. 18 is a flowchart for explaining the processing performed to temporarily enlarge an element and to display the enlarged element in order to extract contour information.

FIG. 18 is a flowchart for explaining the processing for displaying a temporarily enlarged element and for extracting contour information.

First, the enlargement magnification rate is determined (step S1801). The enlargement magnification rate need only be larger than the ratio of the resolution of the display device 41 to that of the imagesetter 52. Therefore, as for the resolution indicated for method (1), an element for which contour information is to be extracted need only be enlarged at a magnification rate that is larger than $$Rp/Rd=3000/100=30 \text{ (magnification rate)} \qquad (3).$$

At this time, of the print attributes of the element, the line width, the end edge shape and the connection shape that are affected by the enlargement are also enlarged at the same magnification rate.

Then, the element that is enlarged at the magnification rate determined at step S1801 is displayed on the display device 41 (step S1802).

As in method (1), the PS operator is employed to extract the contour information for the enlarged element (step S1803). The accuracy of the extracted contour information is equivalent to the accuracy of the imagesetter 52.

The extracted contour information is restored to its original size (step S1804).

Finally, since the data for the temporarily enlarged element that have been used to extract the contour information are no longer required, these data are deleted (step S1805).

(3) Geometrical Method:

The following method can be employed for graphic data for which a geometrical shape, especially a line element, such as a line segment, a circle, an arc, an ellipse, an elliptical arc or a free curve, is obtained in advance. As a result, very accurate contour information can be extracted, regardless of the resolution of the display device 41.

Figure 19:
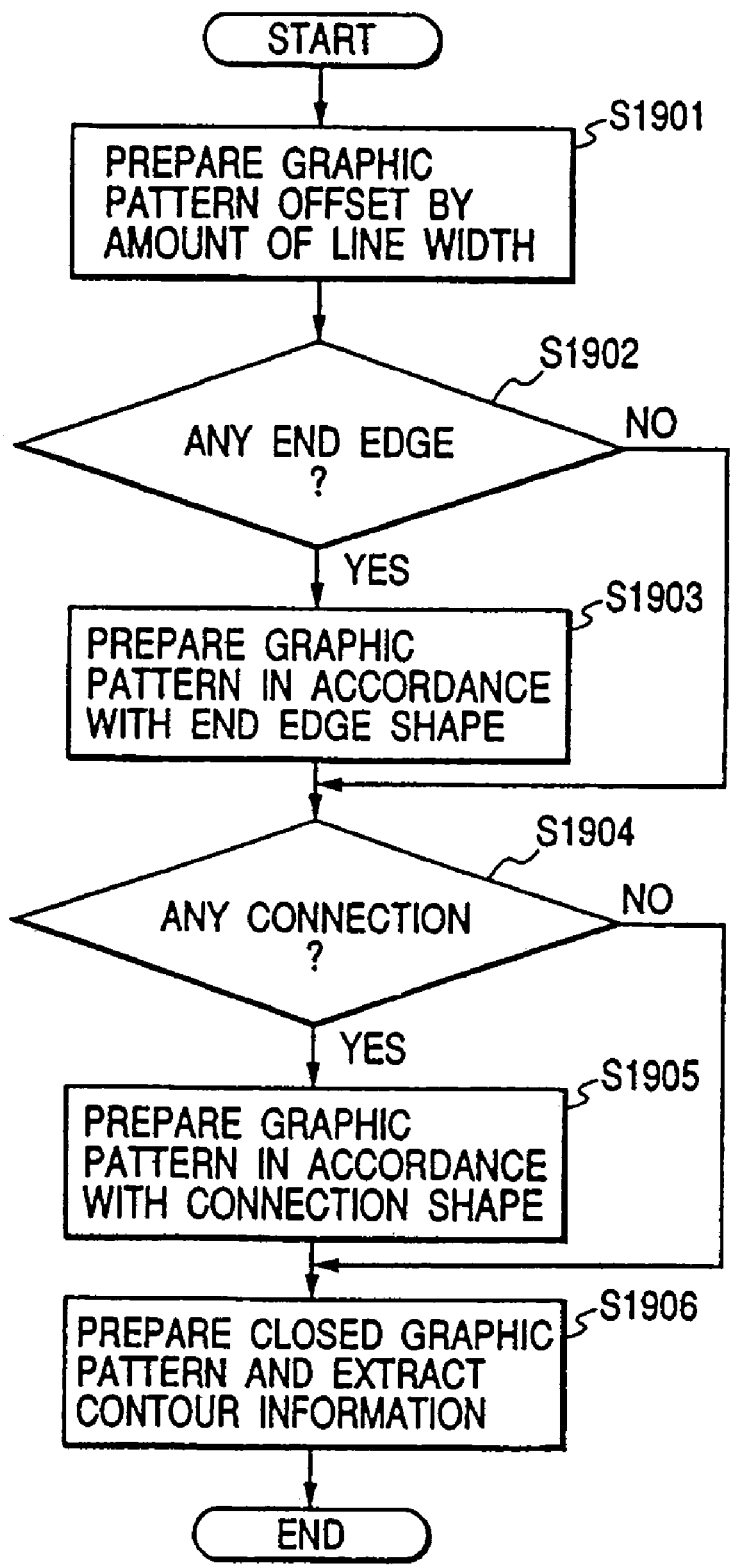
FIG. 19 is a flowchart for explaining the processing performed to extract contour information using a geometric method.

FIG. 19 is a flowchart for explaining the processing employed to extract contour information for a line element using the geometrical method.

First, while taking into account the line widthwise direction of a line element, a graphic pattern is prepared by offsetting the line element distance equivalent to the line width (step S1901).

A check is performed to determine whether the line element has an end edge (step S1902). When an end edge is present, program control advances to step S1903, whereat a graphic pattern corresponding to the end edge shape is created. When the line element does not have an end edge, program control moves to step S1904.

A check is performed to determine whether the line element includes a connection (step S1904). When the line element includes a connection, program control advances to step S1905, whereat a graphic pattern corresponding to the connection shape is created. When the line element does not have a connection, program control goes to step S1906.

Then, a closed graphic pattern is prepared based on the obtained graphic pattern, and the contour information is extracted (step S1906).

Figure 20:
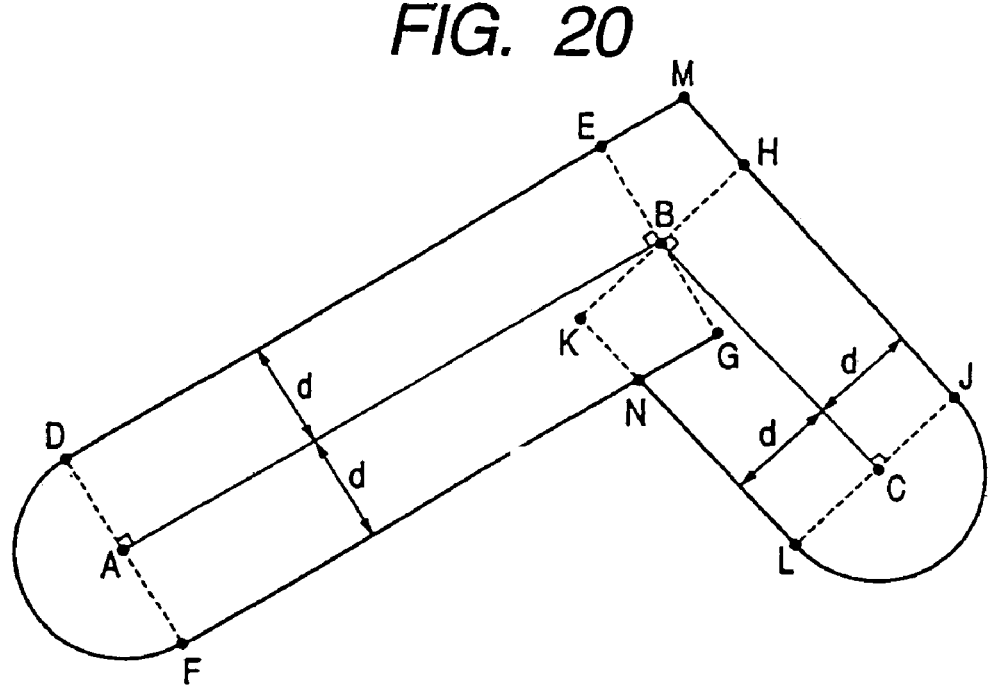
FIG. 20 is a diagram showing an example arrangement for extracting contour information for a line segment string using a geometric method.

An explanation will now be given for a method for geometrically extracting contour information for a line segment string that has the print attributes shown in FIG. 20. In the example in FIG. 20, the line width is 2d, the line widthwise bidirections are employed, the end edge shape is a round cap, and the connection shape is a mitered joint.

First, at step S1901, to prepare line segments DE and FG, line segment AB of line segment string ABC is offset to both sides, in the normal line direction of the line segment, a distance equivalent to ½ of the line width (=d). Similarly, to prepare line segments HJ and KL, line segment BC is offset to both sides, in the normal line direction, a distance equivalent to ½ of the line width (=d).

Since it is ascertained at step S1902 that the line segment string includes end edges, program control moves to step S1903, whereat the end edge shape is prepared. In this case, since the end edge shape is a round cap, only a semicircle having a diameter of DF and a semicircle having a diameter of JL need be formed.

Following this, since it is ascertained at step S1904 that the line segment string includes a connection, program control advances to step S1905, whereat the connection shape is created. In this case, since the connection shape is a mitered joint, the line segments DE and JH need only be extended to intersection M of the two line segments. Thereafter the intersection of the line segments FG and KL is defined as N.

Therefore, at step S1906 the contour information for the line segment string can be expressed as a closed graphic pattern obtained by connecting points M, J, L, N, F, D and M. The interval JL and the interval FD are connected using an arc, and the other intervals are connected using line segments.

If an object line element is a free curve, at step 1901, whereat a graphic pattern is created by offsetting the element a distance equivalent to the line width, to create the offset graphic pattern either method (1) or method (2) may be employed to determine the size of the intervals into which the curve is divided.

(4) Method for Outputting a Software or Hardware Component that Corresponds to a Printer:

According to the above method (2), in order to reduce an error that would be generated due to the difference in the resolutions of the printer and the display device 41, a temporarily enlarged element is displayed on the display device 41. Very accurate contour information can also be extracted by outputting data to a software or a hardware component that provides accuracy corresponding to that provided by the resolution of the printer.

Such a software component has a function for employing reading/writing data for a two-dimensional integer string that is large enough to correspond to the number of dots that a printer, such as the imagesetter 52, can express.

Further, a hardware component such as that mentioned above has a function for reading/writing of data for a two-dimensional display data buffer that is large enough to hold the data for the number of dots that a printer, such as the imagesetter 52, can express.

Both the software and the hardware components can also include a function for interpreting a drawing command (the PS operator in this case) and for developing it into a dot image.

The process at step 1305 for setting the layout reference rectangle will now be explained.

First, the layout reference information defined by the layout reference rectangle will be described.

The layout reference information is information used as a reference for the position and the size of an element to be laid out as print data. The layout reference information must be stored for each element. In this embodiment, the position reference is called a layout reference position, and the size reference is called a layout reference size.

In the process for setting the layout reference rectangle, one of the feature points of the rectangle can be defined as the layout reference point for the layout processing, which will be described later. In total, the rectangle has nine feature points: the corner points of the rectangle (four points), the midpoints of the individual sides (four points) and the center point.

The layout reference point can be selected during the layout processing, instead of a specific point being designated in advance. In this case, the change (parallel movement) of the layout reference point of the element occurs.

The following methods are those used to set the layout reference rectangle.

(1) Arbitrary Rectangle:

Two arbitrary points in the drawing area 62 are selected by using the arbitrary designation method, the point designation method, the feature point designation method, the intersection designation method, or the on-line point designation method to determine the layout of a rectangle for which the points designated are diagonal points.

According to an element selection method, other than the arbitrary designation method, generally an object element is selected for which a layout reference rectangle is set, i.e., one of the grouped elements in this case. However, another element can be selected.

Figure 23:
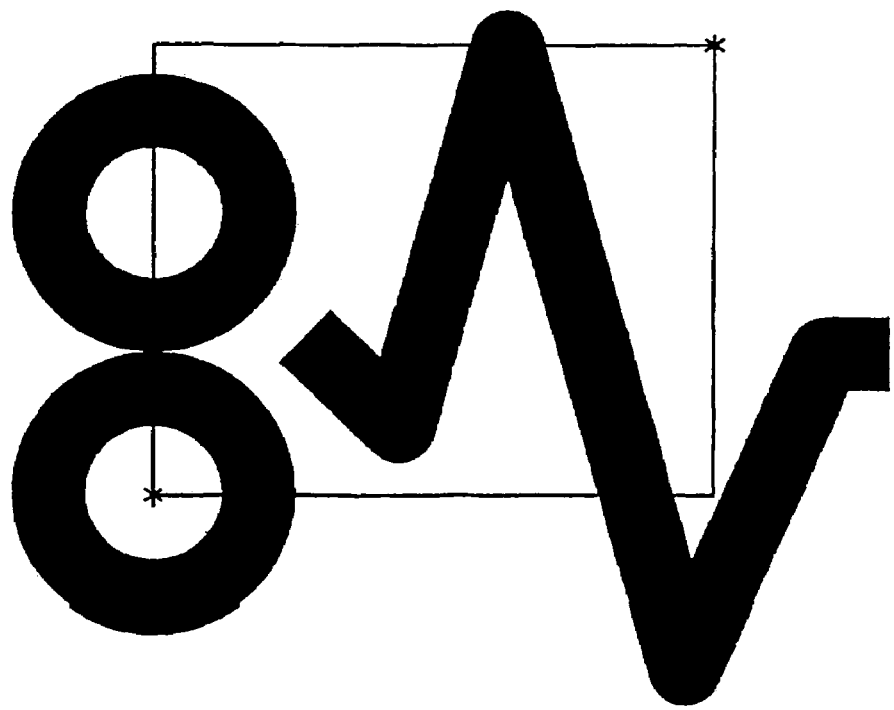
FIG. 23 is a diagram showing an example where an arbitrary rectangle is employed as a layout reference rectangle for a graphic pattern group.

FIG. 23 is a diagram showing an example wherein a circle, one element of a group, is selected, and wherein the center point of the circle is selected using the feature point designation method and another point is selected using the arbitrary designation method in order to create a layout reference rectangle.

(2) Circumscribed Rectangle:

Calculations are performed to acquire the following circumscribed rectangles.

A circumscribed rectangle for inclosing all elements:

A circumscribed rectangle is acquired for enclosing all object elements, and for grouped elements, a circumscribed rectangle is acquired for enclosing all the constituent elements.

Figure 21:
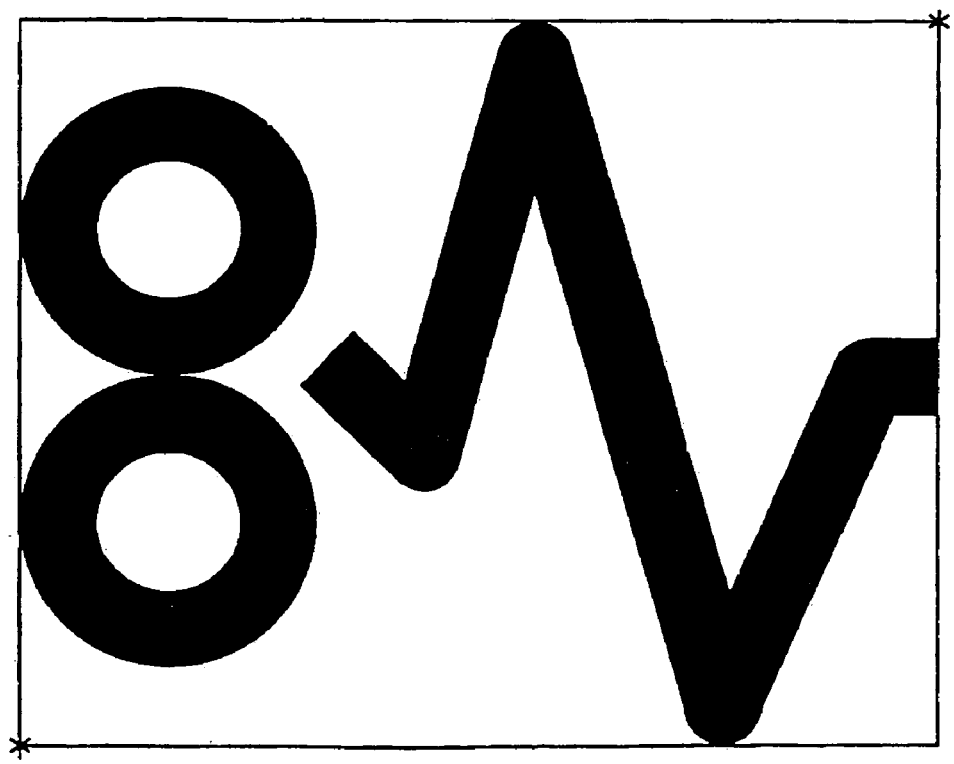
FIG. 21 is a diagram showing a group of elements positioned within a circumscribed rectangle.
Figure 22:
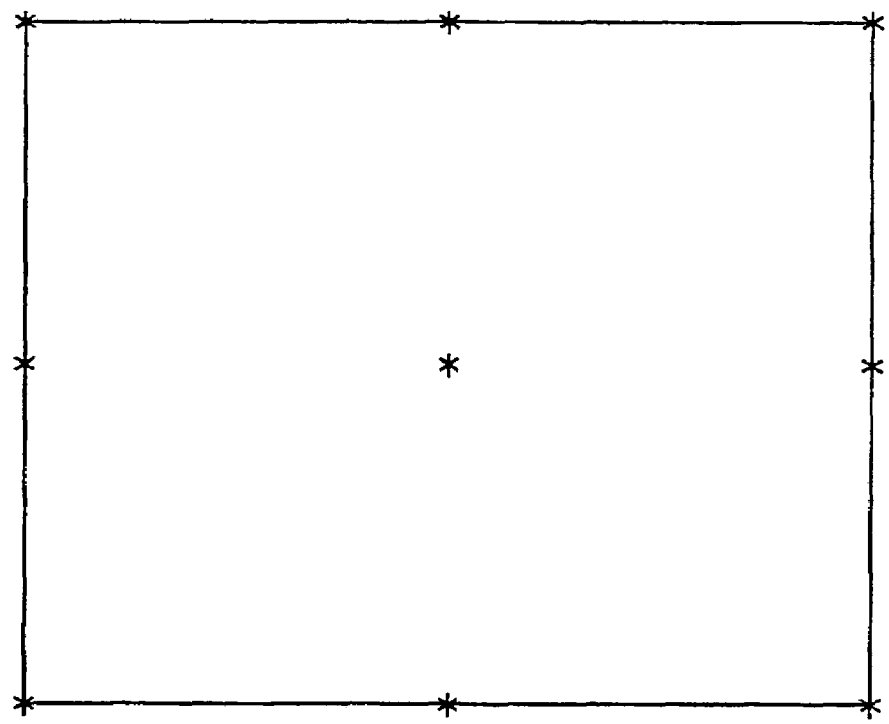
FIG. 22 is a diagram showing the feature point locations of the rectangle.

An example, previously described, wherein a circumscribed rectangle for enclosing an element group is acquired and is defined as a layout reference rectangle is shown in FIG. 21.

A circumscribed rectangle for enclosing an arbitrary element selected from among those in a group:

An arbitrary element can be selected from among the elements constituting a group graphic pattern, and a circumscribed rectangle for that element can be acquired.

Figure 24:
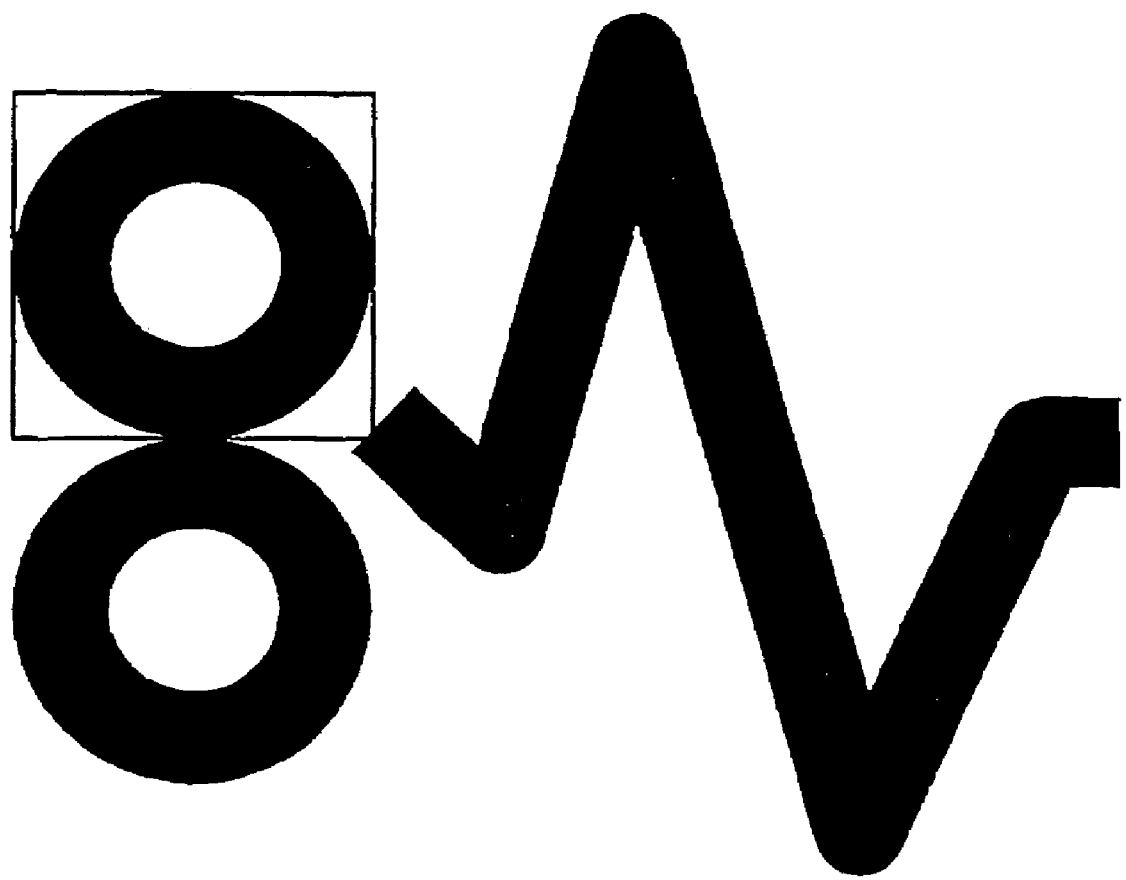
FIG. 24 is a diagram showing an example wherein a circumscribed rectangle for elements is employed as a layout reference rectangle for a graphic pattern group.

In FIG. 24 is shown an example wherein a circle, one element of a group, is selected, and a circumscribed rectangle is fashioned that is defined as a layout reference rectangle.

The processing for grouping together the elements of a symbol and for registering the group as the symbol has been explained.

An explanation will now be given for the processing performed to retrieve a registered symbol and for laying out the symbol as print data.

(C) Retrieval and Layout of a Symbol

Figure 25:
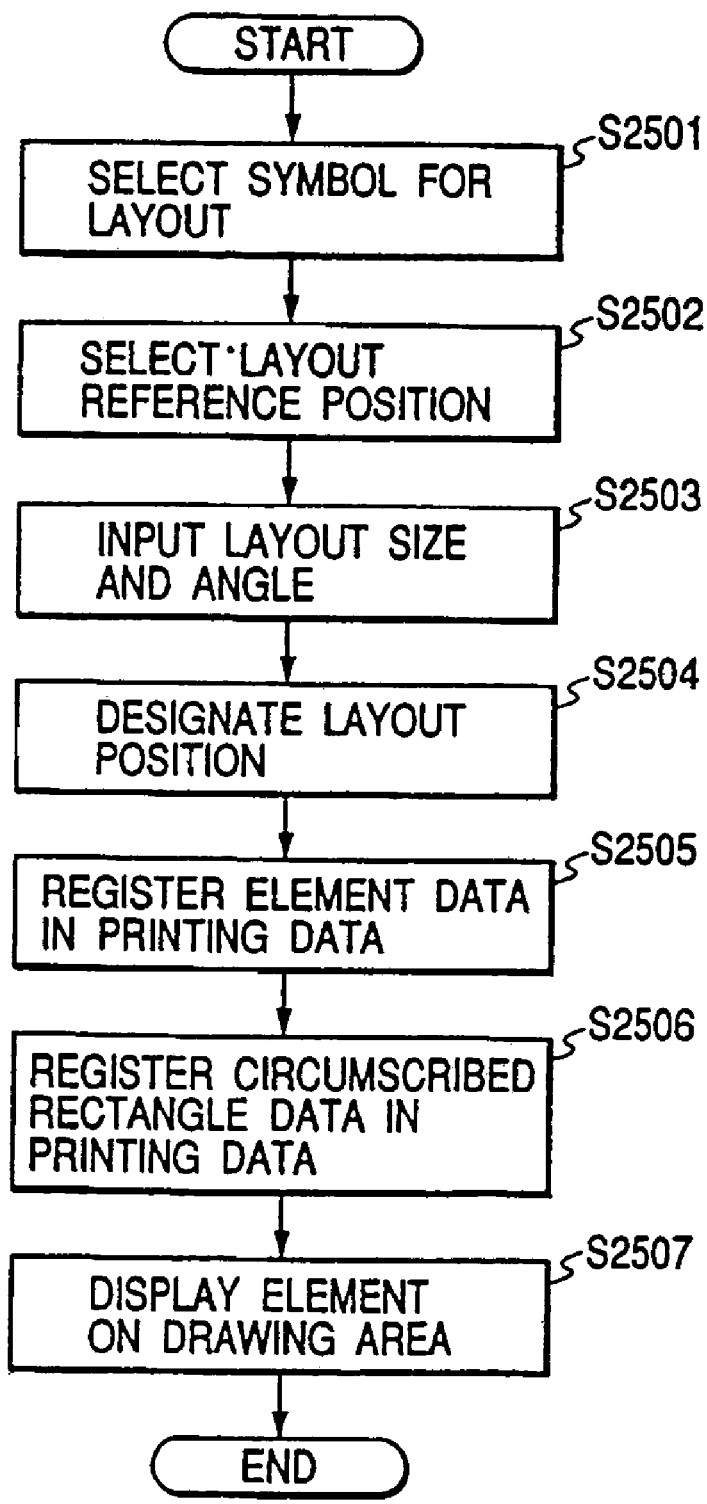
FIG. 25 is a flowchart for explaining the processing performed when calling and laying out a symbol.

FIG. 25 is a flowchart for explaining the processing performed to retrieve a registered symbol and for laying out the symbol as print data.

A symbol to be laid out is selected (step S2501).

Specifically, the following processing is performed.

First, to retrieve a symbol stored in the external storage device 33, the button for a "symbol" command is selected from among the buttons 65 on the main panel 61 and is activated, or the keyboard 11 is used to enter the name of the "symbol" command in the character input area 64.

Figure 26:
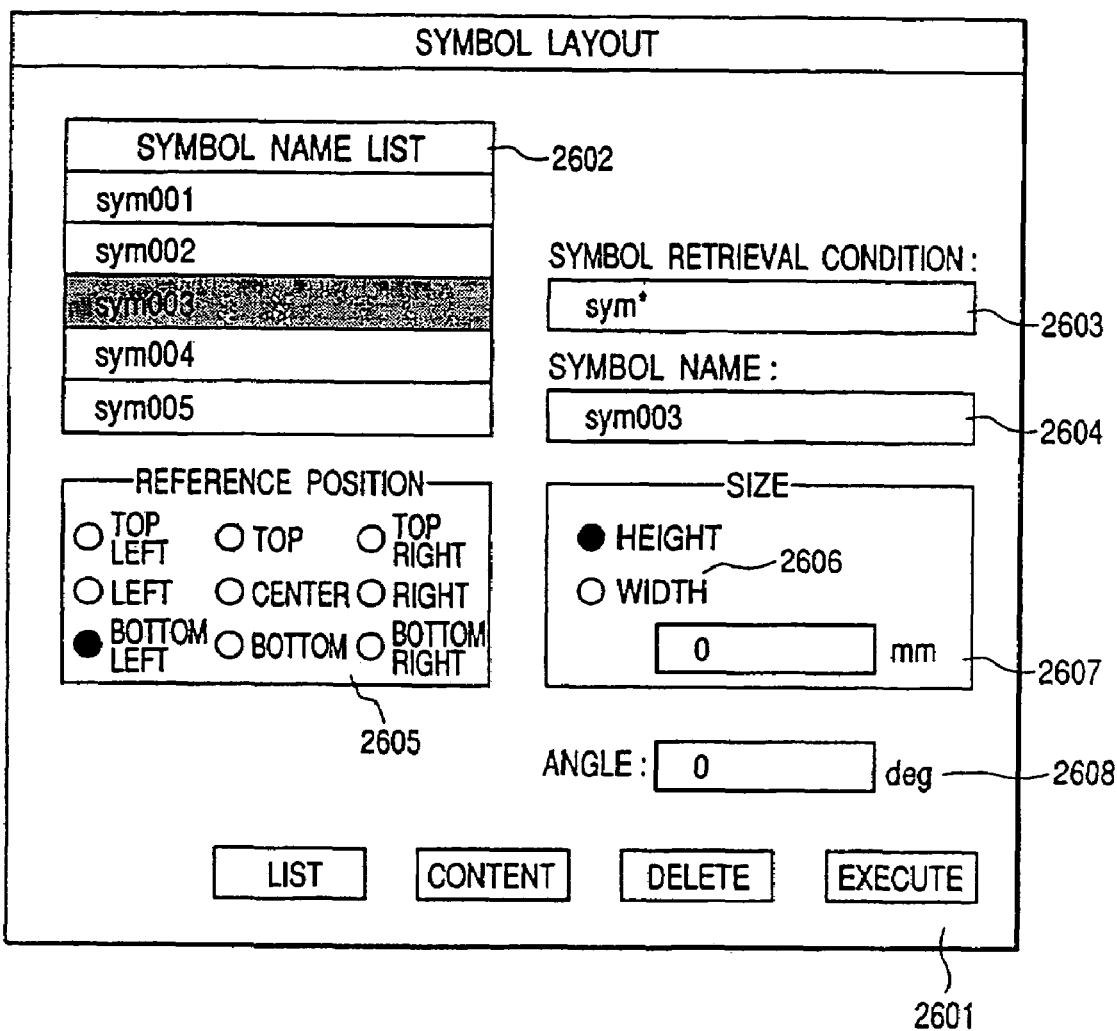
FIG. 26 is a diagram showing a symbol layout panel.

Then, the symbol layout panel 2601 shown in FIG. 26 is displayed on the display device 41, and the mouse 12 is used to select a symbol to be laid out from among those in the symbol name list 2602. The keyboard 11 can also be used to enter the name of a symbol directly in a symbol name input area 2604. In this case, the selection conditions for the symbol name list 2602 are changed, so that they interact with the name entered in the symbol name input area 2604.

When many symbols have been stored, the keyboard 11 can be used to enter one part of a symbol name in the symbol retrieval condition input area 2603, following which the return key is depressed. Then, since only the symbol name that corresponds to the entered condition is displayed in the symbol name list 2602, the symbol that is to be laid out can be selected by using the mouse 12.

Figure 27:
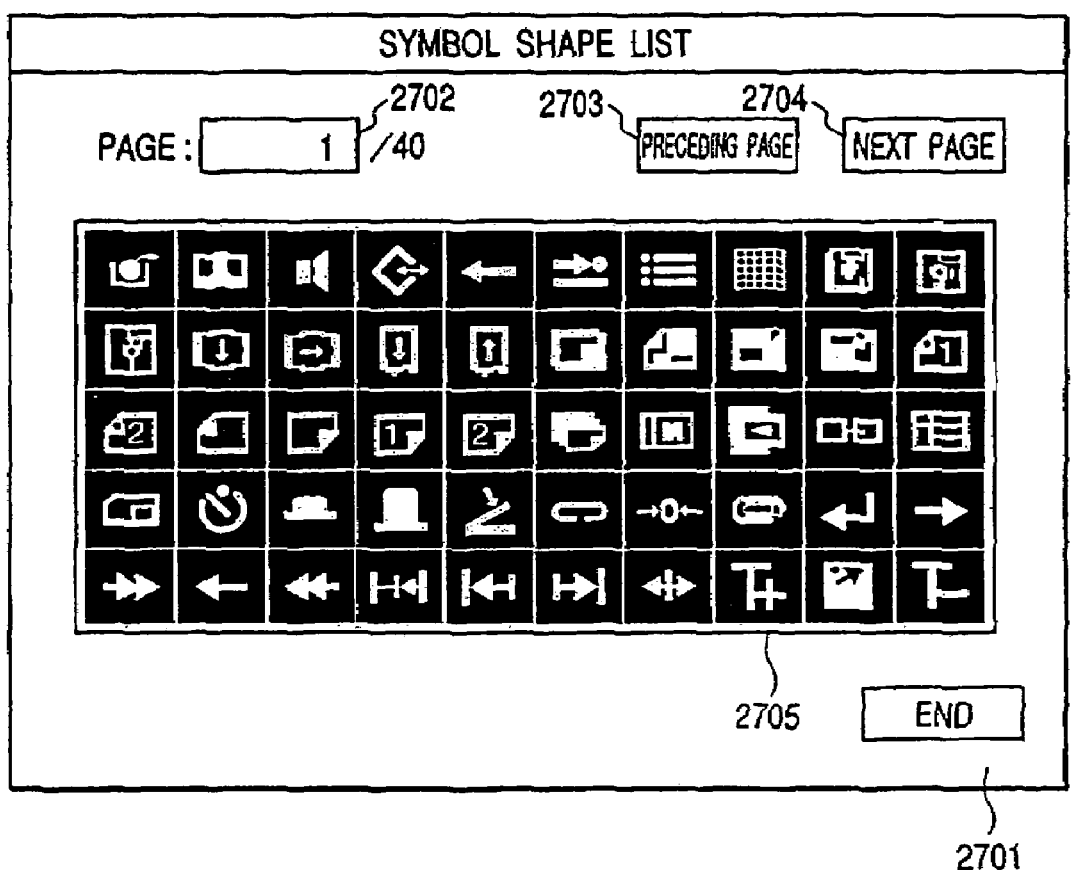
FIG. 27 is a diagram showing a symbol shape list panel.

If a user desires to select a symbol not only by entering the name of the symbol but also by confirming the shape of the symbol, the "list" button in the symbol layout panel 2601 must be selected. Then, the symbol shape list panel 2701 shown in FIG. 27 is displayed on the display device 41.

When the symbol shape list is extended over a plurality of pages, the total number of pages is displayed in the symbol shape list panel 2701. Thus, the keyboard 11 is used to enter a page number in a page number input area 2702, or a preceding page button 2703 or a next page button 2704 is selected, so that the page preceding or succeeding the currently displayed page can be seen.

When the mouse 12 is used to select the symbol to be laid out from the symbol shape list 2705, the selection conditions for the symbol name list 2602 are changed accordingly.

When a user desires to confirm in detail the contents of a selected symbol, the "contents" button in the symbol layout panel 2601 is activated so that a symbol content confirmation panel 2801 is displayed on the display device 41.

Figure 28:
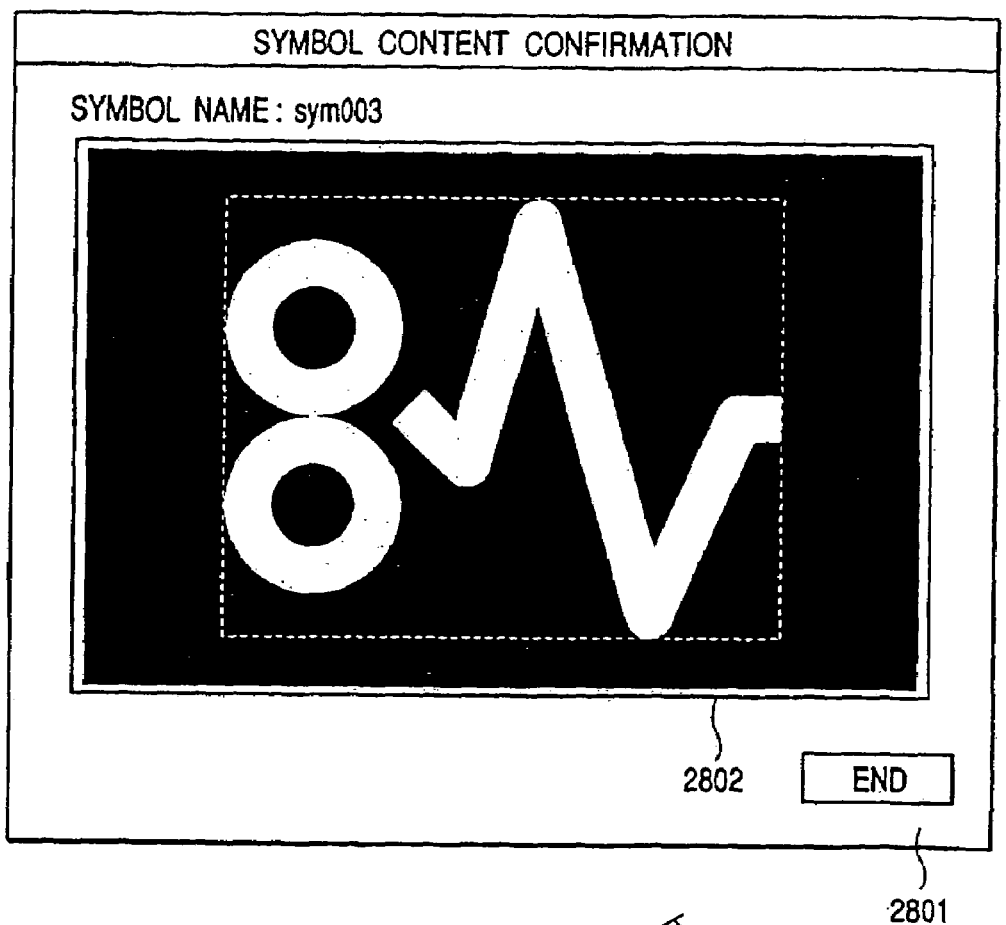
FIG. 28 is a diagram showing a symbol content confirmation panel.

The shape of a symbol and the information for the layout reference rectangle are displayed at the same time on the symbol contents confirmation panel 2801. A rectangle indicated by a broken line in FIG. 28 is a layout reference rectangle. In this example, the circumscribed rectangle for enclosing all the symbols is used as a layout reference rectangle.

When the symbol to be laid out is determined, the layout reference position is selected (step S2502).

The layout reference position can be designated by activating one of the layout reference position selection buttons 2605 on the symbol layout panel 2601. The nine reference positions indicated by the layout reference position selection buttons 2605 correspond to the nine feature points of the layout reference rectangle.

When the layout reference position is selected, before they are loaded into the RAM 32, coordinate data for the individual elements that constitute the symbol and that are stored in the symbol data file are transformed into relative coordinates at a distance from the selected layout reference position.

Further, a layout size and a layout angle are input as necessary information for the layout (step S2503).

The layout size is used to designate the size of a symbol after it is laid out. Either the height or the width of the layout reference rectangle must be designated. The "height" button or the "width" button in the layout size selection buttons 2606 on the symbol layout panel 2601 is activated, and the keyboard 11 is used to enter the numerical value for the height or the width in the layout size input area 2607.

When, for example, a specific value, such as 0, is entered in the layout size input area 2607, the laying out of the symbol can be performed in accordance with the size that is stored in the symbol data file.

The layout angle is used to designate the angle of the symbol for the layout. An angle formed between a horizontal side (a top side or a bottom side) of the layout reference rectangle and a positive X axial direction may be employed. A numerical value for the angle need only be entered, using the keyboard 11, in the layout angle input area 2608 on the symbol layout panel 2601.

To initiate the laying out of the symbol after the above described information has been entered, the "execute" button on the symbol layout panel 2601 is activated. To cancel the laying out of the symbol, the "delete" button is activated.

The layout position for the selected symbol in the drawing area 62 is then designated (step S2504).

The following methods can be employed to designate the layout position for a symbol.

(1) Point Layout:

An arbitrary position in the drawing area 62 is selected using the arbitrary designation method, the point designation method, the feature point designation method, the intersection designation method, or the on-line point designation method. In this case, the layout process is so performed that the layout reference position for the symbol matches the designated position.

(2) Rectangle Layout:

A rectangle that already exists in the drawing area 62 as printing data is designated by selecting an element. In this case, the layout process for the symbol is performed so that the top left point of a layout reference rectangle for the object symbol matches the top left point of the designated rectangle, regardless of the layout reference position and the layout angle that are specified on the symbol layout panel 26, and so that the layout reference rectangle is aligned along the two sides that sandwich the top left point of the designated rectangle.

When the height of the rectangle is used to define the layout size on the symbol layout panel 2601, the layout process is so performed that the height of the layout reference rectangle matches the height of the designated rectangle. When the width of the rectangle is used, the layout process is so performed that the width of the layout reference rectangle matches the width of the designated rectangle.

When the above operation is completed, in the RAM 32 the CPU 21 registers, as print data, symbol data that have been retrieved from the external storage device 33 (step S2505).

Furthermore, the data for the circumscribed rectangle for the symbol element, which are obtained at step S1303, are stored as a part of the symbol data (step S2506). When the circumscribed rectangle data are stored as a part of the element data, the contour information need not again be extracted to, for example, fully display the designated element in the drawing screen 62.

Thereafter, the CPU 21 displays the obtained symbol element in the drawing area 62 (step S2507).

In order to clearly create the circumscribed rectangle that is stored at step S2506, either the "rectangle" button, in the buttons 65 on the main panel 61, instructing the drawing of a rectangle is activated, or the keyboard 11 is used to enter "rectangle," the name of the command, in the character input area 64 and the "circumscribed rectangle" menu in the command menu 67 is selected, and an element is designated for which the circumscribed rectangle is required.

A specific display example is provided for the symbol layout that is retrieved using the above method.

Figure 29:
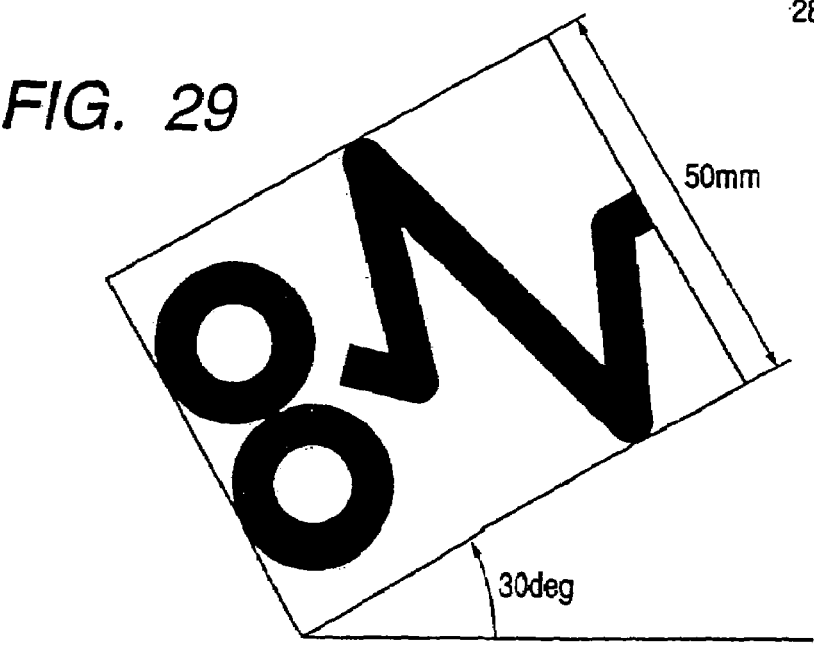
FIG. 29 is a diagram showing an example wherein symbols are laid out by using a point.

FIG. 29 is a diagram showing an example symbol point layout when the circumscribed rectangle for the symbol is set as a layout reference rectangle, the bottom left point of the rectangle is selected as the layout reference position, the layout size is set to a height of 50 mm, and the layout angle is set to 30 degrees. While in FIG. 29, for the explanation the layout reference rectangle is also displayed, actually, only the symbol is displayed. Of course, the layout reference rectangle can be displayed with the symbol by altering the specifications.

Figure 30A:
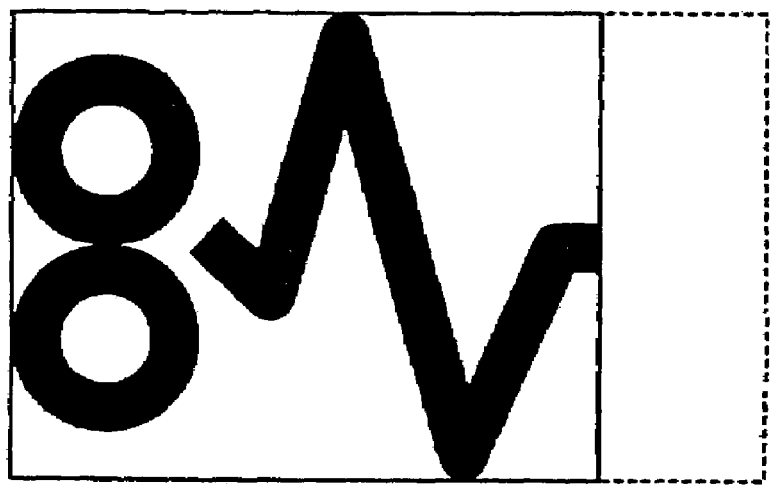
FIGS. 30A and 30B are diagrams showing examples wherein symbols are laid out by using a rectangle.
Figure 30B:
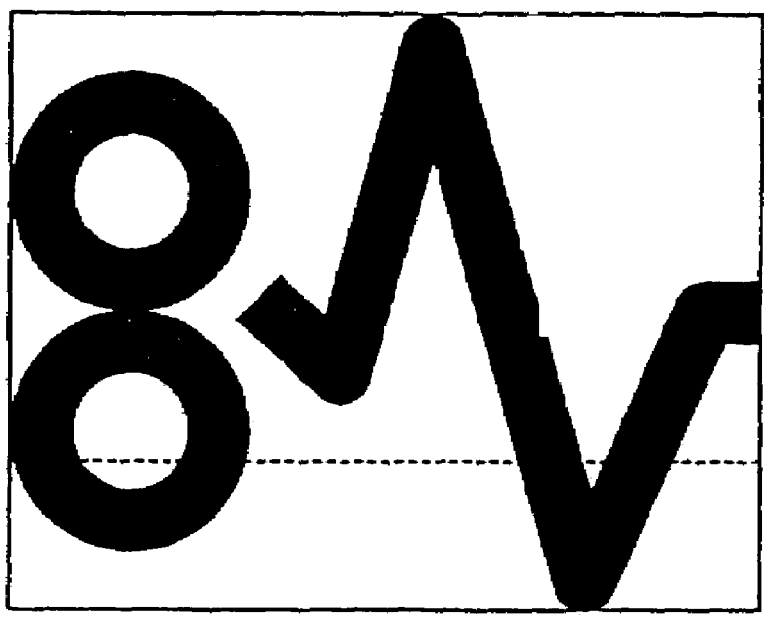

FIGS. 30A and 30B are diagrams showing an example wherein a circumscribed rectangle for symbols is set as the layout reference rectangle for the performance of the rectangular layout process. In FIG. 30A is shown an example wherein the height of the rectangle is set as the layout size, while in FIG. 30b is shown an example where the width is set as the layout size. The rectangles described by broken lines are the layout rectangles, and the rectangles described by the solid lines are the layout reference rectangles. While in FIGS. 30A and 30B, the layout reference rectangles are displayed for the purpose of making the explanation easier to understand, actually only the symbols are displayed. However, the layout reference rectangle can be displayed by altering the specifications.

The processing for retrieving the registered symbol and for performing the layout for the symbol as printing data has been explained.

In addition, the processing for preparing the symbol shown in FIG. 8 has been described by breaking it down into three different processes: (A) layout of a basic graphic pattern as print data; (B) grouping symbol elements and registering the group as a symbol; and (C) retrieving the registered symbol for the layout as print data.

<Management of History of Symbol>

The information processing apparatus in this embodiment can manage the history of a symbol.

An explanation will now be given for how the history of a symbol is managed by storing, as the key for a symbol data file, the time at which the symbol was prepared and each time it is updated, as well as the name of the symbol.

First, assume that the symbol data and printing data are prepared or updated along the time axis as follows.
1. Prepare symbol 1
   (registered symbol contents: SYM1-a)
2. Change symbol 1 one time
   (registered symbol contents: SYM1-b)
3. Prepare printing data 1 to include symbol 1
4. Change symbol 1 two times
   (registered symbol contents: SYM1-c, d)
5. Retrieve printing data 1 to include symbol 1

1 to 5 represent the elapsed time and the contents of jobs. The contents of the registered symbol in 1, 2 and 4 are names obtained by adding a time key "a (or b, c or d)" to a symbol name "SYM1", and indicate that the symbol is altered.

When the symbol 1 is prepared at 1, the contents of the registered symbol are SYM1-a.

When the symbol 1 is changed one time at 2, the contents of the registered symbol are SYM1-b.

When, at 3, printing data 1 is newly prepared and the symbol 1 is attached, the SYM1-b file that constitutes the latest state of the symbol 1 is read. The data are stored in the printing data using the name of SYM1-b.

When, the symbol 1 is changed two times at 4, the contents of the registered symbol are SYM1-c and SYM1-d.

When the printing data 1, to include the symbol 1, are called at 5, since there are four files, SYM1-a to SYM1-d, that represent the states of the symbol 1, a user can select and retrieve one of them.

When a printing data file including a symbol that has a plurality of states is retrieved, in the drawing area 62 the CPU 21 displays a symbol state selection panel 3101, as is shown in FIG. 31.

When a "storage time" button is activated on the symbol state selection panel 3101, the symbol data file SYM1-b is retrieved because the name SYM1-b, which represents the updated state of the symbol 1 when the printing data were stored, is held in the printing data file. SYM1-b is retained as the symbol name for the printing data.

This selection process is performed when a screen, one which was displayed at the time the printing data were prepared, is again to be printed by a printer such as the imagesetter 52.

When a "latest" button is activated on the symbol state selection panel 3101, the symbol data file SYM1-d, which represents the latest state of the symbol 1 at the time the printing data file is retrieved, is read. The symbol name included in the printing data is replaced by SYM1-d.

This selection is performed when the symbol in its latest state is to be included in the printing data that were prepared in the past, so that symbol data having an adequate form for the current standards are again printed by a printer such as the imagesetter 52, or when the printing data is to be changed by including the symbol in the latest state in the printing data that were prepared in the past.

When an "arbitrary" button is activated on the symbol state selection panel 3101, in the drawing area 62 the CPU 21 displays the symbol date input panel 3201 is shown in FIG. 32.

Assume that a user employs the keyboard 11 to enter the date on which he or she prepared or changed an object symbol in a date input area 3202, and a time input area 3203 on the symbol data input panel 3201, and activates an "execute" button. The CPU 21 then reads a symbol data file that includes the latest state of the symbol 1 at the time of the entry date. For example, when an arbitrary date is entered after SYM1-c was prepared and before SYM1-d was prepared, the symbol data file for SYM1-c is read.

Such history management is not limited to recording information concerning the symbol, but can also be employed in this manner for illustrations.

<Preparation of Text>

An explanation will now be given of an example that involves the preparation as character data of the text shown in FIG. 33.

Figure 34:
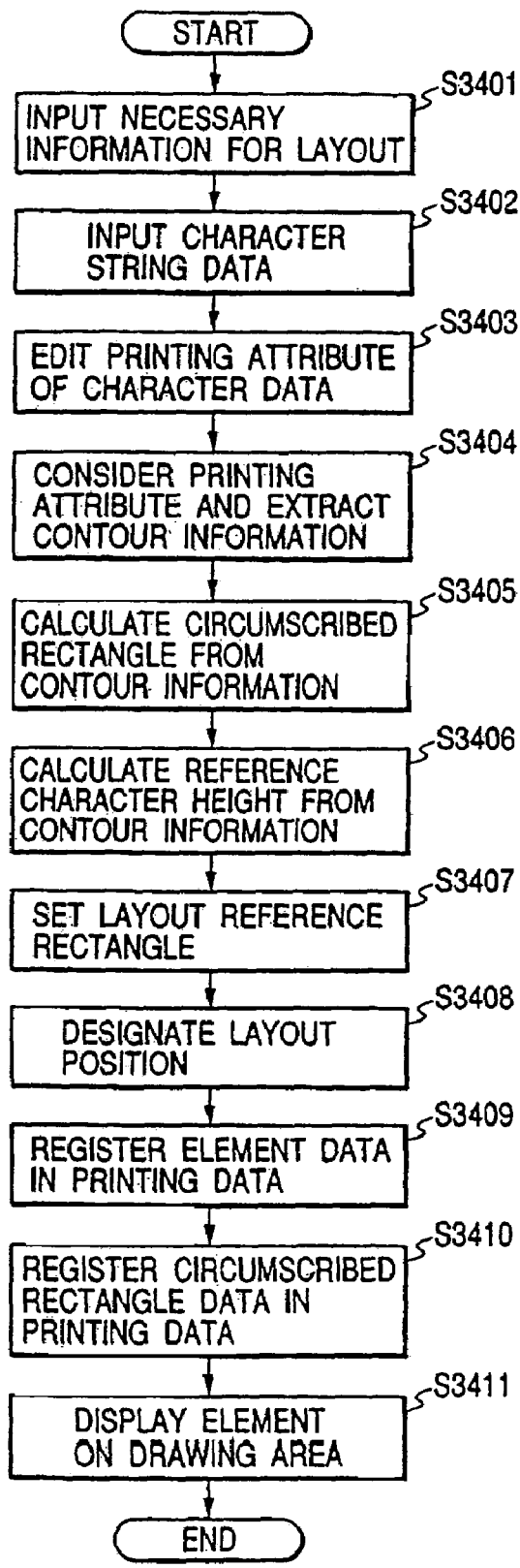
FIG. 34 is a flowchart for explaining the processing employed to lay out text as printing data.

FIG. 34 is a flowchart for explaining the processing performed to lay out the text as print data.

First, information required for laying out the text is entered (step S3401).

Specifically, the following processing is performed.

First, a text button selected from among the buttons 65 on the main panel 61 is activated, or the keyboard 11 is used to enter the name of the text command in the character input area 64.

Then, the command menu 67 is displayed on the display device 41. The selections listed on the command menu 67 include:
(1) New: Create new text.
(2) Correct: Correct previously prepared text.

When editing text, a user can choose either menu entry.

When the "new" menu button is activated, a text editing panel 3501 shown in FIG. 35 is displayed on the display device 41.

Using the text editing panel 3501, the user enters, as information required for creating text, layout information for text (a layout reference position and a line justification position), character string data, and of character data print attributes (a typeface name, a reference character height, a character size, a vertical scale, a horizontal scale, a baseline rotate angle, an oblique angle, character spacing and line spacing).

The layout reference position is designated by activating one of nine layout reference position selection buttons 3503 that represent the feature points of the layout reference rectangle. The contents of the layout reference position are valid for the point layout.

The line justification position is designated by activating one of four line justification position selection buttons 3504 provided for choosing left justification, right justification, center justification or full justification. The contents of the line justification position are valid for the rectangular layout.

The method employed to set the layout reference rectangle, and the point layout/rectangle layout method will be described later.

When the "correct" menu button is activated on the command menu 67, a message instructing the user to select the text to be corrected is displayed on the guidance area 68.

When the user complies with the instruction and selects the text to be corrected, the text editing panel 3501, which presents data representing the current state of the selected text, is displayed on the display device 41.

The user corrects desired data selected from among the information provided concerning text layout, character string data, and character data print attributes, which are already set on the text editing panel 3501.

The descriptions that are given for the following steps are given for a case wherein the "new" menu button is activated; note, however, that when the "correct" menu button is activated, essentially the same process is performed, except that the values that have already been set are displayed.

The keyboard 11 is used to enter the text for the character string data in the character string input area 3506 (step S3402).

The print attributes for the character data are added to the character string data that are to be used as printing data (step S3403). The types of print attributes that are available for character data were described previously.

Figure 36A:
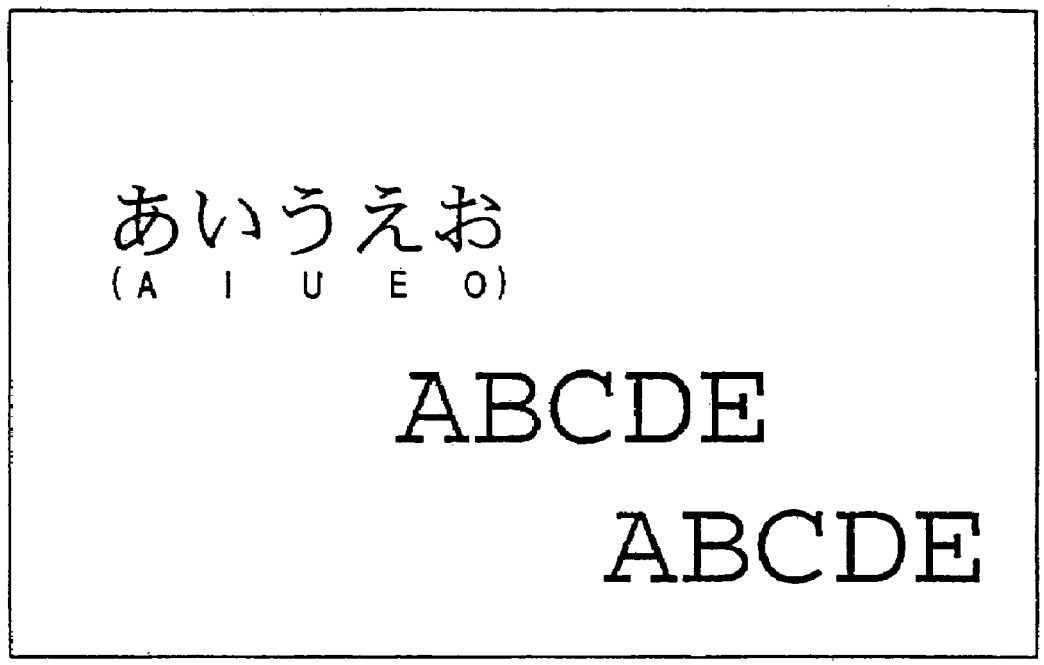
FIGS. 36A and 36B are diagrams showing an example wherein a printing attribute is added to character data.
Figure 36B:
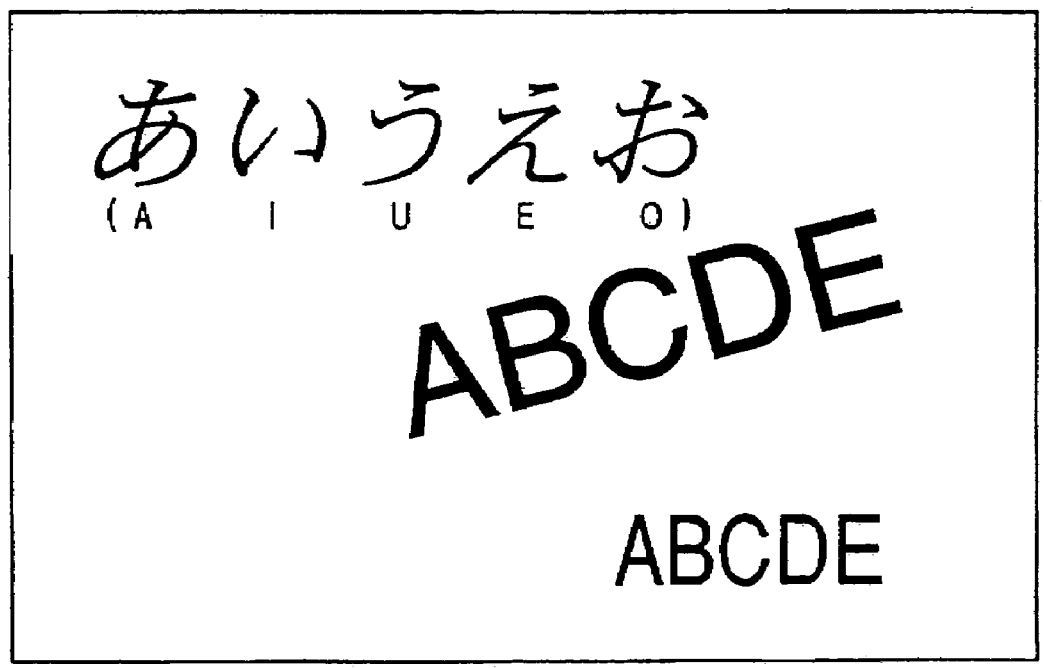

In FIGS. 36A and 36B, respectively, are shown character data to which print attributes are not added, and character data to which print attributes are added. When the print attributes are not added to the print data, the attribute setup flag in the previously described print attribute data structure is invalid. Thus, the character data are represented as having the default shape and size.

To edit the print attributes, in the print attribute editing area 3505, only the character input area for a print attribute to be edited need be selected, using the mouse 12 or the keyboard 11, while the numerical data is entered using the keyboard 11.

The print attribute "reference character height" is the height of the visible portion of a reference character that a user defines for each typeface, and is proportional to the print attribute "character size" for a reference character of the same typeface.

Figure 37:
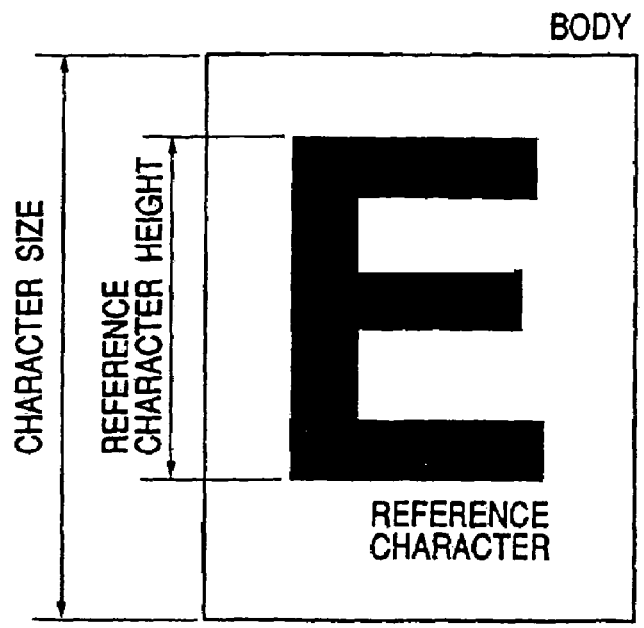
FIG. 37 is a diagram showing the relationship between reference character height and character size.

FIG. 37 is a diagram showing the relationship between the reference character height and the character size when capital letter E is defined as a reference character.

In the print attribute editing area 3505, when the data for the reference character height or the character size are set, accordingly, the other data are automatically updated.

As the current print attributes, the CPU stores in the RAM 32 the print attributes for the last character data that are set using the text editing panel 3501. Therefore, when new text is created, only one part of the current print attributes displayed on the text editing panel 3501 need be changed.

Before terminating the program, the CPU 21 stores the current print attributes in the external storage device 33, from whence they can be loaded into the RAM 32 the next time the program is executed. Therefore, the current print attributes need not be reset each time the program is executed. As the current print attributes, those used in common by all users and those set by individual users may be stored separately in the RAM 32 or in the external storage device 33.

When the above processing has been completed, the user activates the "execute" button on the text editing panel 3501, and sets up the necessary information for preparing text (information for the layout of text, character string data, and the print attributes for the character data).

When the necessary information for the creation of text has been set up, the CPU 21 prepares text data in accordance with the designated contents, and extracts the contour information (step S3404).

Figure 38:
FIG. 38 is a diagram showing example results obtained by extracting contour text information.

FIG. 38 is a diagram showing the results obtained by extracting the text contour information in FIG. 33.

To extract the contour information, one of the previously mentioned methods can be employed, i.e., one of (1) a method for displaying an image unchanged on the display device;
(2) a method for displaying a temporarily enlarged image on the display device;
(3) a geometrical method; and
(4) a method for outputting an image to a software or hardware component that is the equivalent of a printer.

It should be noted that for character data the geometrical shape must be provided in order to employ method (3).

The CPU 21 employs the contour information obtained at step S3404 to calculate the circumscribed rectangle for the text (step S3405). The same calculation method is employed for the circumscribed rectangle as is used at step S1303 in FIG. 13.

To clearly prepare the circumscribed rectangle, of the buttons 65 on the main panel 61, the "rectangle" command button for drawing a rectangle is activated. Or the keyboard 11 is used to enter the name of the "rectangle" command in the character input area 64, the "circumscribed rectangle" button on the command menu 67 is activated, and an element for which the circumscribed rectangle is to be created is selected.

Since the reference character height is employed as the layout reference for the text, the reference character height is calculated by using the contour information for the reference character (step S3406). At this time, the height of the visible portion of a reference character, which is prepared in accordance with the print attributes set at step S3403, is calculated, regardless of whether the reference character is included in the character string that is entered at step S3402.

Generally, the reference character height is proportional to the character size of the reference character of the same typeface. Therefore, when a ratio of the reference character height to the character size of the reference character is calculated in advance by using the contour information, and is stored in the external storage device 33, the process at step S3406 need not be performed each time new text is created.

The layout reference rectangle is set as the layout reference information for the text (step S3407), and a layout reference rectangle is also set for each line of the text.

To set the layout reference rectangle for the above example symbol, (1) an arbitrary rectangle, and
(2) a circumscribed rectangle are employed. For the text,
(3) a rectangle that is determined using the reference character height and the width of the visible portion of a character string is defined as a layout reference rectangle.

The reference character height is obtained at step S3406, and the width of the visible portion of the character string equals the width of the circumscribed rectangle that is obtained at step S3405. As a result, the bottom left point and the top right point of the layout reference rectangle are provided as the bottom left point (minimum X coordinate value of contour information, minimum Y coordinate value of contour information of a reference character when it is assumed that the reference character is included in a character string), and the top right point (maximum X coordinate value of contour information, maximum Y coordinate value of contour information of a reference character when it is assumed that the reference character is included in a character string).

Figure 39:
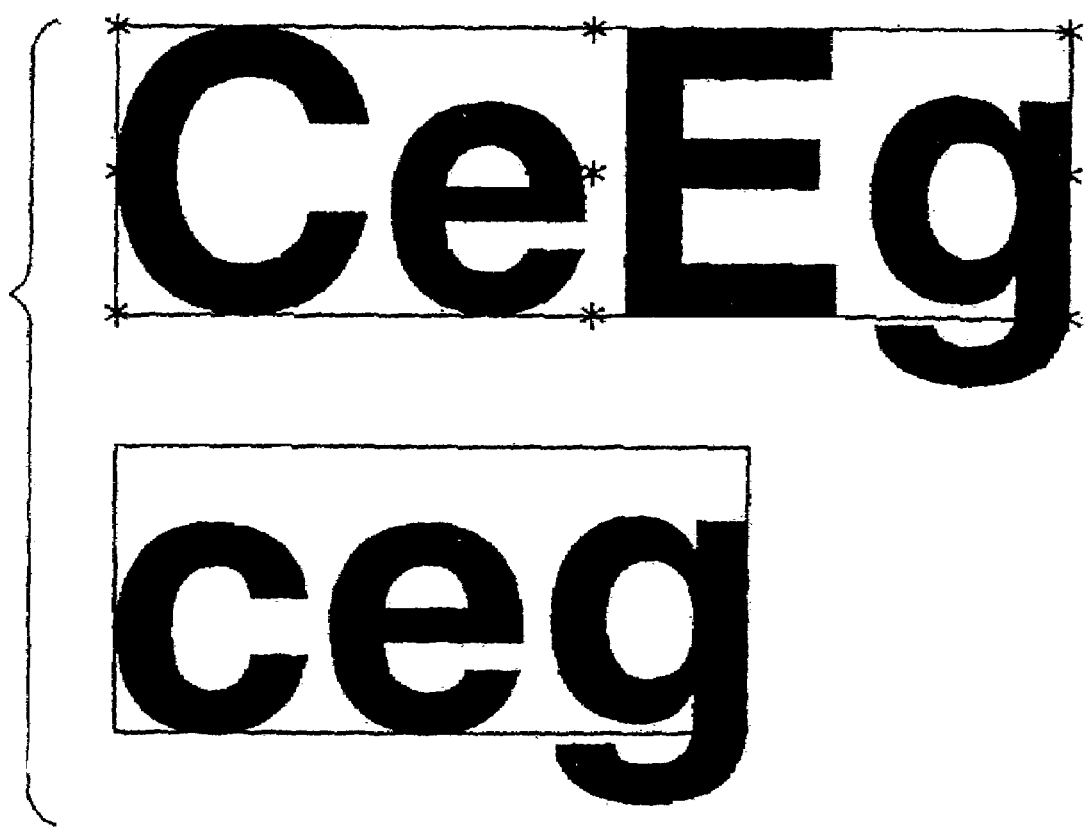
FIG. 39 is a diagram showing a layout reference rectangle and a layout reference position for text.

FIG. 39 is a diagram showing layout reference rectangles and nine layout reference positions, which are set for the text in FIG. 33. Each of the rectangles constructed of solid lines is a layout reference rectangle for an individual line of text, and each of the points identified by an * is a layout reference position.

Then, the layout position for the text in the drawing area 62 is designated (step S3408).

The following methods are employed to designate the text layout position.

(1) Point Layout:

An arbitrary position in the drawing area 62 is selected using the arbitrary designation method, the point designation method, the feature point designation method, the intersection designation method, or the on-line point designation method. In this case, the layout for the text is so performed that the layout reference position of the head line of the text that is designated at step S3401 matches the selected position.

Figure 40:
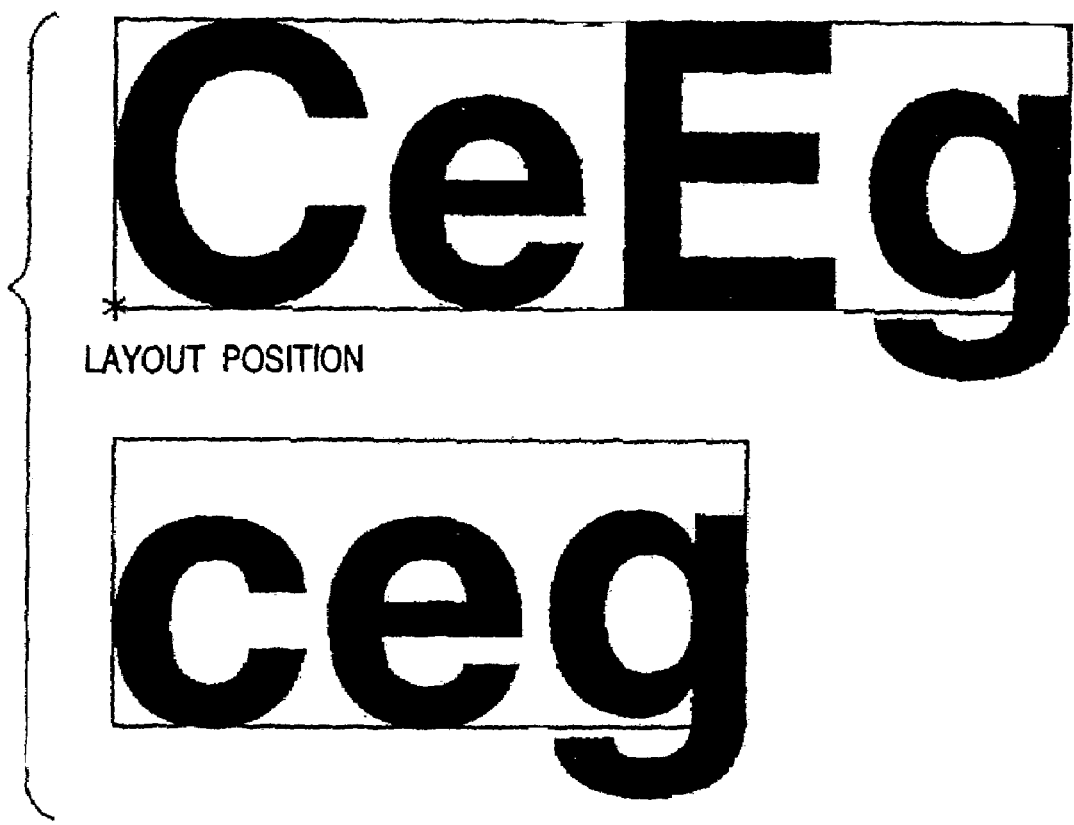
FIG. 40 is a diagram showing an example wherein point-layout is performed for text.
Figure 41A:
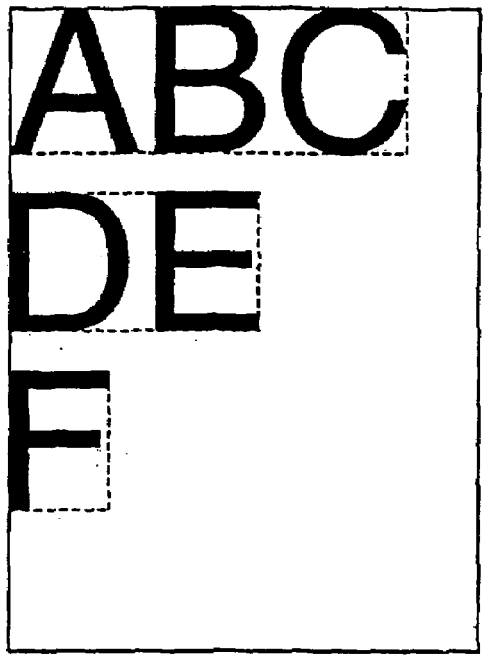
FIGS. 41A, 41B, 41C and 41D are diagrams showing examples wherein text is laid out using rectangles.
Figure 41B:
Figure 41C:
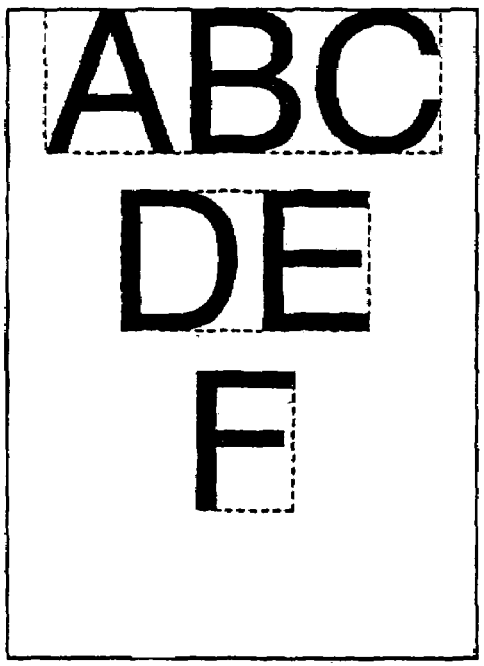
Figure 41D:
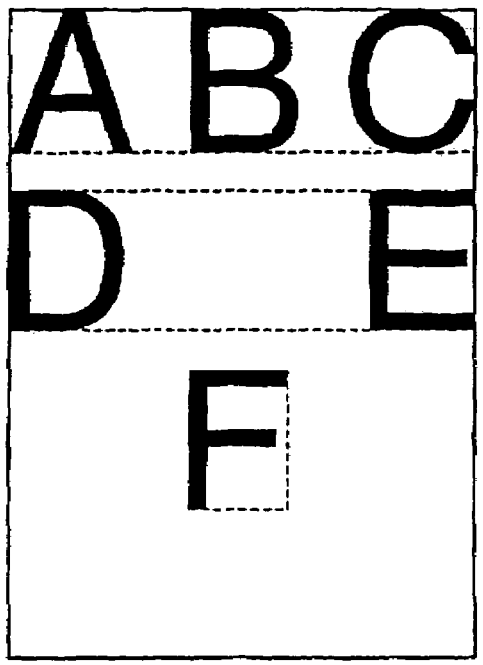

FIG. 40 is a diagram showing a case where the bottom left point of the layout reference rectangle is selected as the layout reference position when performing the point layout for the text. In FIG. 40, the position identified by the * is the layout position. And in FIG. 40, to facilitate the explanation the layout reference rectangles are again displayed using solid lines. In actuality, however, only the text is displayed. Of course, if desired, a layout reference rectangle can be displayed by altering the specifications.

(2) Rectangular Layout:

A rectangle, for printing data, that already exists is designated in the drawing area 62. In this case, the layout is performed as follows in accordance with the line justification position designated at step S3401, so that the top side of the layout reference rectangle of the first line of the text matches the top side of the designated rectangle.

Left justification: A layout reference rectangle for each line of text is aligned along the left side of the designated rectangle for the layout.

Right justification: A layout reference rectangle for each line of text is aligned along the right side of the designated rectangle for the layout.

Center justification: A layout reference rectangle for each line of text is positioned at the center of the width of the designated rectangle for the layout.

Full justification: The character spacing in each line of text is so adjusted that the width of the layout reference rectangle for each line matches the width of the designated rectangle.

FIGS. 41A to 41D are diagrams showing example rectangular text layouts. The rectangles constructed of solid lines are those used for the layout. Left justification is demonstrated by the example in FIG. 41A, right justification by the example in FIG. 41B, center justification by the example in FIG. 41C, and full justification by the example in FIG. 41D. While for the examples the layout reference rectangles are displayed using broken lines, in actuality, however, only text is displayed. Of course, if desired, the layout reference rectangles can also be displayed by altering the specifications.

When the above processing has been completed, in the RAM 32 the CPU 21 registers, as printing data, the obtained text element data (step S3409).

Further, the data that are obtained at step S3405 for the circumscribed rectangle for the text element are stored as a part of the text element data (step S3410).

If the data for the circumscribed rectangle are stored as a part of the element data, then contour information need not again be extracted when, for example, a designated element is to be displayed in its entirety in the drawing area 62.

Finally, the CPU 21 displays the obtained text element in the drawing area 62 (step S3411).

<Preparation of Dragonfly>

The information processing apparatus in this embodiment can prepare a "dragonfly" for use as a printing data element. The processing performed to prepare a "dragonfly" will now be described.

A "dragonfly" is a positioning mark used to identify an area of printing data that is finally to be formed as printed matter, or to describe the shape of an object on which the printing data are pasted. This element is indispensable when preparing as print data block copy for photo engraving, and a high degree of accuracy is required.

Figure 42:
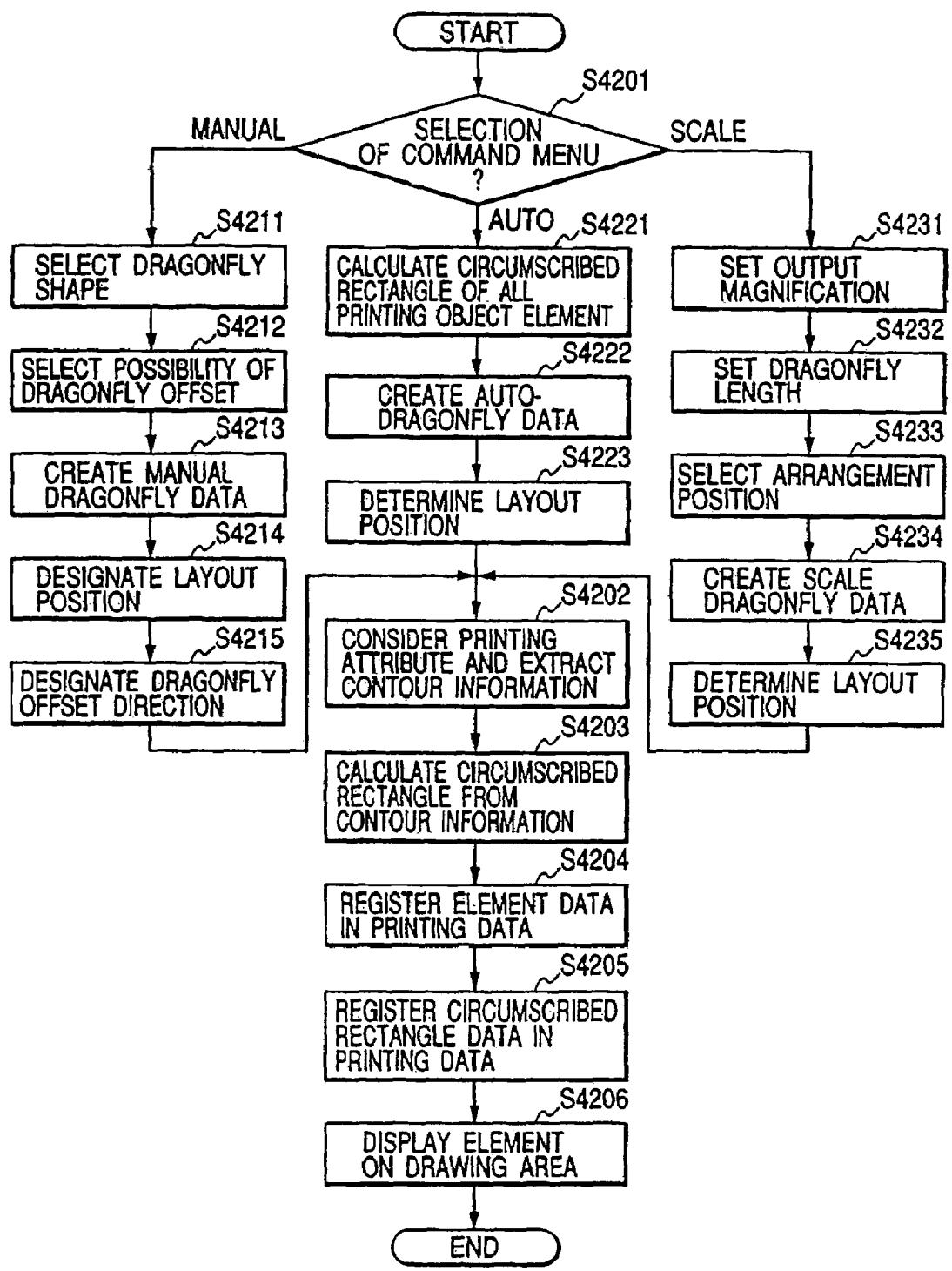
FIG. 42 is a flowchart for explaining the processing performed to lay out a register mark dragonfly (hereinafter referred to simply as dragonfly) as printing data.

FIG. 42 is a flowchart for explaining the processing performed to lay out a dragonfly as print data.

First, a command for a dragonfly is selected (step S4201).

Specifically, the following process is performed.

First, of the buttons 65 on the main panel 61 the "dragonfly" command button is activated, or the keyboard 11 is used to enter the name of the "dragonfly" command in the character input area 64.

Then, the command menu 67 is displayed on the display device 41. The selections listed on the command menu 67 include:

(1) manual dragonfly;
(2) automatic dragonfly; and
(3) scale dragonfly.

A user initiates the preparation of a dragonfly by choosing one of the menu entries.

An explanation will now be given for an example wherein, at step S4201, "manual dragonfly" is chosen from the menu.

Figure 43:
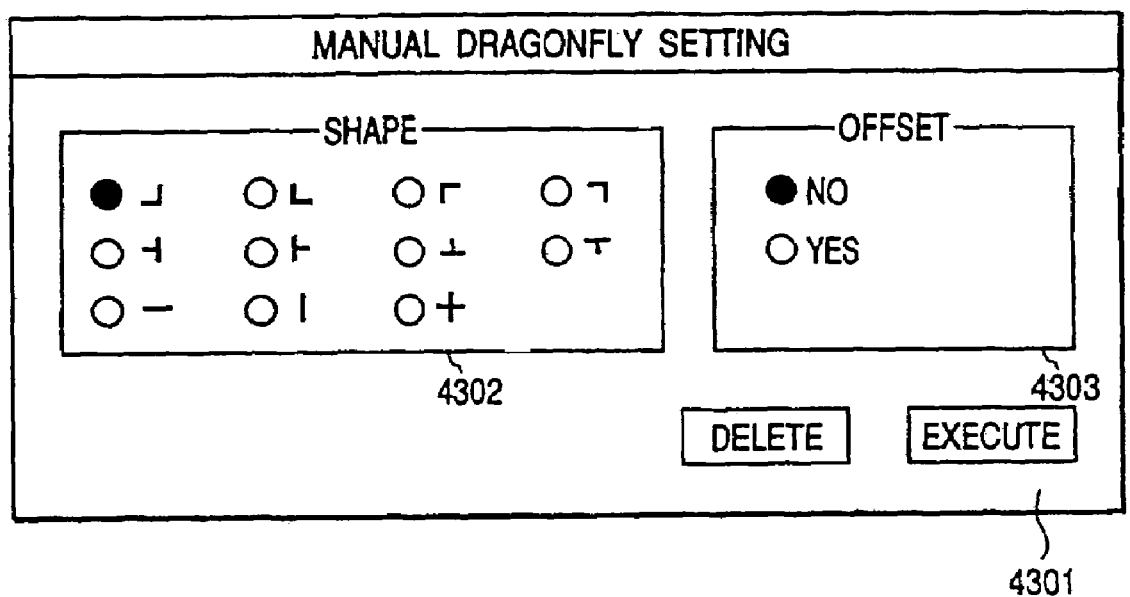
FIG. 43 is a diagram showing a manual dragonfly setting panel.

When the "manual dragonfly" menu selection is chosen, a manual dragonfly setting panel 4301 shown in FIG. 43 is displayed on the display device 41. The following conditions can be set using the manual dragonfly setting panel 4301.

(1) Dragonfly Shape
(2) Dragonfly offset

First, to designate the shape of a manual dragonfly one of the available manual dragonfly shapes is selected by activating one of the 11 selection buttons 4302 (step S4211).

Since the width of the dragonfly itself equals the line width, a check is performed to determine whether the dragonfly should be offset a distance equivalent to ½ of the line width in order to improve the positioning accuracy (step S4212).

When the dragonfly should be offset, of the two manual dragonfly offset selection buttons 4303 the "Yes" button is activated. In this case, one side of the external line of the dragonfly is used as a reference positioning line. When the dragonfly need not be offset, of the two manual dragonfly offset selection buttons 4303 the "No" button is activated. In this case, the line that runs through the center of the dragonfly is used as a reference positioning line.

When the individual conditions for preparing a manual dragonfly have been selected and the "execute" button is activated, the conditions are set. Then, the CPU 21 prepares for the manual dragonfly data that has the designated print attributes and that is formed by one or two line segments (step S4213).

The layout position of the dragonfly in the drawing area 62 is designated. The layout reference position of the dragonfly is determined in accordance with the shape of the dragonfly. For a dragonfly that is formed of two line segments, the intersection is defined as the layout reference position. For a dragonfly that is formed by one line segment, the midpoint is defined as the layout reference position (step S4214).

When at step S4211 the dragonfly formed by one line segment is selected and at step S4212 the "Yes" button is activated for the dragonfly offset, a message instructing the entering of the dragonfly offset direction is displayed in the guidance area 68, and in accordance with the instruction a user enters an arbitrary offset direction (step S4215). When at step S4211 a dragonfly formed of two line segments is selected and when at step S4212 the "No" button is activated for the dragon offset, no particular process is performed at step S4215.

Following this, the CPU 21 extracts the contour information from the data for the dragonfly, while taking the print attributes into account. The contour information is extracted in the same manner as at step S1302 in FIG. 13 (step S4202).

The CPU 21 employs the contour information obtained at step S4202 to calculate a circumscribed rectangle for the dragonfly. The calculations for the circumscribed rectangle are performed in the same manner as at step S1303 in FIG. 13 (step S4203). When the above processing has been completed, in the RAM 32 the CPU 21 registers, as printing data, the obtained dragonfly element data (step S4204).

The data for the circumscribed rectangle for the dragonfly element, which are obtained at step S4203, are stored as one part of the dragonfly element data (step S4205).

Finally, the CPU 21 displays the obtained dragonfly element in the drawing area 62 (step S4206).

Figure 44A:
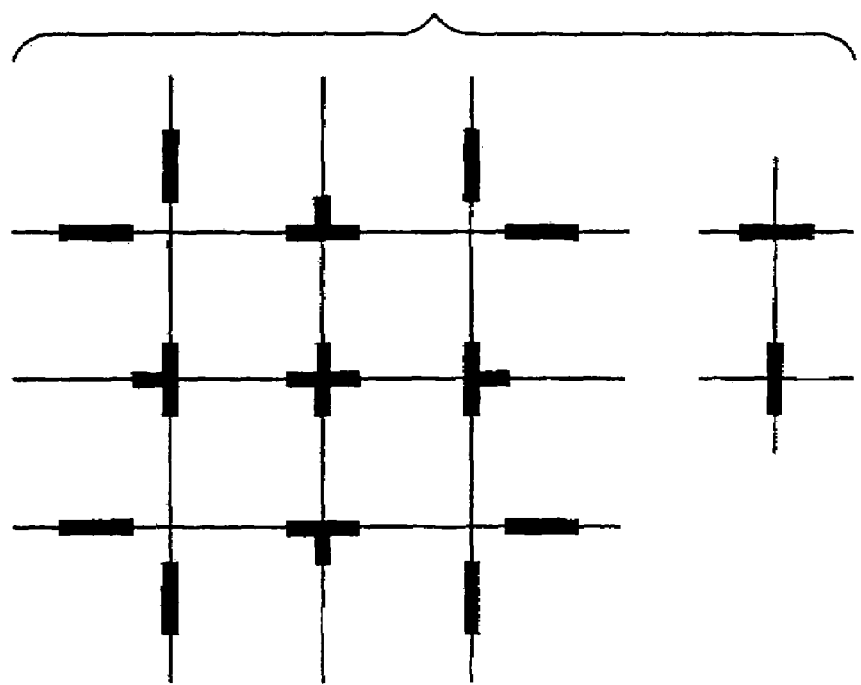
FIGS. 44A and 44B are diagrams showing manual dragonfly examples.
Figure 44B:
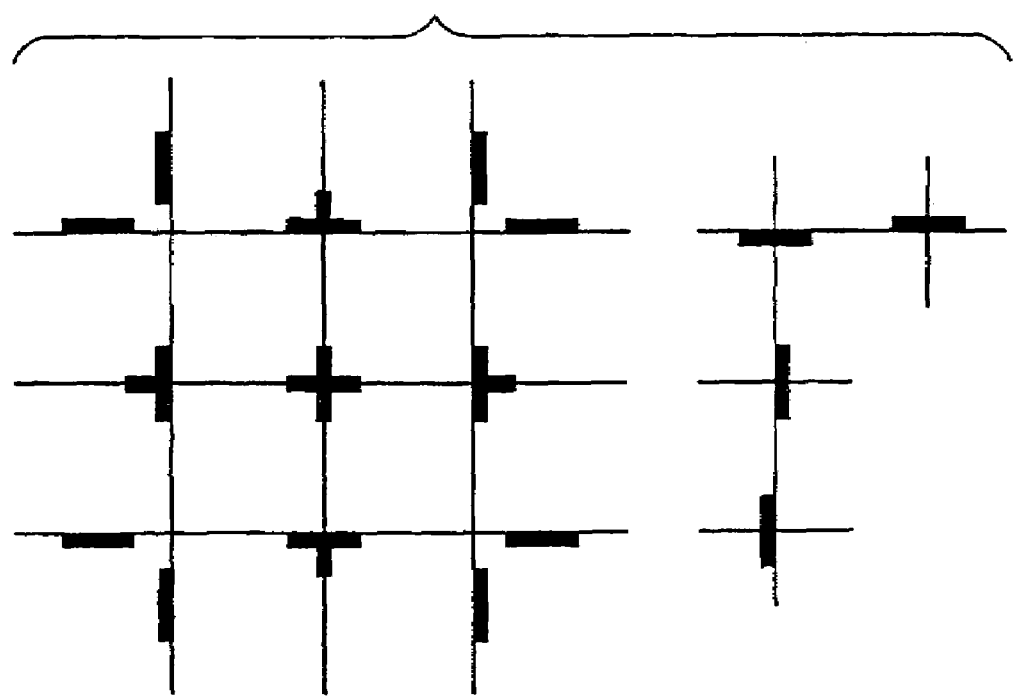

FIGS. 44A and 44B are diagrams showing examples of the manual dragonflies prepared using the above described method. In FIG. 44A is shown an example wherein the dragonflies are not offset, and in FIG. 44B is shown an example wherein the dragonflies are offset. The locations where the fine lines intersect are the layout positions for the individual dragonflies. In FIGS. 44A and 44b, the thickness of each of the dragonflies is exaggerated in order to make the dragonfly offset clearly visible.

Next, an explanation will be given for an example wherein the "automatic dragonfly" menu button is activated at step S4201.

When the "automatic dragonfly" menu button is activated, the CPU 21 calculates a circumscribed rectangle for all the object elements in the printing data, while taking the printing attributes into account (step S4221).

Since at step S2506 circumscribed rectangle data are stored as one part of the print data for a graphic pattern, and at step S3410 in FIG. 34 for characters, the CPU 21 need only read these data from the RAM 32.

The elements to be printed are determined in accordance with the element type, and the element color is determined in accordance with rules set in advance by a user.

The CPU 21 prepares data for an automatic dragonfly that is formed of two line segments and that has printing attributes that are designated in advance (step S4222). For the preparation of the automatic dragonfly data, four types of dragonflies that identify the four corners of the circumscribed rectangle for the object element, and normally, dragonflies for which the offset is required are prepared.

Then, the CPU 21 determines the layout position of the dragonfly in the drawing area 62 (step S4223). For an automatic dragonfly, the layout positions are determined in advance to be the four corners of the circumscribed rectangle of an element to be printed.

If necessary, the layout position for an automatic dragonfly can be offset from the circumscribed rectangle of the object element a distance designated by a user.

Since the process from steps S4202 to 4206 is the same as that for the manual dragonfly, no further explanation for it will be given.

Figure 45A:
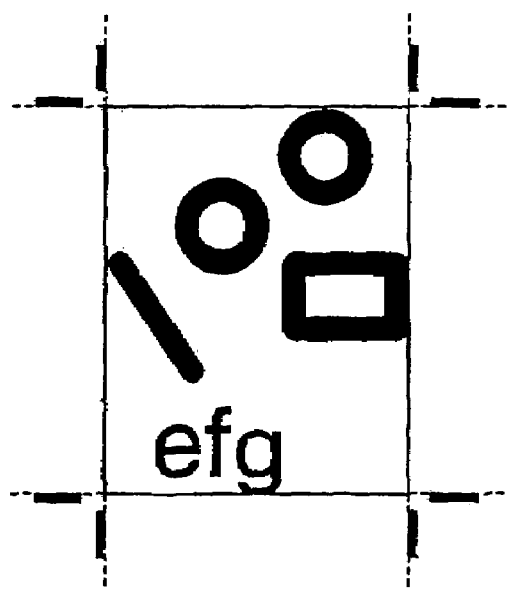
FIGS. 45A and 45B are diagrams showing automatic dragonfly examples.
Figure 45B:
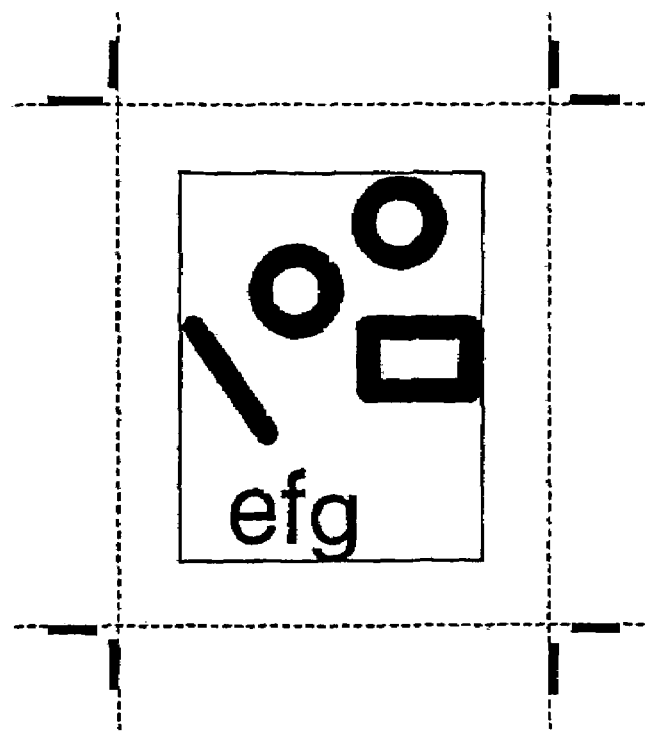

FIGS. 45A and 45B are diagrams showing example automatic dragonflies prepared using the above method. In FIG. 45A is shown an example wherein the layout positions of the automatic dragonfly match the circumscribed rectangle of an element to be printed. In FIG. 45B is shown an example where the layout positions of the automatic dragonfly are externally offset a constant distance from the circumscribed rectangle of an element to be printed. In FIGS. 45A and 45B, to facilitate the explanation, the circumscribed rectangle for the object element is constructed of fine solid lines and the auxiliary lines identifying the dragonflies are is represented by broken lines. None of these lines need necessarily be displayed.

An explanation will now be given for a case where the "scale dragonfly" menu button is activated at step S4201. The "scale dragonfly" is constituted by text for which scale is indicated in addition to the positioning marks.

Figure 47:
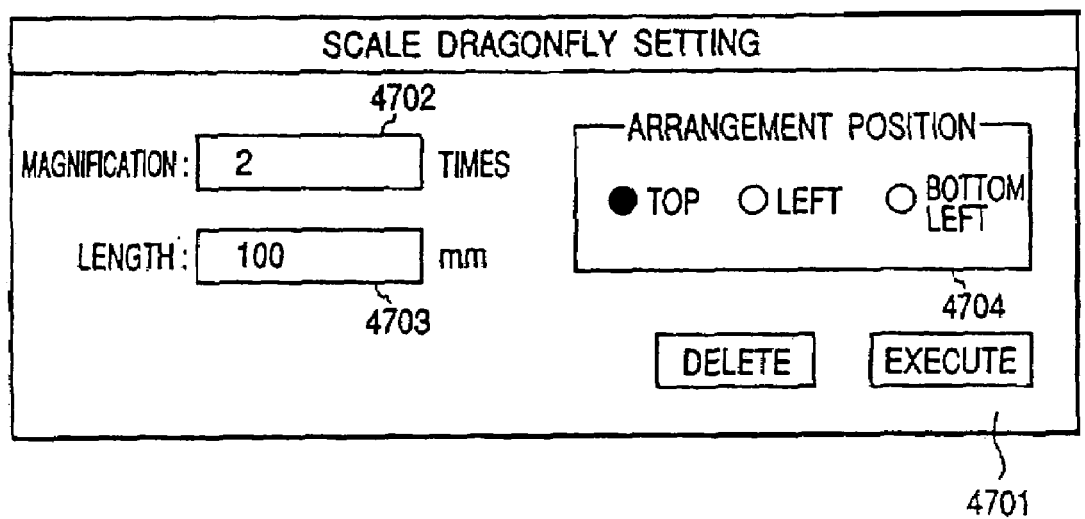
FIG. 47 is a diagram showing a dragonfly scale setting panel.

When the "scale dragonfly" menu button is activated, a scale dragonfly setting panel 4701 shown in FIG. 47 is displayed on the display device 41. The following conditions can be set using the scale dragonfly setting panel 4701:

(1) Output magnification;
(2) Dragonfly length; and
(3) Arrangement position.

First, the output magnification is entered in a magnification input area 4702 in order to employ a laser printer 51, or an imagesetter 52, to output prepared print data that have been reduced or enlarged (step S4231). The output magnification value is produced as one part of the scale dragonfly data.

The dragonfly scale length is entered in a length input area 4703 to establish the approximate size of an element to be printed (step S4232). The value of the dragonfly length is also produced as one part of the scale dragonfly data.

One of three arrangement position buttons 4704, up, left and left lower buttons, is activated to designate the arrangement position for the scale dragonfly in the element to be printed (step S4233).

When the individual conditions for preparing the scale dragonfly have been designated and the "execute" button is activated, these conditions are set. And the CPU 21 prepares for the scale dragonfly data that have the predetermined printing attributes and that are constituted by a line segment, a circle and text (step S4234).

The size and the line width of the circle, and the line width of the line segment and the character size of the text, all elements constituting the scale dragonfly, are determined by the output magnification set at step S4231. When the output magnification is set at 2×, the size and the line width of the circle, the line width of the line segment, and the character size of the text are ½ those set when the output magnification is 1×.

The CPU 21 determines the layout position for the dragonfly in the drawing area 62 (step S4235). For the scale dragonfly, the layout position is obtained when the object element is offset a designated offset distance, toward the arrangement position that is selected at step S4233, by using as the reference the circumscribed rectangle of the object element. The offset distance is designated in advance, and the value stored in the external storage device 33 is loaded.

Since the process from step S4202 to S4206 is the same as that for the manual dragonfly, no further explanation for it will be given here.

FIG. 48 is a diagram showing an example scale dragonfly that is obtained using the above method. Generally, one scale dragonfly is required for one set of print data. In FIG. 48, however, to facilitate the explanation, three scale dragonflies having a length of 50 mm are prepared: one at the up arrangement position with an output magnification of 1×, one at the left arrangement position with an output magnification of 1×, and one at the left lower arrangement position with an output magnification of 2×. While in FIG. 48, for the explanation the circumscribed rectangle for the object element is described using broken lines, the rectangle need not be displayed.

In order to clearly produce a circumscribed rectangle stored at step S4205, of the buttons 65 on the main panel 61, the command "rectangle" button for drawing a rectangle is activated, or the keyboard 11 is used to enter the name of the command "rectangle" in the character input area 64. And from the command menu 67 the "circumscribed rectangle" menu button is activated, and the element for which the circumscribed rectangle is to be produced is selected.

In the above embodiment, the manual dragonfly, the automatic dragonfly and the scale dragonfly are included entries on the command menu 67 that is displayed by selecting the "dragon" command. Further, a "graphic dragonfly" and a "dragonfly attribute" may be displayed as included entries on the command menu 67.

The graphic dragonfly is a dragonfly based on a circumscribed rectangle that is calculated, while taking the printing attributes into account, for one or more specific elements that are designated by a user using the element selection method, the sequential element selection method, the rectangular area designation method or the arbitrary designation method. The graphic dragonfly is prepared substantially in the same manner as is the automatic dragonfly. The only difference being that while at step S4221 the circumscribed rectangle is calculated for all the elements of a automatic dragonfly that is to be printed, a circumscribed rectangle is calculated only for a specific element of a graphic dragonfly.

Figure 46A:
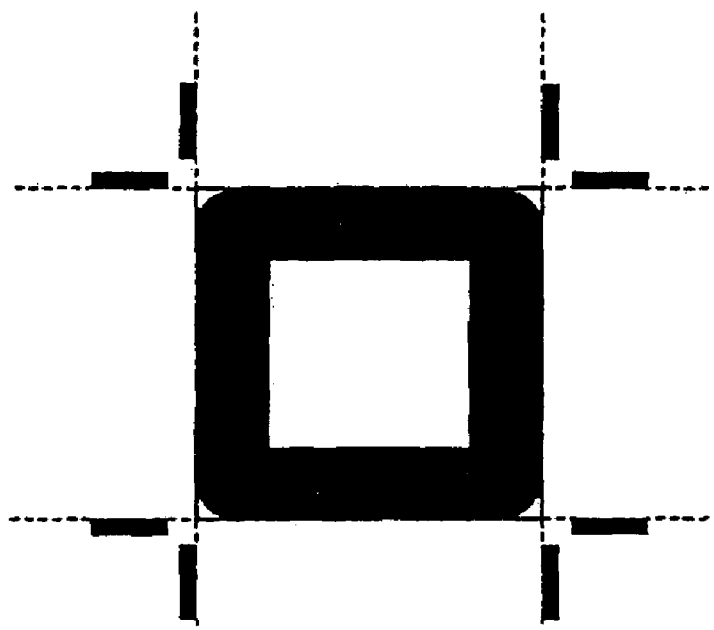
FIGS. 46A and 46B are diagrams showing graphic dragonfly examples.
Figure 46B:
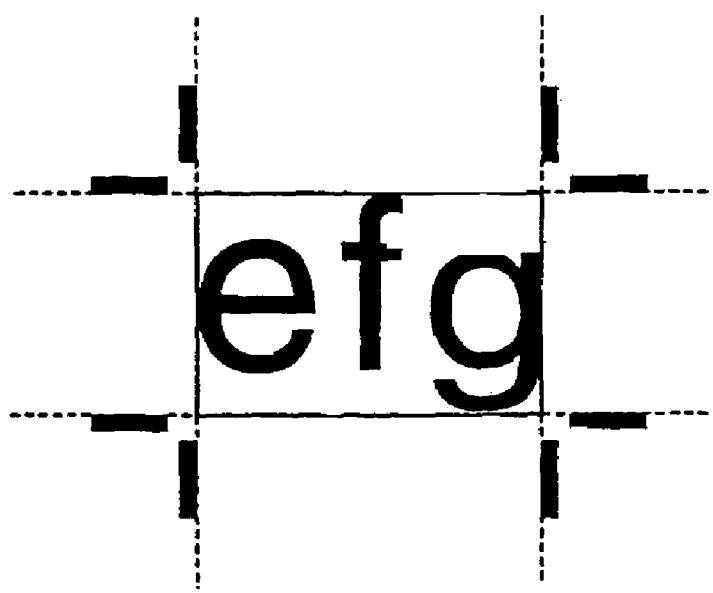

FIGS. 46A and 46B are diagrams showing example graphic dragonflies. For convenience sake, the circumscribed rectangle for a selected element is described using fine lines, and auxiliary lines that are used to indicate the positions of the dragonflies are displayed as broken lines. These lines need not necessarily be displayed.

When the "dragonfly attribute" menu is selected, a detailed step for a dragonfly, such as the adjustment of the length, can be performed.

A detailed explanation has been given for the layout processing for using dragonflies as print data.

<Preparation of a Bar Code>

The information processing apparatus according to this embodiment can prepare a "bar code" as a print data element.

A "bar code" is code that uses line widths and the intervals between line segments to identify a product. Very high accuracy is required to precisely conform to established standards. When a bar code can be directly produced as one part of the print data in block copy for packing material or labels, both the preparation costs and time can be reduced.

Of the buttons 65 on the main panel 61 the "bar code" command button is activated, or the keyboard 11 is used to enter the name of the "bar code" command in the character input area 64. A bar code setting panel 5001 shown in FIG. 50 is then displayed on the display device 41. The following conditions can be set using the bar code setting panel 5001:

(1) bar code classification
(2) code
(3) size
(4) code notation
(5) layout reference position As a result, the bar code can be laid out as print data.

Figure 49:
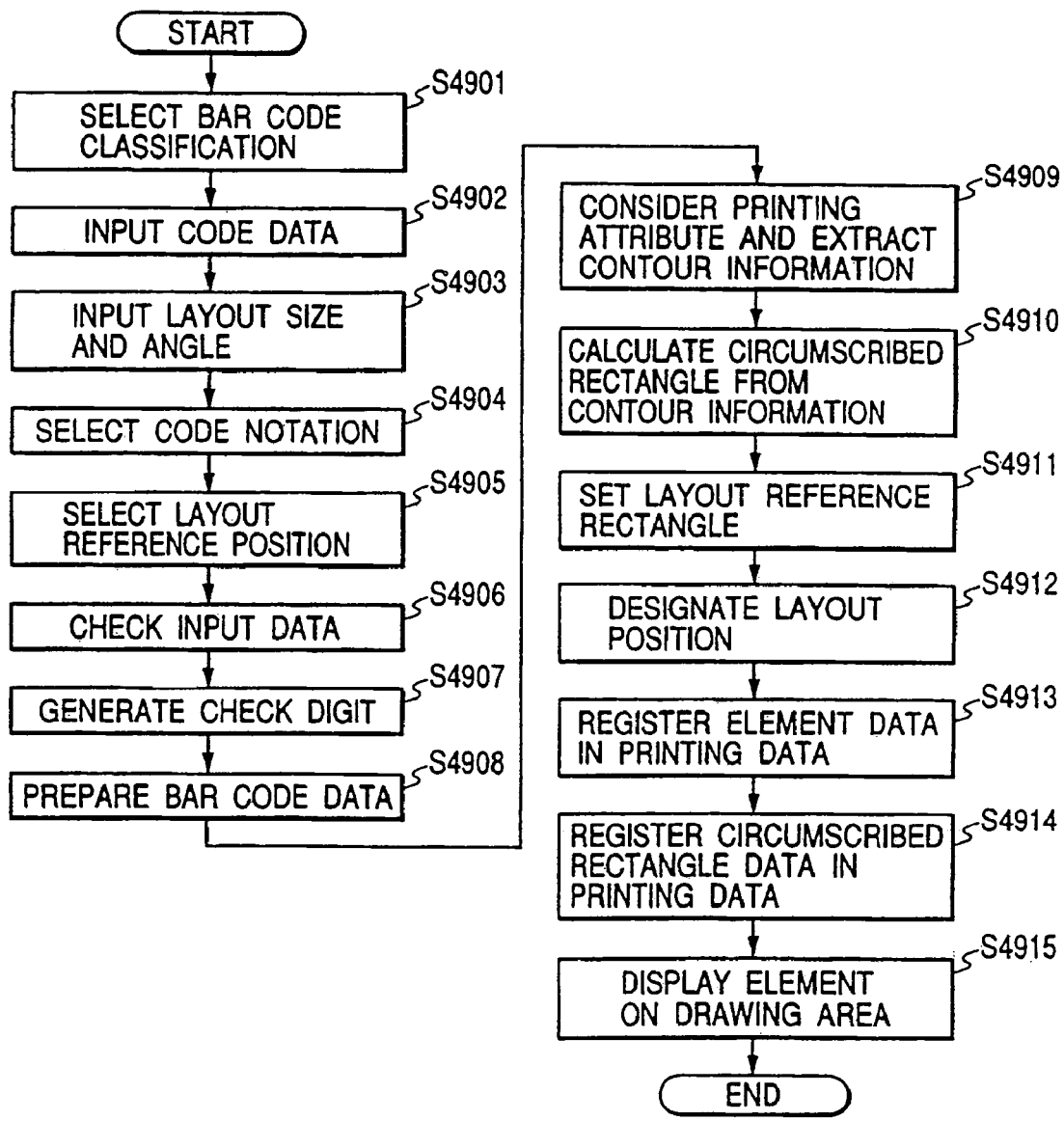
FIG. 49 is a flowchart for explaining the processing performed to lay out bar code as printing data.

FIG. 49 is a flowchart for explaining the layout processing of the bar code as print data.

First, one of the bar code classification selection buttons 5002 is activated for a bar code to be prepared (step S4901).

The bar code classifications are as follows.

JAN (Japan Article Number): A distribution standardization symbol in Japan that is provided so as to be compatible with EAN or UPC, which will be described later. The JAN is used for the identification of products, and there are an 8 digit standard version and an 8 digit reduced version. Each version consists of a two-digit flag ("49" for Japan), a maker code, a product code and a check digit. The check digit is an arithmetic code check method to improve the precision of the bar code. Modulus 10 or Modulus 43 is a well known calculation method for the check digit.

ITF (Interleaved Two of Five): A distribution symbol in Japan that is used for the identification of package contents. A one digit (standard version) or a two digit (extension version) distribution identification code is added to the JAN code number.

Therefore, the standard version consists of 14 digits, and after a 0 is added at its head, the extension version consists of 16 digits.

CODE39: A symbol that is the currently most popular one in the industrial business. The reading error rate is low, and not only numerals but alphabetical characters are employed as code.

UPC (Universal Product Code): A standard symbol that is used in the United States for packaging retail food.

EAN (European Article Numbering System): A standard symbol that is used in Europe for packaging retail food. The EAN is also the international standardization symbol.

In this embodiment, one of the JAN/EAN standards, the CODE 39, the UPC standard, and the ITF standard is selected.

The code data for the selected bar code classification are entered. The numerical or character code data are entered in a code input area 5004 using the keyboard 11 (step S4902). Since the CPU 21 automatically calculates the check digit and adds it to the code data, a user need not enter the check digit.

The layout size and the layout angle of the bar code to be produced are designated by using the magnification, the height, or the angle (step S4903). The default values based on, for example, the JIS standards are displayed in advance in the text boxes in the size input area 5003 in accordance with the bar code classification that is selected at step S4901. A user employs the keyboard 11 to enter numerical values in the text boxes in the user input area 5003. When the layout size of the bar code is designated as the magnification, the height value is changed in consonance with a value obtained by multiplying the default value by the designated magnification value.

Either one of the code notation selection buttons 5005 can be selected to determine whether the code character should be displayed using the bar code graphic pattern (a so-called bar portion) (step S4904).

Then, of the layout reference selection buttons 5006, which represent the feature points of the layout reference rectangle for the bar code, one button is activated (step S4905).

When the individual conditions to prepare the bar code have been set in the above manner and the "execute" button is activated, these conditions are set.

The CPU 21 determines whether the code data and the layout size that are entered conform to the standards of the selected bar code classification (step S4906).

The examination of the code data includes determining whether the number of digits in the code data is correct, and whether available characters are used for each digit of the code data. The examination of the layout size includes determining whether the layout size falls within the magnification range that is specified in the standards such as JIS.

When the code data or the layout size does not conform to the standards, the reason it does not conform is displayed on a warning panel, so that the user can again designate the bar code conditions using the bar code setting panel 5001.

When the code data and the layout size conform to the standards, the CPU 21 calculates the check digit, as required in accordance with the bar code classification, and adds it to the code data (step S4907).

The CPU 21 prepares a bar code graphic pattern that is constituted by a group of line segments having different line widths. When "display" is selected in the code notation section of the bar code setting panel 5001, a code character having designated printing attributes is produced (step S4908).

The CPU 21 extracts the contour information from the bar code data that are prepared, while taking the printing attributes into account (step S4909). The same method as is used at step S1302 in FIG. 13 is employed for the extraction of contour information.

The CPU 21 employs the contour information obtained at step S4909 to calculate a circumscribed rectangle for the bar code (step S4910). The same calculation method as is used at step S1303 is employed.

A layout reference rectangle is designated as the layout reference information for the bar code (step S4911).

In the explanation for the symbol data, (1) arbitrary rectangle; and (2) circumscribed rectangle have been employed for setting the layout reference rectangle. For the bar code, the (2) circumscribed rectangle is defined as the layout reference rectangle.

Figure 51:
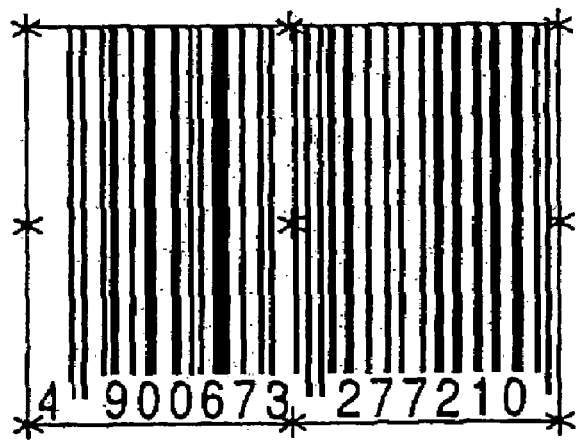
FIG. 51 is a diagram showing a layout reference rectangle and a layout reference position for bar code.

FIG. 51 is a diagram showing the layout reference rectangle for the bar code and no layout reference positions. The bar code in FIG. 51 is prepared, while the JAN/EAN standard is designated as the bar code classification, the number "490067327721" is defined as the code, and "Yes" is specified for the code notation. As the check digit, 0 is designated. In FIG. 51, the rectangle constructed of the solid lines is the layout reference rectangle for the bar code, and each of the points identified by an * is a layout reference point.

The layout position for the bar code in the drawing area 62 is designated (step S4912).

In the explanation for the symbol data, (1) point layout, and (2) rectangular layout have been employed as the methods used for designating the layout position. For the bar code, either method can be employed to designate the layout-position.

When the above described processing has been completed, in the RAM 32 the CPU 21 registers, as printing data, the data for the obtained bar code element (step S4913).

In addition, the data for the circumscribed rectangle of the bar code, which are obtained at step S4910, are stored as a part of the bar code data (step S4914).

The CPU 21 displays the obtained bar code element in the drawing area 62 (step S4915).

In order to clearly prepare a circumscribed rectangle stored at step S4914, of the buttons 65 on the main panel 61, the "rectangle" command button for drawing a rectangle is activated, or the keyboard 11 is used to enter the name of the rectangle command. Then, from the command menu 67 the "circumscribed rectangle" menu button is activated, and an element for which the circumscribed rectangle is to be prepared is selected.

The processing performed to lay out the bar code as printing data has been explained in detail.

[Printing of Printing Data]

An explanation will now be given for the processing for outputting the prepared printing data using a printer such as a laser printer 51 or an imagesetter 52.

When the printing data are employed, for example, as block copy, a laser printer 51 is used to produce a proof sheet for printing data (output print data for confirmation) and to output the contents of a print log file. An imagesetter 52 is used to print a fair copy of printing data (to output an accurate copy as a formal block copy).

The information processing apparatus in this embodiment has the so-called WYSIWYG function, i.e., a function whereby graphic data and character data images displayed on the display device 41 look the same as they do when they are printed.

However, the display device 41 has a resolution of only 100 DPI. And therefore, even when an apparatus has the WYSIWYG function, in order to confirm a layout in detail or to check on mistakes, a laser printer 51, which has a resolution of 500 DPI, much higher than the display device 41, must be employed to output the printing data.

Of course, such a confirmation can be performed directly by printing the data using an imagesetter 52. However, since an imagesetter 52 has an extremely high resolution of approximately 3000 DPI, special paper must be used. In addition, the imagesetter 52 printing costs are high and the printing speed is low. Therefore, even when the printing data are finally to be printed using an imagesetter 52, generally, a laser printer 51 is used to print the data in order to confirm the output form.

Figure 52:
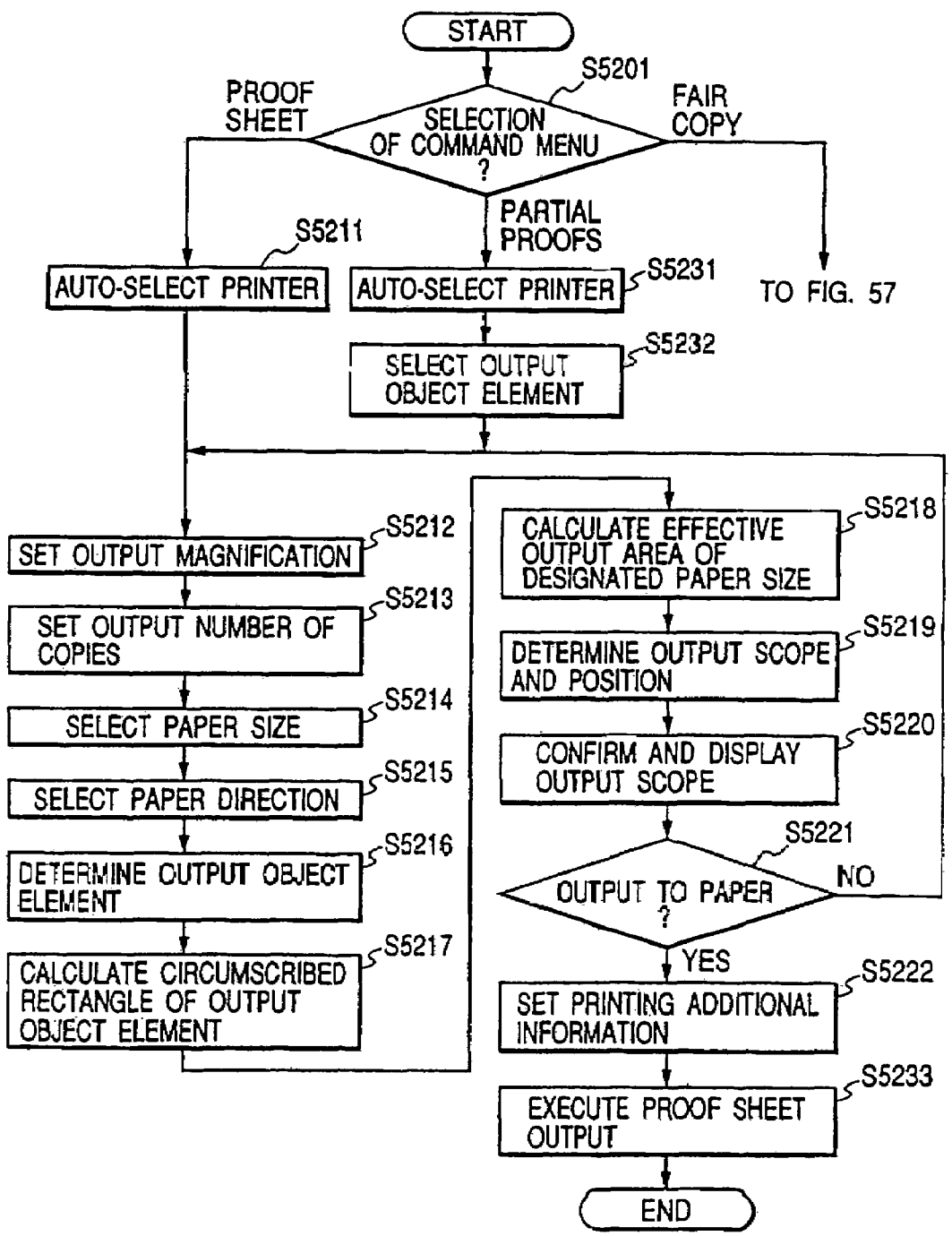
FIG. 52 is a flowchart for explaining the processing performed to output printing data.

FIG. 52 is a flowchart for explaining the processing for outputting the printing data using a printer, such as a laser printer 51 or an imagesetter 52.

Initially, a print command is selected (step S5201).

Specifically, the following processing is performed.

First, of the buttons 65 on the main panel 61 the "print" command button is activated, or the keyboard 11 is used to enter the command "print" in the character input area 64.

Then, the command menu 67 is displayed on the display device 41. The command menu 67 includes the selections:

(1) proof sheet;

(2) partial proof sheet; and (3) fair copy.

A user chooses one of the menu items, and the data printing process is initiated.

An explanation will now be given for an example wherein the "proof sheet" button is activated at step S5201.

When the "proof sheet" button is activated, as the printer to be used, the CPU 21 selects the laser printer 51 (step S5211).

Sequentially, a proof sheet output condition setting panel 5301 shown in FIG. 53 is displayed on the display device 41. The following conditions can be specified using the proof sheet output condition setting panel 5301:

(1) magnification
(2) number of copies
(3) paper size
(4) paper direction

First, the keyboard 11 is used to enter a value for the actual magnification rate in a magnification input area 5302 (step S5212).

Then, the keyboard 11 is used to enter in a copy count input area 5303 the number of copies of the printing data to be produced during one printing process (step S5213).

Following this, for the paper to be used for printing, one of the paper size selection buttons 5304 is chosen (step S5214). The selection of the paper sizes is based on the sizes specified for the laser printer 51.

Finally, one of the paper direction selection buttons 5305 is chosen to determine whether the direction in which data are to be printed is to be "vertical" (longer in the Y direction), "horizontal" (longer in the X direction) or "auto" (minimum number of pages) (step S5215).

When the conditions for outputting the proof sheet have been set and the "execute" button is activated, the conditions are set.

Subsequently, in accordance with the following conditions, an element that is actually to be output is selected from among the available printing data (step S5216).

(1) Layer:

A layer is a virtual printing data layer, to which the elements belong, and based on the element colors, can be identified on the display. The layers include a layer that is always to be output, a layer that is not always to be output, and a layer that a user can select as an output object.

(2) Display Attribute:

This represents a condition wherein an element or a layer that is designated non-display will not be output. A user can set this condition for each element and for each layer.

(3) Element Type:

The element type includes an element (a dragonfly, etc.) that is always an output object, an element (a point, etc.) that is not always an output object, and an element (other type) that a user can select as an output object.

While the elements are enlarged at the magnification rate specified at step S5212, the CPU 21 calculates a circumscribed rectangle for all the elements that are actually to be output (step S5217).

At this time, if the circumscribed rectangle for the overall elements has already been obtained by the CPU 21 and is stored in the RAM 32 as a part of the element data in the RAM 32, the CPU 21 need only multiply the stored circumscribed rectangle data by the magnification rate.

Further, the CPU 21 obtains an effective output area for the paper by subtracting, from the paper size set at step S5214, the margins in all directions wherein no printing data are output (step S5218).

The information for the paper size and the information for the paper margins are stored in advance in the external storage device 33, and for use are loaded into the RAM 32.

The CPU 21 employs the circumscribed rectangle obtained at step S5217 and the information for the effective output area obtained at step S5218 to determine the output scope and the position of the printing data on the paper (step S5219).

When one sheet is sufficient for the output of the printing data, the CPU 21 determines the output position so that the data are printed in the center of the paper. The printing data can be output at the bottom left, the top left, the bottom right, or the top right of the paper.

When one sheet is not sufficient for the output of the printing data, the CPU 21 divides the printing data and outputs them to a plurality of sheets of paper. In such a case, one part of the printing data can be overlapped and output to two separate sheets, so that all the printing data at the border can be printed.

When, at step S5215, "auto" is selected as the paper direction, either the horizontal or the vertical direction is selected by the CPU 21 to minimize the number of print pages required, and the output scope and the position are determined.

The CPU 21 displays the output scope in the drawing area 62, so that a user can confirm the output scope before data is actually output for printing on paper (step S5220).

Figure 54:
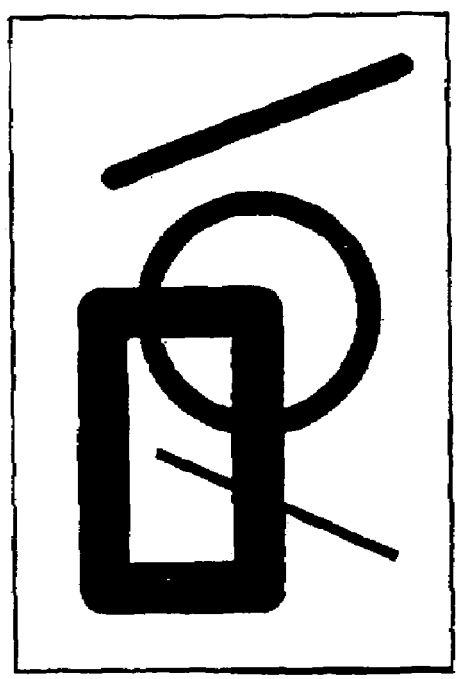
FIG. 54 is a diagram showing an example wherein output scope is displayed for confirmation (when data can be output on a single sheet of paper)

FIG. 54 is a diagram showing an example wherein the output scope is displayed for confirmation. The rectangle described by solid lines represents the output scope. In this example, the printing data can be output on a single sheet of paper, and the vertical direction is designated as the paper direction.

Figure 55:
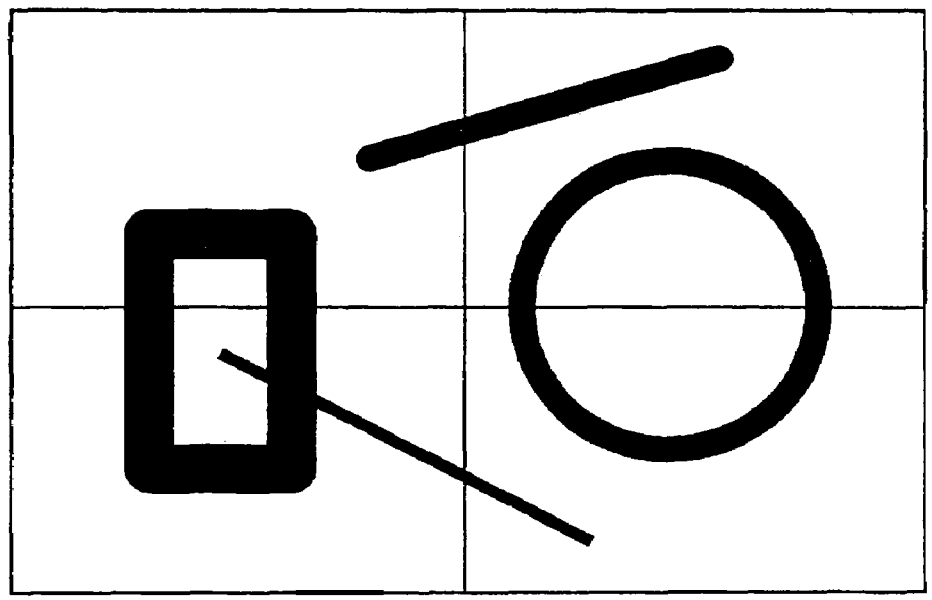
FIG. 55 is a diagram showing an example wherein output scope is displayed for confirmation (when data can not be output on a single sheet of paper)

FIG. 55 is a diagram showing another example where the output scope is displayed for confirmation. In this example, unlike in FIG. 54, the printing data can not be output on a single sheet of paper, four separate sheets of paper must be used for the output, and the horizontal direction is selected as the paper direction.

Figure 56:
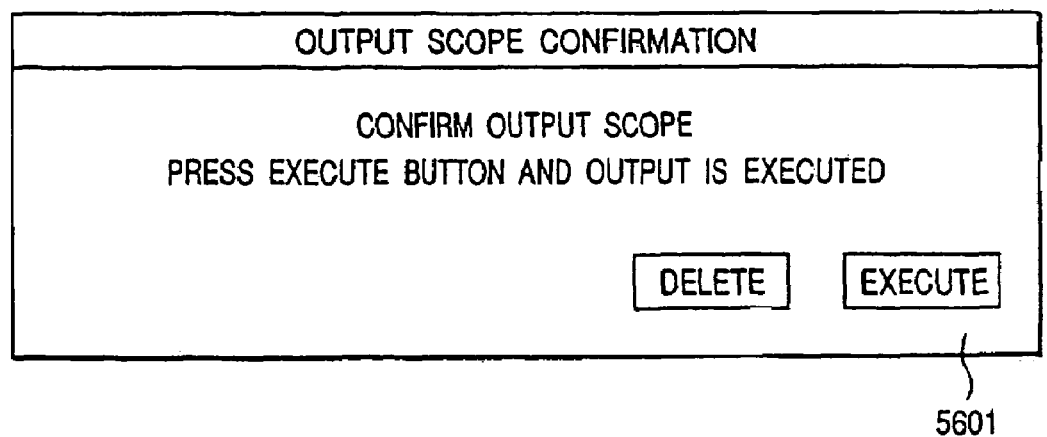
FIG. 56 is a diagram showing an output scope confirmation panel.

In this case, an output scope confirmation panel 5601 shown in FIG. 56 is displayed. A user examines the output scope displayed at step S5220 to determine whether he or she should actually output the printing data on paper. When the output scope is adequate, the "execute" button is activated on the output scope confirmation panel 5601. When the output scope is not adequate, the "delete" button is activated on the output scope confirmation panel 5601 (step S5221).

When the "execute" button is activated, the name of the printing data, the output date and time, and the number of pages to be output are added to the printing data (step S5222).

For the additional information, the printing data name is set in advance by the user and is loaded from the RAM 32. The output date and the time and the number of output pages are set by the CPU 21 during the printing process.

The information concerning the position of the paper and the printing attributes of the characters is stored in advance in the external storage device 33 and is loaded into the RAM 32.

The additional printing information and the printing data are output to the paper by the laser printer 51, so that a so-called proof sheet output is performed (step S5223).

When the "delete" button is activated at step S5221, the printing data are not output and the proof sheet output condition setting panel 5301 is again displayed. Program control returns to step S5212, and the user again sets the output conditions, such as the magnification rate.

An explanation will now be given for an example wherein the "partial proof sheet" menu button is chosen at step S5201.

When the "partial proof sheet" button is chosen, selected, as the printer the CPU 21 selects the laser printer 51 (step S5231).

When the partial proof sheet output is chosen, an instruction for selecting an object element is displayed in the guidance area 68, and the user selects the element in accordance with the instruction (step S5232). To select the element, of the sequential element selection, the rectangular area designation and the arbitrary area designation processes one must be selected and can be employed as well as grouping of the elements.

When an element has been selected, the proof sheet output condition setting panel 5301 in FIG. 53 is displayed on the display device 41.

Since the process from step S5212 to S5223 is performed in the same manner as is for the proof sheet output, no further explanation for it will be given.

An explanation will now be given for an example where the "fair copy" menu button is chosen at step S5201.

Figure 57:
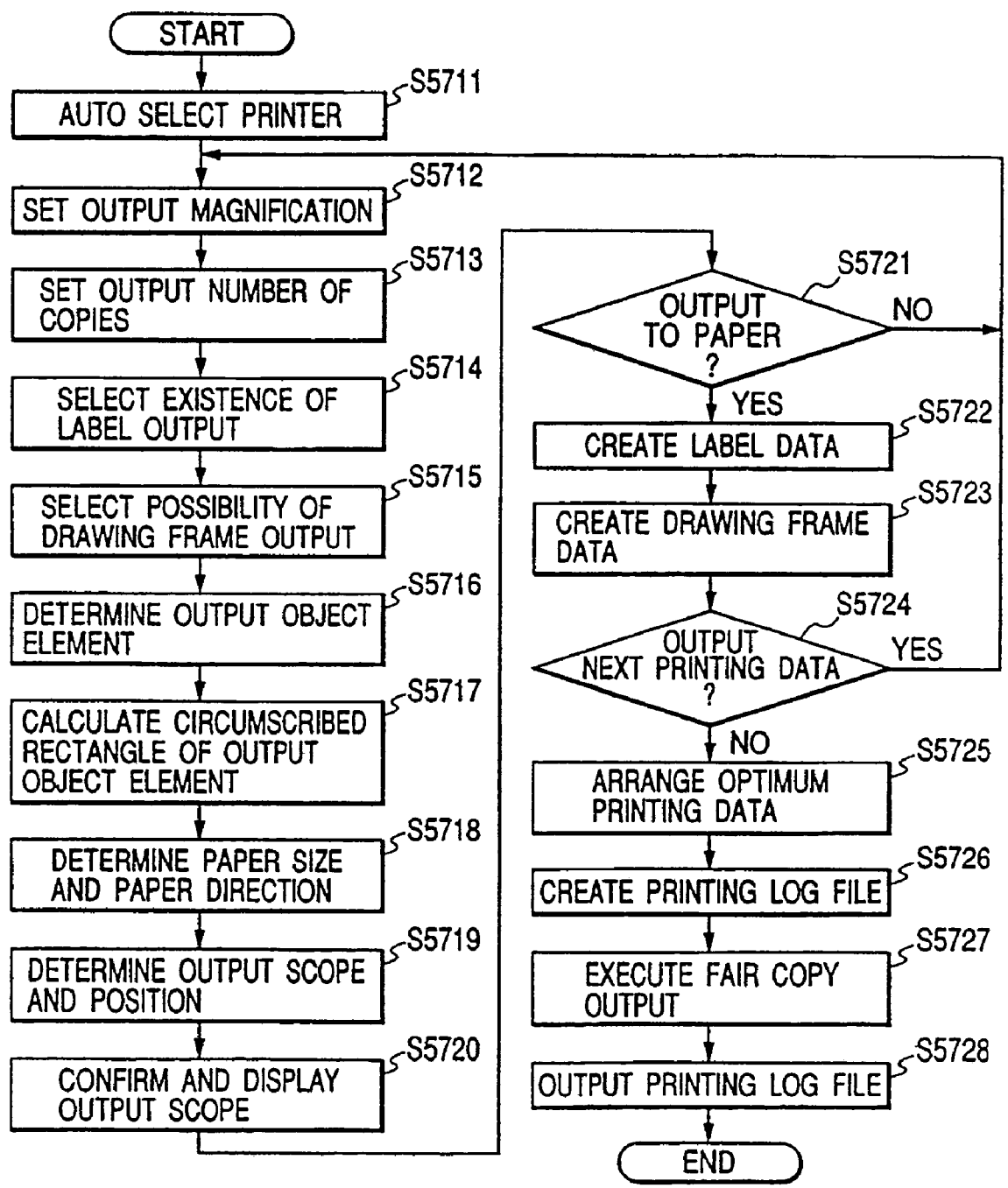
FIG. 57 is a flowchart for explaining the processing performed to output a fair copy of printing data.

FIG. 57 is a flowchart for explaining the processing for outputting a fair copy of the printing data.

First, when the "fair copy" button is selected, the CPU 21 selects as the printer an imagesetter 52 (step S5711).

A fair copy output condition setting panel 5801 shown in FIG. 58 is displayed on the display device 41. The following conditions can be specified using the fair copy output condition setting panel 5801:

(1) magnification;
(2) number of copies;
(3) label; and
(4) drawing frame.

Using the keyboard 11, a value for the magnification rate for the output is entered in a magnification input area 5802 (step S5712).

The keyboard 11 is used to enter the number of copies of the printing data to be produced in one printing process in a copy count input area 5803 (step S5713).

One of the label output selection buttons 5804 is chosen to determine whether a regular size label to attach to the printing data should be output with the printing data (step S5714). Information, such as the name of a block of copy, a part number, a part name, the name of a person and the date of creation, the name of a person and the date of approval, measurements, and a correction history, is output as the label.

Following this, one of the drawing frame output selection buttons 5805 is activated to determine whether a drawing frame should be output with the printing data (step S5715). A drawing frame is a rectangle that describes, as a drawing, the scope of the printing data that are to be output. Generally, this frame is a rectangle that is offset towards the center, from the edge of the paper, at a constant distance.

When the fair copy output conditions are designated and the "execute" button is activated, these conditions are set.

Next, an object element is determined (step S5716), and a circumscribed rectangle for the object element is calculated (step S5717). These procedures are the same as those performed at steps S5216 and S5217 for the proof sheet output.

The CPU 21 employs the information for the circumscribed rectangle obtained at step S5717 to determine the paper size (the minimum An size on which all the printing data can be output) and the paper direction (step S5718).

The fair copy output is performed more efficiently with a small number of pages because of the cost and the speed. Thus, if possible, a plurality of sets of printing data should be output to a single printing sheet. The printing sheet is a sheet of paper used by an imagesetter 52, and does not mean the paper size. The paper size is the size of the area that is required for the output of a single set of printing data.

Then, the CPU 21 determines the output position so that the printing data are output in the center of the paper (step S5719). The printing data can be output at the bottom left, the top left, the bottom right or the top right of the paper.

The CPU 21 displays the output scope in the drawing area 62, so that the user can confirm the output scope before the printing data are output and recorded on paper (step S5720).

In this process, the output scope confirmation panel 5601 in FIG. 56 is displayed. The user examines the output scope displayed at step S5720 and determines whether the printing data should be output to paper. When the output scope is adequate, the "execute" button on the output scope confirmation panel is activated 5601. When the output scope is not adequate, the "delete" button on the output scope confirmation panel 5601 is chosen (step S5721).

When the "execute" button is activated, program control goes to step S5722. When the "delete" button is chosen, the printing data are not output and the fair copy output condition setting panel 5801 is displayed again. Program control then returns to step S5712 whereat the user can again set the output conditions, such as the magnification.

When, at step S5714, "Yes" is selected in the "label" section, the CPU 21 prepares the label (step S5722).

FIG. 59 is a diagram showing an example fair copy label. This is a label attached to a photoengraving block copy, and the label items include a block copy number, a parts number, informality, the name of a person who granted approval, the name of an inspector, a product symbol, a date, a measure, and a correction history.

The information concerning the fixed portions, such as the frame of a label and the character of a title, are stored in advance in the external storage device 33 and are loaded into the RAM 32. When the printing data are to be stored in a file, the contents of the individual label items are entered in a file storage panel 6001 shown in FIG. 60, and are stored in the external storage device 33. For use, these stored data are loaded into the RAM 32.

The information concerning the name of a creator and the name of a person who granted approval are entered by the user. However, the CPU 21 may recognize the name of a current user and specify this information. Further, the CPU 21 may designate the current date as the date information.

A label having a designated size is output to a selected position, such as the bottom right of a sheet of paper. In addition to this position, the top left, the bottom left or the top right may also be selected, or an arbitrary position may be designated.

A plurality of forms of labels may be stored in the external storage device 33 in accordance with the specific application. When at step S5714 "Yes" is chosen as the label output, one of the stored forms may be selected.

When "Yes" is chosen in the drawing frame item 5805, the CPU 21 prepares drawing frame data (step S5723).

Figure 61:
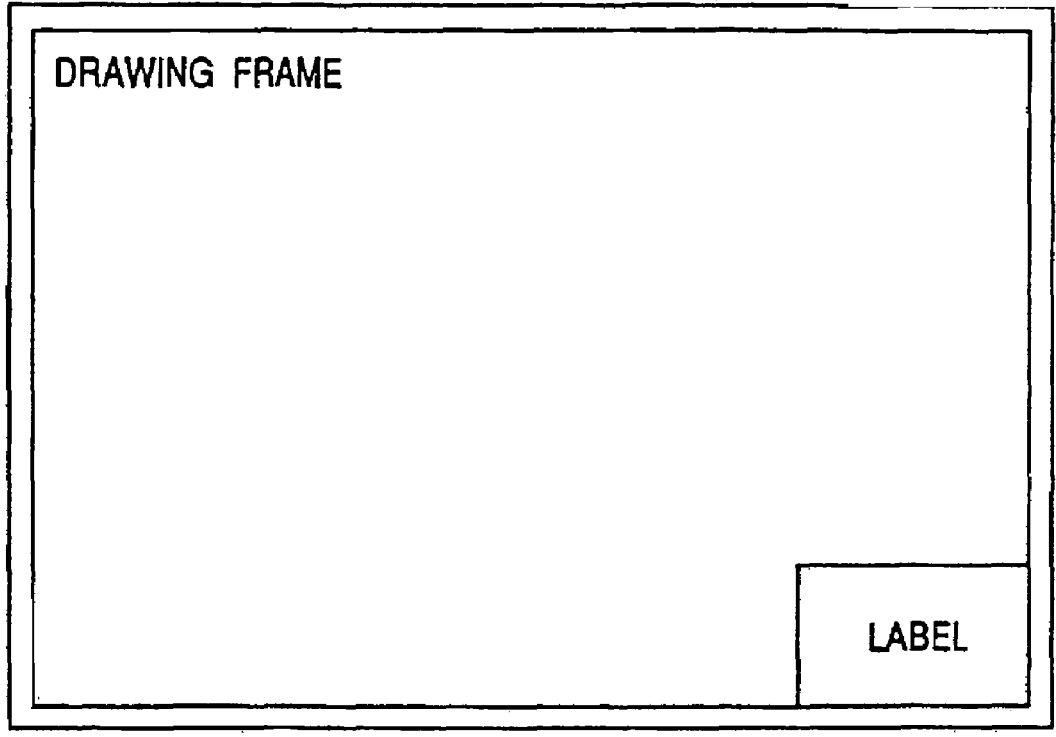
FIG. 61 is a diagram showing the relationship between a drawing frame and paper size.

FIG. 61 is a diagram showing the relationship between the drawing frame and the paper size. In FIG. 61, the label is set at the bottom right in the drawing frame.

The information concerning the line width, the output position and the size of the drawing frame is stored, in advance, for each paper size in the external storage device 33. For use, this information is loaded into the RAM 32. The CPU 21 determines the output position and the size of the drawing frame in accordance with the paper size that is determined at step S5718.

Through the above processing, data used for outputting the fair copy of the printing data are prepared. To actually output a fair copy, a plurality of sets of printing data can be designated. Therefore, in order to sequentially output the fair copies of the printing data sets, the processing from step S5712, for setting the output conditions, to step S5723, for preparing the drawing frame data, is repeated (step S5724).

When a plurality of printing data sets have been designated, the CPU 21 determines the arrangement of these printing data sets on the printing sheet (step S5725). According to the optimal arrangement for the output of the data by the imagesetter 52, the individual printing data sets are so arranged that the number of printing sheets is minimized. The optimal arrangement process for the printing data will be described in detail later.

Figure 64:
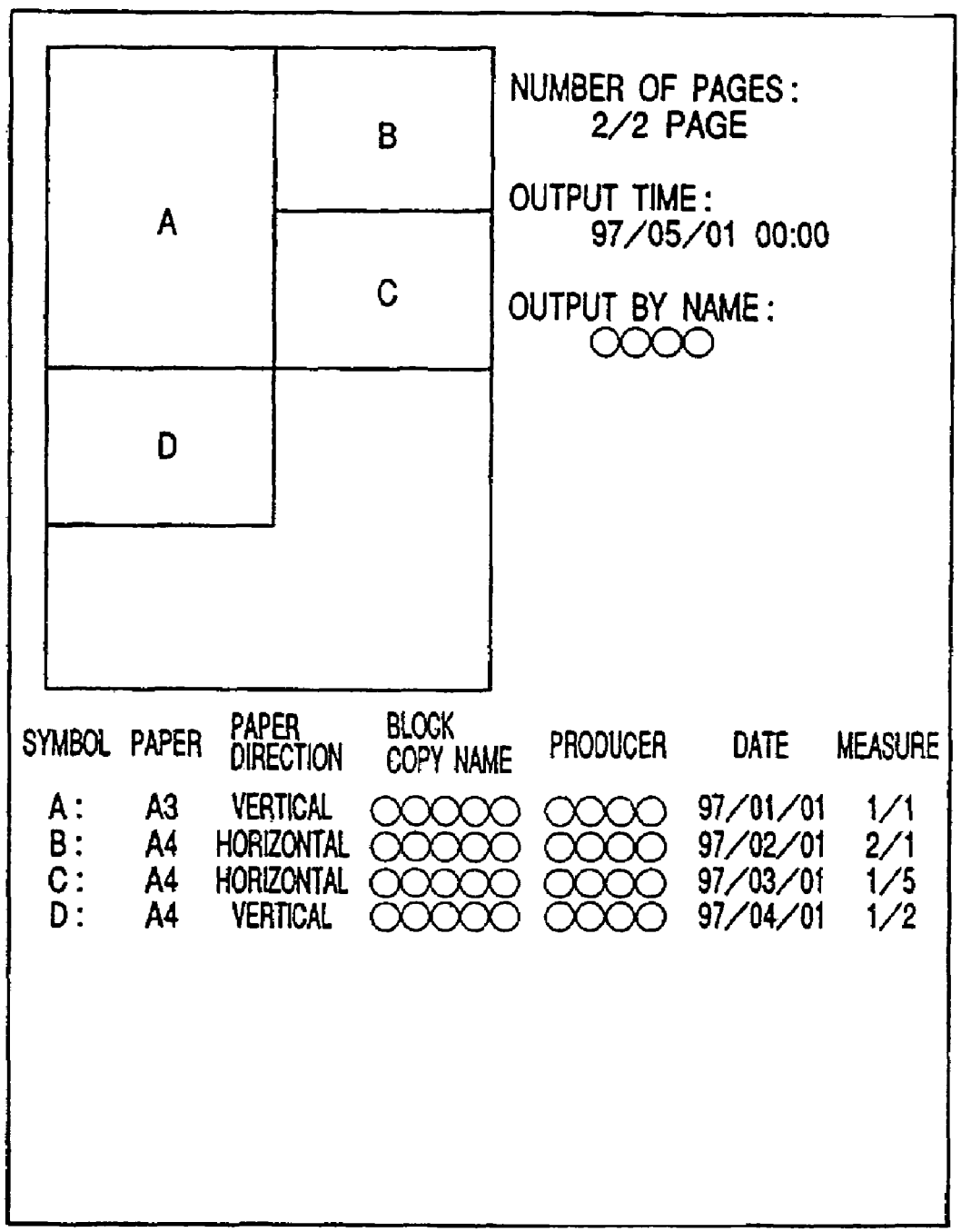
FIG. 64 is a diagram showing an output example of a printing log file.

A printing log file for the fair copy output is prepared (step S5726), and then the following information is described in the printing log file and notification of the contents of the block copy to be output by the imagesetter 52 is transmitted. FIG. 64 is a diagram showing an example of the printing log file output.

(1) Output time, the name of the person by whom output, the number of pages: The date and the time whereat the printing data were actually output, the name of a person who output the printing data, and the number of pages are specified.

(2) Arrangement on printing sheet: A schematic diagram is prepared representing how the individual printing data sets are arranged on a printing sheet. Symbols are added to identify the printing data.

(3) Output data list: The symbols used for the arrangement diagram, information concerning the output conditions (the paper size, the paper direction, etc.) and the label information (the block copy name, the parts number, the parts name, the name of the creator and the date of creation, the name of the person who granted approval, measure, etc.) are specified in a list.

When all the data for the fair copy output have been prepared, the CPU 21 uses the imagesetter 52 to print the data (step S5727).

The printing log file data are also printed by the laser printer 51 (step S5728).

A detailed explanation will now be given for the processing performed at step S5725 for the optimal arrangement of the printing data. Assume that the printing paper size is Am size and the paper size for the printing data is An size (m≧n).

Figure 62:
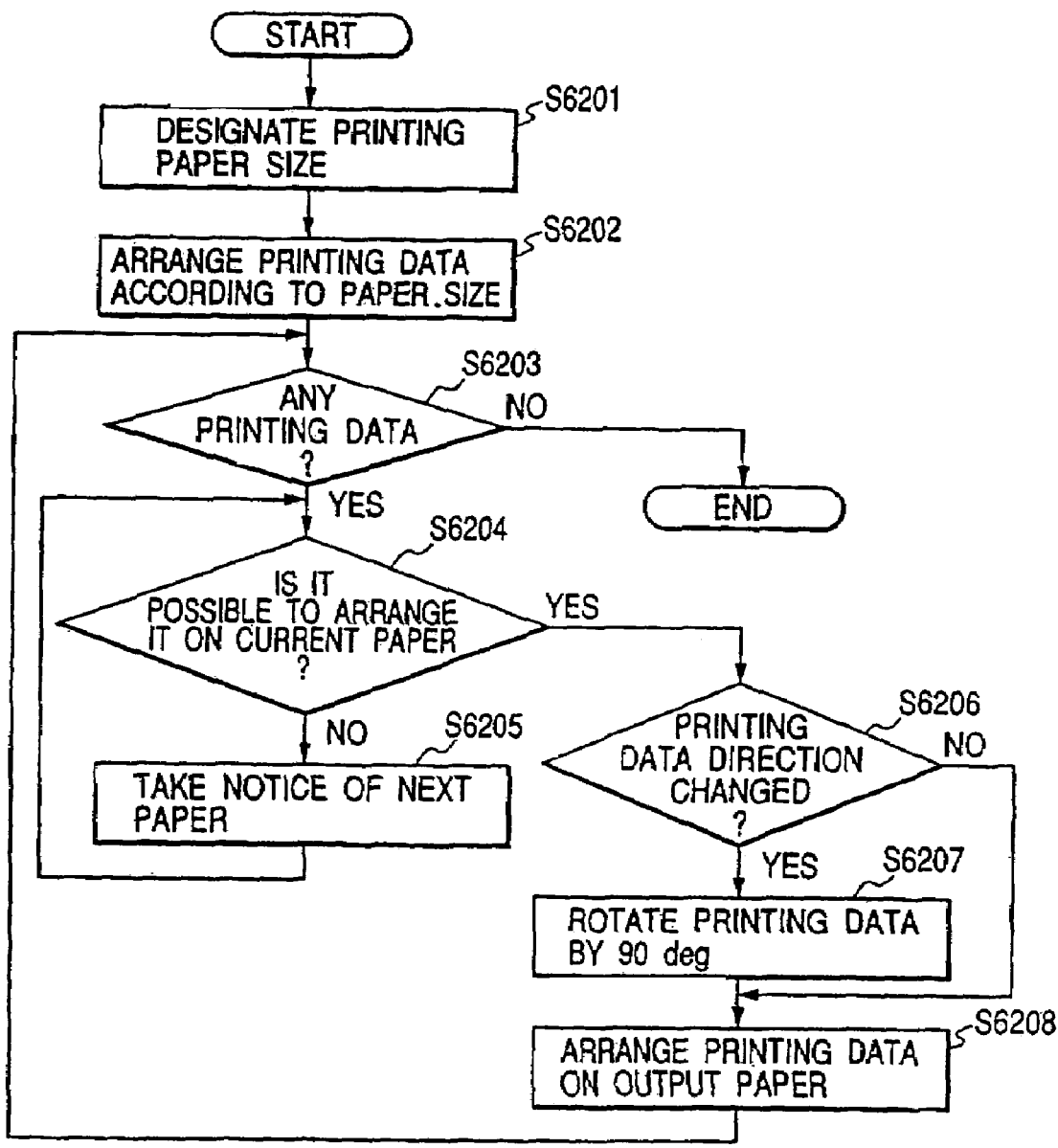
FIG. 62 is a flowchart for explaining the processing performed to optimally arrange printing data.

FIG. 62 is a flowchart showing the processing for the optimal arrangement of the printing data.

First, the printing paper size is selected (step S6201). When the size of the printing paper that is employed is determined in advance, this step can be skipped.

The printing data are rearranged in the ascending order of the paper sizes (step S6202). Any order can be employed when the same paper size is employed for the individual printing-data sets.

The CPU 21 determines whether printing data to be output are present (step S6203). When printing data to be output are present, program control advances to step S6204. When no printing data are found, the printing data optimal arrangement processing is thereafter terminated.

A check is performed to determine whether the printing data to be output can be accommodated by the paper sheet that is currently being used (step S6204). When the printing data can be accommodated, program control goes to step S6206. When the printing data can not be accommodated, the arrangement process for the printing paper that is currently being used is terminated, and the next printing paper in line is selected (step S6205). A check is again performed to determine whether the printing data can be accommodated on the recently selected paper sheet.

Then, a check is performed to determine whether the direction in which the printing data are to be output should be changed (step S6206). When the direction of the printing data needs to be changed, all the printing data to be output are rotated 90 degrees to change the direction (step S6207). When the direction need not be changed, program control moves to step S6208.

The printing data to be output are arranged on the paper sheet that is currently being used (step S6208).

The processing for arranging a single set of printing data is thereafter terminated. The processing extending from step S6203, whereat the presence/absence of printing data to be output is determined, to step S6208, whereat the printing data is arranged on the printing paper, is repeated until all the sets of printing data have been arranged on the printing paper.

Assume that the currently used printing paper size is A1 and that there is one set of printing data for A2 (called A21), three sets of printing data for A3 (A31, A32 and A33) and three sets of printing data for A4 (A41, A42 and A43). The printing data sets are rearranged as A21, A31, A32, A33, A41, A42 and A43.

Figure 63:
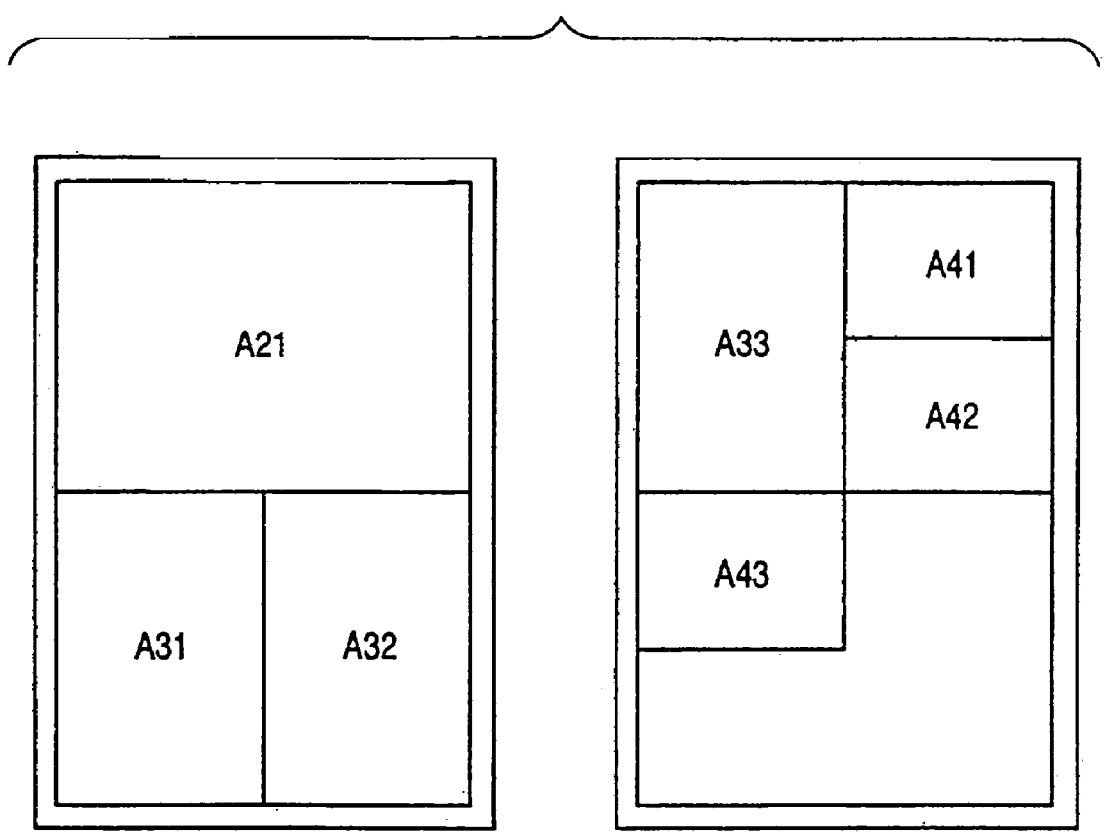
FIG. 63 is a diagram showing example results obtained by optimally arranging printing data.

FIG. 63 is a diagram showing example results obtained by optimally arranging the printing data sets from A21 to A 43 on the printing paper A1.

In the example in FIG. 63, the data A21, A31 and A32 can be arranged on the first printing paper sheet. However, since the succeeding data A33 can not be included on the first sheet, the second sheet is designated the currently used paper sheet so that the data A33 can be arranged on in the second paper sheet, which is now the current sheet.

Furthermore, in FIG. 63, while the paper direction for the data A21 is vertical, the area used on the A21 sheet is horizontal. Therefore, the printing data A21 must be rotated 90 degrees to change its direction.

An explanation has been given for the processing for printing the obtained data using a printer such as the laser printer 51 or the imagesetter 52.

(b) Second Embodiment

In the first embodiment, at step S0901 in FIG. 9, and at steps S3401 and S3402 in FIG. 34, the information is entered that is required for registering the graphic data and the character data as printing data. Instead of performing these steps, graphic data or character data that are prepared in advance by another drawing device may be loaded into the information processing apparatus.

In this case, the graphic data and the character data that are prepared by another drawing device are converted by the CPU 21 into a form that the information processing apparatus can read. The resultant data are stored in the external storage device 33, and for use are loaded into the RAM 32.

The data prepared by the drawing device may be transmitted to an external storage device 33, such as a hard disk device connected to the information processing apparatus, and for use the CPU 21 may directly load the received data. Further, the data prepared by another drawing device may be stored on a storage medium, such as a floppy disk, and the floppy disk may be loaded into an external storage device 33, such as a floppy disk drive, that is connected to the information processing apparatus.

When the data that are prepared by another drawing device include one part or all of the printing attributes of the graphic data and the character data, the data to which the printing attributes have been added are loaded.

If the data that are prepared by another drawing device do not include one part of the printing attribute required for the printing data, a default printing attribute, which is stored in advance in the external storage device 33, is added to supplement the inadequate printing attributes. If a printing attribute that has been added to the printing data prepared by another drawing device is unnecessary or is inadequate, the unnecessary printing attribute is deleted and a default printing attribute is added.

In any of the above cases, the printing attribute for the graphic data or the character data may be edited at step S0902 or step S3403, as needed.

The drawing device is, for example, a device in which is mounted a software program such as Illustrator, by Adobe Systems.

(c) Third Embodiment

In the first embodiment, at step S2504 in FIG. 25 and at step S3408 in FIG. 34, an explanation has been given for the process for designating the layout positions for the graphic data and the character data. A CAD device may prepare in advance graphic data that is used as a reference for designating the layout positions, and the information processing apparatus of the present invention may load the graphic data.

In this case, the printing data prepared by the information processing apparatus are to be used to label the drawings of mechanical parts, and the CAD drawing of the mechanical parts can also be displayed in the drawing area 62 for use as a reference when designating the layout positions.

The graphic data prepared by the CAD device is converted by the CPU 21 into a form that the information processing apparatus can read, and the resultant data are stored in the external storage device 33 and for use are loaded into the RAM 32.

The graphic data prepared by the CAD device may be transmitted to an external storage device 33, such as a hard disk drive, that is connected to the information processing apparatus, and the CPU 21 may directly load and use the received data. Further, the data may be stored on a storage medium, such as a floppy disk, and may be loaded by using an external storage device 33, such as a floppy disk drive, that is connected to the information processing apparatus.

Since generally the data prepared by the CAD device are not actually output as printing data, this data is automatically designated as an element that is not an output object. Therefore, the printing attribute of the graphic data need not be added to this data. However, if necessary, at step S0902 the printing attribute of the graphic data can be added for employment as the printing data.

The CAD device is, for example, a device in which is mounted a software program, such as CADAM, by Cadam System.

(d) Fourth Embodiment

The printing data prepared by the information processing apparatus may be converted by the CPU 21 into a form that another drawing device can read, so that the drawing device can employ the printing data.

The printing data prepared by the information processing apparatus may be transmitted via a network to an external storage device, such as a hard disk drive, that is connected to another drawing device, so that the drawing device can directly load and use the data. Further, the data may be stored on a storage medium, such as a floppy disk, and may be loaded into an external storage device, such as a floppy disk drive, that is connected to the drawing device.

When a drawing device can handle the printing attributes for graphic data and character data, the printing data that are prepared by the information processing apparatus in the first embodiment, and that include the printing attributes, are converted into a form that can be read by the drawing device.

If the printing data that are prepared by the information processing apparatus does not include one part of the printing attribute required for the printing data, a default printing attribute, which is stored in advance in the external storage device 33 and is to be used for the drawing device, is added to the inadequate part of the printing attributes. If a printing attribute that is unnecessary or inadequate for printing data is added to the data that are prepared by the information processing apparatus, the unnecessary printing attribute is deleted, and a default printing attribute to be used by the drawing device is added.

The drawing device is, for example, a device in which is mounted a software program, such as illustrator, by Adobe Systems.

(e) Fifth Embodiment

The printing data prepared by the information processing apparatus may be converted by the CPU 21 into a form that another CAD device can read, so that the CAD device can employ the printing data.

In this case, the printing data prepared by the information processing apparatus are to be pasted in as descriptions for mechanical parts, so that the printing data are displayed together with the CAD drawing of the mechanical parts, and their positional relationship with the mechanical parts can be confirmed.

The printing data prepared by the information processing apparatus may be transmitted via a network to an external storage device, such as a hard disk drive, that is connected to another CAD device, and the CAD device may directly load and use the received data. Further, the data may be stored on a storage medium, such as a floppy disk, and may be loaded into an external storage device 33, such as a floppy disk drive, that is connected to the CAD device.

When the CAD device can not process the printing attributes of the graphic data and the character data that are added to the printing data prepared by the information processing apparatus, the printing data from which the printing attributes have been deleted are converted into a form that the CAD device can read.

When, for example, the CAD device can not process the printing attributes for the graphic data, the graphic data are developed as contour information, and a pseudo-shape is expressed to which is added the printing attributes, such as line widths, end edge shapes and connection shapes.

When the CAD device can not process the printing attributes for the character data, the character data are developed as contour information, and a pseudo-shape is expressed to which is added the printing attributes, such the typeface, the vertical scale and the horizontal scale.

The CAD device is, for example, a device in which is mounted a software program, such as CADAM, by Cadam System.

As is described above, according to the first embodiment, the following effects are obtained.

First, a precise layout can be easily obtained for graphic data or character data laid out as printing data for block copy.

Further, not only simple graphic data or character data, but also group data, such as an illustration or a symbol, can easily be processed.

Furthermore, since the history of the prepared printing data can be managed, printing data that were prepared at a desired time can be retrieved.

In addition, dragonflies and bar codes can be laid out as printing data.

An adequate printing method, such as the proof sheet output or the fair copy output, can be selected in accordance with the printer type, such as a laser printer or an imagesetter.

According to the second to the fifth embodiments, since information is exchanged between the information processing apparatus of the present invention and another information processing apparatus, the printing data can be prepared more efficiently.

As is described above, according to the first to the fifth embodiments, very accurate printing data can be easily and precisely prepared, without deterioration of the work efficiency of a user.

(f) Sixth Embodiment

[Reverse Video Image Processing]

In a sixth embodiment, a reverse video attribute can be provided as a printing attribute. The reverse video image processing in the sixth embodiment will be described in detail.

<Explanation of Terms>

Reverse Video Attribute:

Attribute for designating the printing of a solid color image painted the same color as the background.

Figure 82A:
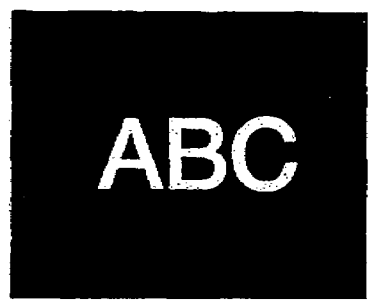
FIGS. 82A and 82B are diagrams showing example reverse video elements.
Figure 82B:

Reverse Video Element:

A solid color character string or graphic pattern having the reverse video attribute. For example, in FIG. 82A is shown a character string for which the reverse video image is set, and in FIG. 82B is shown a solid color graphic pattern for which the reverse video attribute is set.

Figure 83:
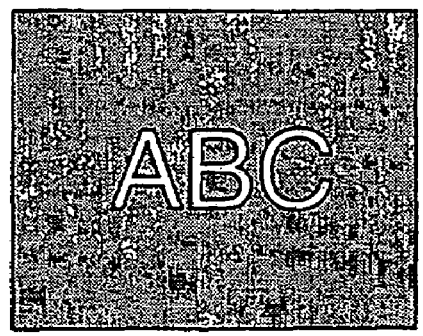
FIG. 83 is a diagram for explaining a solid background graphic pattern.

Background Solid Color Graphic Pattern:

A solid color graphic pattern lying behind a character or a graphic pattern having the reverse video attribute. In FIG. 83, the a rectangle behind the reverse video character string "ABC" is the background solid color graphic pattern.

Figure 84:
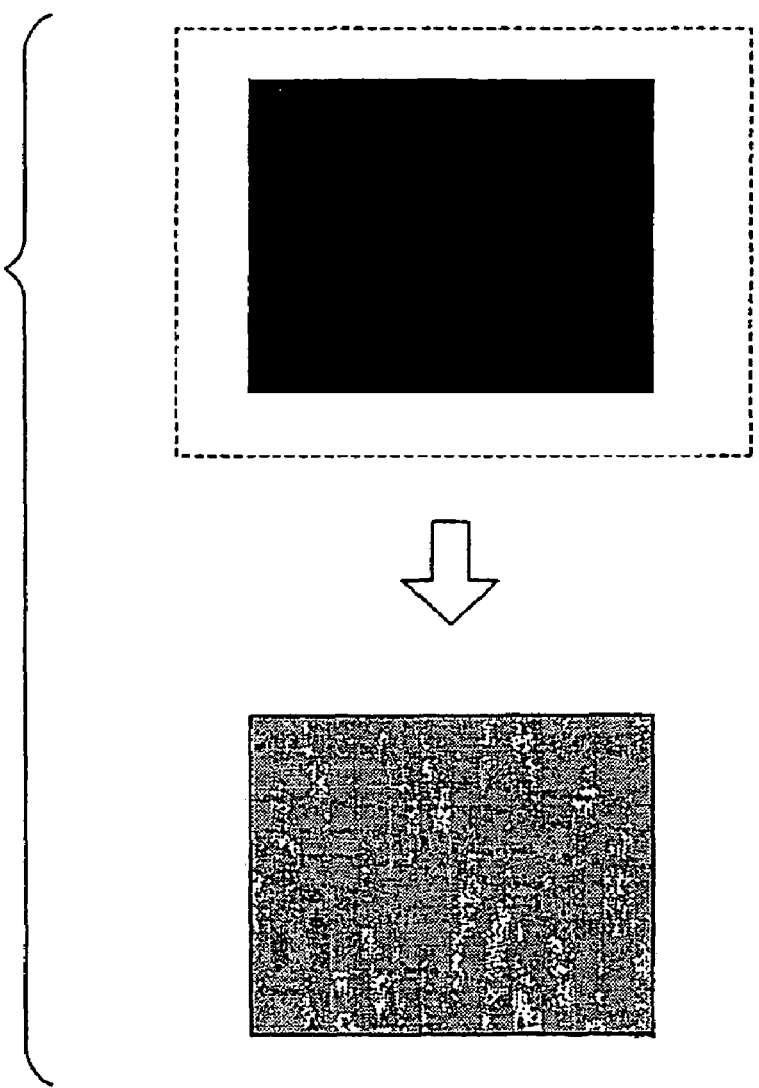
FIG. 84 is a diagram for explaining a temporarily specific display state.

Temporarily Specific Display State:

The state wherein an element that is selected or is disabled in order to select an interactive editing process is displayed using a special display color. When, for example, a graphic pattern or a character string is selected by a pointing device, this state is entered. In FIG. 84 is shown an example temporarily specific display state. When a solid black graphic pattern is selected, the graphic pattern is placed in the dotted state to represent being selected.

<Explanation of the Individual Processes>

The reverse video image processing for this embodiment will now be described in detail, while referring to flowcharts in FIGS. 65 to 79.

<Reverse Video Element Output Process (1)>

Figure 85:
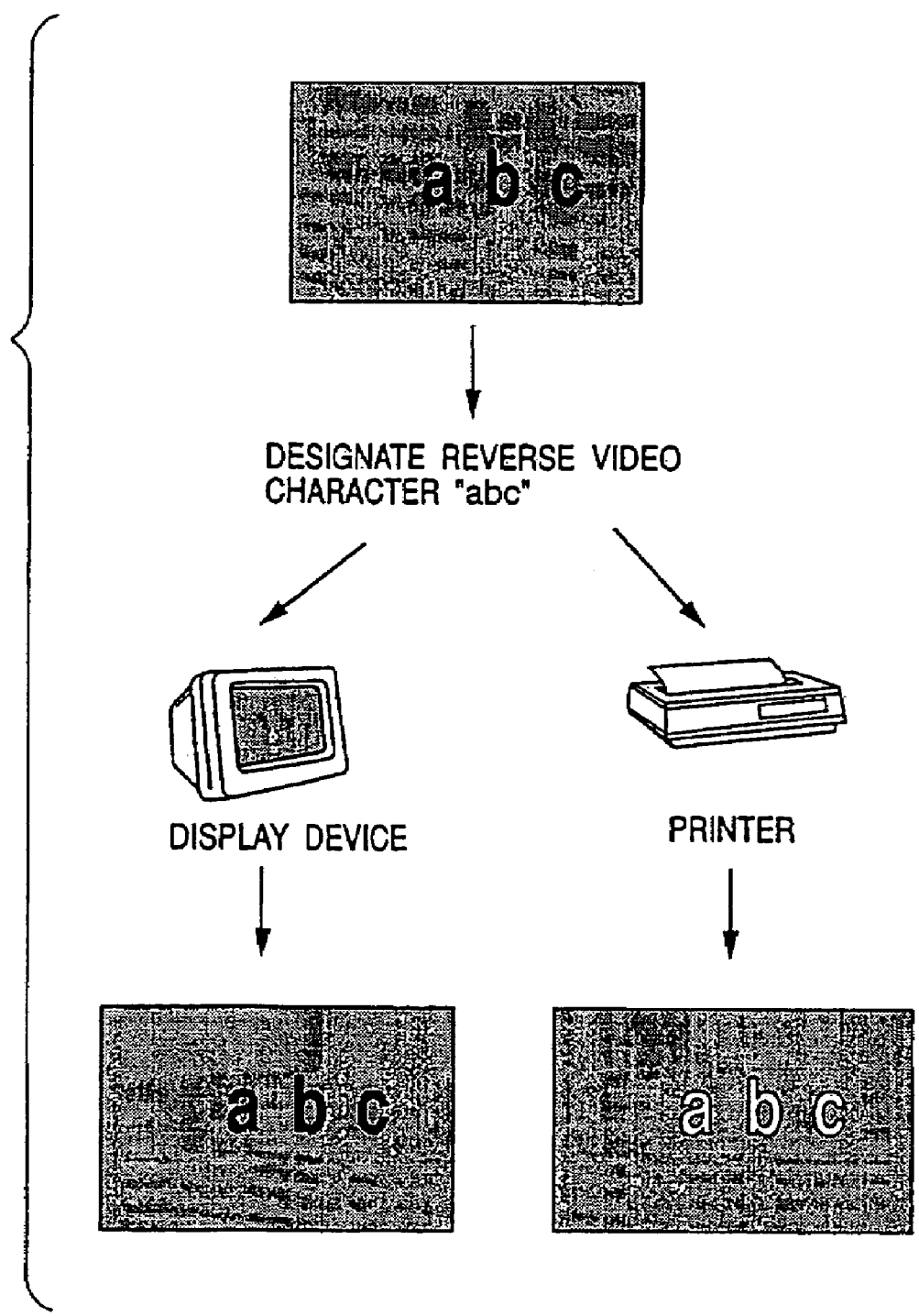
FIG. 85 is a diagram showing the processing required to display a reverse video element.

In this process, the display color of a character string or a solid color graphic pattern having a reverse video attribute is changed in accordance with the output destination (see FIG. 85). For example, when character string ABC is designated a reverse video element, as is shown in FIG. 85, different colors are employed for the character string when it is displayed on a display device and when it is output to a printer.

Figure 65:
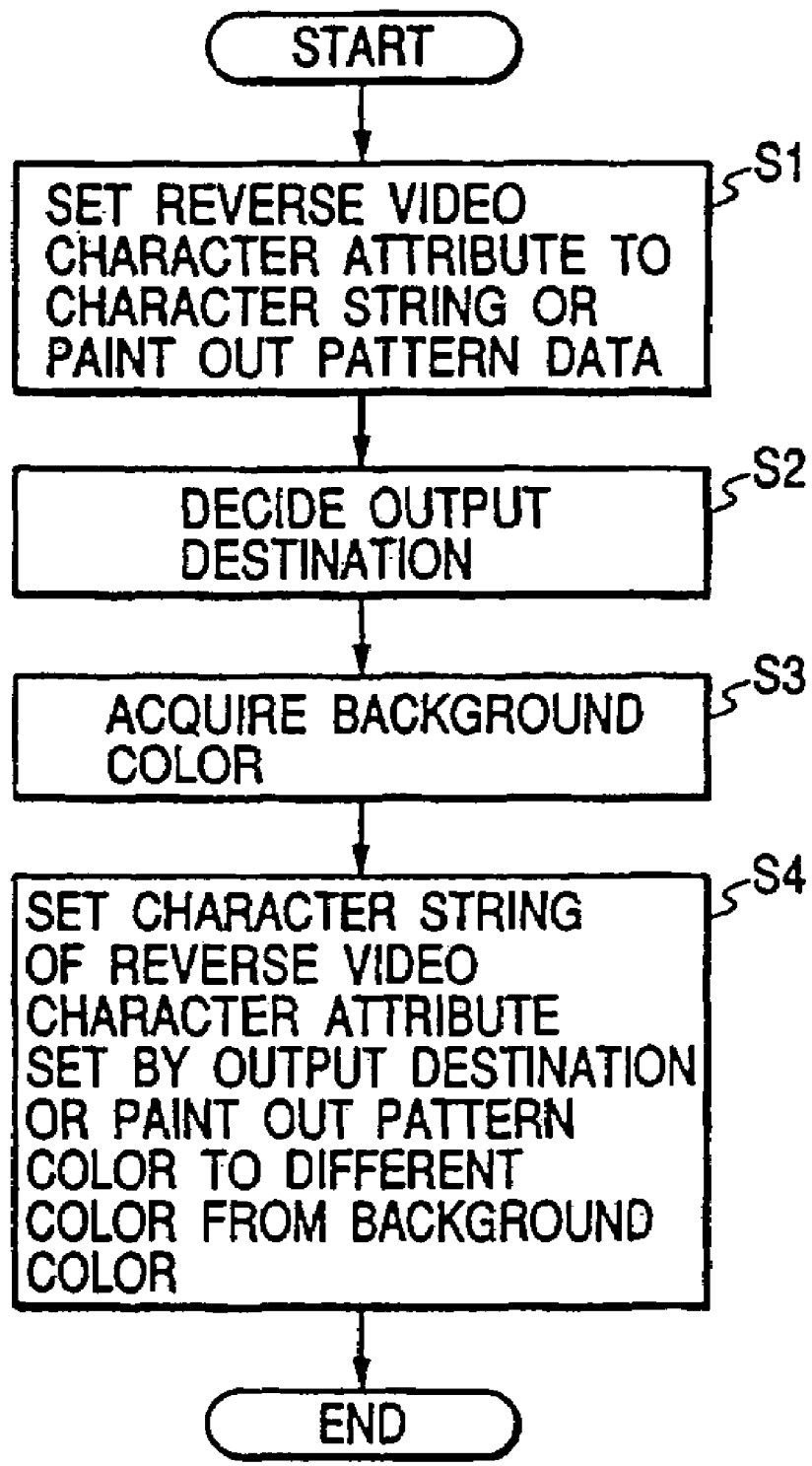
FIG. 65 is a flowchart for explaining the processing performed for a reverse video element output example.
Figure 66:
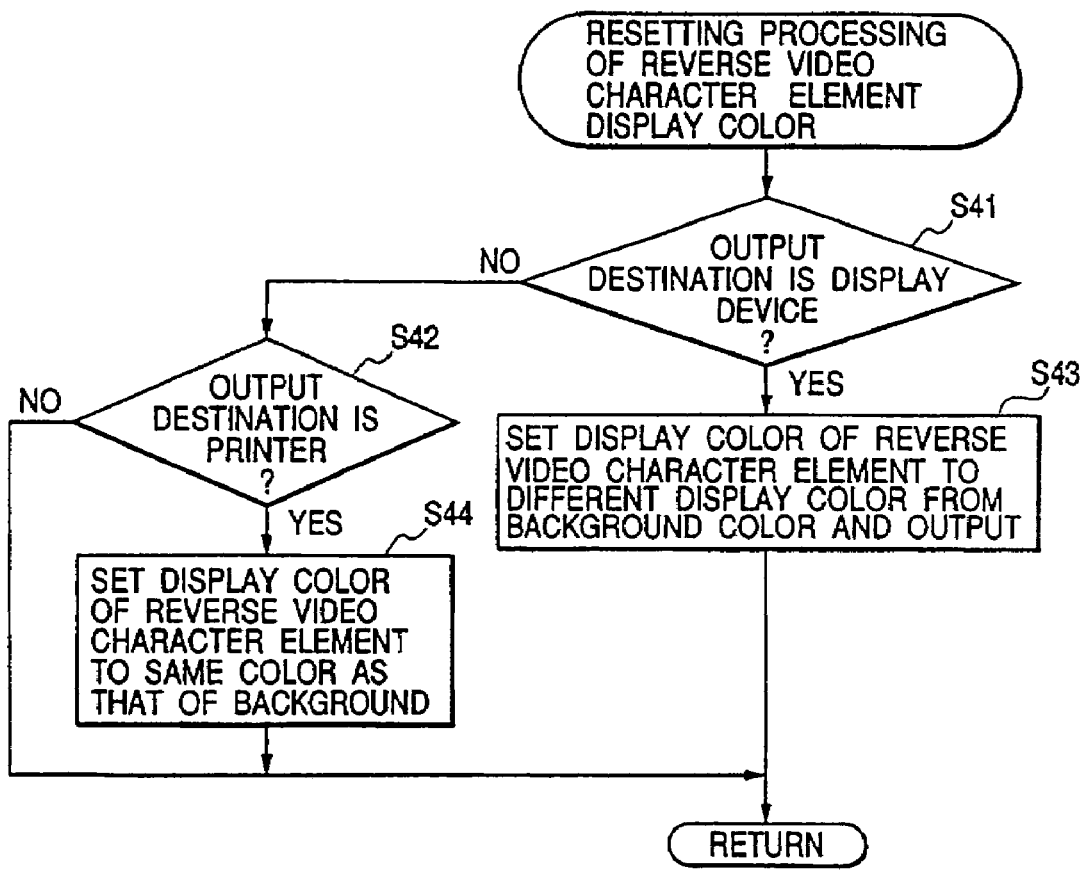
FIG. 66 is a flowchart for explaining the processing performed to reset a display color for a reverse video element.

FIG. 65 is a flowchart for explaining the reverse video element output processing. At step S1, a reverse video attribute is designated for a character string or a solid color graphic pattern. The following procedures are performed to designate the reverse video attribute for the character string or the solid color graphic pattern.

(1) A character string or a graphic pattern is selected for which a reverse video attribute is to be designated.

Figure 86:
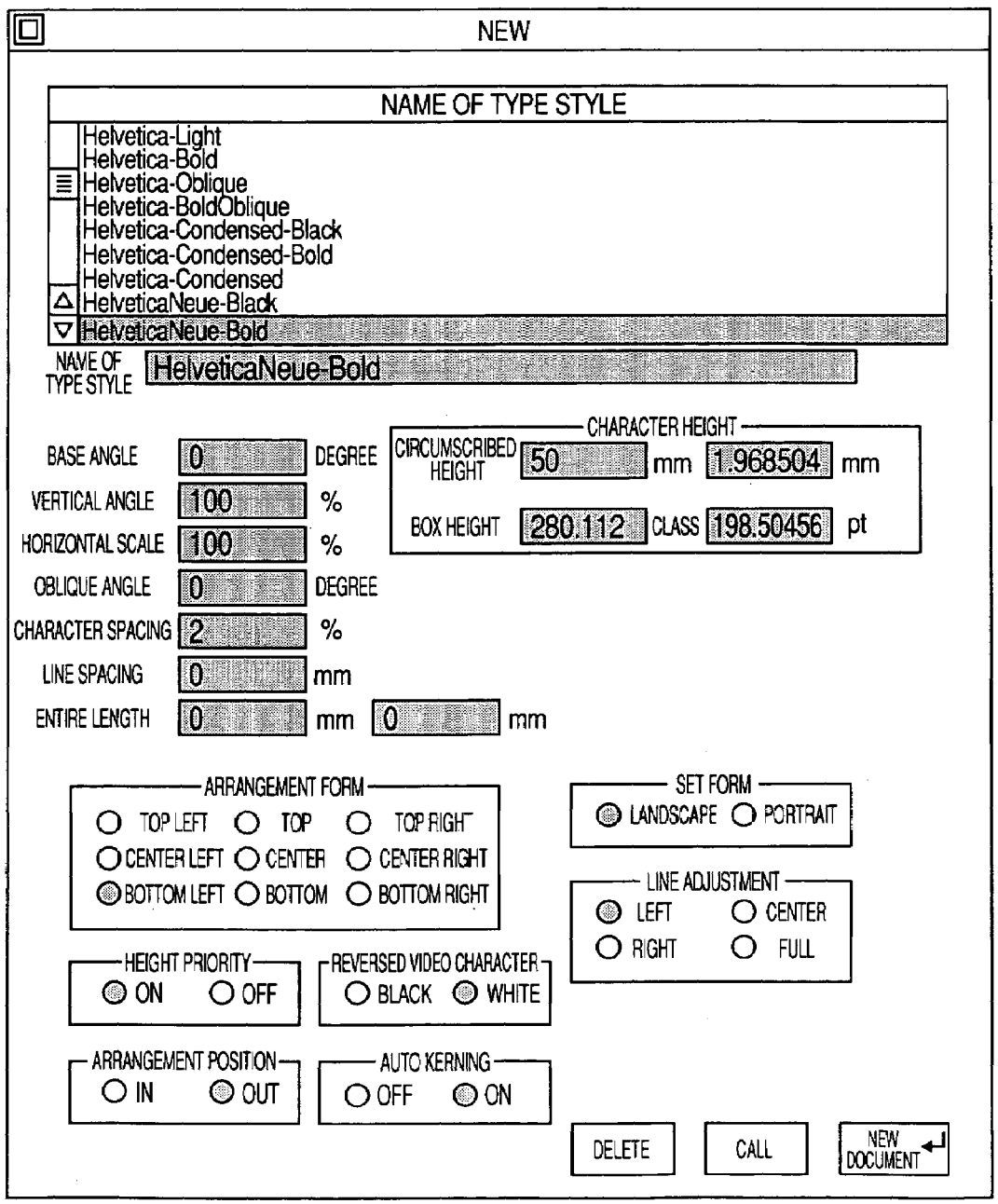
FIG. 86 is a diagram showing a reverse video attribute setting panel.

(2) A graphic interface, such as a panel shown in FIG. 86, is employed to set the reverse video attribute of the selected element to the ON state.

(3) A value that represents the ON state of the reverse video attribute data for each character string or graphic pattern is stored in the RAM 32.

At step S2 an output destination is determined. In the sixth embodiment, the output destination is set as a flag in the RAM 32 before the output process is initiated. Therefore, the CPU 21 need only read the value of the data (flag) from the RAM 32, and employ the value to determine the output destination.

At step S3, a background color that is to be used is obtained. The background color is stored in advance in the RAM 32 for each output destination, and is represented by three or four real numbers, such as RGB values, HSB values or YMCB values. Therefore, the background color can be obtained by reading the data stored in the RAM 32.

At step S4 a color that differs from the background color is set for the character string or the graphic pattern for which the reverse video attribute is designated. In this embodiment, specifically, this process is performed at steps S41 to S44 in the flowchart in FIG. 66.

First, at step S41 a check is performed to determine whether the output destination is a display device. As was explained at step S2, the CPU 21 determines the output destination by referring to the output destination data (flag) that is stored in advance in the RAM 32. If the output destination is a display device, at step S43 a color that differs from the background color is designated and is output as the color for a reverse video element. The process for setting the display color will be described later while referring to FIGS. 67 and 87.

If the output destination is not a display device, at step S42 a check is performed to determine whether a printer is the output destination. As well as at step S41, this determination is performed by referring to the output destination data (flag) that is stored in advance in the RAM 32. When the output destination is a printer, at step S44 a color that is the same as the background color is designated and is output as the display color for the reverse video element. As is described at step S3, the background color data that are stored in advance in the RAM 32 are loaded into the CPU 21. In the process for outputting a character string or a graphic pattern, the CPU 21 instructs the output device to employ the obtained background color to display the character string or the graphic pattern for which the reverse video attribute is in the ON state.

Figure 67:
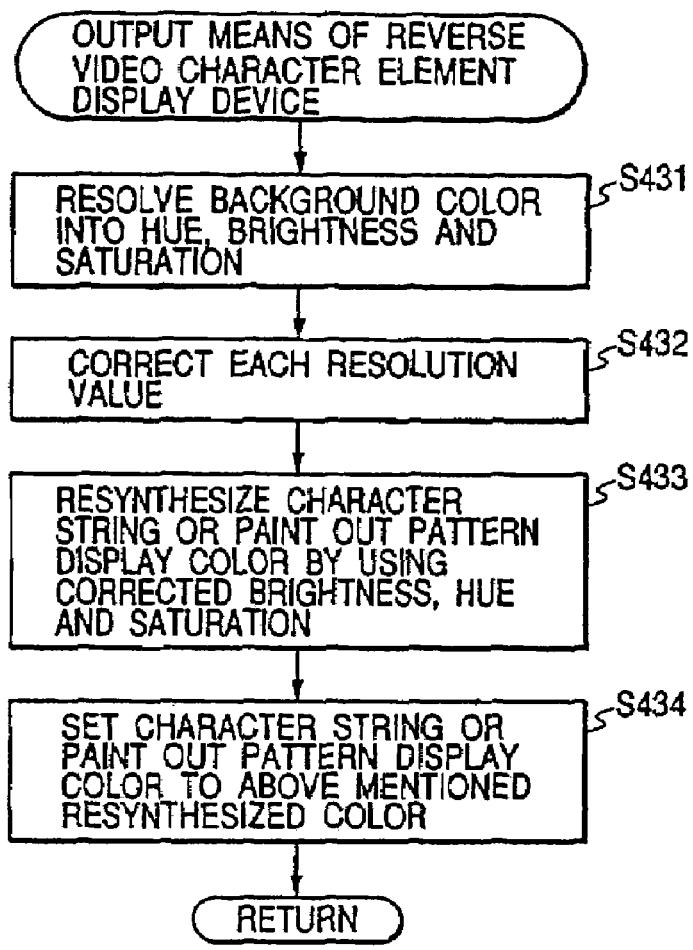
FIG. 67 is a flowchart for explaining the processing performed by the output means of a reverse video element display device.
Figure 87:
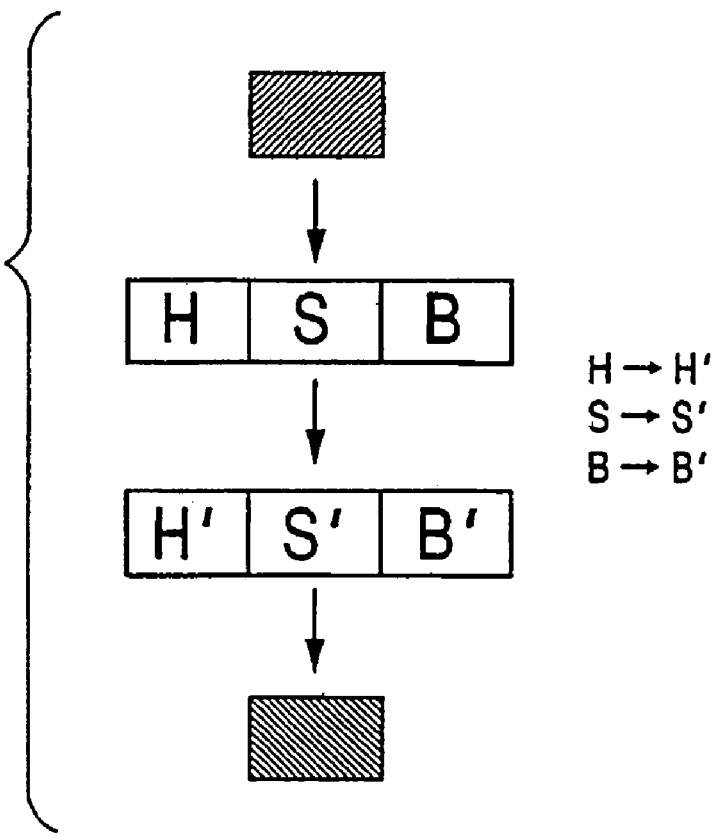
FIG. 87 is a diagram showing the processing performed to synthesize reverse video element display colors.

FIG. 67 is a flowchart for explaining the processing for outputting a reverse video element to the display device 41. Specifically, in the sixth embodiment, steps S431 to S434 are performed. FIG. 87 is a diagram showing the synthesis of display colors for reverse video elements.

First, at step S431 the background color obtained at step S3 is resolved into hue, brightness and saturation elements. As is described above, the data for the background color that is expressed using the RGB values, the HSB values or the YMCB values are loaded from the RAM 32, and are recalculated by the CPU 21 to obtain the HSB values for the hue, the brightness and the saturation. For this, a commonly known calculation method may be employed. As a result, H (hue), S (saturation) and B (brightness) are obtained from the background color, as is shown in FIG. 87.

At step S432, the resolution values obtained at step S4341 are corrected. Specifically, a process is performed for correcting the brightness B at step S4321 (see the flowchart in FIG. 68) and step S43211 (see the flowchart in FIG. 69), or a process is performed for correcting the saturation S-at-step S4322 (see the flowchart in FIG. 72) or step S43221 (see the flowchart in FIG. 73). Therefore, as shown in FIG. 87, the H, S and B values obtained at step S431 are corrected to H', S' and B' at step S432.

At step S433 the display color for the character string or the solid color graphic pattern is again synthesized by using the corrected brightness, hue and saturation. That is, the CPU 21 converts the brightness, the hue and the saturation obtained at step S432 into model color values for the RGB, HSB or YMCB values that are originally employed. For this, a commonly known calculation method can be employed. As a result, a corrected color for displaying the reverse video element is obtained from H', S' and B', as is shown in FIG. 87.

At stp S434, the corrected color data that are obtained at step S433 are transmitted to the output device to display the character string or the graphic pattern.

A detailed explanation will now be given for the correction of the individual color resolution values at step S432. In this embodiment, an explanation will be given for the following methods for correcting the color resolution value concerning brightness: (1) a method at step S4321 in FIG. 68 for multiplying the brightness value by a constant-correction coefficient; and (2) a method at step S43211 in FIG. 69 for calculating an adaptable brightness correction coefficient using the color of the background solid color graphic pattern. In addition, an explanation will be given for the following methods for correcting the color resolution value concerning saturation: (3) a method for multiplying the saturation by a constant correction coefficient; and (4) a method for calculating an adaptable saturation correction coefficient using a background solid color graphic pattern.

Figure 68:
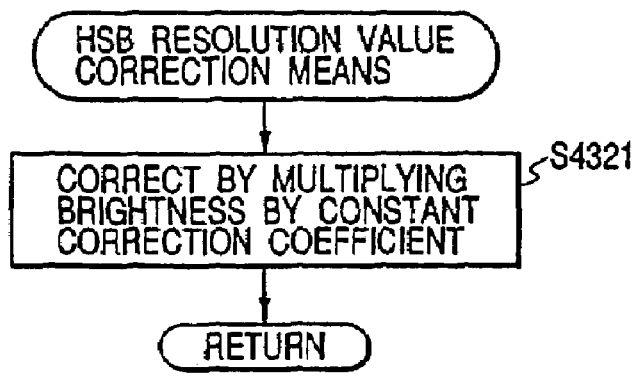
FIG. 68 is a flowchart for explaining the processing performed to correct the first HSB resolution value.
Figure 90:
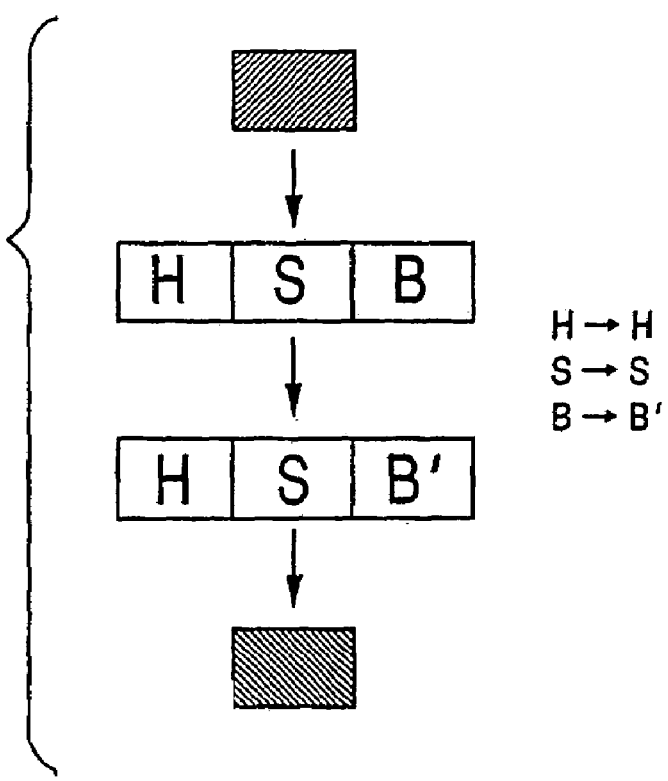
FIG. 90 is a diagram for explaining brightness correction means.

(1) Method for Multiplying the Brightness by a Constant Correction Coefficient to Correct the Display Color for a Reverse Video Image FIG. 90 is a diagram for explaining the correction process for multiplying the brightness value by a constant correction coefficient (the processing in FIG. 68). In this process, a constant correction coefficient is stored in advance in the RAM 32, and is read out. The brightness B obtained at step S431 is multiplied by this correction coefficient to obtain the brightness B'. Therefore, the individual color elements H, S and B, which are obtained by resolving the original background color, are changed to H, S and B'.

Figure 69:
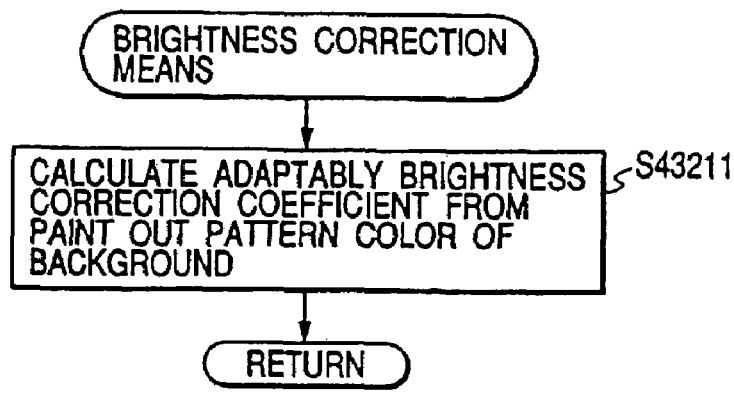
FIG. 69 is a flowchart for explaining the brightness correction processing.
Figure 70:
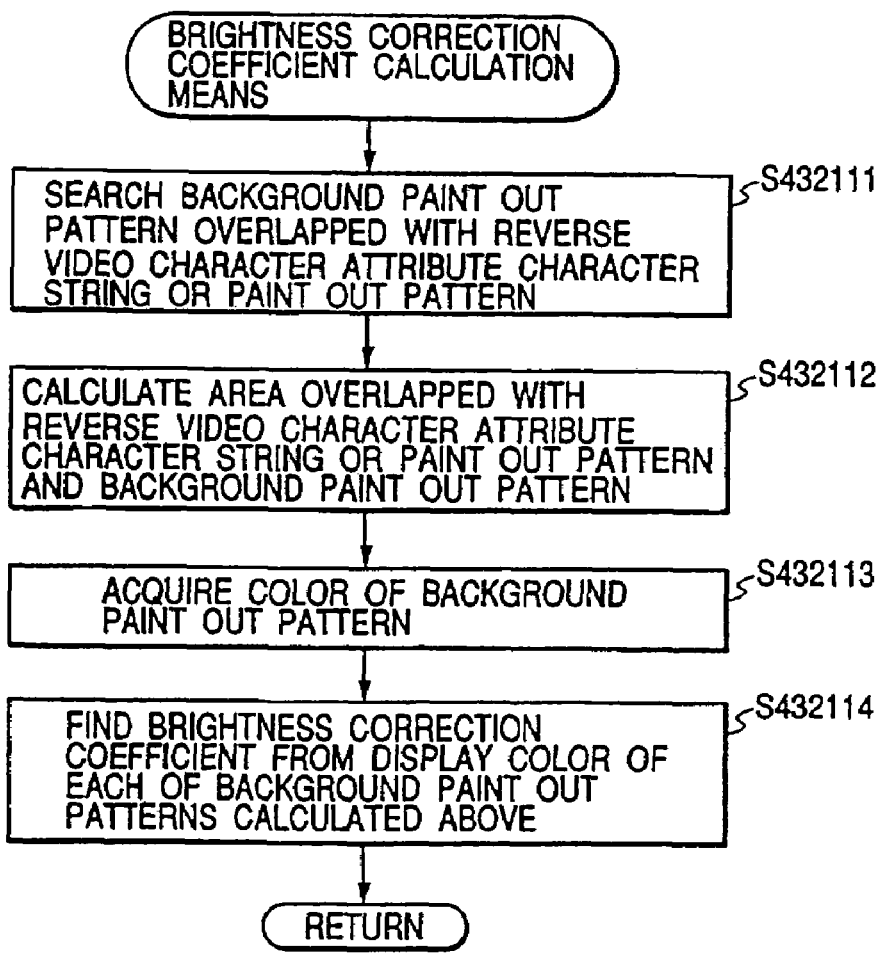
FIG. 70 is a flowchart for explaining the processing performed to calculate a brightness correction coefficient.

(2) Method for Calculating an Adaptable Brightness Correction Coefficient Using the Color for the Background Solid Color Graphic Pattern to Correct the Display Color for the Reverse Video Image While referring to the flowchart in FIG. 70, an explanation will be given for the correction coefficient calculation processing performed when the brightness is corrected by calculating an adaptable correction coefficient by employing the background solid color graphic pattern (the process in FIG. 69). FIG. 70 is a flowchart for explaining the brightness correction coefficient calculation process for correcting the brightness.

Figure 88:
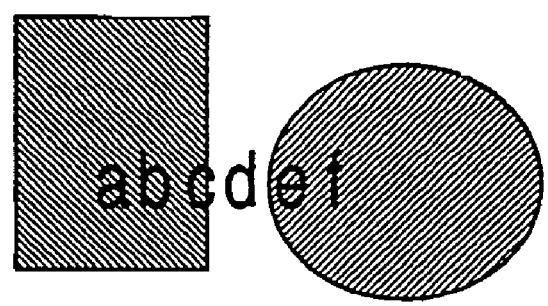
FIG. 88 is a diagram showing a solid background graphic pattern.

At step S432111, a background solid color graphic pattern is searched for that overlaps a character string or a graphic pattern that includes a reverse video attribute. FIG. 88 is a diagram showing the state where the background solid color graphic pattern and the reverse video character string are overlapped. In the example in FIG. 88, two background solid color graphic patterns are searched for.

The CPU 21 extracts geometric data for each background solid color graphic pattern that is registered, and geometrical data for a character string or a solid color graphic pattern that has a reverse video attribute, and determines whether these data overlap. A solid color graphic pattern that it is determined overlaps the reverse video character string or the solid color graphic pattern is a background solid color graphic pattern.

Such a determination method is, for example, a method for extracting contour information for a reverse video character string or a solid color graphic pattern and a background solid color graphic pattern, and for determining whether edge lines that provide the contour information intersect each other.

At this time, to improve the processing efficiency, a check may be performed to determine whether a MiniBox and a MaxBox, which have vertically and horizontally parallel edge lines that enclose each character string or graphic pattern, overlap each other.

At step S432112, geometric data for each background solid color graphic pattern, and geometric data for a reverse video character string or a solid color graphic pattern are extracted from the RAM 32, and the area whereat the elements overlap is calculated. In this process, for example, a product graphic pattern is calculated, and the dimensions of that pattern are obtained. To obtain the dimensions of the product graphic pattern, for example, a polygon approximately the size of the pattern is obtained and the dimensions of the polygon are calculated using a well known method.

At step S432113 the color of the background solid color graphic pattern is obtained. A solid color is stored in the RAM in advance for each solid color graphic pattern. The color value is represented by three or four real numbers, such as RGB values, HSB values or YMCB values. Therefore, the solid color that corresponds to the background solid color graphic pattern obtained at step S432111 is loaded from the RAM 32 to acquire the color for that graphic pattern.

At step S432114, the brightness correction coefficient used at step S432 is calculated based on the display color for each background solid color graphic pattern obtained in the above process. The processing at step S432114 for obtaining the brightness correction coefficient will be descried later, while referring to the flowchart in FIG. 77.

Figure 72:
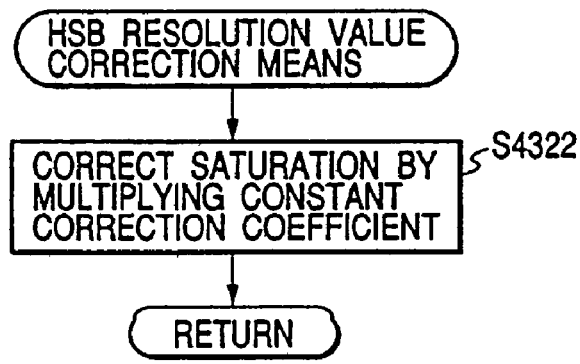
FIG. 72 is a flowchart for explaining the processing performed to correct the second HSB resolution value.
Figure 73:
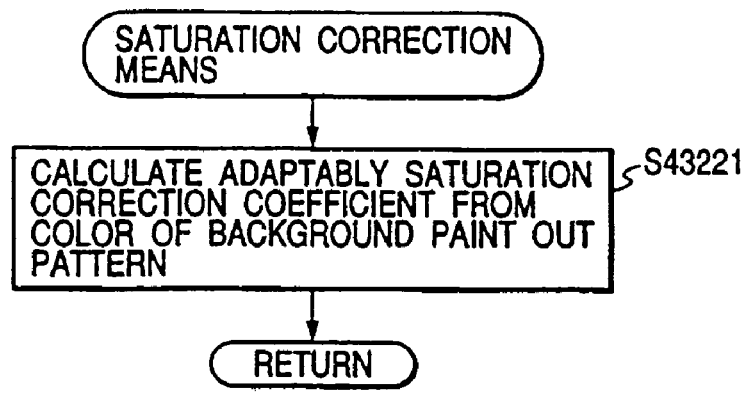
FIG. 73 is a flowchart for explaining the saturation correction processing.
Figure 74:
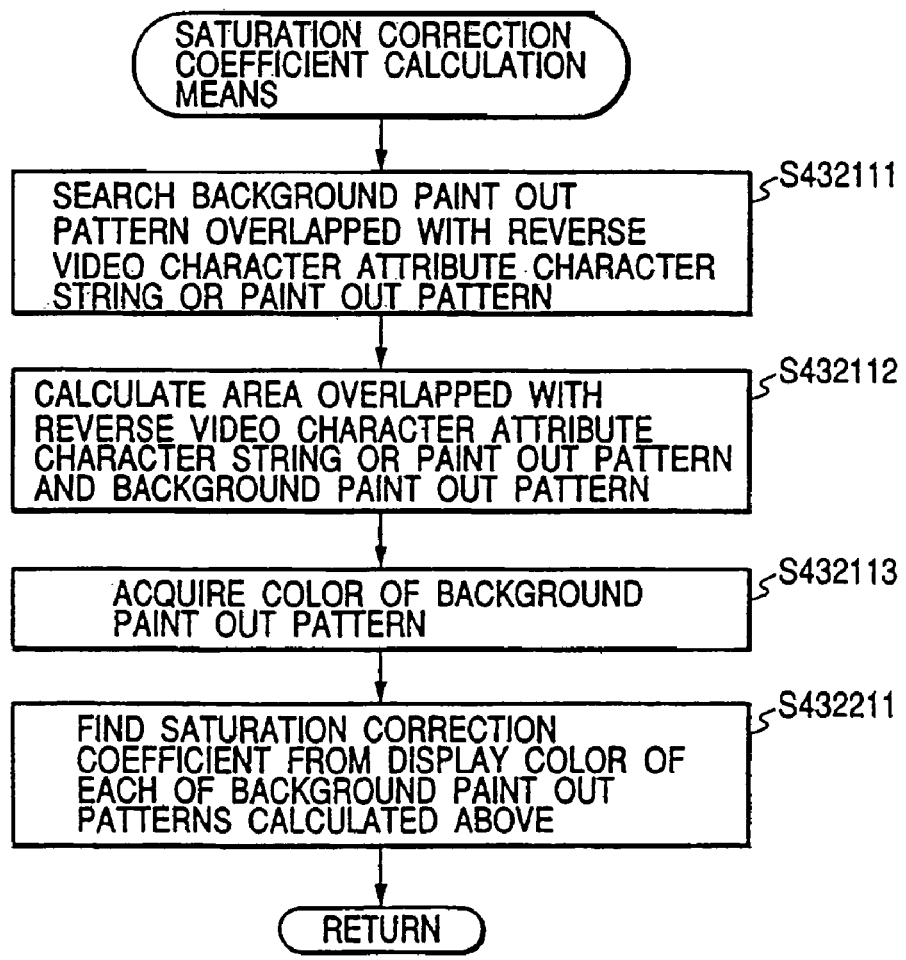
FIG. 74 is a flowchart for explaining the processing performed to calculate a saturation correction coefficient.
Figure 91:
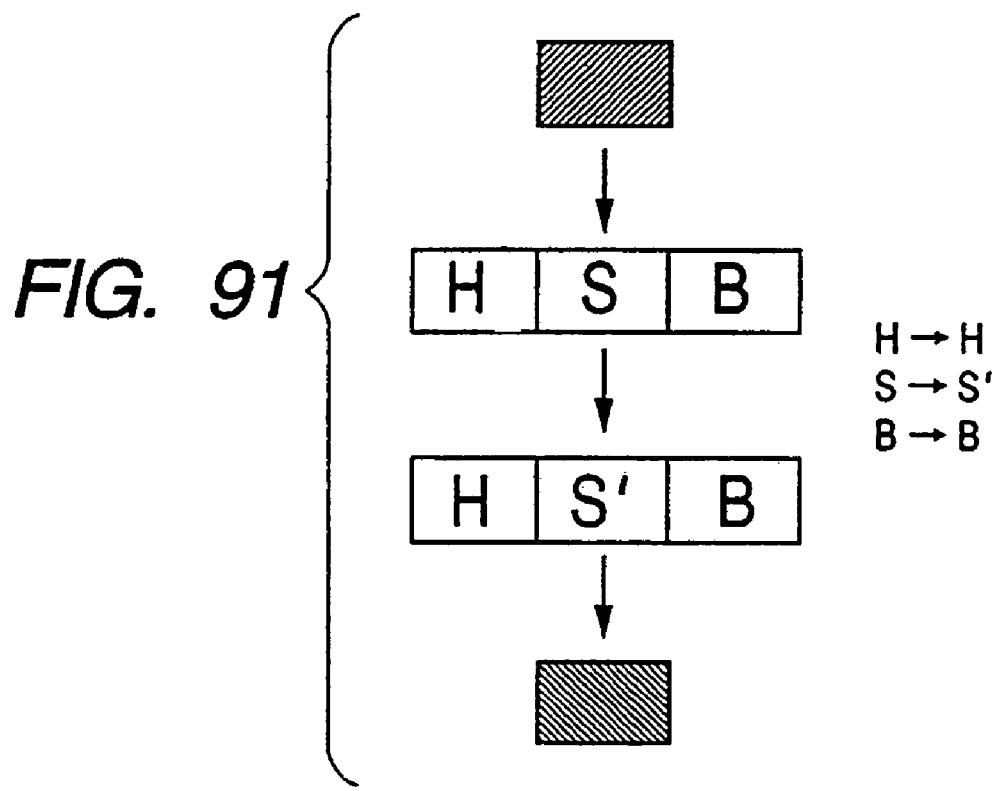
FIG. 91 is a diagram for explaining saturation correction means.

(3) Method for Multiplying the Saturation by a Constant Correction Coefficient to Correct the Display Color for a Reverse Video Image As is shown at step S4322 in FIG. 72, the saturation value S is corrected by multiplying it by a constant correction coefficient, and as is shown in FIG. 91, saturation S' is obtained by multiplying the saturation S by the constant correction coefficient. In this process, the constant correction coefficient which is stored in advance in the RAM 32, is loaded. The saturation S obtained at step S431 is multiplied by this correction coefficient to obtain S'. Then, the correction color for a reverse video display is obtained from the corrected HSB value (H, S' and B).

(4) Method for Calculating an Adaptable Saturation Correction Coefficient Using the Color for a Background Solid Color Graphic Pattern to Correct the Display Color for a Reverse Video Image An adaptable saturation correction coefficient may be calculated using the color of a background solid color graphic pattern. The saturation coefficient correction is obtained through the processing shown in the flowchart in FIG. 74. The processes at steps S432111 to S432113 are the same as those explained while referring to FIG. 70. At step S432211, the saturation correction coefficient is calculated using the display color for each background solid color graphic pattern obtained at steps S432111 to S432113.

An explanation will now be give for the calculation of an adaptable correction coefficient for the background solid color graphic pattern. Since substantially this process is performed in common for the brightness correction coefficient and the saturation correction coefficient, an explanation will be given for both cases.

Figure 77:
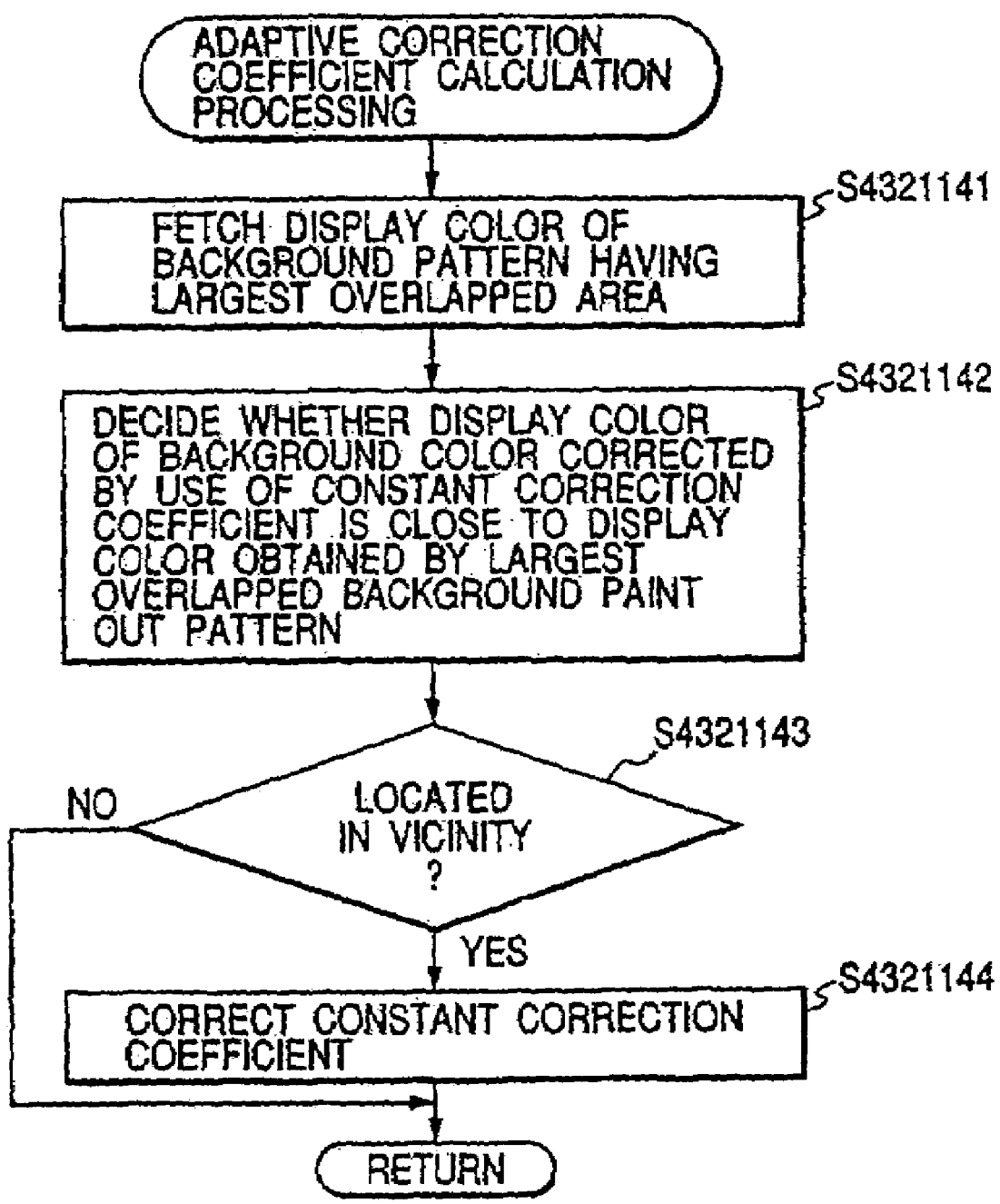
FIG. 77 is a flowchart for explaining the processing performed to calculate the adaptive correction coefficient.
Figure 78:
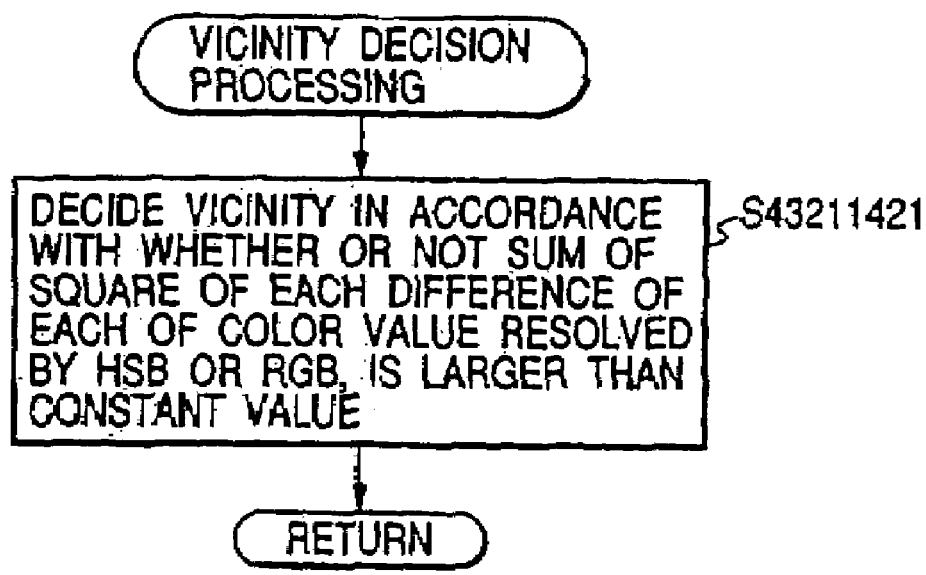
FIG. 78 is a flowchart for explaining the vicinity decision processing performed for a color value.
Figure 79:
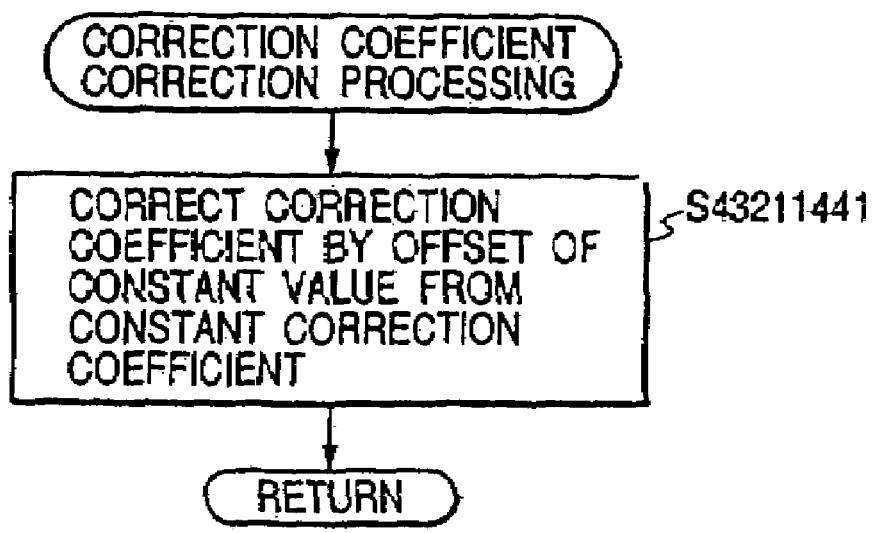
FIG. 79 is a flowchart for explaining the processing performed to correct the correction coefficient.
Figure 81:
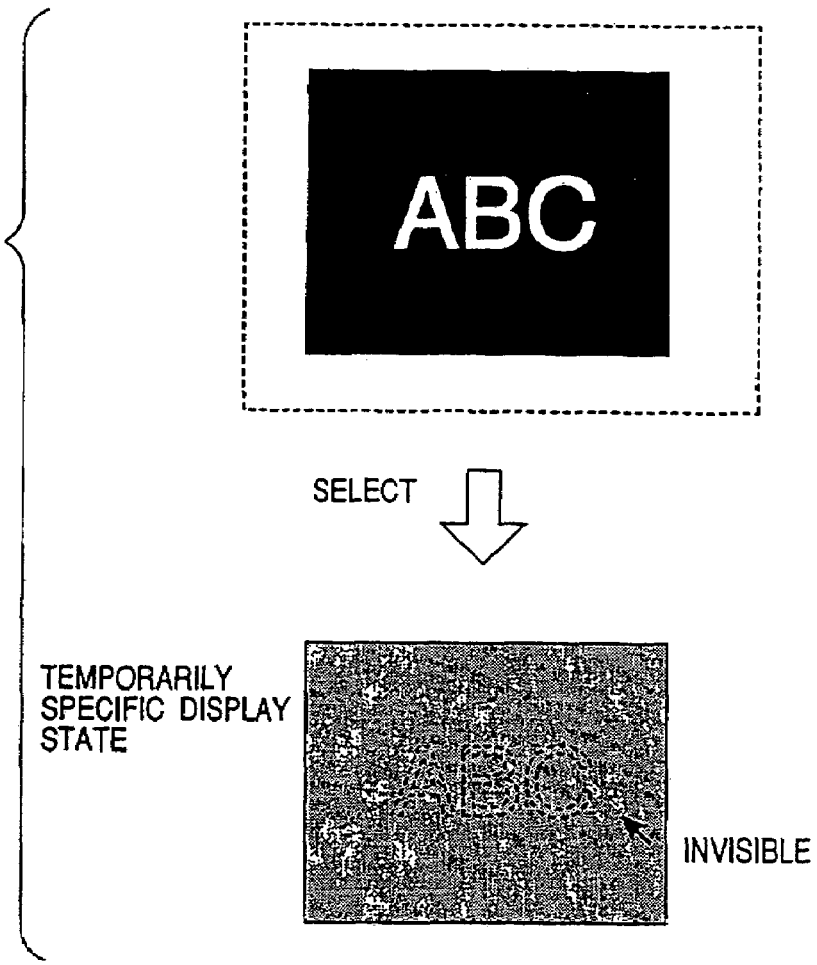
FIG. 81 is a diagram showing an example defect concerning the temporarily specific display state of a reverse video element.
Figure 89:
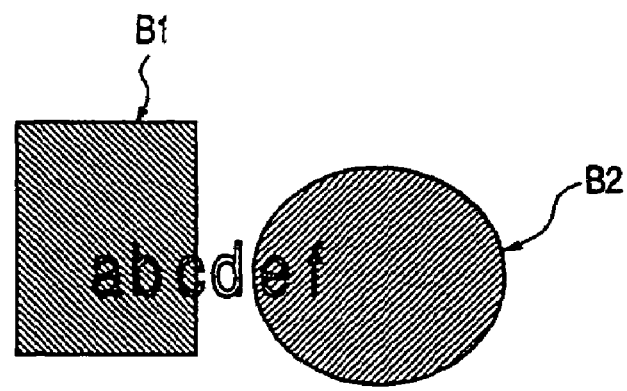
FIG. 89 is a diagram for explaining an area wherein a reverse video element and a solid background graphic pattern overlap.

FIG. 77 is a flowchart for explaining the processing for calculating an adaptable correction coefficient. First, at step S4321141, the background solid color graphic pattern that has the largest overlapping area is searched for among those obtained at step S432112 (in FIG. 70 for the brightness correction, and in FIG. 74 for the saturation correction). The display color that corresponds to that for the obtained graphic pattern is extracted from those obtained at step S432113. For example, in FIG. 89, assume that the area wherein background solid color graphic pattern B1 overlaps reverse video text is S1 and the area wherein background solid color graphic pattern B2 overlaps the reverse video text is S2. When S1>S2, the graphic pattern B1 is selected and the display color for B1 is extracted. When S1<S2, the graphic pattern B2 is selected and the display color for B2 is extracted.

At step S4321142, a check is performed to determine whether the display color obtained by correcting the background color by using a predetermined coefficient is similar to the display color obtained at step S4321141.

In this embodiment, this determination is made by the process (flowchart in FIG. 78) at step S43211421. Specifically, differences among the individual color values resolved by HSB or RGB are calculated. Whether the color of the graphic pattern is similar to the background color is decided by determining whether the sum of the squares of the differences is greater than a constant value.

Figure 92A:
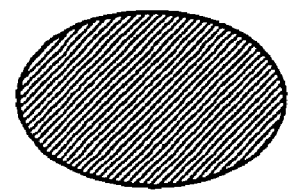
FIGS. 92A and 92B are diagrams for explaining color vicinity determination.
Figure 92B:
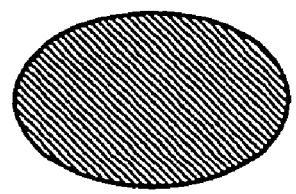

For example, as is shown in FIG. 92, RGB resolution values for a specific color C1 are defined as (R1, G1, B1). It should be noted that R1, G1 and B1 are represented by either a real number or an integer as:

R1: red element,
G1: green element, and
B1: blue element.

Another color C2 is represented as (R2, G2, B2).

When it is assumed that each of the values constitutes one point in the three-dimensional vector space, the square $d^2$ of the distance between the two points ($X^2$ represents the square of X) is represented as $$d^2=(R1-R2)^2+(G1-G2)^2+(B1-B2)^2.$$

When the thus obtained value $d^2$ is equal to or smaller than a constant value $\epsilon$, which is determined in advance, it is ascertained that the colors C1 and C2 are similar colors. When the value $d^2$ is greater than the value $\epsilon$, it is ascertained that C1 and C2 are different colors. When the color is represented using the HSB values or a combination of n real values, the distance in the $R^n$ space is calculated in the above described manner in order to determine the color similarity.

When at step S4321142 the colors C1 and C2 are similar, it means that the colors C1 and C2 are difficult to distinguish between, i.e., the corrected display color for the reverse video character or for graphic pattern resembles the display color for the background solid color graphic pattern, and the two colors are not easily distinguished. Therefore, to further change the display color (change the correction coefficient), program control moves from step S4321143 to step S4321144. At step S4321144 a predetermined correction coefficient is corrected. In this embodiment, the process at step S4321441 (see the flowchart in FIG. 79) is performed for the correction.

In this correction process, when a constant correction coefficient is defined as $\alpha 1$ and a correction offset value is defined as $d\alpha 1$, the correction coefficient is corrected by using $\alpha 1+d\alpha 1$ or $\alpha 1-d\alpha 1$. While either the sign + or the sign – may be employed, the results of the correction must fall within the scope of the available color elements.

Reverse Video Element Output Process (2)

Figure 93:
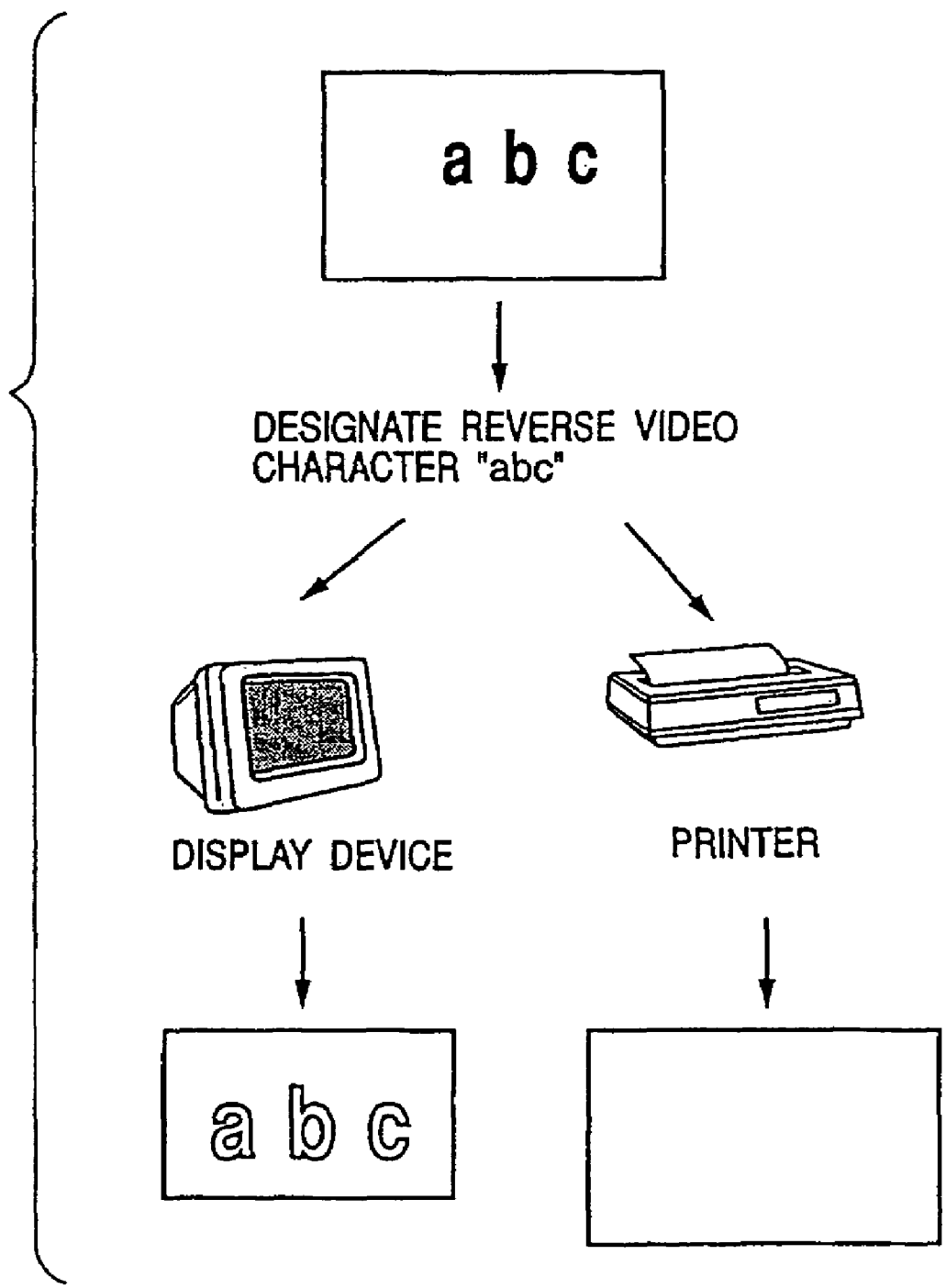
FIG. 93 is a diagram for explaining another process performed to display a reverse video element.

In this process, in accordance with an output destination, a character string or a solid color graphic pattern to which a reverse video attribute has been set is replaced by a display of contour information for the character string or for border information for the solid color graphic pattern (FIG. 93).

Figure 75:
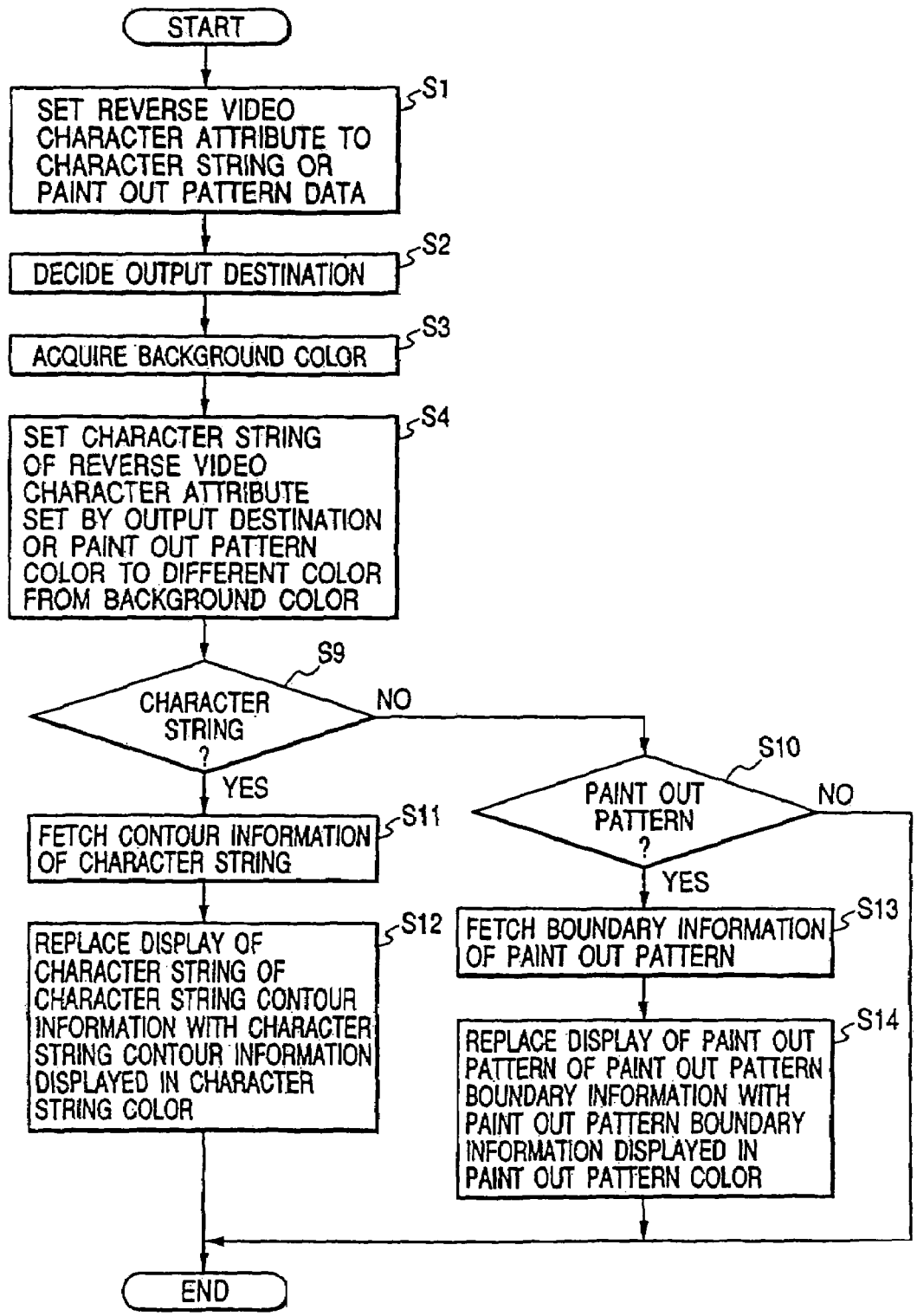
FIG. 75 is a flowchart for explaining the processing performed for another reverse video element output example.

The reverse video element output process will now be described, while referring to the flowchart in FIG. 75. Since the processes at steps S1 to S4 are the same as those in FIG. 65, no explanation for them will be given.

Figure 94A:
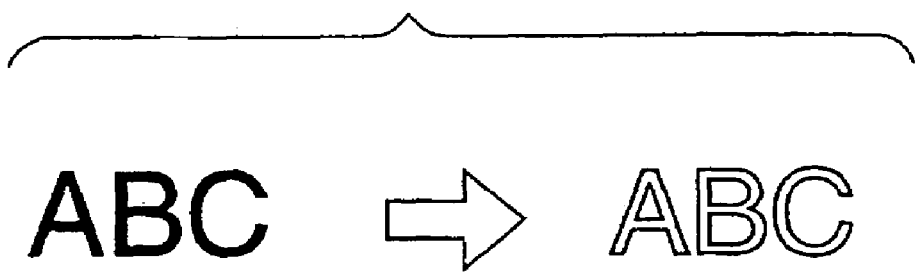
FIGS. 94A and 94B are diagrams for explaining information concerning a border lying between a graphic pattern for the contour of a character string and a solid graphic pattern.

At step S9, a check is performed to determine whether a reverse video element is a character string. When the reverse video element is a character string, program control advances to step S11. At step S11 the CPU 21 employs the geometrical data for the character string to calculate a contour pattern. The contour pattern for the character string is shown in FIG. 94A. At step S12, the displayed character string is replaced by the contour pattern obtained at step S11 that is displayed using in the display color for the character string. The pertinent character string may be displayed by employing broken lines to distinguish it from a normal graphic pattern.

Figure 94B:
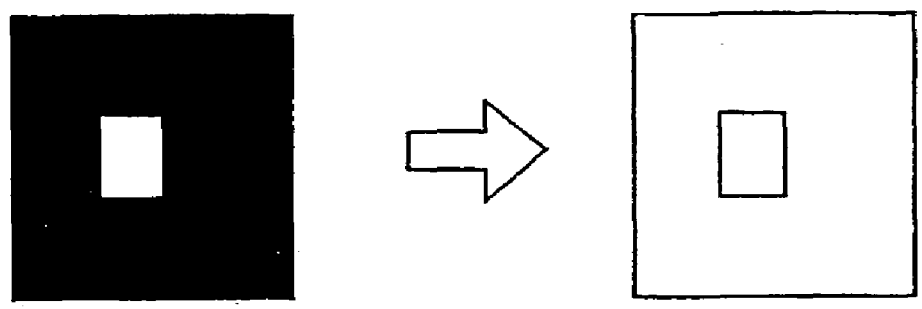

When at step S9 the reverse video element is not a character string, at step S10 a check is performed to determine whether the reverse video element is a solid color graphic pattern. If the reverse video element is a solid color graphic pattern, program control moves to step S13. At step S13, border data for the solid painted pattern, which are stored in advance in the RAM 32 (the fact that the solid color graphic pattern has been defined is equivalent to the fact that the border data has been set), are read from the RAM 32. The border information for the solid color graphic pattern is shown in FIG. 94B.

At step S14, the display of the solid color graphic pattern is replaced by a graphic pattern whose border information is displayed using the border display color. That is, the solid color graphic pattern is changed to a border graphic pattern that is consonant with the border data acquired at step S13 and that is displayed using a border graphic display color. The pertinent graphic pattern may be represented by a broken lines in order to distinguish it from an ordinary graphic pattern.

<Temporarily Specific Display Process (1)>

Figure 95:
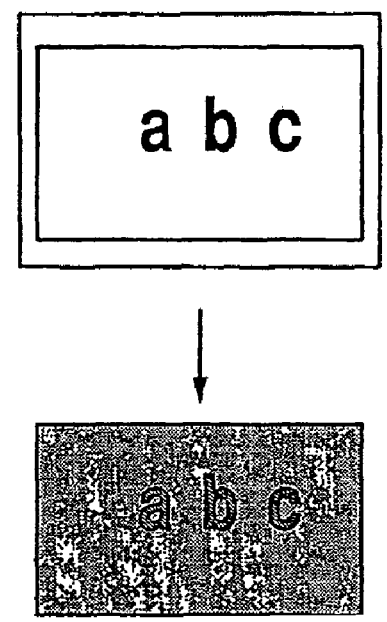
FIG. 95 is a diagram for explaining the temporarily specific display state of a reverse video element.

An explanation will now be given for the temporarily specific display processing during which a specific display color is employed to display an element that is selected or disabled in order to select an object in the interactive process, and in which a character string or a solid color graphic pattern, for which a reverse video attribute is designated, is selected as an object to be temporarily displayed. In this processing, as is shown in FIG. 95, when a background solid color graphic pattern and a reverse video element are selected as objects for the temporarily specific display process, these elements are displayed using a temporarily specific display color, which differs from the display color used for the normal temporarily specific display process, so that the selected elements can be easily distinguished from each other.

Figure 71:
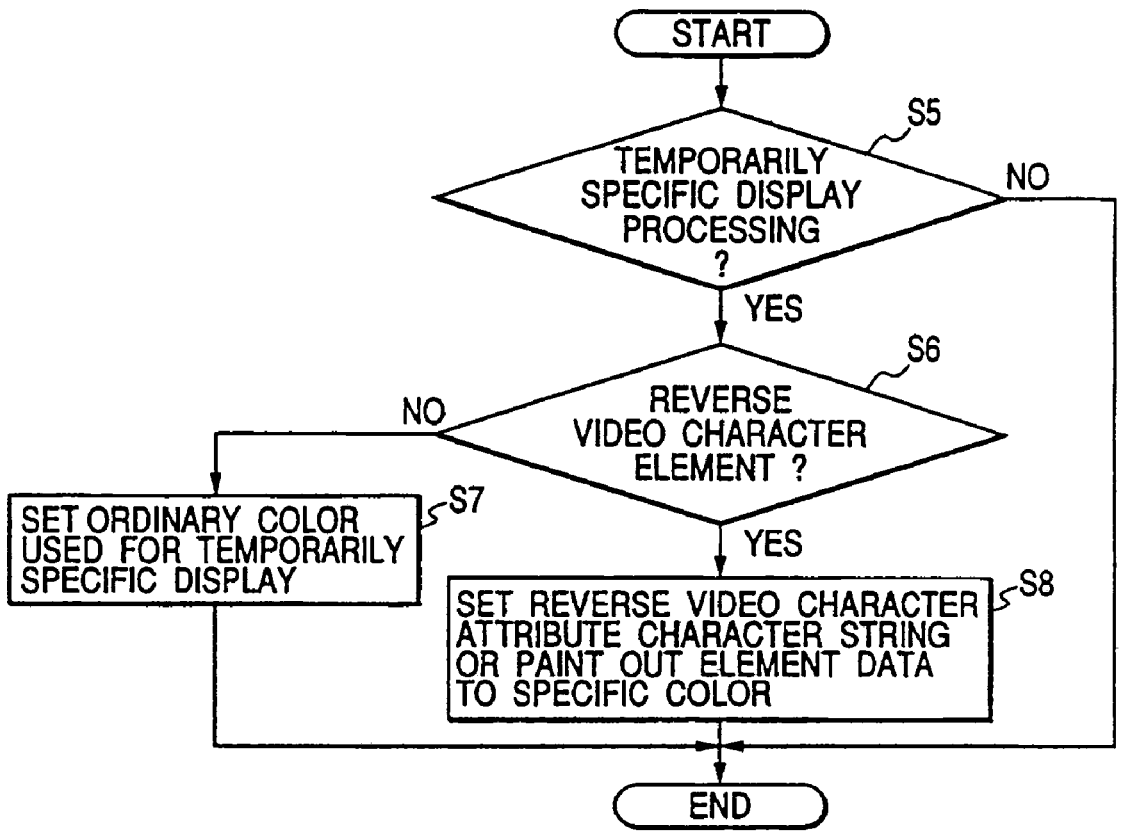
FIG. 71 is a flowchart for explaining the processing performed for the temporarily specific display.

FIG. 71 is a flowchart for explaining the temporarily specific display processing. First, at step S5, a check is performed to determine whether an element to be output is in the temporarily specific display state. Since a flag indicating whether an element is in the temporarily specific display state is set in advance in the RAM 32, the CPU 21 need only read the flag data from the RAM 32 and determines the state of the element.

When at step S5 the element is set in the temporarily specific display state, at step S6 a check is performed to determine whether the element to be output is a reverse video element. As is described above, since a flag indicating whether or not the element is a reverse video element is set in the RAM 32, the CPU 21 reads the flag data from the RAM 32 to perform the determination.

When at step S6 the element to be output is not a reverse video element, at step S7 the element is set to the normal color for a temporarily specific display. Since this color is stored in advance in the RAM 32, the color data is read from the RAM 32 and is transmitted to the output device to display the character string or the solid color graphic pattern using this color.

When at step S6 the element to be output is a reverse video element, program control moves to step S8. At step S8, the reverse video character string or the solid color graphic pattern is set to a specific color. This specific color (it differs from the color that is set at step S7 when an ordinary element other than a reverse video element is in the temporarily specific display state) is stored in advance in the RAM 32. Therefore, the CPU 21 need only read the color data from the RAM 32 and transmit them to the output device to display the character string or the solid color graphic pattern.

<Temporarily Specific Display Process (2)>

Figure 96:
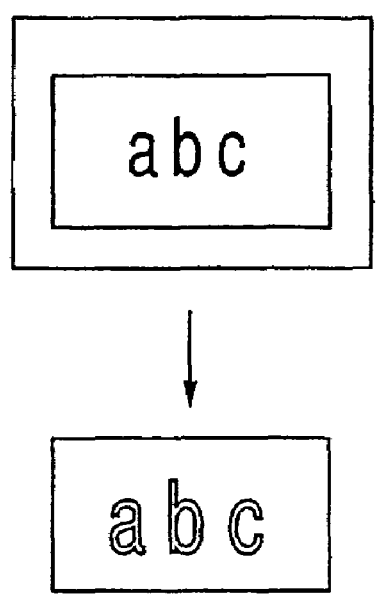
FIG. 96 is a diagram for explaining the temporarily specific display state of another reverse video element.

In the temporarily specific display process, the reverse video element is painted solid with a color that differs from that used for the ordinary temporarily specific display process. In the following process, as is shown in FIG. 96, a reverse video character string and a background solid color graphic pattern positioned behind the character string are selected as objects for the temporarily specific display process, the contour pattern for the character string or the border pattern for the solid color graphic pattern is displayed using the color, employed for the temporarily specific display process, that differs from the display color for of the object elements of the temporarily specific display process.

Figure 76:
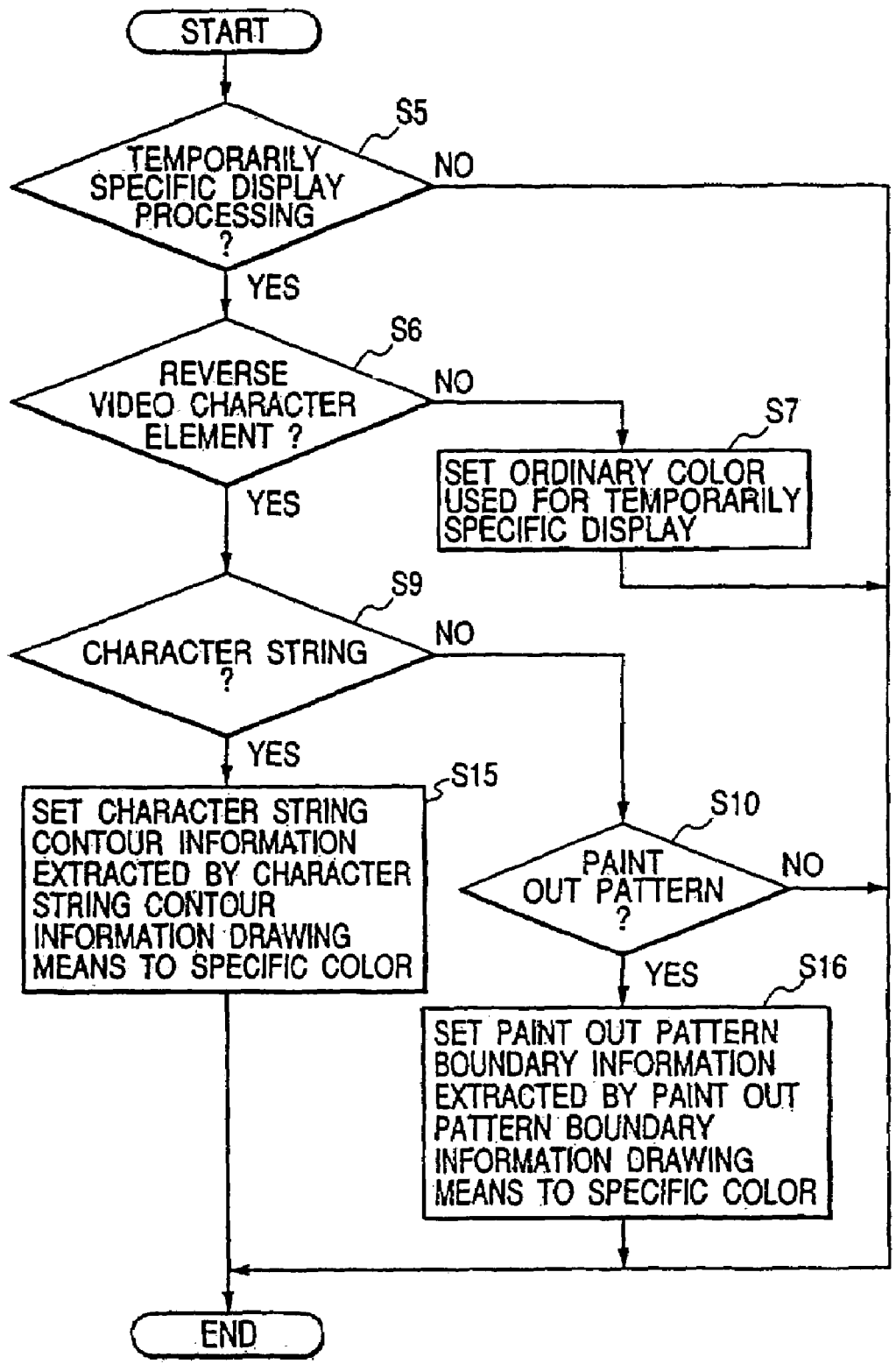
FIG. 76 is a flowchart for explaining the processing performed to output a reverse video element.

FIG. 76 is a flowchart for explaining the processing performed for the reverse video element output processing. Since steps S5 to S7 in FIG. 76 are the same as those in FIG. 71, and steps S9 and S10 are the same as those in FIG. 75, no further explanation for them will be given here.

At step S15 the contour information is extracted from a character string that is designated a reverse video display, and a specific color is set for the character string contour information. That is, the contour pattern for the character string, which is obtained using the same method as that at step S11 in FIG. 75, is displayed using a color that differs from the color used for the common temporarily specific display process, and the pertinent character string is replaced by the obtained contour pattern. The pertinent character string may be displayed by using broken lines to distinguish it from the common graphic pattern.

When the reverse video element is a solid color graphic pattern, program control moves from step S10 to S16. At step S16, the border information for the solid color graphic pattern is extracted, and is set to a specific color. That is, the border pattern for the solid color graphic pattern, which is obtained using the same method as that at step S13 in FIG. 75, is displayed using a color that differs from the color that is used for the common temporarily specific display process, and the pertinent graphic pattern is replaced by the obtained border pattern. The pertinent solid color graphic pattern may be displayed using broken lines in order to distinguish it from the common graphic pattern.

As is described above, according to this embodiment, during the interactive processing, the reverse video character string and the solid color graphic pattern can be distinguished from the background color, so that the editing job can be easily performed. In addition, since the display color is corrected using the brightness or the saturation, an adaptable display color that makes it easy for a user to visualize the background color can be set as the display color for the reverse video element. Therefore, when the reverse video character string or the solid color graphic pattern is arranged during the interactive process, the character data can be easily distinguished from the background and a display color can be employed that is close to that of the print image. As a result, the editing job can be easily performed. In addition, the following effects are obtained: (1) a smaller memory capacity is required for storing reverse video information than for storing background color information; (2) the color of a reverse video element need not be changed when the background color is changed (because this is processed in accordance with the background color, as is shown at steps S3 and S4 in FIG. 65); (3) the number of procedures for setting the reverse video is smaller than the number for matching the color to the background; (4) a flexible process can be performed at the output destination, such as the display device or the printer, to display the reverse video element; (5) the same process is performed for inverting the display color on the display device as for initiating the interactive processing (because as is shown at steps S2 and S4 in FIG. 65, the destination output is determined first and the process that is performed depends on the output destination); and (6) the same process can be employed for a color display device or a monochrome display device (because the saturation or the brightness is changed in the color process).

As is described above, according to the sixth embodiment, an adequate output color is set for the reverse video element, so that it is always easy to identify the reverse video element during the interactive editing process.

(g) Seventh Embodiment

In a seventh embodiment, in addition to the creation of new text and correction of text, the position of a specific character is designated to arrange a character string.

When the "create" menu button is selected, the text editing panel 3501 shown in FIG. 35 is displayed on the display device 41. One of specific character selection buttons 3507, either "standard" or "set", is selected on the text editing panel 3501 and established. Then, a new character string can be created at the specific character position.

Figure 97:
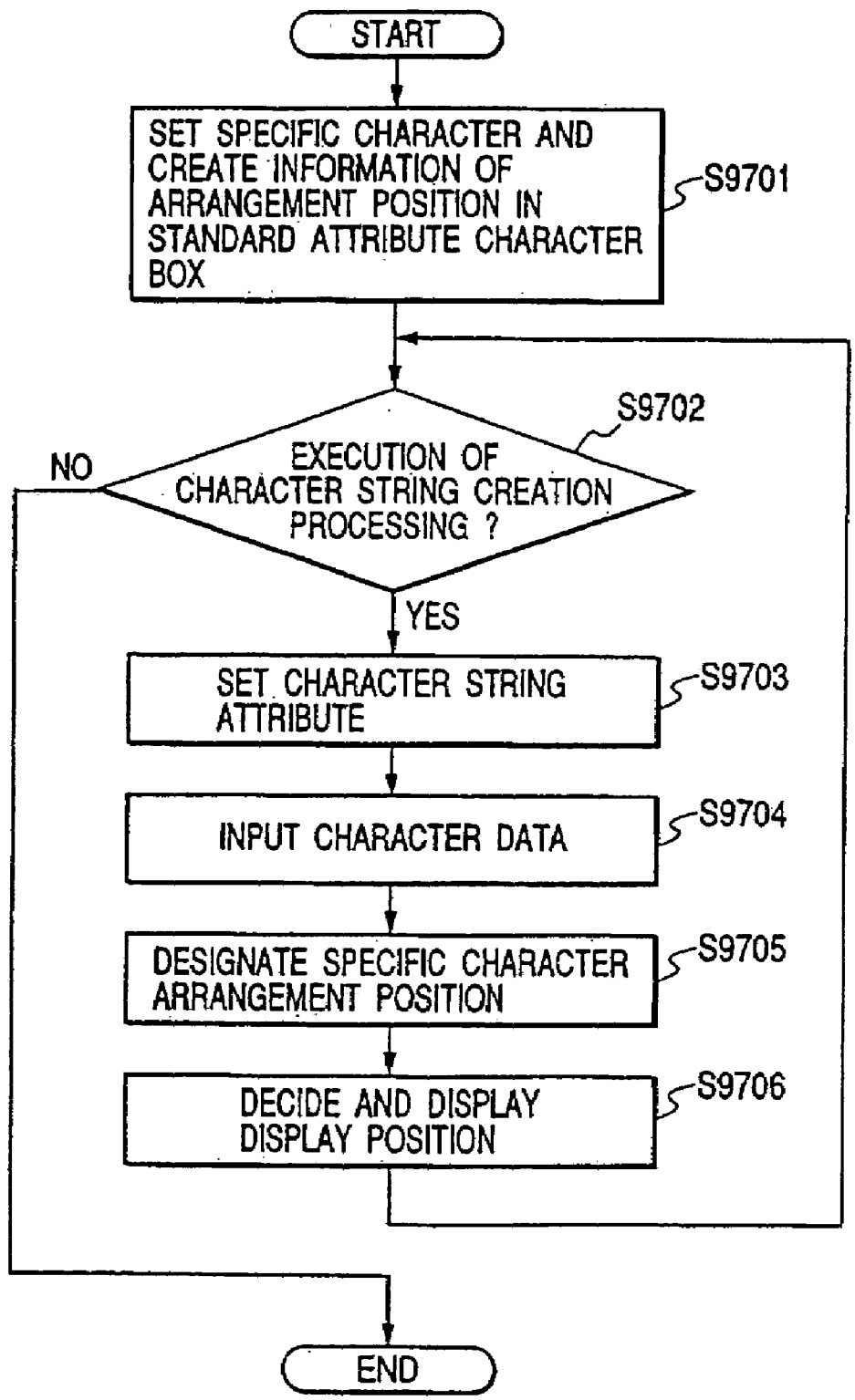
FIG. 97 is a flowchart for explaining the character string arrangement processing performed to create a new character string.

FIG. 97 is a flowchart for explaining the new text creation processing for designating the position of a specific character to arrange a character string. Before the explanation of the new text creation processing, a body, a character sting box, a circumscribed rectangle for a character contour and a standard attribute will be described.

The body is a box for which the height is represented by a character size x a vertical scale, and the width is represented by a horizontal distance between the origin of the character to the origin at which the next character is to be normally located x a horizontal scale. Therefore, the height of the body is same for each character in accordance with the character size and the vertical scale, while the width of the body differs for each character. The horizontal distance from the origin of a character string to the origin at which the next character string should normally be located is called a character string box.

The circumscribed rectangle for the character contour will now be described. The character contour is represented by contour information obtained at step S3404 in FIG. 34, and a rectangle that is circumscribed with the contour is called a circumscribed rectangle. The calculation method for the circumscribed contour at step S1303 in FIG. 13 is employed.

The standard attribute will now be explained. The standard attribute is a character attribute used as a reference. In the above described (g) Character string attribute, the character size of 100 [point], the vertical scale of 100%, the horizontal scale of 100%, the baseline rotate angle of 0 [radium] and the oblique angle of 0 [radium] are set for each typeface. The information for the character contour in the body of the standard attribute is called information for the arrangement position in the standard attribute body, and consists of parameters: left empty portion size Dls, character contour circumscribed rectangle width Drw, character contour circumscribed rectangle height Drh, and right empty portion size Drs. When the standard attributes are set, the information for the position in the standard attribute body can be easily employed for conversion of another attribute. In FIG. 107 is shown a file format for the information for the position in the standard attribute body that is stored in the external storage device 33. The name of parameters in FIG. 107 are used in common with those in FIG. 106.

In FIG. 97, first, a specific character is designated, and the information for the position in the standard attribute body of that character is read from the ROM 31 (step S9701).

Figure 116:
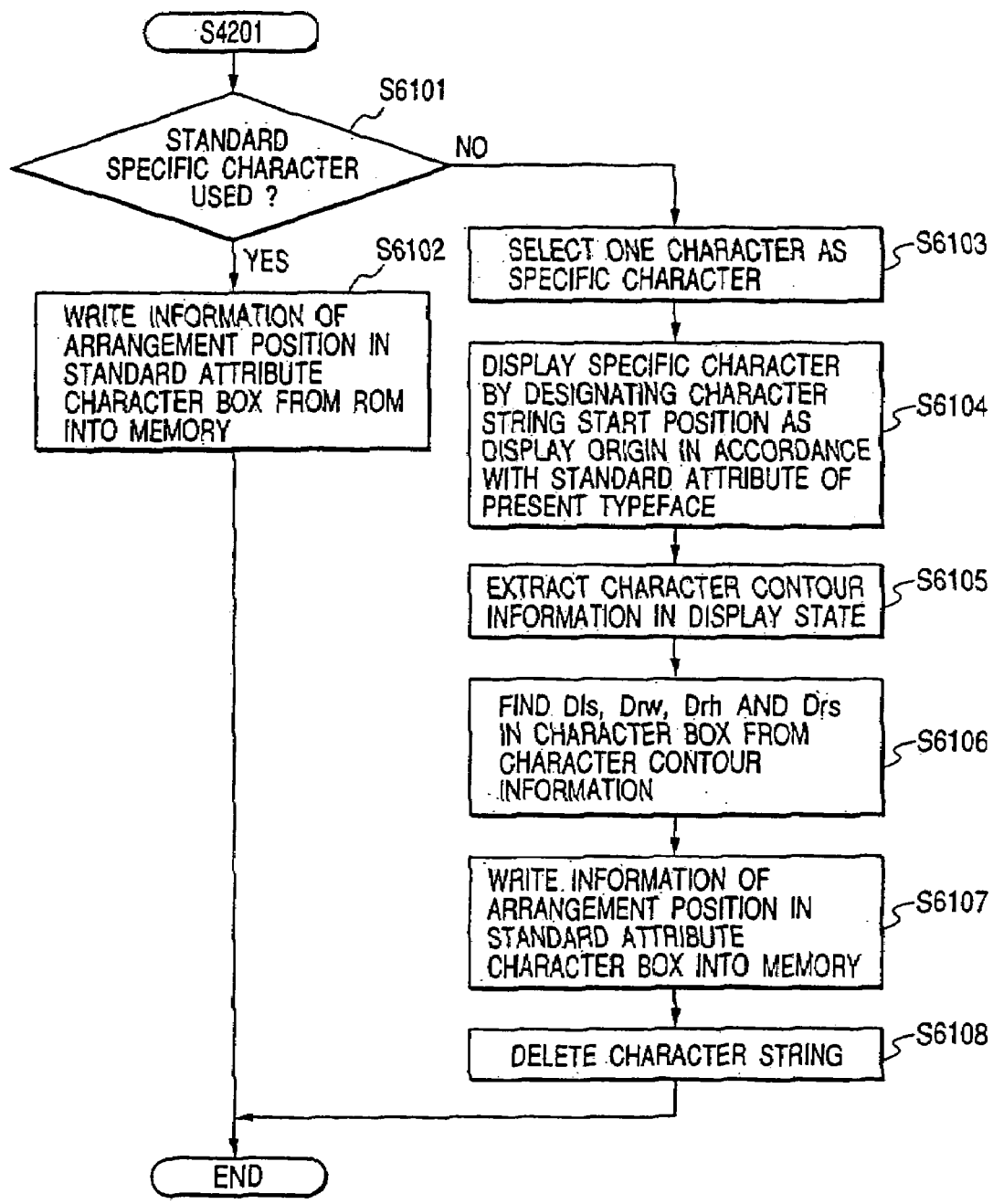
FIG. 116 is a flowchart for explaining the processing performed to set a specific character and to prepare arrangement position information in a standard attribute character box.

FIG. 116 is a flowchart for explaining the processing at step S9701 for setting a specific character. To set a specific character, as is shown in FIG. 116, first, a check is performed to determine whether a standard specific character should be employed (step S6101).

When a specific character selection button 3506 is selected on the text editing panel 3501, the use of the standard specific character is designated. The information for the position in the standard attribute body is stored in the ROM 31 for one character that is determined in advance as a standard specific character. Therefore, when the standard specific character is employed, the information for the position in the standard attribute body is loaded from the ROM 31 to memory (step S6102).

When a character other than the standard specific character is employed, the specific character selection button 3506 is selected on the text editing panel 3501, and one character is entered to designate a specific character (step S6103). Then, information for the position in the standard attribute body is prepared for the character that is entered in the specific character area 3507 for the typeface that is designated on the typeface name list 3502 of the text editing panel 3501. First, the typeface and the standard attribute are set, and the designated specific character is displayed, while the character string start position is regarded as the display origin (step S6104). The size of the body and the location of the character in the body are included in the font. Then, the character contour information is extracted (step S6105). The contour information is employed to obtain the width of the left empty portion in the body, the height and width of the circumscribed rectangle and the width of the right empty portion (step S6106). The obtained information for the position in the standard attribute body is stored in the memory (step S6107). The pertinent character string is deleted (step S6108). As previously described, the "display" here means the transmission of data to the display device 41, and need not be visible.

Referring back to FIG. 97, a check is performed to determine a character string creation process is to be performed (step S9702). When the delete button on the text editing panel 3501 is selected, the creation process is terminated.

When the delete button is not selected, a character string attribute is set (step S9703).

Then, the character data are entered by the keyboard 11 and stored in the RAM 32 (step S9704).

Following this, the position of the specific character is designated (step S9705). To designate the position, the point coordinate input method, the arbitrary point input method, the point input method by point element selection, the feature point input method, the intersection designation method and the on-line point designation method, all of which were previously described, can be employed. In the layout, the designated position corresponds to the position that is selected for a specific character in the character string by using the specific character reference position selection button 35087 on the text editing panel 3501. The display position of the character string is determined and the character string is displayed (step S9706).

Figure 98:
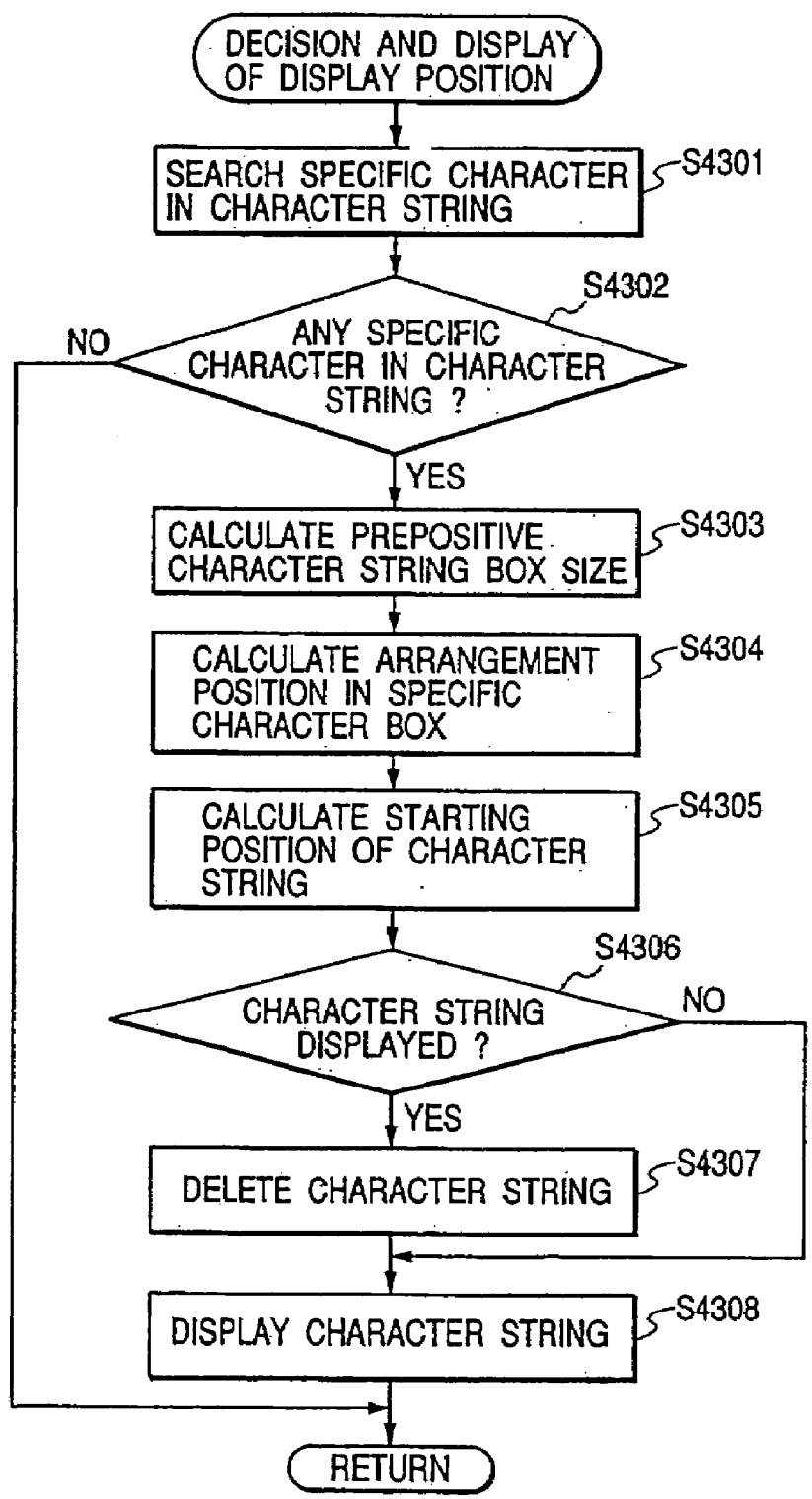
FIG. 98 is a flowchart for explaining the processing performed to employ a prepositive character string box size to determine the display position for a character string.

The processing at step s9706 for determining the display position of the character string will now be explained. FIG. 98 is a flowchart showing the processing for calculating a character string box size to determine the display position of the character string.

Figure 99:
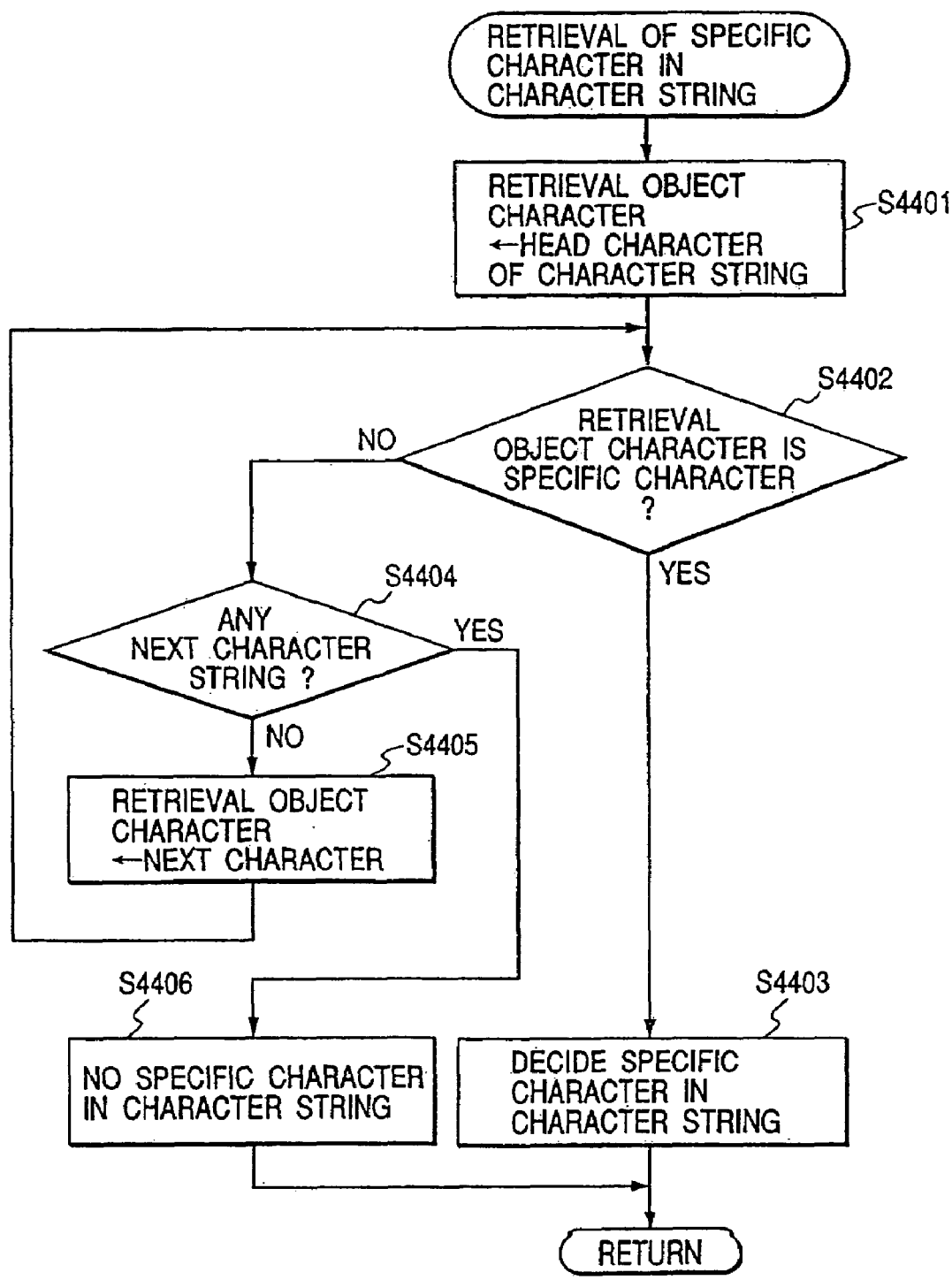
FIG. 99 is a flowchart for explaining the processing performed to retrieve a specific character in a character string.

First, a specific character in a character string is searched for (step S4301). FIG. 99 is a detailed flowchart for explaining the process for searching for a specific character in the character string. In FIG. 99, first, an object character for a search is set as the head character of the pertinent character string (step S4401). A check is performed to determine whether the object character is a specific character (step S4402). If the object character is not a specific character, the next character is set as the object character for the search, and program control returns to step S4402 (steps S4404 and S4405). When all the characters in the character string have been processed, there is no character to be designated, program control moves from step S4404 to step S4406, whereat it is ascertained that no specific character is present in the pertinent character string.

When the object character is a specific character, that character is determined as a specific character in the pertinent character string, and the processing is thereafter terminated (step S4403).

As is shown in the above processing, in this embodiment, a specific character is searched for from the beginning of the character string, and the search is halted when a specific character is found. When a plurality of specific characters are present in the character string, a character close to the head of the character string is selected as a specific character. When no specific character is present in the character string, the result indicating that a specific character is not included in the character string is provided.

Figure 117:
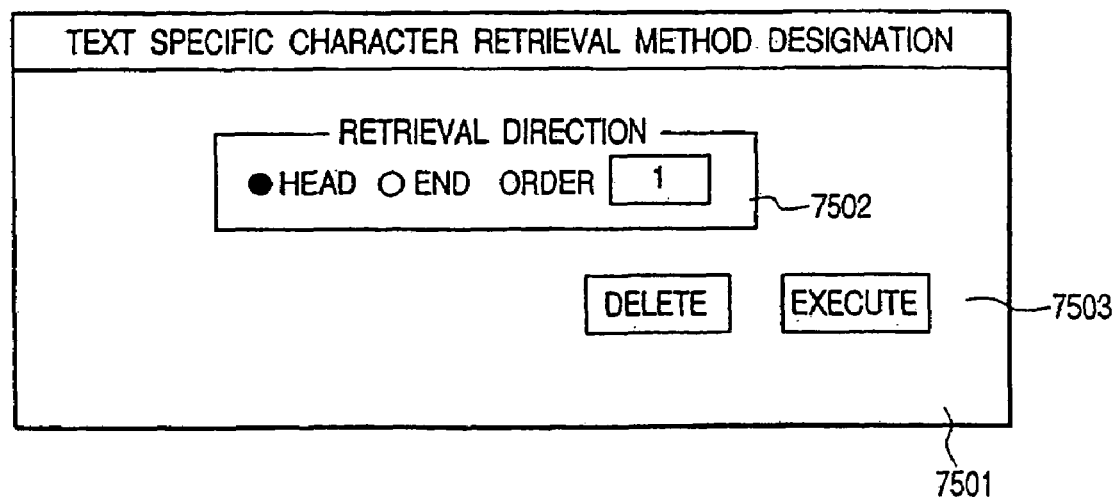
FIG. 117 is a diagram showing an example designation panel for a text specific character retrieval method.

When a plurality of specific characters are present, a user can employ the text specific character retrieval method designation panel 7501 in FIG. 117 to designate the position of a character from the head of the character string, so that it can be actually defined as a specific character. For example, when the end button in a retrieval direction setting area 7502 and the order is set to "1", a character close to the end in the character string can be designated as a specific character.

Figure 115:
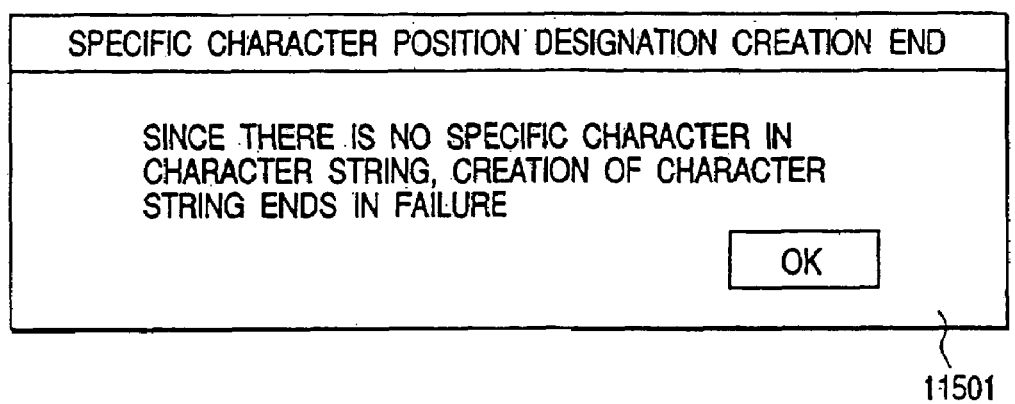
FIG. 115 is a diagram showing an example message panel for designating/creating a position for a specific character in text.

When the search of the specific character has been completed, a check is performed to determine whether a specific character is present in the character string (step S4302). When a specific character is not found in the character string, a message panel 11501 shown in FIG. 115 is displayed, and the display process for the character string is terminated. Then, the text editing panel 3501 is displayed.

When a specific character is found, the size of a prepositive character string box is calculated that is extended from the head character of the character string to the preceding character of the specific character that is found (step S4303). The prepositive character string box is a box for a character string that is extended from the head character of the pertinent character string until the preceding character of the specific character.

Figure 108:
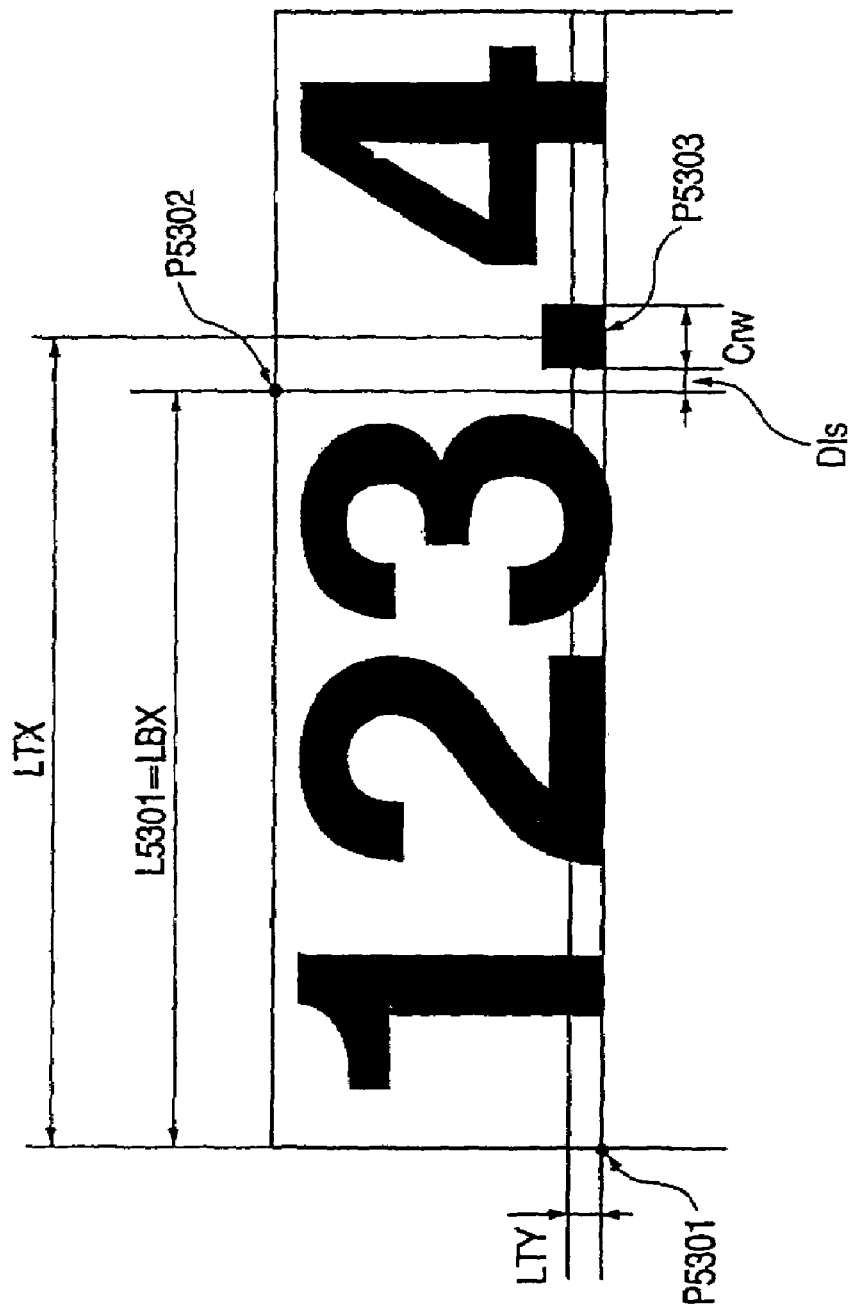
FIG. 108 is a diagram showing an example display for numerical data when a period is designated as being a specific character.

FIG. 108 is a diagram showing an example numerical string when a specific character reference position is in the middle. In FIG. 108 the prepositive character string box is that for character string "123". Therefore, at step S4304 the box size L5301 for the character string "123" is calculated. Since the distance to the origin of the next character differs depending on the typeface, the character box size is varied in accordance with the typeface. Since the information processing apparatus of the present invention implements the WYSIWYG function as is shown in FIG. 2, the data with the printing attributes being added are displayed on the display device 41 in the same form as being printed.

When, for example, the WYSIWYG function is implemented by the display postscript (DPS), the character data can be displayed with the designated attributes, and the postscript (PS) instruction (operator) for the character data need only be issued to extract the body size and contour information of the character data. In the example in FIG. 108, therefore, the character data "123" are displayed with the designated attributes and the box size is obtained in response to the PS instruction.

Figure 100:
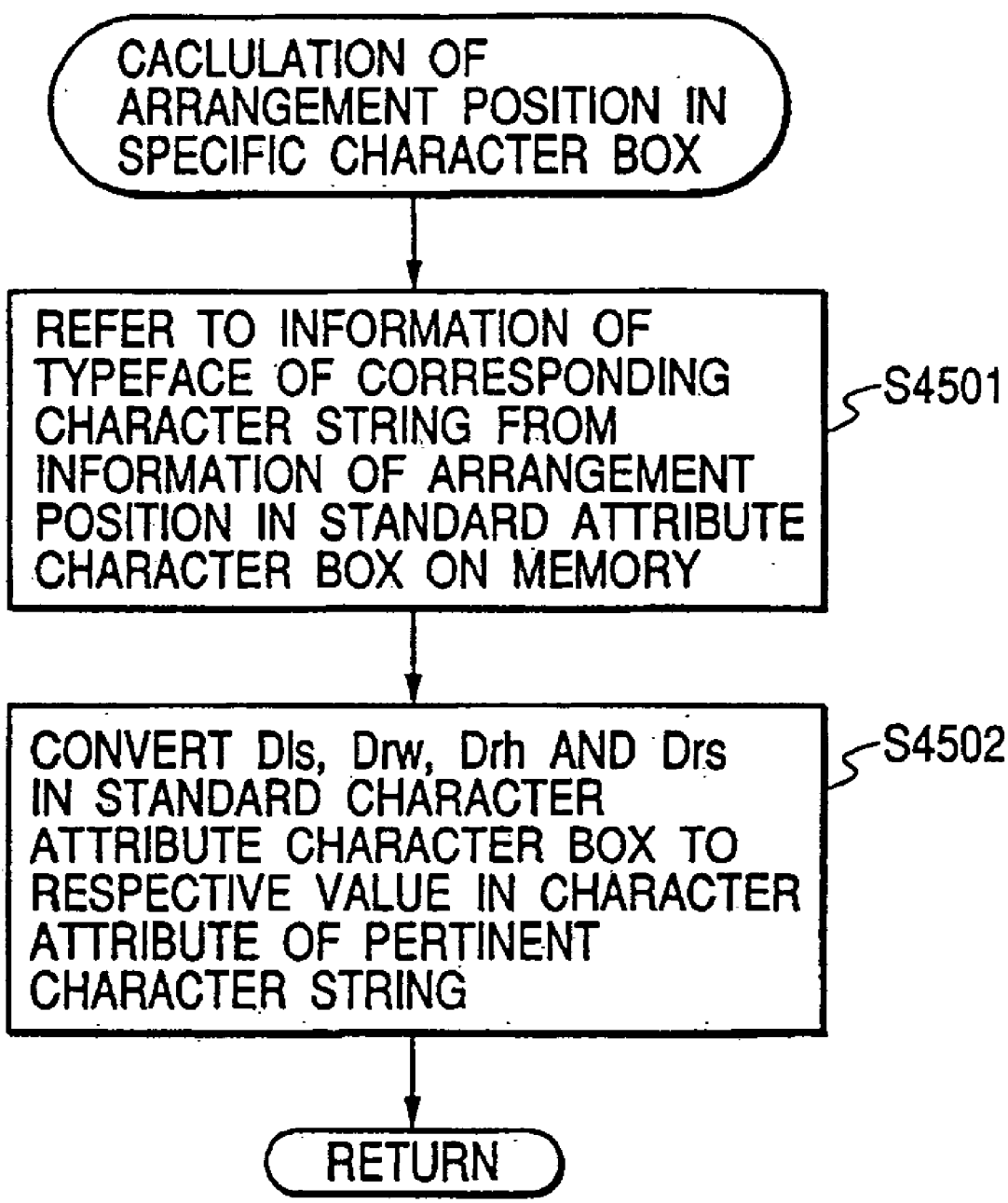
FIG. 100 is a flowchart for explaining the processing performed to calculate the position at which a specific character is arranged in a character box.

Following this, the arrangement position in the specific character box is calculated (step S4304). FIG. 100 is a flowchart for explaining the processing for calculating the position in the specific character box. First, at step S4501, the information for the position in the standard attribute body stored in the ROM 31 is employed to refer to the information of the font name that is set at step S4203.

Figure 106:
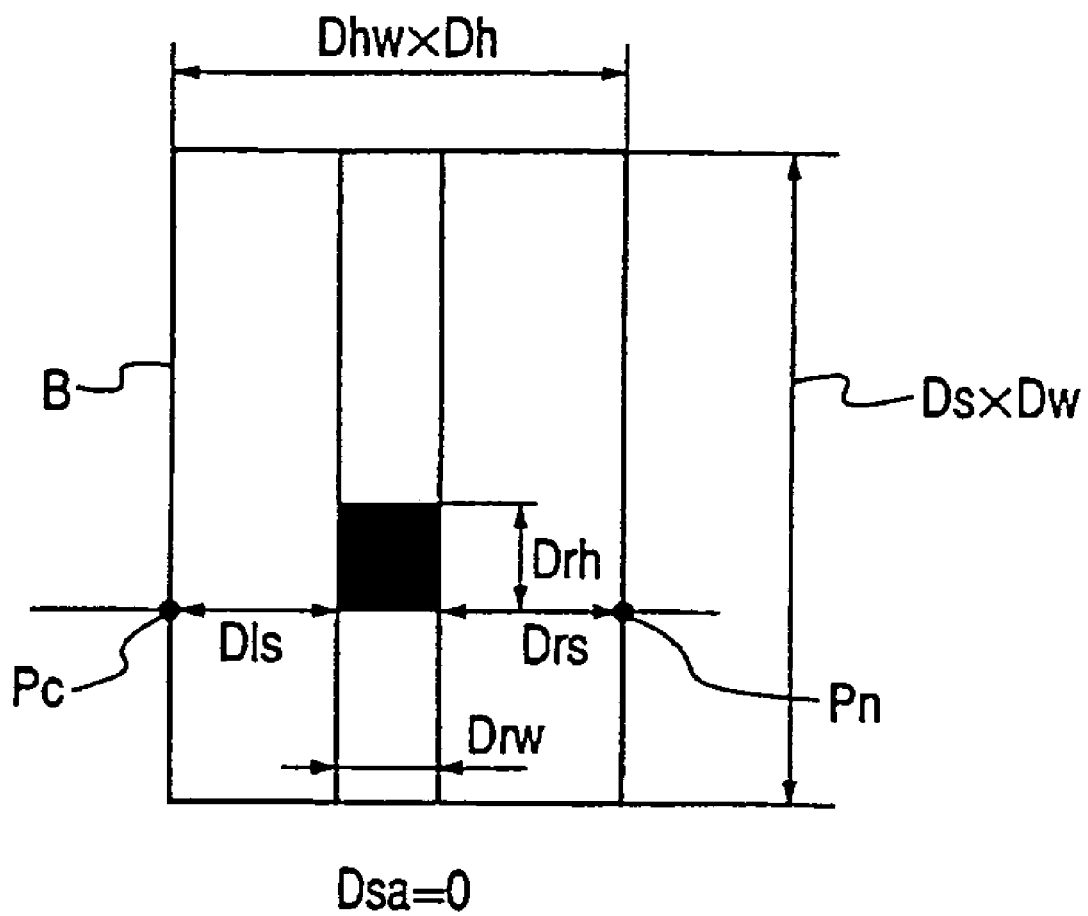
FIG. 106 is a diagram showing a character box and the contents of the arrangement position information included in a character box having standard character attributes.

At step S4502, the information for the position in the standard attribute body in FIG. 106 is converted to the attribute value that is set at step S4203. In this embodiment, the information for the position in the specific character body having the designated attribute, the left empty portion size Cls, the right empty portion size Crs, the width Crw of circumscribed rectangle width, and the height Crh of the circumscribed rectangle, all of which are shown in FIG. 108, are calculated by using the standard attribute character size of Ds [point], the vertical scale of Dh [%], the horizontal scale of Dw [%], the oblique angle of Dsa [radium], the designated attribute character size of Cs [point], the vertical scale of Ch [%], the horizontal scale of Cw [%], the oblique angle of Csa [radium], the left empty portion size of Dls of the information for the position in the standard attribute body, the right empty portion size of Drs, the width Drw of the character contour circumscribed rectangle, and the height Drh of the character contour circumscribed rectangle. In FIG. 106, B denotes a character box; Pc, a character origin; and Pn, the origin of the next character. The horizontal width Dhw is not converted.

$$Crw = Drw \times (Cs \times Ch/100)/(Ds \times Dh/100) + (Cs \times Cw/100) \times \tan Csa \quad (4)$$

$$Crh = Drh \times (Cs \times Cw/100)/(Ds \times Dw/100) \quad (5)$$

$$Cls = Dls \times (Cs \times Ch/100)/(Ds \times Dh/100) \quad (6)$$

$$Crs = Drs \times (Cs \times Ch/100)/(Ds \times Dh/100) \quad (7).$$

The display start position of the character string is calculated (step 4305). In the following example, the "center" is selected as the specific character reference position on the selection area 3503 in FIG. 35.

Figure 101:
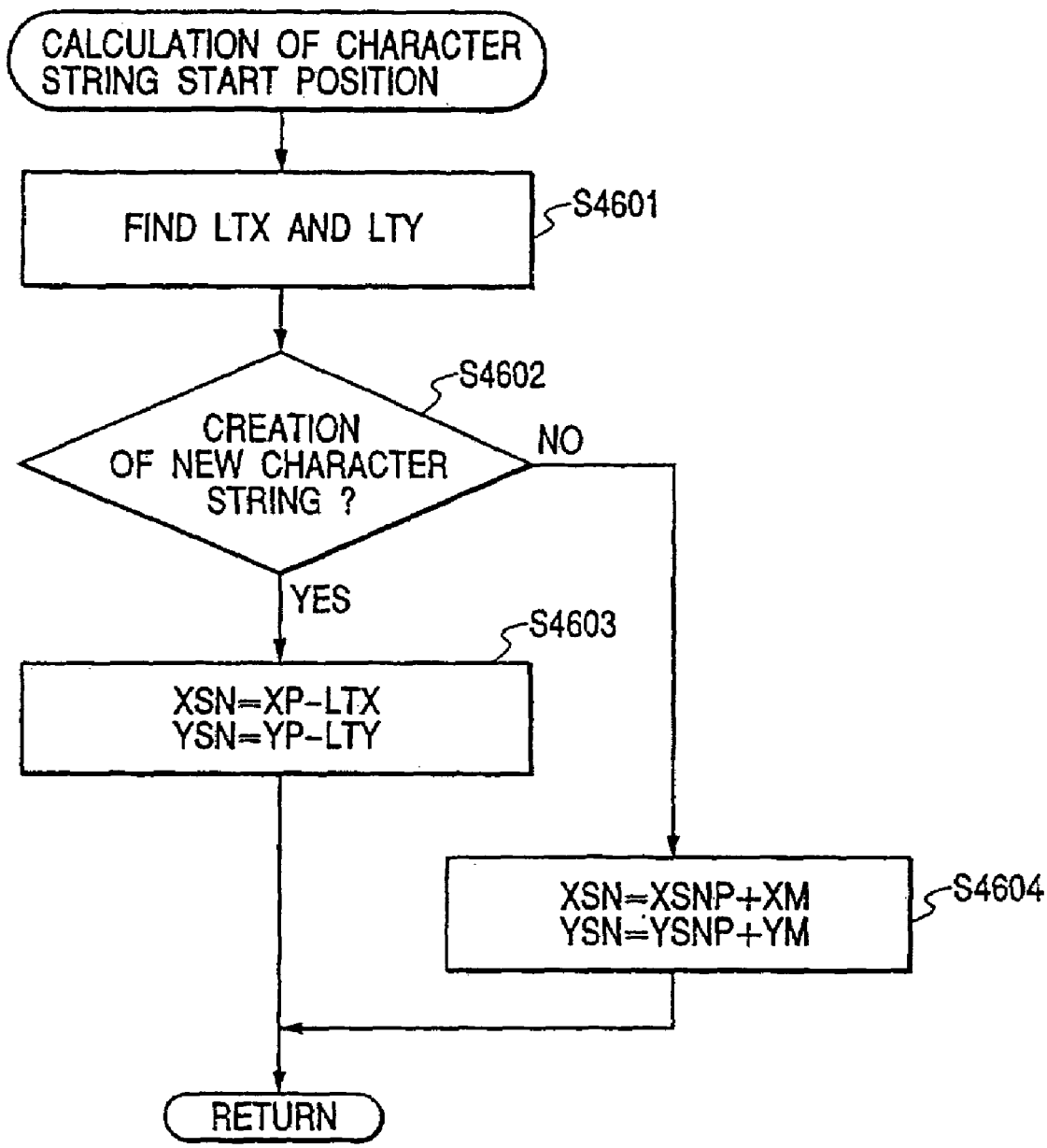
FIG. 101 is a flowchart for explaining the processing performed to calculate the starting position of a character string by using a prepositive character string box size.

FIG. 101 is a flowchart for explaining the processing for calculating the start position of the character string. First, the horizontal distance LTX and the vertical distance LTY up to the center of the circumscribed rectangle of the specific character that is found at step S4301 are calculated (step S4601). The horizontal distance LBX of the character box size and the vertical distance LBY up to the preceding character of the specific character, which are obtained at step S4303, and the left empty portion size Cls of the specific character and the width Crw of the character contour circumscribed rectangle, which are obtained at step S4304, are employed to represent $$LTX = LBX + Cls + Crw \times 0.5 \quad (8)$$

$$LTY = Crh \times 0.5 \quad (9).$$

When the specific character reference position is designated as top left, equations (8) and (9) are represented as $$LTX = LBX + Cls \quad (10)$$

$$LTY = Crh \quad (11).$$

The LTX and LTY are determined by designating the specific character reference position. The LBY is used to calculate the bottom left point (starting point) of the character string when the operator selects, as the specific character arrangement position, the top left on the specific character reference position area 3503 in FIG. 35.

In the creation process for a new character string, the specific character position (XP, YP) designated at step S4205 and the above described LTX and LTY are employed to represent the coordinates (XSN, YSN) of the start of the character string as follows (steps S4602 and S4603):

$$XSN=XP-LTX \quad (12)$$

$$YSN=YP-LTY \quad (13)$$

Figure 109A:
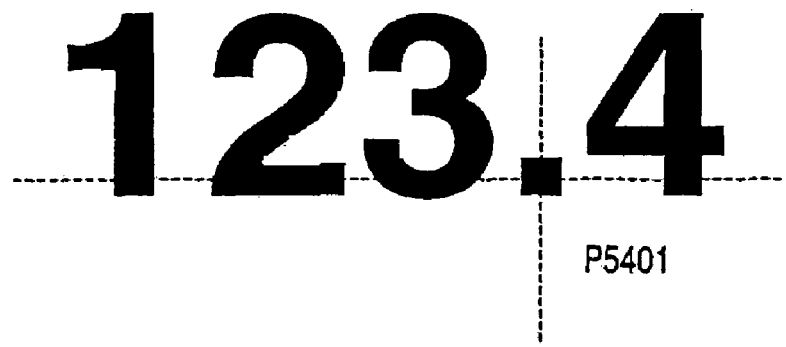
FIGS. 109A and 109B are diagrams showing example displays for a character string when a period is designated as being a specific character.
Figure 109B:
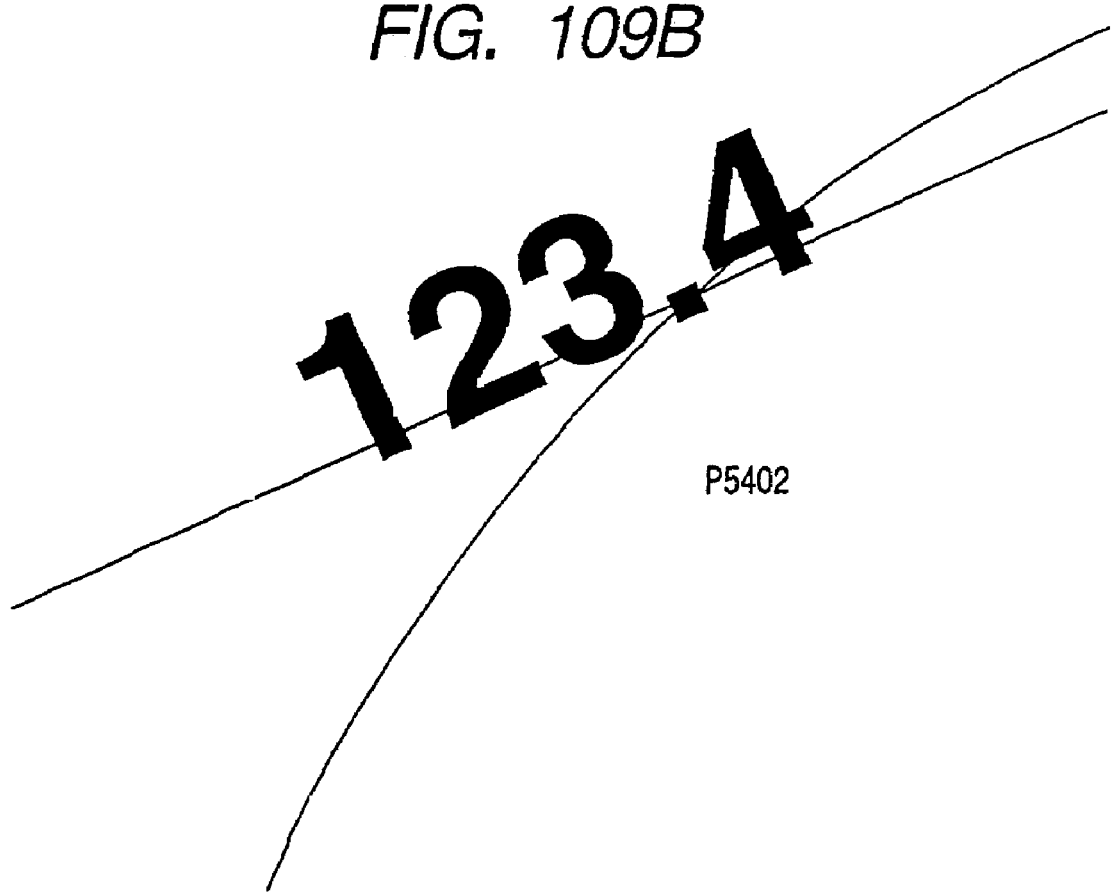

Example values for them are shown in FIG. 108. In FIG. 108, point P5301 is the coordinate point for the start of the character string, i.e., the bottom left point of the body, point P5302 is the top right point of the prepositive character string box, and point P5303 is the arrangement position of the specific-character. The character string is displayed in the drawing area 62 (step S4308). In FIGS. 109A and 109B are shown example character strings for which a period is designated as a specific character and the center is designated as the specific character reference position. In an output example in FIG. 109A, the font name is HelveticaN-ueu-Bold, and the character string direction is horizontal. In an example in FIG. 109B, the character for which the character string direction is set is arranged at the intersection of an arc and a line segment. When the character string direction is set, the previously described horizontal direction corresponds to the character string direction. The vertical direction is perpendicular to the character string direction. In FIG. 109A, point P5401 that is already present in the drawing area 62 is selected as the specific character position. In FIG. 109B, two elements (a line segment and an arc) that already exist in the drawing area 62 are selected and its intersection is designated as the specific character position.

Figure 105:
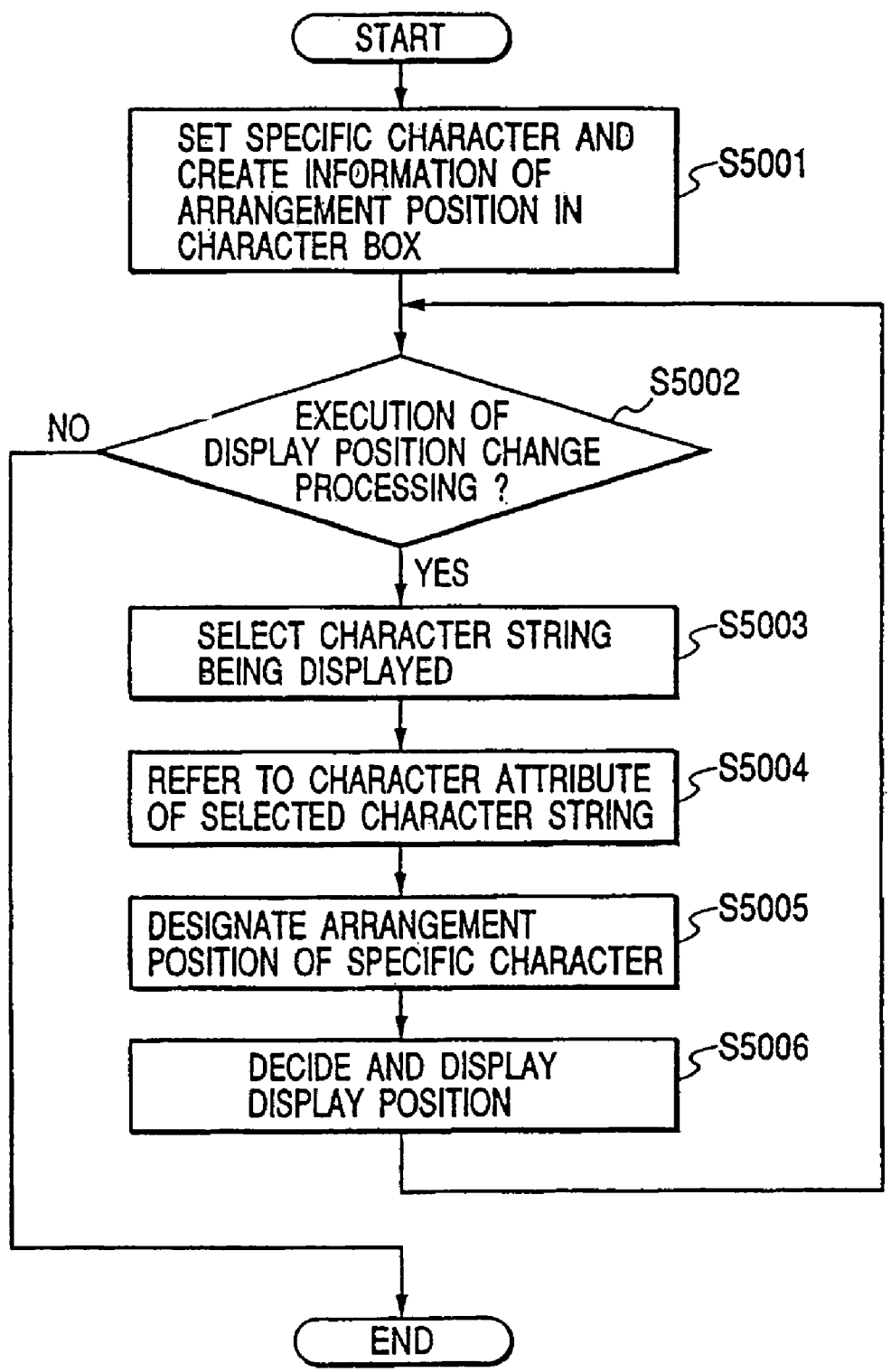
FIG. 105 is a flowchart for explaining the processing performed to arrange a character string that is being displayed.

An explanation will now be given for a case where a character string currently displayed in the drawing area 62 is selected, and a specific character in the character string is arranged at a designated position. FIG. 105 is a flowchart for explaining the processing for the character arrangement processing for a character string that is being displayed.

First, a specific character is set and information for the position in the standard attribute body is prepared (step S5001). This process is the same as that at step S4201.

A check is performed to determine whether the character string display position change process is to be performed (step S5002). When the delete button is selected on the text editing panel 3501, the display position change process is terminated.

A character string for which the display position is to be changed is selected from the character string displayed in the drawing area 62 (step S5003). Character data and character attributes that are stored for the selected character string in the RAM 32 are examined (step S5004). The the arrangement position of the specific character is designated (step S5005). This process is the same as that at step S4205.

Finally, the display position of the character string is determined and the character string is displayed at that position (step S5006). This process is substantially the same as that at step S4206, except for the following process.

(1) Calculation of a Character String Start Position

In the flowchart in FIG. 101 for the display position change process for a conventional character string, at step S4601 the LTX and LTY are obtained, and program control moves from step S4602 to S4604. The specific character arrangement position (XP, YP), which is obtained at step S5005, and the display start position (XS, YS) of the current character string, which is referred to at step S5004, are employed to calculate new character string start coordinates (XSN, YSN) of the character string.

For example, the X coordinate value is represented as [new character string start horizontal coordinates XSN]= [current character string display start horizontal coordinate XSNP]+[character string display start horizontal traveling distance XM]. The character string display start horizontal traveling distance XM is represented as [new specific character position XP–current specific character position XPP]. The current specific character position XPP is represented as [current character string display start horizontal coordinates XSNP+LTX]. Therefore, [new character string start horizontal coordinates XSN]=[current character string display start horizontal coordinate XSNP]+[new specific character position XP]–[current specific character position XPP]= [current character string display start horizontal coordinates XSNP]+[new specific character position XP]–([current character string display start horizontal coordinates XSNP]+ LTX)=[new specific character position XP]–LTX.

As a result, the new character string start coordinates (XSN, YSN) are calculated by employing the new specific character arrangement position (XP, YP) as follows:

$$XSN=XP-LTX \quad (14)$$

$$YSN=YP-LTY \quad (15).$$

(2) Display of a Character String

When, at step S4306, the character string is displayed in the drawing area 62, it is erased from the drawing area (step S4307). In this process, not only the character string is invisible in the drawing area 62, but also the data for the character string are deleted from the RAM 32.

In the above description, the character string box (prepositive character string box) is obtained for a prepositive character string that extends from the head character to the preceding character of the specific character, and the arrangement of the character string is determined. However, the arrangement of the character string is not limited to this form. As another form, a circumscribed rectangle of a character string that consists of the prepositive character sting and the specific character can be employed. An explanation will now be given for the character string arrangement method using such a circumscribed rectangle.

Figure 102:
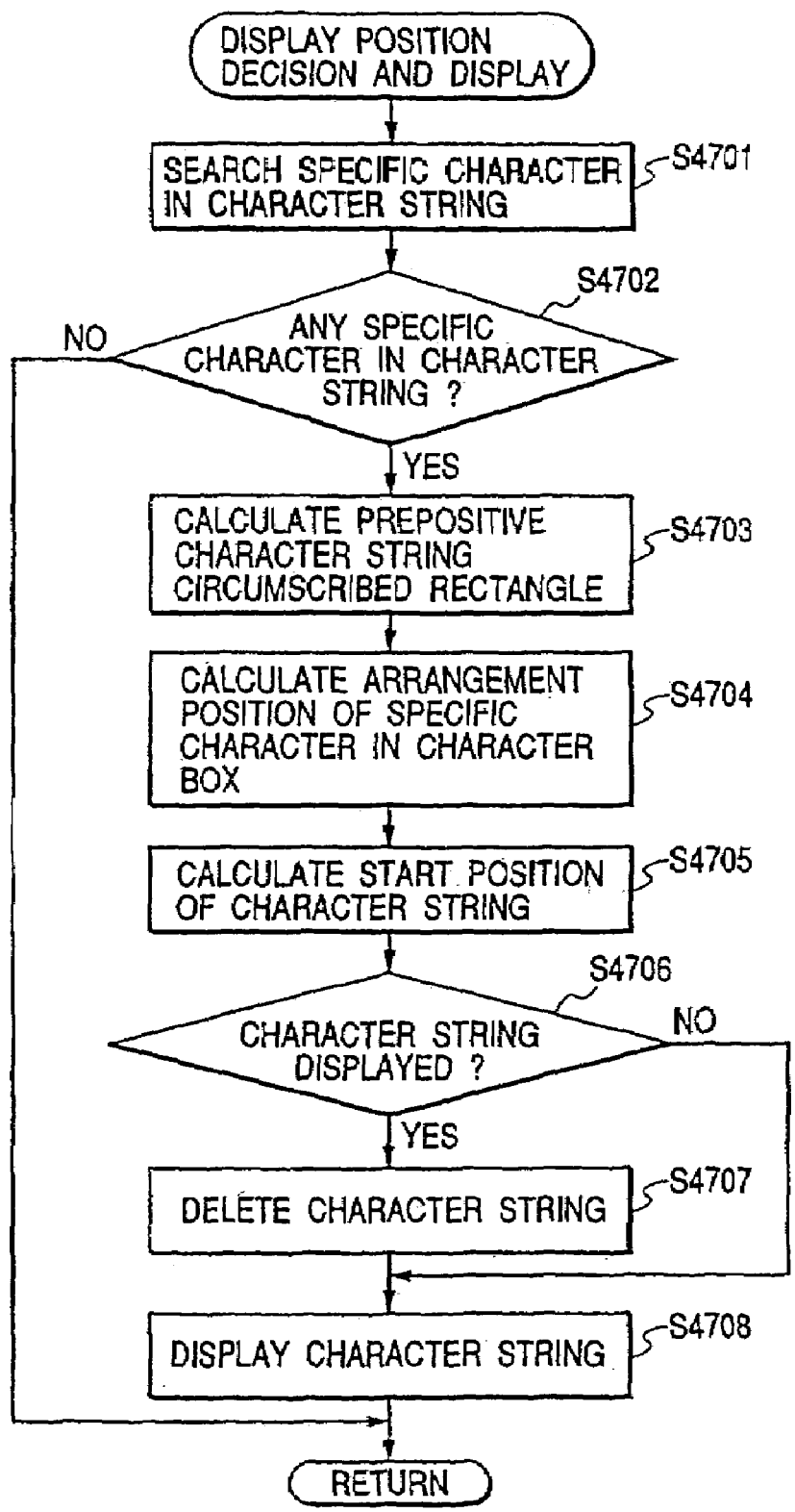
FIG. 102 is a flowchart for explaining the processing performed to determine a display position for a character string using a prepositive character string circumscribed rectangle.

FIG. 102 is a flowchart for explaining the processing for using a circumscribed rectangle of a character string that consists of a prepositive character string and a specific character to determine the arrangement position of a character string. An explanation will now be given for the processing for calculating a new display start position of a character string by using the circumscribed rectangle information relative to the character string contour information. The processing in FIG. 102 is substantially the same as that in FIG. 98, except for the following process.

(1) A circumscribed rectangle is calculated for a character string that is extends from the head character to the specific character (hereinafter referred to as a prepositive character string circumscribed rectangle) (step S4703).

Figure 111:
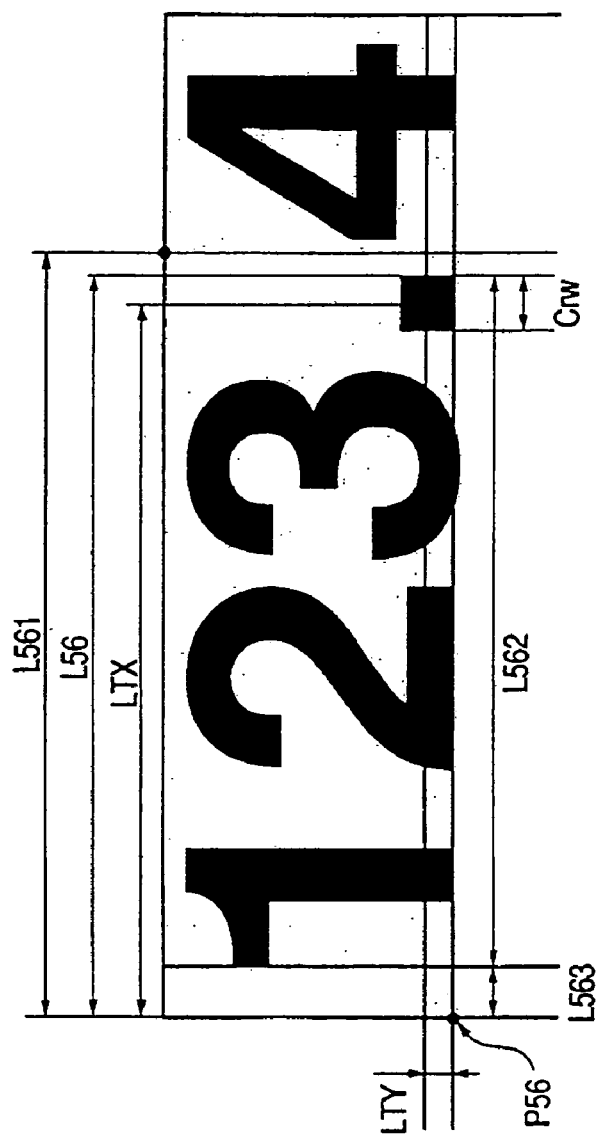
FIG. 111 is a diagram showing an example numerical data display when a period is designated as being a specific character.

FIG. 111 is a diagram showing example numerical data for which a period is defined as a specific character. In this case, the size L56 is obtained that extends from the starting point of the character string "123" until the right edge of the circumscribed rectangle of the period. First, the character data "123" are displayed using the WYSIWYG function to calculate the character string box size L561, the contour information, and the circumscribed rectangle L562 for the contour information (prepositive character string circumscribed rectangle). At this time, the character string box size and the prepositive character string circumscribed rectangle are employed while the character string starting point P56 is used as the origin (0, 0). As a result, the distance L563 can be obtained that is extended from the character string starting point P56 to the left edge of the prepositive character string circumscribed rectangle. Therefore, L56 is represented as $$L56=L562+L563 \qquad (16)$$

(2) The distance L56 obtained at step S4703 is employed to calculate the start position of the character string (step S4705).

Figure 103:
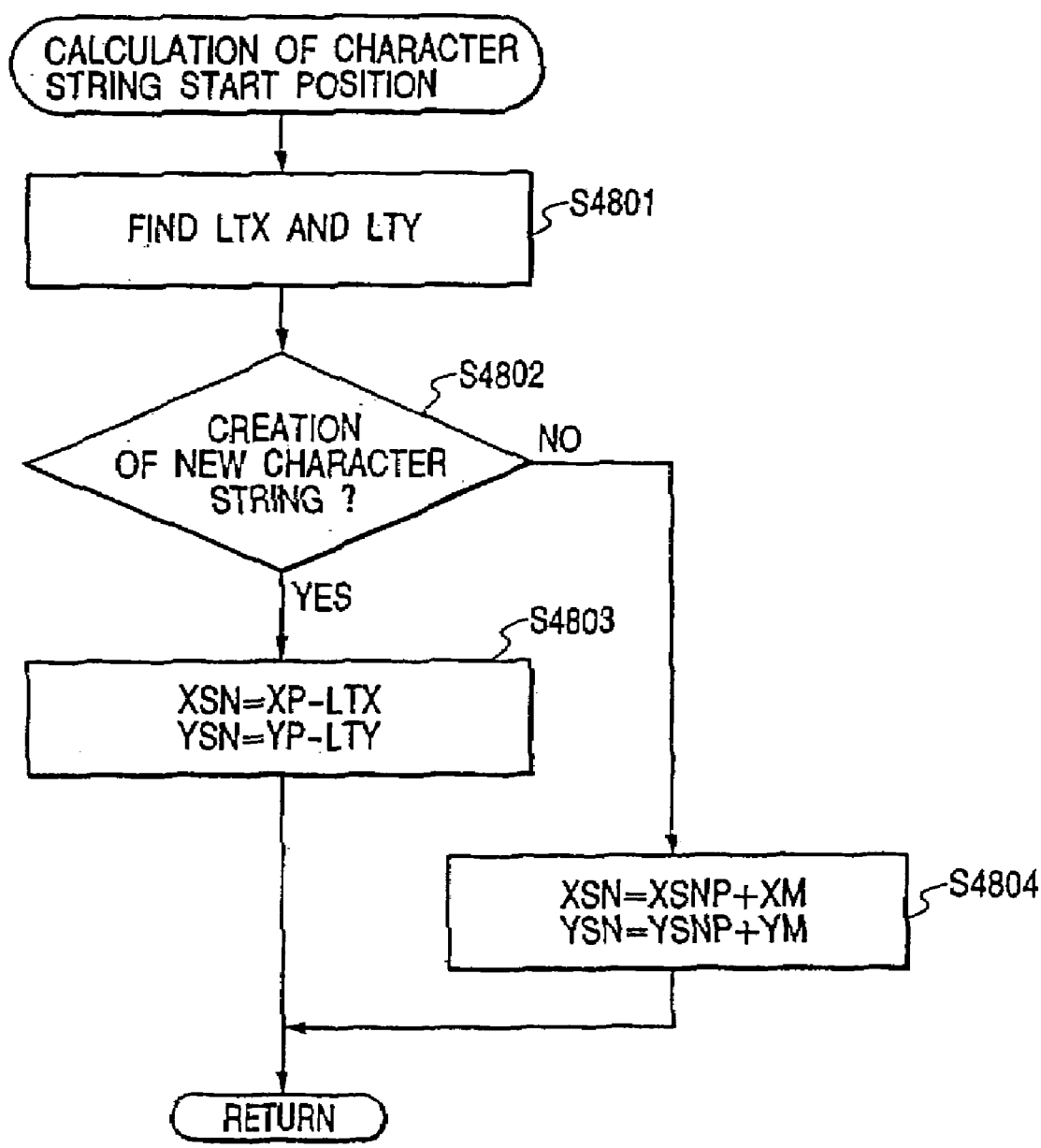
FIG. 103 is a flowchart for explaining the processing performed to calculate the start position of a character string using a prepositive character string circumscribed rectangle.

FIG. 103 is a flowchart showing this process. First, LTX and LTY as described at step S4601 are calculated by using the horizontal distance L56, obtained at step S4703, of the character string box size up to the center of the circumscribed rectangle for the specific character contour, and the left empty portion size Cls of the specific character and the width Crw of the character contour circumscribed rectangle, which are obtained at step S4704 (i.e., in the same manner as at step S4304) (step S4801).

When the center is designated as the specific character reference position, $$LTX=L56-Crw\times 0.5 \qquad (17)$$

$$LTY=-Crh\times 0.5 \qquad (18).$$

When the bottom right is designated as the specific character reference position, LTX and LTY are as follows:

$$LTX=L56 \qquad (19)$$

$$LTY=0 \qquad (20).$$

In other words, the LTX and LTY values differ in accordance with the specific character reference position.

The process for obtaining the new character string coordinates (steps S4802, S4803 and S4804) are the same as those at steps S4602, S4603 and S4604.

In the above described manner, the display position can be determined by using the prepositive character string circumscribed rectangle.

Further, in this embodiment, any of the above described method can be employed to adjust, to the designated position, only the horizontal coordinates of the center of the character contour circumscribed rectangle for a specific character in a character string that is displayed in the drawing area 62. In this case, in the process for calculating the new character string start position at step S4305 or at step S4705, only the horizontal coordinates are calculated in the manner at steps S4305 or S4705, and the vertical coordinates are not changed.

For example, the command menu 67 (FIG. 3) of the text command includes, as a "decimal point alignment" item, a function for moving a character string so that only the horizontal position of the period in the selected character string, for which the period is used as the standard specific character and for which the bottom is selected as the specific character reference position.

Figure 110:
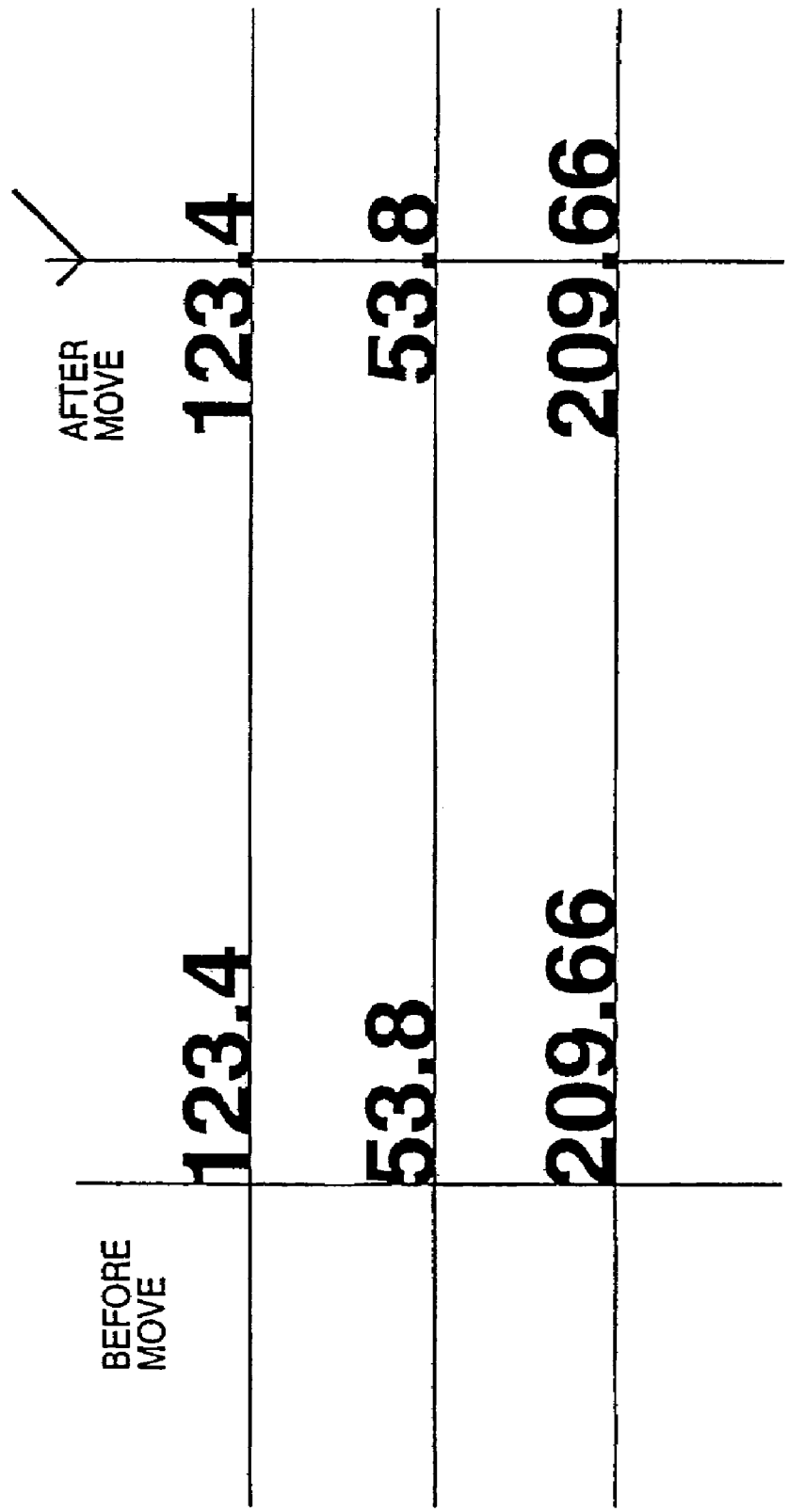
FIG. 110 is a diagram showing example character strings as they are displayed when horizonal positions are designated.

When the decimal point alignment button is activated, an instruction is displayed in the guidance area 68 to choose a character string that is to be moved to the designated position. A user selects text in accordance with the instruction. At this time, the user can sequentially select a plurality of text elements by depressing the Shift key on the keyboard 11. When the text is selected, an instruction is displayed in the guidance area 68 to designate the horizontal position of the period as the specific character. As well as at step S4305, the point coordinates input method, the arbitrary point input method, the point input method by point element selection, the feature point input method, the intersection designation method or the on-line point designation method can be employed to enter the horizontal position of the period. The horizontal coordinates of the point entered by either method is defined as the center of the contour circumscribed rectangle for the period. When the horizontal position of the period is designated, all the selected text are moved horizontally. FIG. 110 is a diagram showing a display example by designating the horizontal position (the alignment of the decimal points in this embodiment).

In this embodiment, the information for the position in the standard attribute body is prepared for a character that is designated as a specific character. However, such information may be stored in advance on the hard disk.

Figure 104:
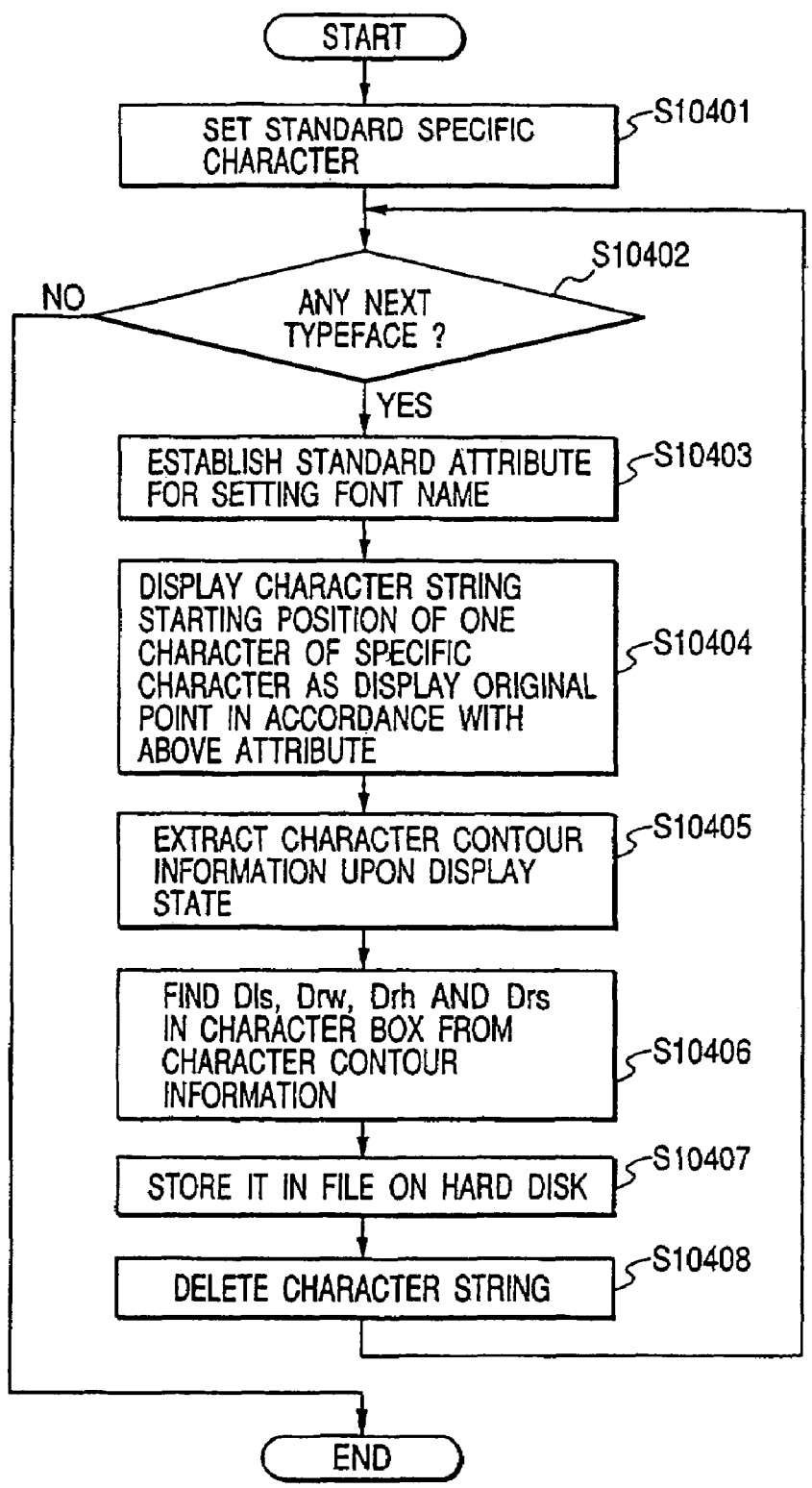
FIG. 104 is a flowchart for explaining the processing performed to prepare arrangement position information in a standard specific character box having standard attributes.

FIG. 104 is a flowchart for explaining the processing for preparing the information for the position in the specific character box with a standard attribute.

Figure 112:
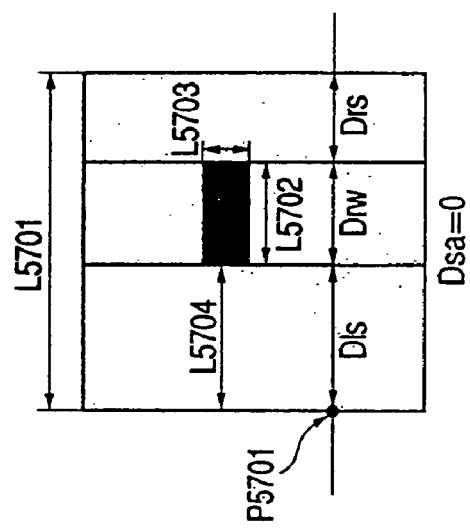
FIG. 112 is a diagram, in which a hyphen is used as an example, for explaining arrangement position information for a specific character box having standard attributes.

First, a standard specific character is set (step S10401). A check is performed to determine whether the next typeface is present (step S10402). If the next typeface is present, the name of a typeface and a standard attribute are set (step S10403). Then, one of specific characters is displayed using the WYSIWYG function, while origin (0, 0) is employed as the character string start position (step S10404). As is shown in FIG. 112, the character box size L5701 the contour information, the circumscribed rectangles L5702 and L5703 for the contour information are obtained (step S10405). At this time, when the contour circumscribed rectangle is calculated while the character string starting point P5701 is used as origin (0, 0), the length L5704 of the left empty portion of the character is acquired. The width Dls of the left empty portion in the character box of the specific character with the standard attribute, the width Drw of the contour circumscribed rectangle, the height Drh of the contour circumscribed rectangle and the width Drs of the right empty portion are calculated (step S10406):

$$Dls=L5704 \qquad (21)$$

$$Drw=L5702 \qquad (22)$$

$$Drh=L5703 \qquad (23)$$

$$Drs=L5701-L5704-L5702 \qquad (24).$$

The obtained Dls, Drw, Drh and Drs are stored with the font name in the external storage device 33 (step S10407). The format shown in FIG. 107 can be employed as a format for the information file for the position in the character box of the standard attribute.

The method at steps S4703, S4704 and S4705 in FIG. 102 for calculating the character string start position can be used, so that only the name of the typeface and the width Drw and the height Drh of the circumscribed rectangle can be stored as the information for the position in the character box of the specific character.

The process shown in FIG. 104 need not be performed each character string display process. The process in FIG. 104 need only be preformed once before a specific font is first employed, and the obtained data be stored in the external storage device 33. As a result, the data in the external storage device 33 are loaded into the RAM 32 at steps S4201 and S5001.

The processing in FIG. 104 may be performed for all the available typefaces, and the names of the typefaces and the information for the position in the character box may be stored in the external storage deice 33. The processing in FIG. 104 may be performed only for the typeface that is frequently employed. For a typeface for which no data are stored, the data may be prepared when necessary.

As is described above, according to the embodiment, as shown in FIG. 110, character strings can be arranged at a plurality of lines with, for example, the periods being aligned, so that a satisfactory appearance is provided.

Figure 113B:
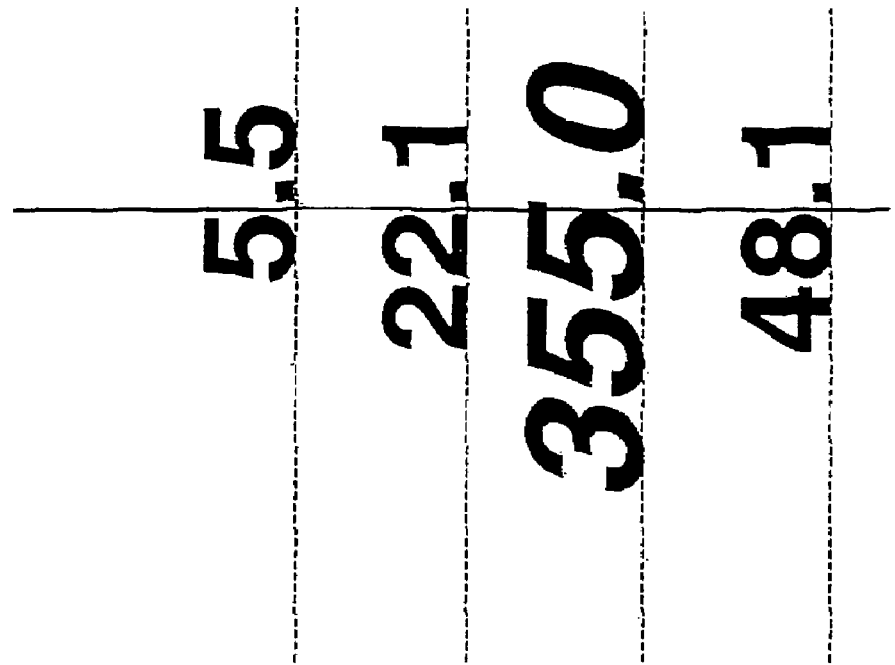
FIGS. 113A and 113B are diagrams for explaining a comparison made with the prior art for which a plurality of character strings is displayed.
Figure 113A:
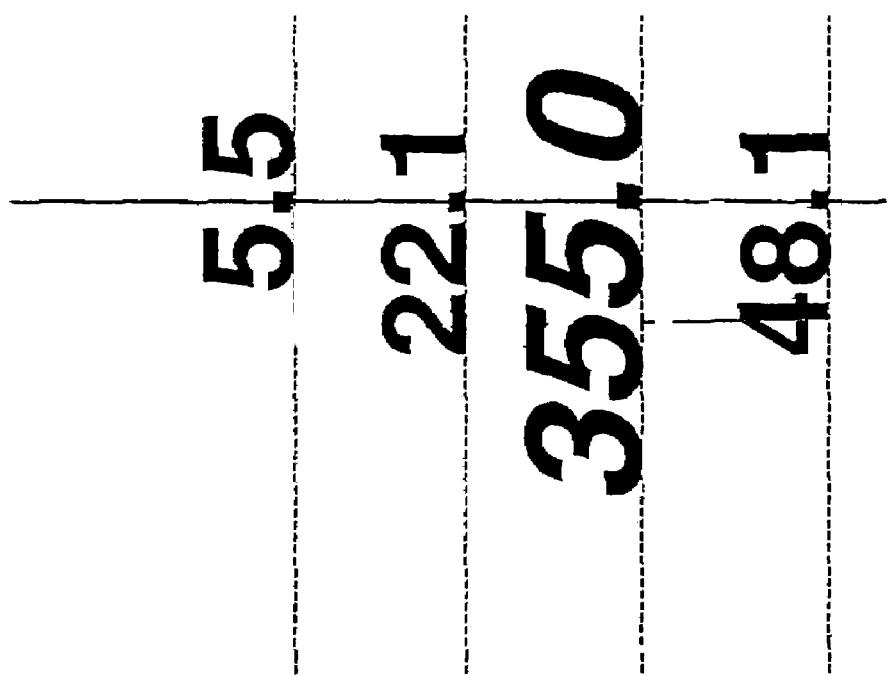

FIG. 113A is a diagram showing a display example in this embodiment where a period is defined as a specific character and the bottom is a specific character reference position, and FIG. 113B is a diagram showing a conventional display example. In FIGS. 113A and 113B, "355.0" is described with the oblique angle>0 and the character size of 1.3 times, and character strings having different attributes are arranged with the periods being aligned. In the conventional example in FIG. 113B, the left edge of the body of the period is aligned at the designated position. In the display example in FIG. 113A for this embodiment, the horizontal center of the contour circumscribed rectangle of the period is located at the designated position. Since the center positions of specific characters can be matched even when character strings having different attributes are arranged over a plurality of lines, the character strings are aligned.

Figure 114B:
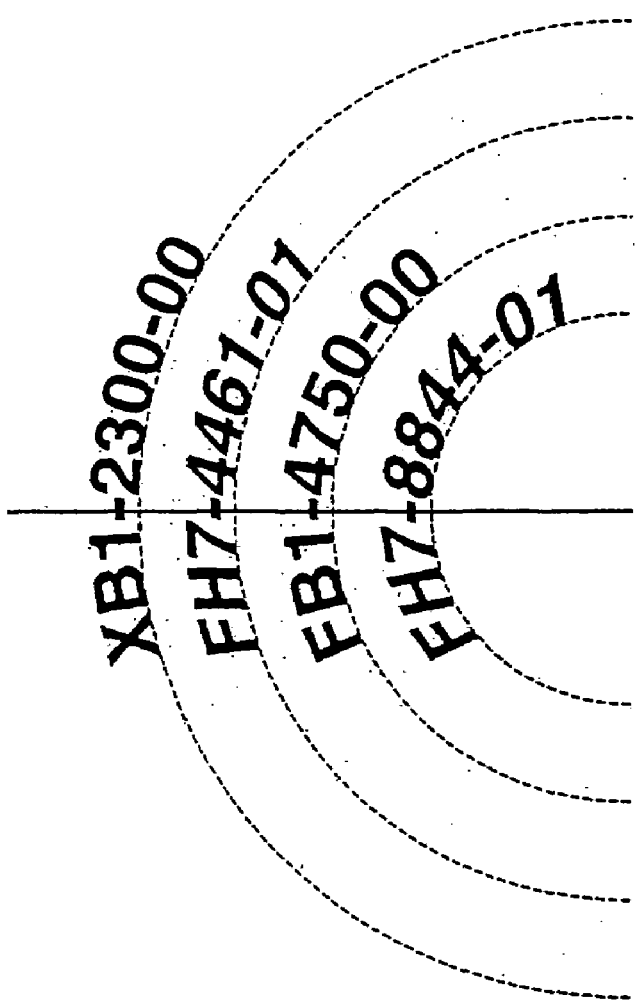
FIGS. 114A and 114B are diagrams showing example displays of a plurality of character strings when a hyphen is designated as being a specific character.
Figure 114A:
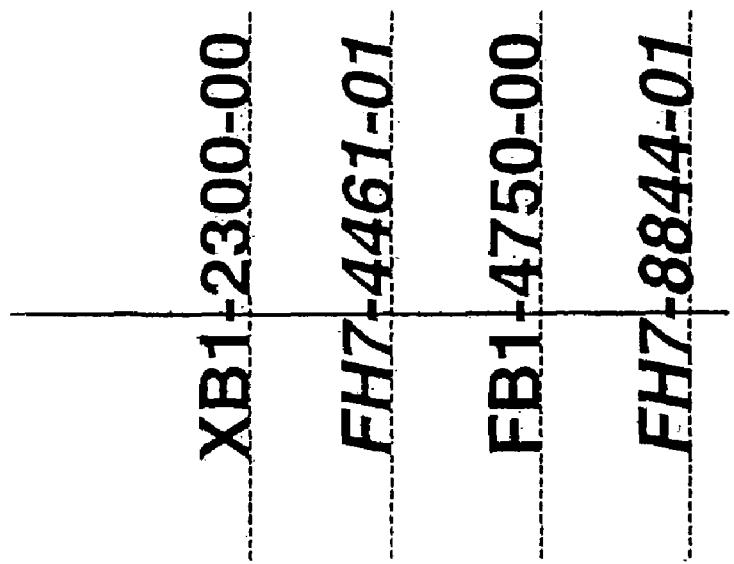

FIG. 114A is a diagram showing a display example for a plurality of character strings when a hyphen is designated as a character string and the bottom is defined as a specific character reference position. As is shown in FIG. 114B, specific characters (hyphens in this example) of character strings can be arranged along arcs at the designated positions.

As is described above, according to the seventh embodiment, the arrangement position of the character string can be precisely determined and output.

(h) Eighth Embodiment

While referring to FIGS. 120 to 123, an explanation will now be given for a method for extracting contour information using a geometrical method according to an eighth embodiment of the present invention.

Figure 120:
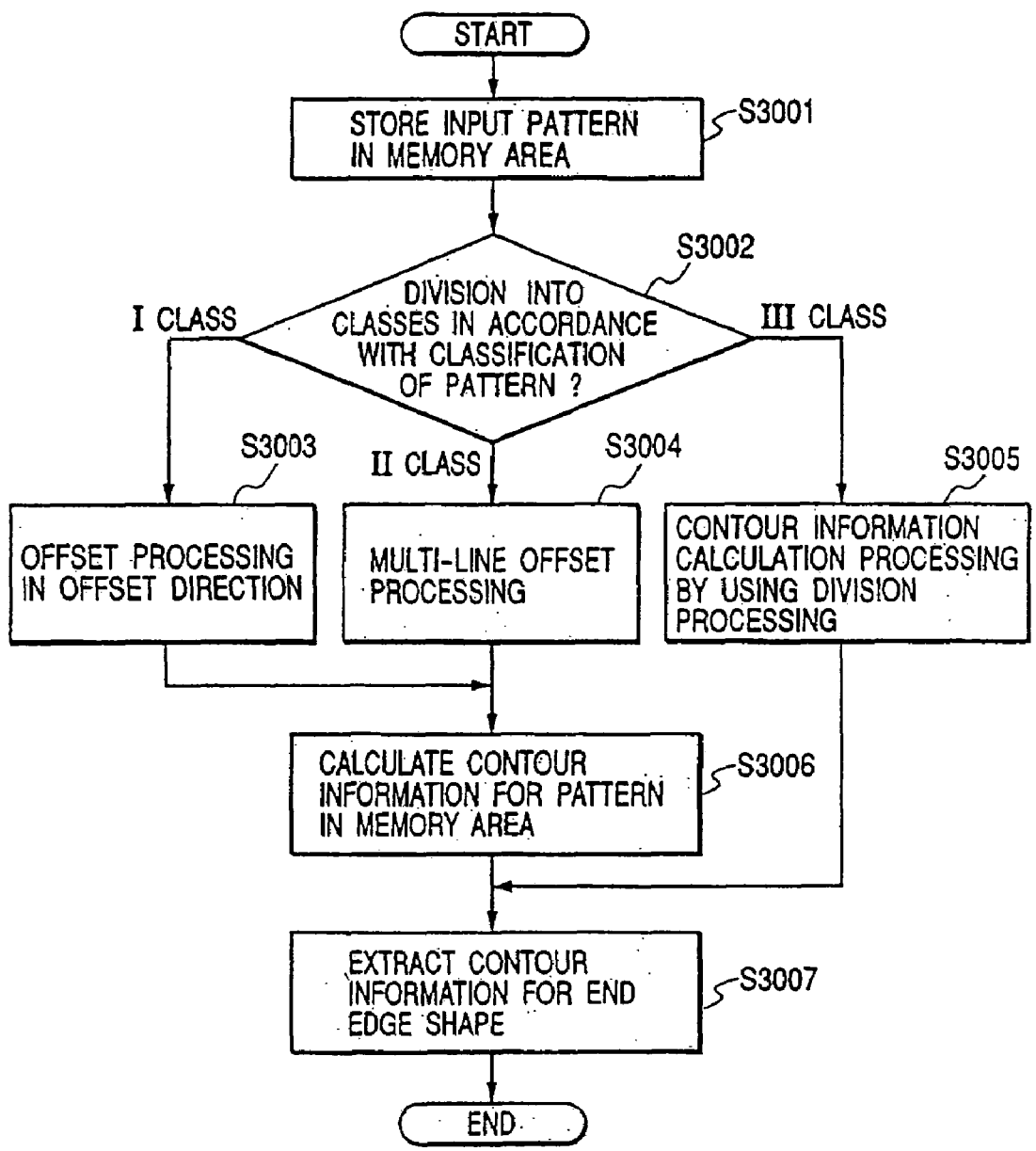

FIG. 120 is a flowchart showing the contour extraction processing according to this embodiment. First, pattern data of an object graphic pattern are temporarily stored in the external storage device 33, or the RAM 32 (step S3001).

The processing is sorted depending on the graphic pattern type. The types are classified into the following (step S3002). That is, I class: ordinary graphic pattern, such as a line segment and an arc II class: multi-line graphic pattern formed by a plurality of lines III class: graphic pattern, such as an ellipse or a free curve, that is prepared by offsetting and that different from the original graphic pattern type The processing for the graphic pattern that is sorted into the type will now be described.

Figure 125:
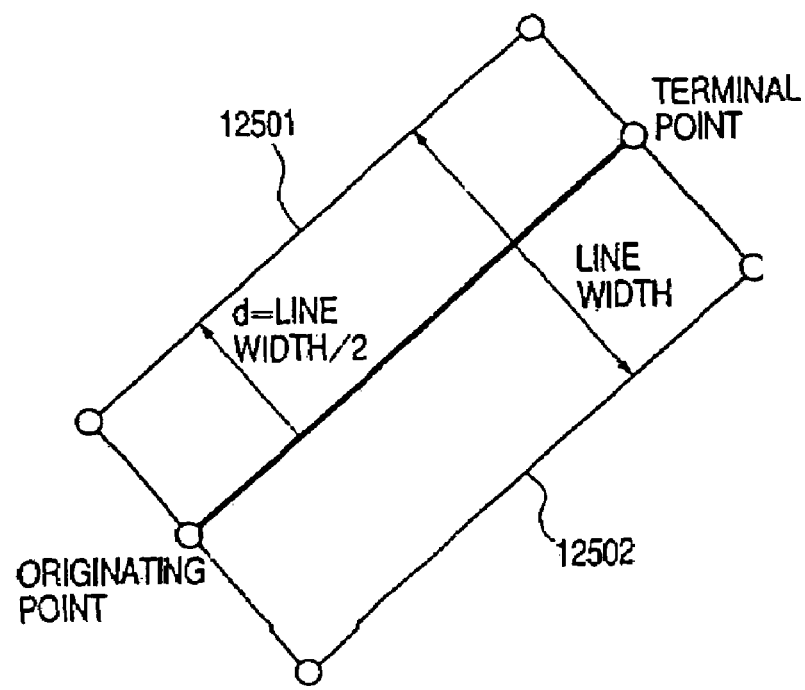

I Class:

The offset pattern for a graphic pattern, such as a line segment or an arc, can be easily obtained if the offset direction is determined. The process for extracting the contour of the graphic pattern sorted into the I class will be explained by using a line segment for which both sides are designated to be the offset directions as the printing attributes. FIG. 125 is a diagram showing a line segment while taking the printing attribute into account (printing attribute: offset direction=both sides).

In this embodiment, as is shown in FIG. 125, assume that the line segments (an offset line segment 12501 and an offset segment line segment 12502) that are offset to the normal line direction at a distance equivalent to ½ of a designated line width are present on both sides of a line that connects the stat point and the end point that define the line segment. The coordinates of the starting point and the end point of the offset line segments 12501 and 12502 are calculated (step S3002). Program control moves to step S3005, whereat the contour information for the pertinent pattern is obtained.

Figure 121:
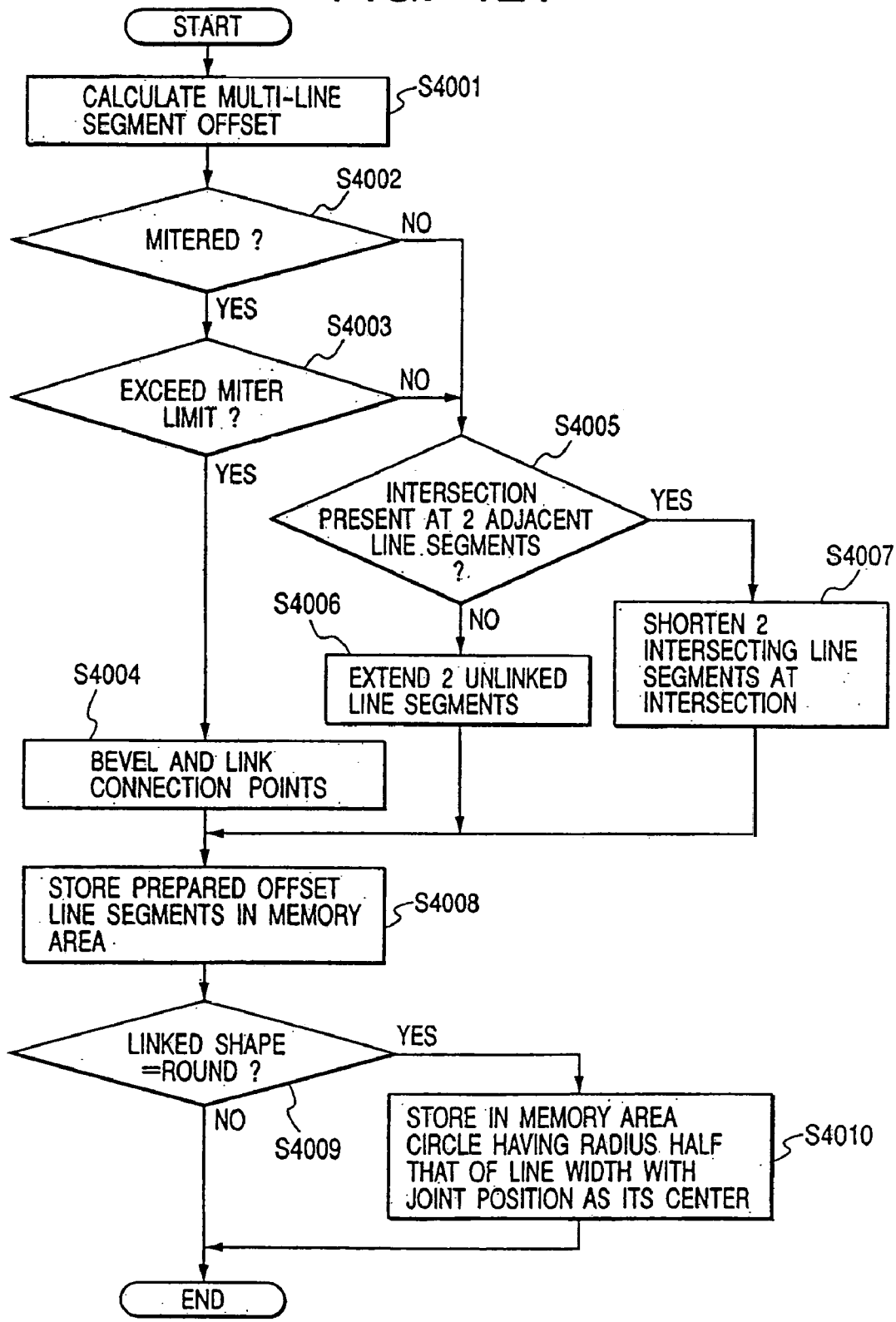

The process (step S3003) when the object pattern belongs to the II class will be specifically explained, while referring to FIG. 121. FIG. 121 is a flowchart showing the contour extraction processing for a multi-line graphic pattern according to this embodiment.

First, offset patterns are prepared for the individual segments of the multi-lines of the original patten (segments indicate the individual line segments of the multi-line pattern). The same process as at step S3002 in FIG. 120 may be performed for the individual segments. However, since the connection shape defined as the printing attribute is not considered, the following process is further performed.

A check is performed to determine whether the printing attribute of the entered multi-line is a mitered pattern (step S4002). The mitered pattern is as shown in FIG. 20.

When at step S4002 the connection pattern is the mitered, at step S4003 a check is performed to determine the connections of the segments exceeds the miter limit. This determination is made as follows. First, angle θ formed by adjacent segments of the multi-line is calculated, and whether the angle θ satisfies the following conditions (1) and (2) is determined.

$$|\theta| > 2*a\ \sin(1/M) \tag{1}$$

$$|\pi-\theta| > 2*a\ \sin(1/M) \tag{2}$$

wherein M denotes the miter limit value where the miter pattern is printed or displayed as a miter.

When θ satisfies the condition (1) or (2), it is assumed that θ exceeds the miter limit. When θ does not satisfy either condition, it is assumed that θ does not exceed the miter limit (step S4003).

When it is ascertained at step S4003 that θ exceeds the miter limit, program control moves to step S4004. At step S4004, a line segment that directly connects two adjacent line segments that form an angle that exceeds the miter limit is inserted into the pattern, so that the connection is processed as a bevel (step S4004).

When it is ascertained at step S4003 that θ does not exceed the miter limit, or when it is ascertained at step S4002 that the connection pattern is not a miter, program control moves to step S4005. An explanation will now be given for the processing for two adjacent segments of a multi-line pattern for which a connection shape does not exceed the miter limit, or for which a connection portion is not in a mitered shape.

First, at step S4005 a check is performed to determine whether an intersection is present on the two adjacent offset line segments of a classified graphic pattern. If there is an intersection, the two intersecting line segments are reduced at the intersection, i.e., the portions that are extended from the intersection are removed (step S4007). If there is no intersection, the offset line segments that are not connected together are lines that have an indefinite length, and the intersection of these lines is obtained. The offset line segments are extended until this intersection (step S4006).

The offset line segments that are prepared through the above process (steps S4004, S4006 and S4007) are stored in the storage area of the RAM 32 or the external storage device 33 (step S4008).

A check is performed to determine whether the connection shape of the input graphic pattern is round (step S4009). If the connection shape is round, circles (virtual circles) that have the joint positions as their centers and that have the radius of ½ of the line width are read, and stored in the storage area of the RAM 32 or the external storage device 33.

Figure 126A:
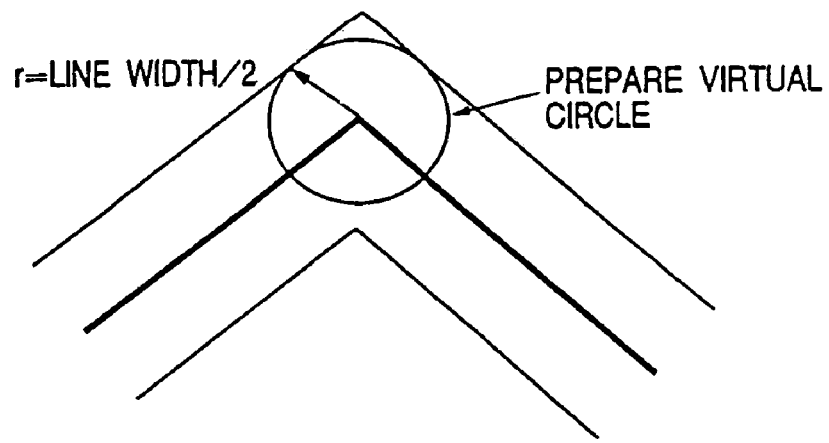
Figure 126B:
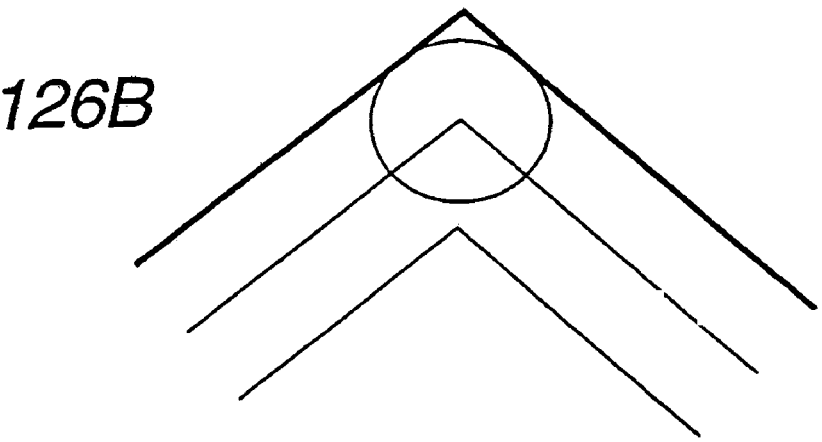
Figure 126C:
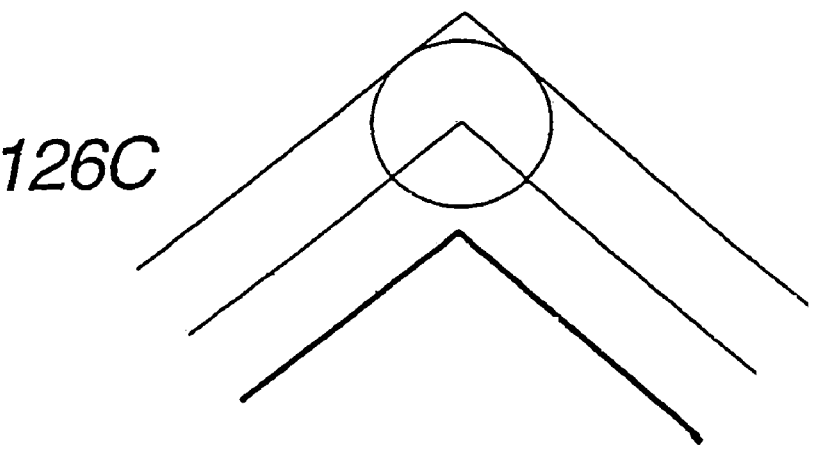

FIGS. 126A to 126C are diagrams for explaining the formation of a virtual circle when the connection shape is round. As is shown in FIG. 126A, when both sides are designated as the offset directions, a virtual circle having a radius r=line width/2 is arranged with the intersection of the line segments being as the center, so that the contour pattern having the round connection shape is obtained. Further, as is shown in FIGS. 126B and 126C, when the outside or the inside is designated as the offset direction, a virtual circle having a radius r=line width/2 is arranged with the intersection of the offset line segments located at the line width/2 being as the center.

Figure 122:
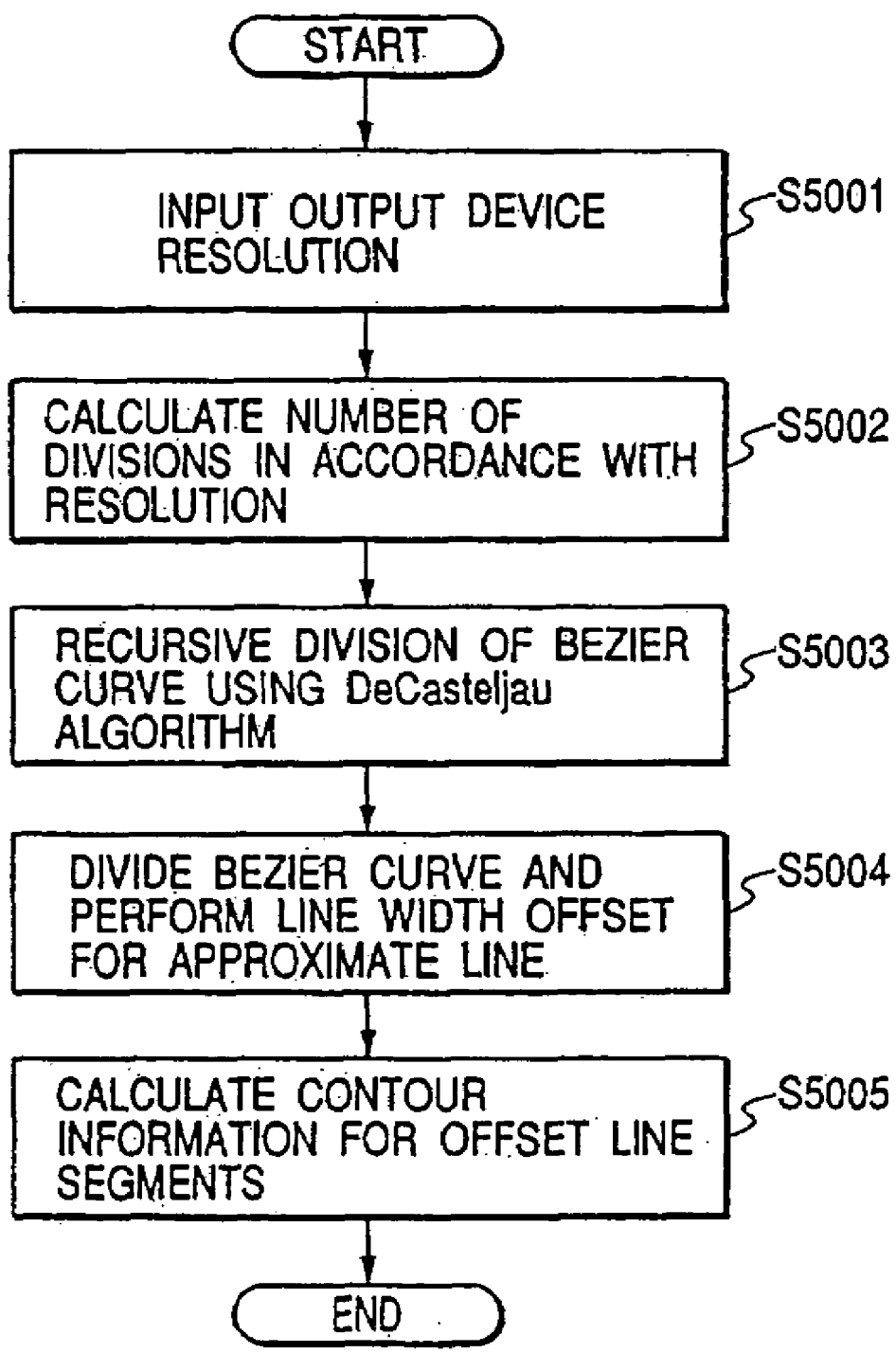

The processing for a graphic pattern sorted to the III class will now be described by employing a Bezier curve. In this embodiment, contour information for the graphic pattern is extracted, while taking into account the printing attributes and the resolution of the printer. FIG. 122 is a flowchart for explaining the contour extraction processing for the graphic pattern in the III class.

Figure 127:
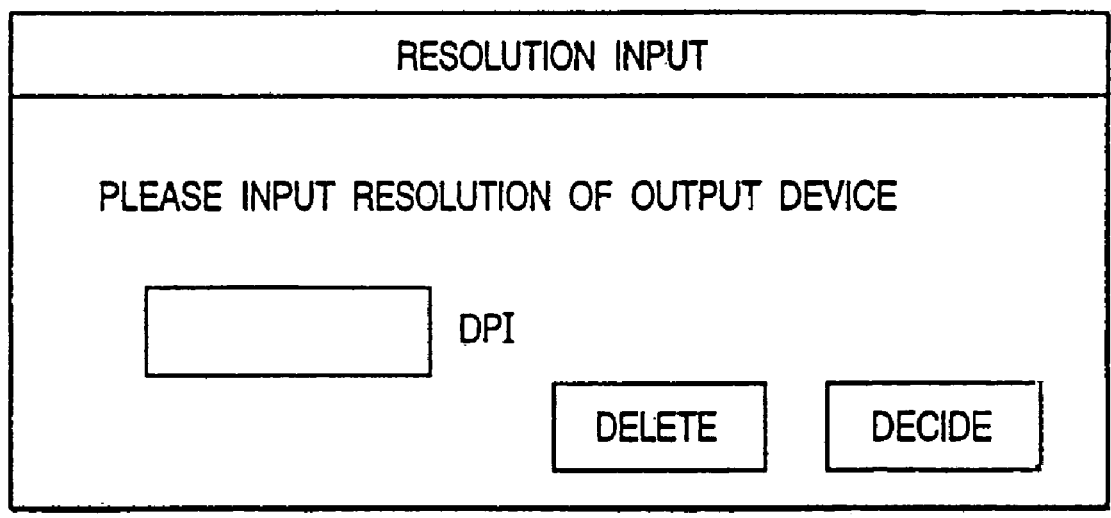

First, the resolution of the output device, which is the output destination of an object graphic pattern, is entered (step S5001). To enter the resolution, as is shown in FIG. 127, a message may be output to the display device 41 to instruct a user to enter the resolution information using the input device, such as the keyboard 11 or the mouse 12. A file for the resolution information of the output device may be stored in advance in the RAM 32 or the external storage device 33 and be loaded therefrom (step S5001).

Based on the resolution information, the number of divisions of the object graphic pattern is calculated (step S5002). A specific explanation for the process at step S5002 will be given later.

Figure 124:
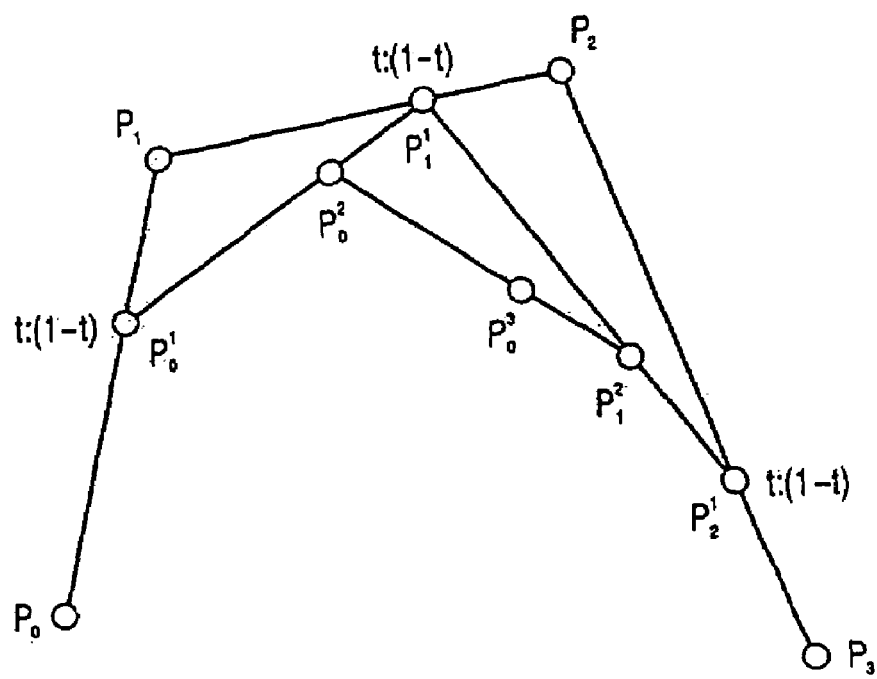

Then, the DeCasteljau Bezier division algorithm is employed to recursively divide the Bezier curve. FIG. 124 is a diagram shown an example curve that is divided using the DeCasteljau algorithm. The times of divisions correspond to the number of divisions obtained at step S5002. To obtain maximum x value, one of two curve segments that has the maximum x value is defined as an object curve to be divided next. To calculate minimum x value, one of two curve segments that has the minimum x value is defined as an object curve to be divided next. The same process is applied for the y value.

Figure 123:
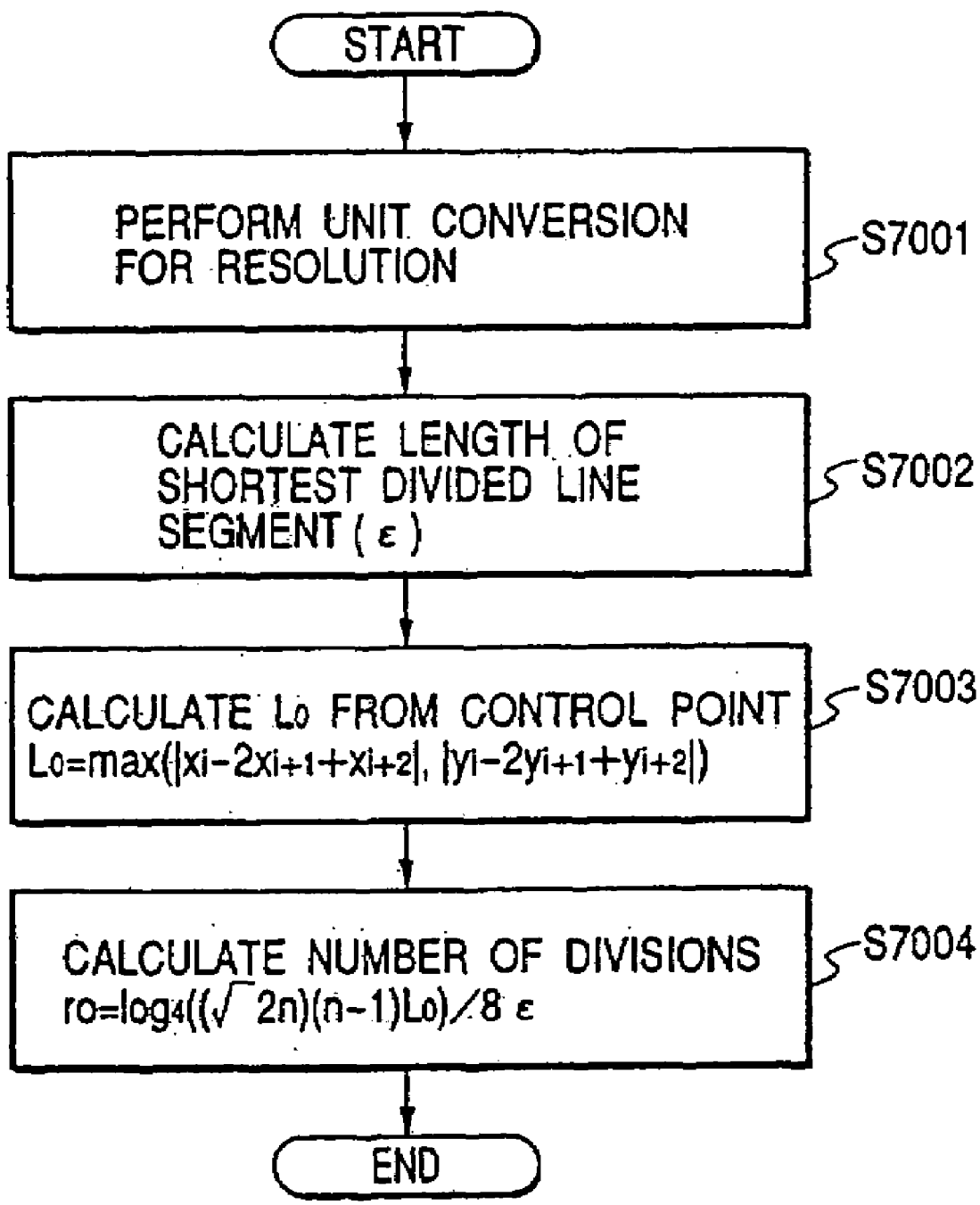

When the number of divisions reaches the value that corresponds to the obtained resolution, a plurality of lines that connect the starting points and the end points are acquired. These lines are offset at a distance equivalent to line width/2 in the offset direction that is defined by the printing attribute (step S5004). The maximum and minimum values of the starting point and the end point of each offset line obtained at step S5004 are employed as contour information for the Bezier curve (step S5005). The processing at step S5002 will be specifically explained, while referring to FIG. 123. FIG. 123 is a flowchart for explaining the processing according to this embodiment for determining the number of divisions of a Bezier curve.

Assume that the resolution entered at step S5001 is 3000 DPI. When mm is the unit used by the system for holding the graphic pattern, the input resolution must be changed to the unit system used in the system. Therefore, at step S7001, 3000 DPI is changed to:

$$3000\ \text{DPI}=(2000/25.4)\ \text{DPmm (Dots per mm)} \tag{25}$$

The minimum divided line segment length $\epsilon$ is calculated. For calculation of the value $\epsilon$, the resolution obtained at step S7001 is employed:

$$\epsilon=1/((3000/25.4)/1)=0.00847 \tag{26}$$

When, for example, the resolution is 400 DPI, $\epsilon$=0.0635 (step S7002).

When the Decasteljau algorithm is employed to divide the curve, and when an error of a curve and a line that connects the division points of the curve is denoted by $\delta$, the relationship between the number of divisions and error $\delta$ is well known by the following equations ("The Subdivisional Method Of Finding The Intersection Between Two Bezier Curves Or Surfaces", G. Wang, Technical Report, Zhenjian University Journal, 1984).

When the control points along the Bezier curve are represented as $(x_i, y_i)$ $(i=0, \ldots, n)$, $$L0=\max(|x_i-2x_{i+1}+x_{i+2}|, |y_i-2y_{i+1}+y_{i+2}|) \tag{27}$$

Then, the number of divisions $r0$ is represented as $$r0=\log 4((\sqrt{2}n)(n-1)L0/8\delta) \tag{28}$$

In this embodiment, the minimum divided line segment length $\epsilon$, which is obtained based on the resolution of the output device, is replaced by the error $\delta$ in the above equation, so that the number of divisions is obtained. That is, the number of divisions $r0$ is calculated by $$r0=\log 4((\sqrt{2}n)(n-1)L0/8\epsilon) \tag{29}$$

An explanation has been given for the individual processes for the I class, the II class and the III class, the contour extraction processing in FIG. 121 for the multi-line graphic pattern, the detailed processing in FIG. 122 for extracting the contour of the III class graphic pattern, and the processing in FIG. 123 for calculating the number of divisions of the Bezier curve in accordance with the resolution of the output device.

The processes at steps S3005 and S3006 in FIG. 120 will now be described. At step S3002 and S3003, the offset graphic patterns for those in the I class and III class are stored in the RAM 32 or the external storage device 33. While taking into account the printing attribute offset direction and the line width, these graphic patterns correspond to the outline of the graphic pattern and the connection shape of the joints of the multi-line pattern. Therefore, at step S3005, only the maximum coordinates (x, y) and the minimum coordinates (x, y) of the stored graphic pattern need be calculated, without the consideration of the line width and the printing attribute offset direction.

At step S3006, the contour information of the graphic pattern is extracted, while taking into account the printing attribute of the end edge shape. A specific explanation will be given for the printing attributes of the end edge shapes that are sorted into flat (FIG. 138A), square (FIG. 138B) and round (FIG. 138C).

1. Flat Cap

No process is performed.

2. Square Cap

Figure 128A:
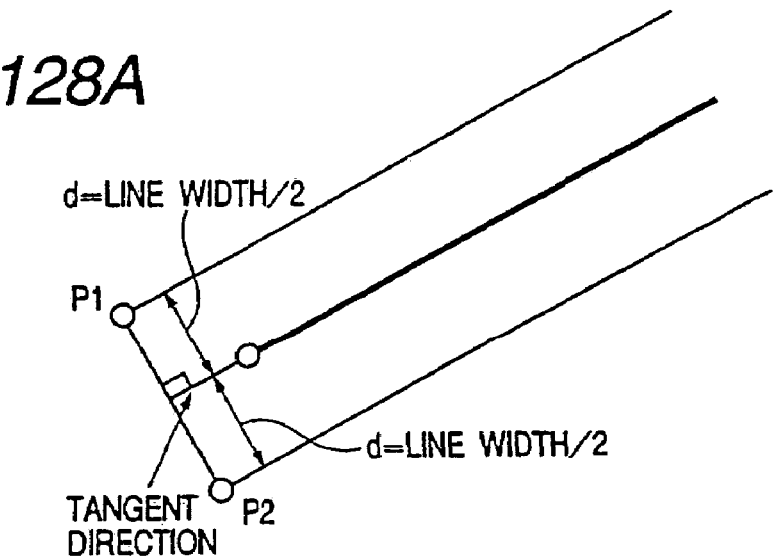
Figure 128B:
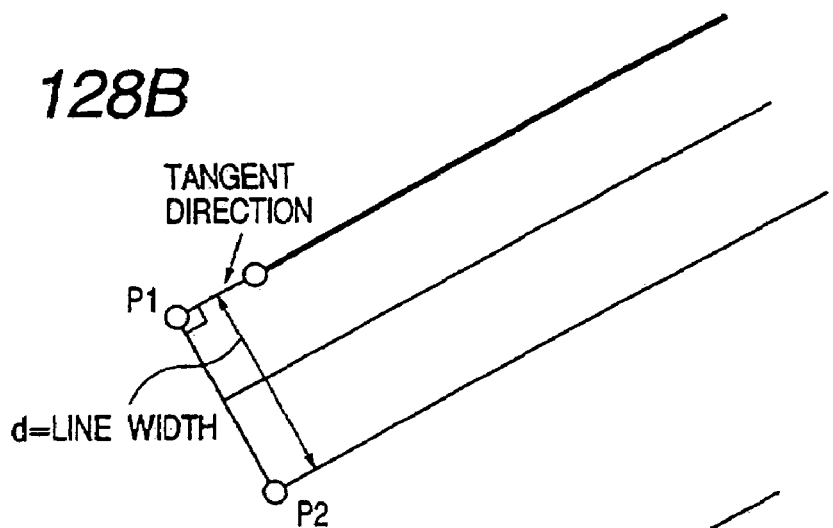
Figure 128C:
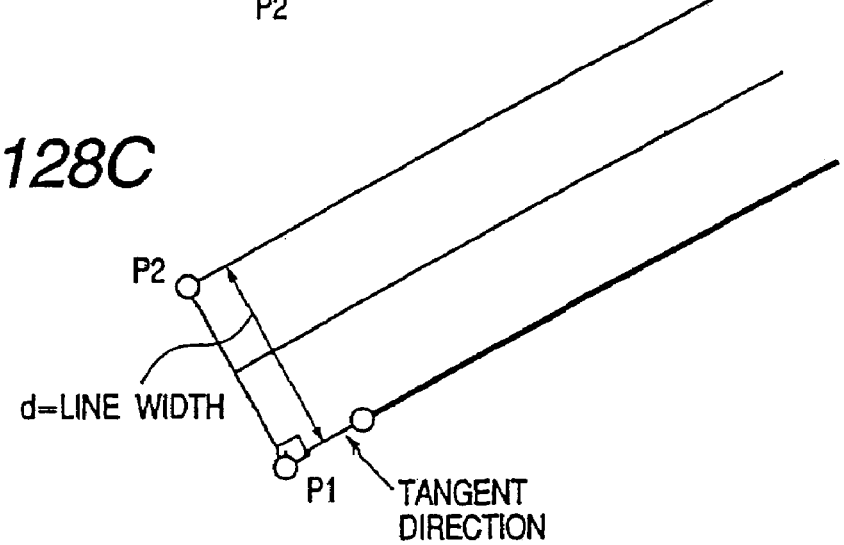

FIGS. 128A to 128C are diagrams for explaining the processing for extracting the contour shape when the end edge shape is a square cap. In this case, the tangent at the end point of the graphic pattern is obtained, and "corners" P1 and P2 of the graphic pattern are calculated, as is shown in FIG. 128. At this time, the offset directions designated as the printing attributes must be considered, as is shown in FIGS. 128A to 128C. The coordinates of the obtained P1 and P2 are compared with the contour information that is already acquired at step S3005 or S3004. When the coordinates P1 or P2 exceeds the maximum or the minimum coordinate, the contour information is updated.

3. Round Cap

Figure 129A:
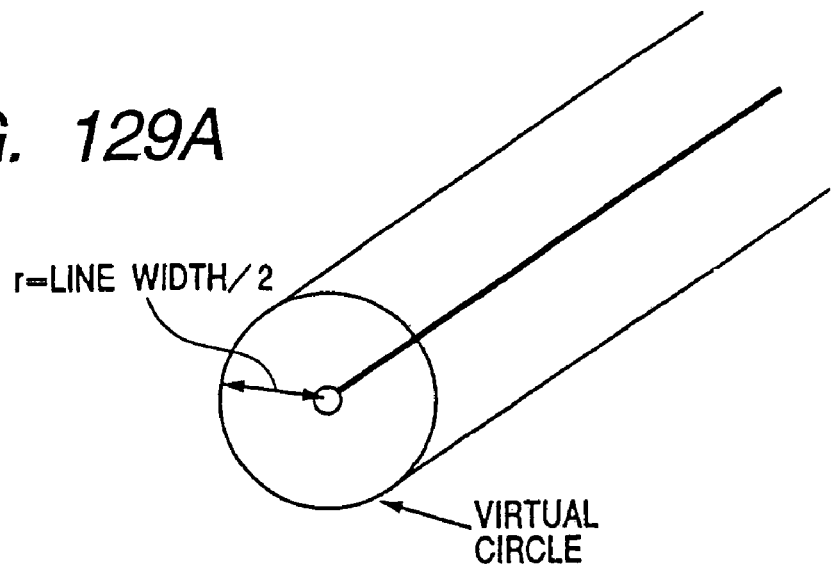
Figure 129B:
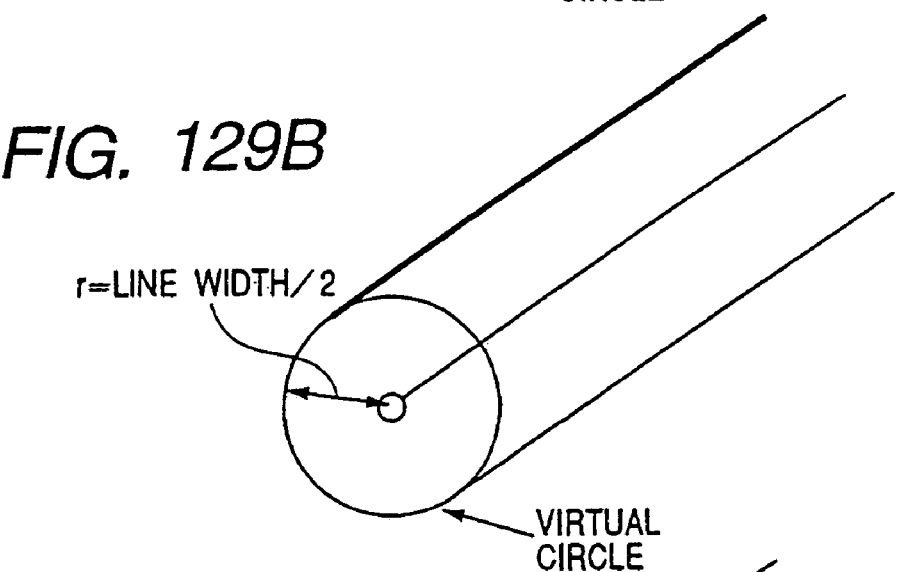
Figure 129C:
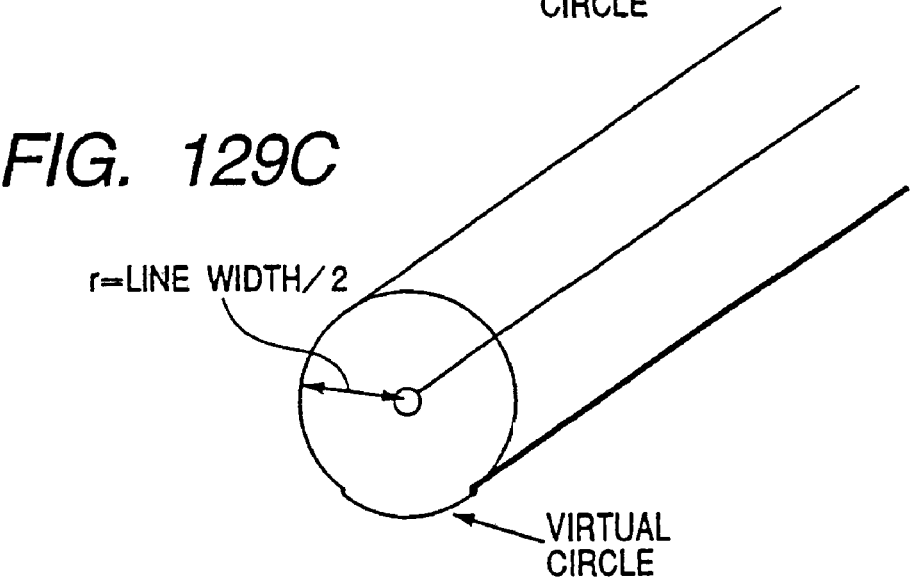

FIGS. 129A to 129C are diagrams for explaining the processing for extracting the contour shape when the end edge shape is round. The end point of the graphic pattern is calculated, while taking into account the line width and the printing attribute offset direction. When, for example, both sides are designated as the offset directions of the line segment, as is shown in FIG. 129A, a virtual circle having a radius r=line width/2 is arranged with the end point of the line segment being the center, and the contour shape of the end edge is obtained. When the outside or the inside is designated as the offset direction, as is shown in FIG. 129B or 129C, a virtual circle having a radius of r=line width/2 is arranged by using, as the center, the end point of the offset line segment that is obtained by moving a line segment in the normal line direction at a distance equivalent to line width/2. Then, the contour information of the end edge is obtained.

The contour information of the thus arranged virtual circle is compared with the contour information that is obtained at step S3005 or S3004. When the contour of the virtual circle exceeds the maximum or the minimum coordinates, the contour information is updated.

(i) Ninth Embodiment

[Editing of Printing Data]

An explanation will now given for the operation where the CPU 21 processes prepared printing data in accordance with the instruction entered by a user through the keyboard 11 or the mouse 12. In a ninth embodiment, the editing process for enlargement and reduction of the character will be explained.

Figure 118:
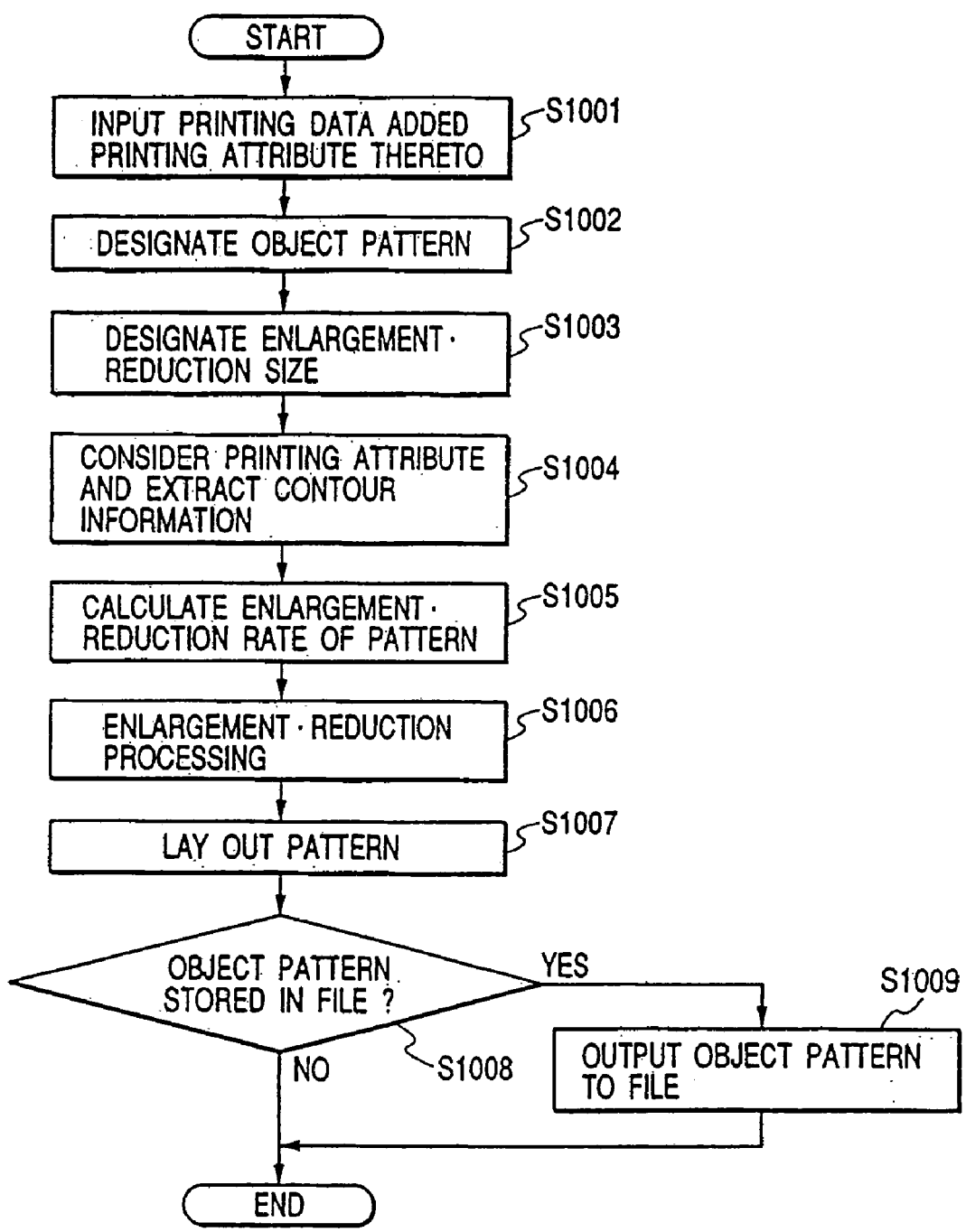
FIG. 118 is a flowchart showing the operation control processing performed according to an eighth embodiment of the present invention.

FIG. 118 is a flowchart for explaining the graphic pattern editing processing according to this embodiment. At step S1001 printing data with the printing attributes being added are entered as an editing object.

As is described above concerning the preparation of the printing data, the user uses the keyboard 11 or the mouse 12 to select an arbitrary patten element from among those with the printing attributes being added. The above described element selection method, the button selection method, the arbitrary designation method, the point designation method or the feature point designatio method can be employed (step S1002).

The character size for enlargement or reduction is designated. The panel shown in FIG. 131 is output on the display device 41, and the user enters a desired size using the keyboard 11 or the mouse 12. On the panel in FIG. 131, either "height" or "width" is selected in order to maintain the constant ratio of the height of the object graphic pattern to the width. The input unit is mm (step S1003).

The, the contour information of the selected element is extracted. The following methods as previously described can be used to extract the contour information (step S1004):

(1) method for displaying data unchanged to the display device,
(2) method for displaying a temporarily enlarged image on the display device,
(3) geometrical method, and
(4) method for outputting a software or hardware component that corresponds to a printer.

Since the contour information once obtained using one of these methods is stored in the external storage device 33 or the RAM 32, the calculation of the contour information is not required for the second operation.

The CPU 21 calculates the enlargement or reduction rate of the graphic pattern. The enlargement/reduction rate is obtained by sing the size that is designated in the size input process at step S1003 and the contour information that is extracted at step S1004. For example, assume that the contour information of the original graphic pattern indicates 12 mm high and 15 mm wide. To increase the height of the pattern to 100 mm, $$\text{enlargement/reduction rate} = 100/12 \approx 8.333\times \quad (30) \text{ (step } S1005). $$

The size of the selected element is multiplied at the enlargement/reduction rate obtained at step S1005, and the enlargement/reduction processis performed (step S1006). The resultant graphic pattern is laid out (step S1007).

The layout process for the enlarged/reduced element will now be descried. FIGS. 132 to 136 are diagrams for explaining the layout process in this embodiment. In this embodiment, the point designation method is used as the process for designating the layout position. The layout process will be explained in detail, while referring to FIGS. 132 to 136.

When the object element is selected and the reference point on or near the element is entered by using the keyboard 11 or the mouser 12. Further, for the layout of the element, a new reference point that is used as a reference for an enlarged or reduced element is entered using the keyboard 11 or the mouser 12, in the same manner as for the reference point. A vector that moves in parallel from the original reference point to the new reference point is obtained, and the element is moved in parallel. After the object element is moved in parallel, the element is multiplied at the enlargement/reduction rate.

A specific explanation will be given for a line segment. In this explanation, the initial point is (100, 100), the end point is (150, 50), the original reference point is (50, 50), the new reference point is (200, 200) and the enlargement/reduction rate is 2.5×. FIG. 132 is a diagram showing the original line segment (line segment before enlarged) and the original reference point.

1. Parallel Movement to the Origin

First, a vector that moves the original reference point to the origin is obtained, and the vector is provided for the starting point and the end point of the original line segment. As a result, as is shown in FIG. 133, the reference point and the line segment are moved.

2. Enlargement/Reduction

Then, the origin is multiplied at the designated enlargement/reduction rate, 2.5 in this embodiment. As a result, the original line segment is enlarged, as is shown in FIG. 134.

3. Movement to the Original Reference Point

The inverse transformation of the origin shift that was performed at 1 is performed. That is, reference point and the enlarged line segment are so moved that the reference point at the origin is returned to the original position (50, 50). As a result, the reference point and the line segment are moved, as is shown in FIG. 135.

4. Parallel Movement to the New Reference Point

When the new reference point (200, 200) is designated, a vector for moving in parallel from the original reference point to the new reference point is calculated. As a result, the line segment is moved along this vector as is shown in FIG. 136.

Then, a message (FIG. 137) is displayed on the display device 41 to inquire whether the graphic pattern to which the thus laid out printing attribute is added, i.e., printing data, should be held in a file. A user employs the keyboard 11 or the mouse 12 to determine whether the printing data should be stored (step S1008).

When "store" is selected, the printing data that are to be edited are written as holding data in the external storage device 33 or the RAM 32 (step S1009).

Figure 119:
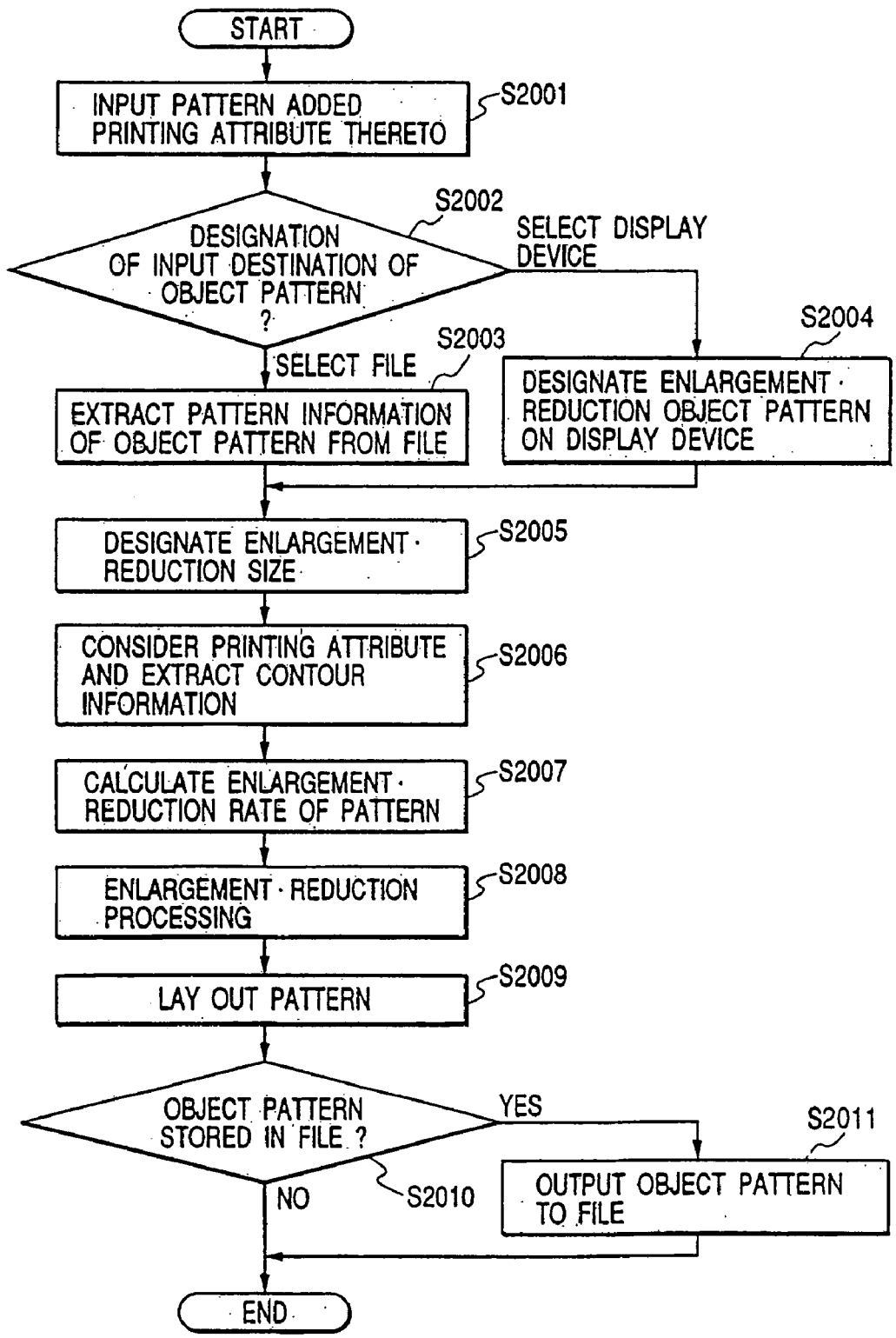
FIG. 119 is a flowchart showing the operation control processing performed according to the eighth embodiment of the present invention.

In FIG. 118, the input printing data are displayed and a desired pattern is selected. However, an object element for enlargement or reduction can not only be selected from printing data that are currently an editing object, but also be loaded from the external storage device 33 or the ROM 31. FIG. 119 is a flowchart showing the processing for selecting an object graphic pattern. In FIG. 119, steps S2001 and S2005 to S2011 are the same as steps S1001, S1003 to S1009 in FIG. 118.

At step S2002, a user determines whether an object element is to be selected from those displayed on the display device 41, or from those in a file that is stored in the external storage device 33 or the ROM 31 (step S2002). When the file in the external storage device 33 or the ROM 31 is selected to extract an object element therefrom, the graphic pattern of the object element is extracted from the file (step S2003).

As is described above, according to the eighth and the ninth embodiments, it is possible to enter a graphic patten with printing attributes being added, to designate the object graphic pattern and the enlargement or reduction size, to extract contour information while taking the printing attribute into account, to calculate the enlargement/reduction rate of the graphic pattern in accordance with the designated size, and to perform layout of the pattern at a position designated by a user. Therefore, the graphic pattern can be prepared while taking, into account, the line width, the end edge shape, the connection shape and the offset direction. In addition, since the job for preparing a contour pattern is not required, the pattern can be precisely edited, without deterioration of the work efficiency. Further, a graphic element, such as a free curve or an ellipse, can be precisely edited in a desired size. Furthermore, since the graphic pattern is enlarged or reduced by referring to the resolution of the output device, the error of the accuracy between the output device and the computer can be removed, so that the pattern enlargement/reduction process can be more accurately performed.

(j) Tenth Embodiment

FIG. 122 is a flowchart specifically showing, in the contour extraction processing in FIG. 120, the contour information calculation process (step S3004) using the division method for the III class graphic pattern. At step S5001, the resolution of the output device is entered. However, an output device can be selected instead of directly entering the resolution. Specifically, a panel (window) shown in FIG. 130 is displayed on the display device 41, and an object output device is selected using an input device, such as the keyboard 11 or the mouse 12. If the resolution information that corresponds to each output device is stored in advance in the external storage deice 33 or the ROM 31, the resolution information can be referred to. In addition, the resolution information for an output device connected through a network can be referred to each time.

(k) Eleventh Embodiment

The magnification processing for the graphic pattern has been explained while referring to FIG. 118. At step S1003 in this processing, the height or the width is entered to designate the enlargement/reduction size. However, the height and the width can be designated individually at the same time. In this case, the magnification in the x direction (width) and the magnification in the y direction (height) must be independently calculated, and the size of the pattern must be changed individually in the x direction (width) and the y direction (height). While mm is employed as the input unit to designate the enlargement/reduction size, various other units, such as inch, feet and meter, can be employed.

As is described above, according to the eighth to the eleventh embodiments, the size of the graphic pattern can be precisely changed at various magnification, without deteriorating the job efficiency of the user.

(l) Twelfth Embodiment

According to a twelfth embodiment, (g) character string attribute is defined as follows.

(g) Character String Attribute:

For a text element, the attribute for an overall character sting and the attributes of individual characters that constitute the character string can be expressed as follows.

The other terms for the character string and text will be described later in the explanation of the text preparation processing.

Typeface: Represents the design of a set of characters. There are courier, helvetica, gothic, etc.

Horizontal scale: Employs a ratio to represent the reduction of a character in the line feeding direction (along the height).

Vertical scale: Employs a ratio to represent the reduction of a character in the character feeding direction (along the width).

Character size: Represents the size of a character. Generally (precisely when the oblique angle is 0 and the horizontal scale is 1), the character size is equal to the height, in the line feeding direction, of a rectangular area (character box) of a single character.

Baseline rotate angle: Represents an angle formed by the character feed direction (widthwise) and the X axis.

Character direction: Represents the rotation angle of a character relative to the character feed direction (widthwise).

Oblique angle: Represents the oblique angle of a character relative to the character feed direction (widthwise).

Character spacing: Represents an interval in the character feed direction (widthwise) between two adjacent characters in the same line.

Line spacing: Represents an interval in the line feed direction (along the height) between characters in two adjacent lines from among a plurality of lines that constitute character strings.

Horizontal inversion flag: Horizontally inverts a character string. The inverted character string is symmetrical along a line in the line feed direction (along the height) that passes through the coordinates of the character string starting point (basic character string data, which will be described later).

Vertical inversion flag: Vertically inverts a character string. The inverted character string is symmetrical along a line in the character feed direction (widthwise) that passes through the coordinates of the character string starting point (basic character string data, which will be described later).

FIG. 156 is a diagram for explaining the baseline rotate angle, one of the character string attributes. A rectangle indicted by a solid line that encloses each character represents a character box of each character. Rectangles indicated by broken lines represent the positions of character boxes when the baseline rotate angle is 0.

FIG. 157 is a diagram for explaining the character direction, one of the character string attributes. A rectangle indicted by a solid line that encloses each character represents a character box of each character. Rectangles indicated by broken lines represent the positions of character boxes when the character direction is 0.

FIG. 158 is a diagram for explaining the oblique angle, one of the character string attributes. A parallelogram indicted by a solid line that encloses each character represents a character box of each character. Rectangles indicated by broken lines represent the positions of character boxes when the oblique angle is 0.

FIG. 159 is a diagram for explaining the horizontal inversion flag and the vertical inversion flag that are the character string attributes. Horizontal and vertical linear lines represent symmetrical axes when a character string is inverted. The intersection of the two linear lines is the starting point of each character string.

In the twelfth embodiment, (D) text is defined as follows.

(D) Text (1) Basic Character String (Element Constituting Text)
Data type code
Data number
Character string starting point coordinates: pt[2]
Number of bytes of a character string: nch
Character string data: str (nch bytes)
Layout angle: ang
Layout scale: sc
Data number for display attribute
Data number for selection attribute
Data number for color attribute
Data number for character string attribute (2) Text
Data type code
Data number
Registered character string name: rgnam
control character string data: ctext
Set form flag (horizontal set/vertical set): form
Layout object type (point/rectangle): lytyp
Layout reference point coordinates: pb[2]
Overall length: widln (effective only for point layout)
Height priority flag: hfix (effective only point layout)
Layout reference position flag (nine types, such as bottom left, center and top right): datum (effective only for point layout)
Automatic kerning flag (Yes/No): aker
Layout object rectangle width: wrect (effective only for rectangular layout)
Layout object rectangle height: hrect (effective only for rectangle layout)
Layout object rectangle inclination: arect (effective only for rectangle layout)
Line justification flag (left/center/right/full): adj
(effective only for rectangle layout)
Text layout rectangle left bottom coordinates: pll[2]
Text layout rectangle top right point coordinates: plr[2]
Text circumscribed rectangle bottom left point coordinates: pdl[2]
Text circumscribed rectangle top right point coordinates: pdr[2]
Number of elements: nd
Basic character string data: Element data (nd sets) of basic character strings
Basic character string layout data: data (nd sets) for layout of basic character strings.
(The text element is obtained by combining a plurality of basic character string elements. Therefore, a character string having a plurality of character string attributes can be processed in a single text element. For example, the typeface of a character, or the height or the width of a character can be changed during one text.)

The text preparation processing according to this embodiment will now be described by employing the above character string attributes and text.

<Preparation of Text>

An explanation will now be given for the processing for preparing text shown in FIG. 160 as an example.

FIG. 140 is a flowchart showing the processing for the layout of text as printing data.

In the following description, text element is employed for the layout. However, not only the text element, but also, a symbol, an illustration, a dragonfly and bar code can be performed in the same manner.

First, the "text." command button is selected from the buttons 65 on the main panel 61, or the name of the text command is entered in the character input area 64 using the keyboard 11.

Then, the command menu 67 is displayed on the display device 41. The command menu 67 include the following items:
(1) New: Create new text.
(2) Correct: Correct text already prepared.

A user selects either menu item to edit text.

An explanation will now be given for a case wherein the "new" menu item is selected.

First, information required for the layout of text (layout information) is entered (step S3101), and text character string data are entered (step S3102). The printing attribute of character data, i.e., a character string attribute is added to the character string data, so that the data can be used as printing data (step S3103).

The process at steps S3101 to S3103 may be performed in an arbitrary order by using a new text creation panel 3901 in FIG. 148 or a character string input panel 4001 in FIG. 149.

In FIG. 36A is shown character data to which printing attributes are not added. When the printing attributes are not added to the print data, the attribute setup flag is invalid in the previously described print attribute data structure. The character data are represented with the default shape and size. Therefore, it is apparent that the typeface, the horizontal scale, the vertical scale, the character size, the baseline rotate angle and the oblique angle are fixed.

In FIG. 36B is shown character data to which printing attributes are added. It is apparent that, when the printing attributes are added, differences of the printing attributes, such as the typeface, the horizontal scale, the vertical scale, the character size, the baseline rotate angle and the oblique angle, are expressed.

When the "new" button is selected, the new text creation panel 3901 shown in FIG. 148 is displayed on the display device 41.

Information required for preparing the text is entered on the new text creation panel 3901 using the keyboard 11 or the mouse 12.

The information that is entered on the new text creation panel 3901 for the layout of text includes a layout reference position, a set form, line justification, the overall length, whether the preference for height is required, and whether automatic kerning is required. These data are stored as text data.

When the character string input button is selected on the new text creation panel 3901, a character string input panel 4001 is displayed. The character string data for the text are entered in a character string input area 4002 by using the keyboard 11. This information is stored as data for text and a basic character string.

Further, the typeface name, the baseline rotate angle, the horizontal scale, the vertical scale, the oblique angle, the character spacing, the lien spacing, the reference character height or the character size, all of which are printing attributes of character data, i.e., the character string attributes, are entered on the new text creation panel 3901. These data are stored as character string attribute data for the basic character string that constitutes the text.

The terms concerning the character will now be defined. FIG. 161 is a diagram for explaining the terms concerning a character. In FIG. 161, "E" is employed as a reference character.

A character box 16101 is a virtual area in a rectangular (oblique angle of 0) or a parallelogram (oblique angle of other than 0) that a single character occupies. Most of characters are so specified to be designed inside the character box. The shape of a character may be extended outside the character box. When the oblique angle is other than 0, the character box is formed like an inclined parallelogram.

A reference character 16102 is one character that a user determines in advance and that is used as a reference to designate the character size or the character layout position. Generally, a character close to a rectangular shape is defined as a reference character. In this embodiment, capital letter "E" is defined as a reference character for the alphabet typeface.

A character size is a general numerical value to represent the size of a character; however, it does not actually indicate the height of a visible portion of a character.

A character box height 16104 is defined to indicate the height of a character that is actually displayed, while taking into account the horizontal scale and the character size. The height of the character box for each character is the same for a single basic character string. The relationship between the character box height and the character size is represented by equation 31:

$$\text{character box height} = \text{character sizes} * \text{horizontal scale} \quad (31).$$

A reference character height 16105 is the height of a visible portion of a reference character. The size of a character can be designated using this value. When the actually visible portion is employed for the layout of a character, it is effective to use the reference character height for designation.

For each typeface, the character size 16104 and the reference character height 16105 have a constant relationship that is represented by equation (32). The character height ratio is calculated in advance for each typeface, and is stored in the external storage device 33.

$$\text{Reference character height} = \text{character size} * \text{character height ratio} \quad (32).$$

A character baseline 16106 indicates a virtual reference line in the direction of the height of the character. In this embodiment, the baseline is defined as a linear line that passes through the bottom side of the circumscribed rectangle for the reference character E. The character baseline is a horizontal linear line relative to the bottom side of the character box.

A character box origin 16107 is a virtual origin that indicates the position of a character in a character box. In this embodiment, the character box origin is defined as the intersection of the character baseline 16107 and the left side of the character box.

A character box width 16108 is defined using a horizontal distance (a distance in the line feed direction) from the character box origin 16107 to the character box origin of the next character string in the same basic charter string. This is a numerical value when the character spacing is 0. Generally, the character box width 16108 differs depending on characters though they are included in the same basic character string. The character box width 16108 with the vertical scale of 1 is especially called the character width of a pertinent character. The relationship between the character box width 16108 and the character width is represented by equation (33):

$$\text{character box width} = \text{character width} * \text{vertical scale} \quad (33).$$

The data structures for the text, the basic character string and the character string attribute are as previously described.

The height from the character box origin 16107 up to the top side of the character box 16101 is called an ascender height 16109, while the height down to the bottom side of the character box 16101 is called a descender height 16110. Therefore, equation (34) is established:

$$\text{character box height} = \text{ascender height} + \text{descender height} \quad (34).$$

The horizontal distance (distance in the character feed direction) from the left side of the character box 16101 to the left end of the visible portion of the character is called a left side bearing 16111. The horizontal distance (distance in the character feed direction) from the right end of the visible portion of the character to the right side of the character box 16101 is called a right side bearing 16112. These side bearings are represented by numerical values when the oblique angle of the character is 0. That is, the side bearings do not depend on the oblique angle of the character. The character spacing is not included in the side bearing. Since the visible portion of the character is not always included in the character box, the side bearing is a numerical value with a sign, with which the character feed direction is positive.

FIG. 162 is a diagram showing an example character having negative side bearings. In this example, both left side bearing 16111 and right side-bearing 16112 are negative. In this case, the visible portion of a character is present outside the character box 16101.

The character spacing is as defined in the explanation for the character string attributes. When the character box 16101 is used to define the character spacing, the character spacing represents the interval of the character boxes of the two adjacent characters in the same line. However, the line spacing in this embodiment is the interval of the layout rectangles of two adjacent text lines, which will be described later, and is not an interval between the character boxes of characters on two adjacent lines.

The terms concerning the character have been defined.

Since a list of available typefaces is displayed on the typeface list 3902, one of them is selected using the mouse 12, or the name of a typeface is entered in the typeface input area by using the keyboard 11. The typeface name that is selected on the typeface list 3902 is reflected in the typeface name input area, If the typeface name entered in the typeface name input area is an available typeface, the pertinent item in the list 3902 is changed to the selected state.

The size of a character is designated by using the reference character height or the character size. Since the relationship represented by equation (32) is established for the reference character height and the character size, the data entered either in the reference character height input area or in the character size input area is automatically updated by selecting the other data.

The baseline rotate angle is entered with degrees by using the keyboard 11. A default value is 0, and the baseline rotate angle is effective only for the point layout.

The horizontal scale and the vertical scale are entered by the percentages through the keyboard 11. Their default values are 100%.

FIGS. 163A to 163C are diagrams for explaining the horizontal scale and the vertical scale. The rectangles denote the character boxes of the individual characters.

The oblique angle is entered by degrees using the keyboard 11. The default value is 0. The oblique angle is effective only for the point layout.

The character spacing is entered by percentages using the keyboard 11, while the width of the character is employed as a reference. This is called a character spacing ratio. The character size and the vertical scale is employed as a reference for the width of the character that is not affected by each character. The relationship between the character spacing ratio and the actual character spacing ratio is represented by equation (35):

$$\text{character spacing}=\text{character size}*\text{vertical scale}*\text{character spacing ratio} \quad (35).$$

The line spacing is entered by the unit of mm using the keyboard 11. The default value is 0 mm.

The process performed when the character spacing and the line spacing are set will be described later in detail.

The overall length is entered by the unit of mm using the keyboard 11 in order to designate the width of the visible portion of text. The default value is 0 mm. When the default value is set, it is assumed that the overall length is not designated.

The height preference is designating by selecting either "Yes" or "No" on the height preference selection button 3904. This height preference is effective only for the point layout and when the overall length is designated.

The process performed when the overall length is designated will be described later in detail.

The layout reference position is designated by selecting one of layout reference rectangle selection buttons 3903 that indicate nine feature points of a layout reference rectangle. The layout reference position is effective only for the point layout.

The method for setting the layout reference rectangle and the layout reference position for the text will be described later in detail.

The set form is designated by selecting one of set form selection buttons 3906, so as to determine whether the text is a landscape or a portrait.

The line justification position is designated by selecting one of line justification position selection buttons 3907 that indicate left, right, center and full. The line justification position is effective only for the rectangle layout.

The method for the point layout/rectangle layout and the method for determining the line justification position for the rectangle layout will be described later.

As for the typeface name, the size of a character, the baseline rotate angle, the horizontal scale, the vertical scale, the oblique angle, the character spacing, the line spacing and the overall length, a character input area of a pertinent item is designated by using the keyboard 11 or the mouse 12, and numerical data are entered using the keyboard 11.

The CPU 21 stored, in the RAM 32, the current values (called initial values) of layout information and the printing attributes for the character data that are finally set. Therefore, when new text is created, only one part of the initial values on the new text creation panel 3901 need be changed.

To terminate the program, the CPU 21 stores the individual values in the external storage device 33, and loads them into the RAM 32 when executing the program next time. Therefore, the initial values do not have to be set again each time the program is executed. The initial values that are used in common by users and the initial values that are set by individual users can be separately stored in the RAM 32 or the external storage device 33.

When the above described processing is completed, the user selects the "set" button on the character string input panel 4001, and establishes the information required for preparing the text (information for the text layout, the character string data and the printing attributes of the character data).

When the information required for the preparation of text is established, the CPU 21 prepares text data in accordance with the setup contents and extracts contour information (step S3104).

FIG. 164 is a diagram showing the result of extraction of text contour information. A rectangle indicated by a solid line is a layout reference rectangle for the text.

To extract the contour information, one of the following methods, which are previously described, can be employed:

(1) method for displaying data unchanged to the display device, (2) method for displaying a temporarily enlarged image on the display device, (3) geometrical method, and (4) method for outputting a software or hardware component that corresponds to a printer.

It should be noted that the geometrical shape for the character data must be provided in order to employ method (3) for the character data.

The CPU 21 employs the contour information extracted at step S3104 to calculate the circumscribed rectangle for the text (step S3105). The method for calculation of a circumscribed rectangle is the same as that at step S1303 in FIG. 13.

To clearly prepare a circumscribed rectangle, the "rectangle" common button to draw a rectangle is selected from the buttons 65 on the main panel 61, or the name of the rectangle command is entered in the character input area 64 using the keyboard 11. Further, the "circumscribed rectangle" items is selected in the command menu 67, and an object element is designated.

Since the reference character height is employed as the layout reference for the text, the character height ratio in equation (32) is calculated in advance using the contour information of the reference character.

FIG. 141 is a flowchart for explaining the processing for calculating the character height ratio.

First, a reference character is prepared with a specific character string attribute (step S3201).

Since the acquisition of the ratio of the character size to the reference character height is the purpose, for example, for each typeface, reference character "E" can be prepared with the printing attributes of character size=10 mm, the horizontal scale=100%, the vertical scale=100%, the baseline rotate angle=0 degree, the character direction=0 degree, the oblique angle=0 degree, the character spacing=mm, the line spacing=0 mm, the horizontal inversion flag=no and the vertical inversion flag=no.

The contour information of a reference character prepared at step S3201 is extracted by the method as used at step S3104 (step S3202).

The circumscribed rectangle for the reference character is obtained form the contour information that is extracted at step S3202 by the method used at step S3105 (step S3203).

The character height ratio of this typeface is calculated according to equation (32) by using the character size set at step S3210 and the ratio of the height of the circumscribed rectangle obtained at step S3203 (step S3204).

The obtained character height ratio is stored in the external storage device 33 (step 3205).

The above processing is repeated for each typeface (step S3206).

The layout reference rectangle is set as text layout information (step S3106). The layout reference rectangle is set for each line of text.

For the above example symbol, (1) arbitrary rectangle, or (2) circumscribed rectangle is employed to set the layout reference rectangle. For the text, (3) rectangle defined by the reference character height and the width of the visible portion of a character string may be employed as a layout reference rectangle.

The reference character height is determined in advance, and the width of the visible portion of the character string is equal to the width of the circumscribed rectangle obtained at step S3105. Therefore, the bottom left point and the top right point of the layout reference rectangle are bottom left point=(minimum X coordinates of contour information, minimum Y coordinate of contour information for a reference character while assuming that the reference character is included in the character string)

top right point=(maximum X coordinates of contour information, maximum Y coordinate of contour information for a reference character while assuming that the reference character is included in the character string).

FIG. 165 is a diagram showing a text layout reference rectangle and nine layout reference positions that are set for the text as shown in FIG. 160. A rectangle indicated by a solid line is a layout reference rectangle for each line of the text, and points indicated by asterisks * are layout reference positions.

In this example, the character circumscribed rectangle baselines for "A" and "B" match the character baseline (the character circumscribed rectangle baseline of the reference character "E"), and the height of the circumscribed rectangle for A and B matches the reference character height. Therefore, the top side of the character circumscribed rectangle for A and B matches the top side of the layout reference rectangle, and the bottom side of the character circumscribed rectangle matches the bottom side of the layout reference rectangle. However, generally as in a case of character "C", the character circumscribed rectangle (visible portion) does not match the layout reference rectangle. For example, the visible portion of "C" is present also in an area outside the layout reference rectangle.

The layout position of the text in the drawing area 62 is designated (step S3107).

To designate the layout position of the text, the following methods can be employed:

(1) Point Layout:

An arbitrary position in the drawing area 62 is selected by the arbitrary designation method, the point designation method, the feature point designation method, the intersection designation method, or the on-line point designation method. In this case, the layout is so performed that the layout reference position of the head line of the text, which is designated at step S3101, matches the designated position.

FIG. 166 is a diagram showing an example where the point layout for the text is performed, while the bottom left point of the layout reference rectangle is defined as the layout reference position. The position indicated by asterisk * is a layout position. In FIG. 166, the layout reference rectangle is shown by a solid line for the convenience sake of the explanation. However, actually only the text is displayed. Of course, the specification can be so changed as to also display the layout reference rectangle. The text having only one line is employed for this example. For the text having a plurality of text, the layout reference position of the head line is employed to determine the layout position for the point layout.

(2) Rectangle Layout:

A rectangle that already exists as print data in the drawing area 62 is designated by selecting an element. In this case, the layout is performed in accordance with the line justification position designated at step S3101, so that the top side of a layout reference rectangle for the head line of the text matches the top side of the designated rectangle.

Left justification: A layout reference rectangle for each line of text is aligned to the left side of the designated rectangle for the layout.

Right justification: A layout reference rectangle for each line of text is aligned to the right side of the designated rectangle for the layout.

Center justification: A layout reference rectangle for each line of text is positioned in the center of the width of the designated rectangle for the layout.

Full justification: The character spacing of each line of text is adjusted, so that The width of a layout reference rectangle for each line matches the width of the designated rectangle.

The layout method according to each justification position of the rectangle layout will be described later.

When the above processing has been completed, the CPU 21 stores, in the RAM 32, the data for the prepared text element as printing data (step S3108).

Data for the circumscribed rectangle for the text element, which are obtained at stp S3105, also stored as one part of text element data (step S3109).

Since the circumscribed rectangle data are stored as one part of the element data, the contour information does not have to be extracted again when a designated element is to be displayed fully in the drawing area 62.

Finally, the CPU 21 displays the obtained text element in the drawing area 62 (step S3110).

The text layout will be described further in detail.

Various methods for controlling the text layout information will now be described.

The method for setting the character spacing will be explained first.

To set the character spacing, a numerical value is entered in the character spacing input area on the new text creation panel 3901. Since the character spacing entered on the new text creation panel 3901 is a character spacing ratio, the actual character spacing represented by, for example, the unit of mm is as is shown by equation (8).

FIGS. 167A and 167B are diagrams showing examples when the character spacing of text is set.

In these examples, the text is constituted by a single basic character string. Generally, when the data forming the basic character string and the attribute data are to be changed in the text, the text is divided into a plurality of basic character strings. Therefore, when the line is returned (the character string starting point coordinates are changed), the kerning is set (the character string starting position coordinates are changed), or the typeface information is changed (the character string attribute is changed), which will be described later, the text is constituted by a plurality of basic character strings.

In FIGS. 167A and 167B, rectangles enclosing the individual characters are character boxes, and each rectangle that encloses an entire character string is a text line layout rectangle.

A text layout reference rectangle for one line (a rectangle that is defined by the height of a reference character and the height of the visible portion of aa character string) is called a text line layout rectangle. The height and the width of the text line layout rectangle are called a text line height and a text line width. The text of one line is laid out based on the text line layout rectangle.

An example when there is no character spacing is shown in FIG. 167A, while an example where the character spacing is present is shown in FIG. 167B. In FIG. 167A, there is no interval between the character boxes in the character feed direction, while in FIG. 167B the interval between the character boxes in the character feed direction is employed as the character spacing.

The setting of line spacing will now be described.

To set the line spacing, a numerical value is entered in the line spacing input area on the new text creation panel 3901. The line spacing entered in the new text creation panel 3901 is an actual value represented by, for example, the unit of mm.

FIGS. 168A and 168B are diagrams showing examples where the line spacing of text is set.

Since the line is returned, a different basic character string is provided for each line.

In these examples, rectangles that enclose the entire character strings are text line layout rectangles.

There is no line spacing in the example in FIG. 168A, while the line spacing is present in the example in FIG. 168B. In FIG. 168A, there is no interval between the text line layout rectangles in the line feed direction. In FIG. 168B, the interval in the line feed direction is employed as the line spacing.

The setting of the character spacing kerning will now be described.

The character spacing kerning is a method for delicately adjusting the spacing between the two adjacent lines horizontally or vertically. The method is called horizontal character spacing kerning or the vertical character spacing kerning.

The line spacing kerning, which will be described later, is a method for delicately adjusting the spacing between two adjacent lines vertically. This method is mainly used to change only specific line spacing.

When the "kerning input" button is selected on the character string input panel 4001, the kerning input panel 4101 is displayed. To set the character spacing kerning, a numerical value for the horizontal character spacing kerning is entered in the horizontal character spacing input area, and a numerical value for the vertical character spacing kerning is entered in the vertical character spacing input area.

At this time, a cursor is move to a desired position for the character spacing kerning of a character string that is entered in the character string input area on the character string input panel 4001.

The reference character height value that is employed as a reference is divided by, for example, 96. The obtained value is used as a unit for a parameter kerning parameter) to enter the character spacing kerning value on the kerning input panel 4101. Actually, the character spacing kerning represented by, for example, the unit of mm is obtained by the following equations (36) and (37).

Assume that the character spacing kerning is a numerical value having a sign, and that the right kerning direction and the upper direction are defined as a positive direction.

$$\text{Horizonal character spacing kerning} = (\text{horizontal character spacing kerning parameter}/96) * \text{reference character height} * \text{vertical scale} \quad (36).$$

$$\text{Vertical character spacing kerning} = (\text{vertical character spacing kerning parameter}/96) * \text{reference character height} * \text{horizontal scale} \quad (37).$$

FIGS. 169A and 169B are diagrams showing examples where the character spacing kerning of the text is set.

Rectangles that enclose the individual characters are character boxes. Rectangles that enclose character strings are text line layout rectangles.

In the example in FIG. 169A, the horizontal character spacing kerning is est, and in the example in FIG. 169B, the vertical character spacing kerning is set. The character spacing is not shown in either case for simplifying the explanation.

In FIG. 169A, the horizontal character spacing kerning parameter is set to 24 to the right, and the interval in the character feed direction between character boxes of basic character "A" and basic character string "BC" is set to a value (positive value) that is obtained by equation (36).

In FIG. 169B, the vertical character spacing kerning parameter is set to 24 downward, and the interval in the line feed direction between character boxes of basic character "A" and basic character string "BC" is set to a value (negative value) that is obtained by equation (37).

The format for entering the character kerning value on the kerning input panel 4101 is, for example, as follows.

right character spacing kerning entry: "> value" or "+ value"

left character spacing kerning entry: "< value" or "– value"

upward character spacing kerning entry: "^ value" or "+ value"

downward character spacing kerning entry: "v value" or "+ value".

When the character spacing is entered and the "set" button is selected on the kerning input panel 4101, the character spacing kerning value is determined, the kerning input panel 4101 is canceled, and the character string input panel 4001 is displayed again.

Then, the following control format, for example, is displayed at the cursor position in the character string that is entered in the character string input area of the character string input panel 4001, and indicates that the character kerning has been established.

right character spacing kerning control: "¥t>value @"
left character spacing kerning control: "¥t<value @"
upward character spacing kerning control: "¥tˆ value @"
downward character spacing kerning control: "¥t v value @"

The horizontal character spacing kerning and the vertical character spacing kerning can be set at the same time. The control format in this case is as follows:

"¥t>value ¥t v value @.

A character string that is entered in the character string input area of the character string input panel 4001 is called a control character string, and is stored as text data.

In the example in FIG. 169A, the control character string is as follows:

"A¥t>24@BC".

In the example in FIG. 169B, the control character string is as follows:

"A¥t v 24@BC".

The setting of the line spacing kerning will now be described.

When the kerning input button is selected on the character input panel 4001, the kerning input panel 4101 is displayed. To set the line spacing kerning, a numerical value is entered in the line spacing input area.

At this time, an empty line is inserted between the lines, for a character string that is entered in the character string input area, for which the line spacing kerning is set. The cursor is moved to that position.

A reference character height value that is employed as a reference is divided by, for example, 96. The obtained value is used as the unit for a parameter (kerning parameter) to enter the line spacing kerning on the kerning input panel 4101. The actual line spacing kerning represented by the unit of mm, for example, is obtained by equation (38).

Line spacing kerning=(line spacing kerning parameter/96)*reference character height*horizontal scale (38), The line spacing kerning is defined as a numerical value having a sign, and the upward direction is a positive direction.

FIGS. 170A and 170B are diagrams showing examples where the line spacing kerning for the text is set.

In these examples, different basic character strings are provided before and after the line spacing kerning is set. Since originally they are separate when line is returned, the structure of the basic character strings of the text is not changed by setting the line spacing kerning. In FIGS. 170A and 170B, the text is constituted by three basic character strings of ABC, DE and FG.

The rectangles that enclose the individual character strings are text line layout rectangles.

In the example in FIG. 170A, the line spacing kerning is set. In the example in FIG. 170B, the line spacing kerning is set. In FIGS. 170A and 170B, specific line spacing is set between the lines.

In FIG. 170A, only specific line spacing is set between the ,lies, and the interval of the text line layout rectangles is set to the line spacing in the line feed direction.

In FIG. 170B, the line spacing kerning parameter of 254 to the downward is set between the first and the second lines, and the interval between the text line layout rectangles for the first and the second lines is the sum of the absolute value of a value (negative) obtained by equation (38) and the line spacing value the interval between the rectangles for the second and the third lines is the same as that in FIG. 170A.

The following format is employed to enter the line spacing kerning on the kerning input panel 4101. This is the same as the format for the vertical character spacing kerning.

upward line spacing kerning entry: "ˆ value" or "+ value"
downward line spacing kerning entry: "v value" or "– value"

When the line spacing kerning is entered and the "set" button on the kerning input panel 4101 is selected, the line spacing kerning value is established. And the kerning input panel 4101 is canceled, and the character string input panel 4001 is displayed again.

Then, the following control format is displayed at the cursor position of a character string that is entered in the character string input area on the character string input panel 4001, and indicates that the line spacing kerning has been set.

upward line spacing kerning control: "¥l ˆ value @"
downward line spacing kerning control: "¥l v value @"

In the example in FIG. 170A, the control character strings are as follows:

ABC
DE
FG.

In the example in FIG. 170B, the control character strings are as follows:

ABC
¥l v 24@
DE
FG.

An explanation will now be given for the processing for changing typeface information.

The typeface information is a general term for the character string attributes, such as the name of a typeface, the size of a character, the horizontal scale, the vertical scale, the oblique angle, the character spacing and the line spacing. Characters in various shapes can be represented in the same text by changing the typeface information.

When the "typeface information change" button is selected on the character input panel 4001, a typeface information change panel 4401 is displayed. To change the typeface information, the character input area of a desired item is specified by using the keyboard 11, and numerical data of desired typeface information is entered by using the keyboard 11.

Since available typefaces are displayed in a typeface name list 4402, one of the names is selected by using the mouse 12, or the name of a typeface is directly entered in the typeface name input area by using the keyboard 11. The typeface name selected from the list 4402 is reflected to the typeface name input area. If the name of the available typeface is entered in the typeface name input area, the pertinent item of the list 4402 is set to the selected state.

At this time, the cursor is moved to a position where the typeface information is to be changed for the character string entered in the character string input area of the character string input panel 4001.

The same contents as those for the new text creation panel 3901 are entered in the individual items of the typeface information change panel 4401.

FIGS. 171A and 171B are diagrams showing examples when the typeface information of text is changed.

In these cases, different basic character strings are provided before and after the typeface information is changed.

Rectangles that enclose the individual characters are character boxes, and a rectangle that encloses a character string is a text line layout rectangle. An explanation will be given later for the text line layout rectangle calculation method performed when a reference character height differs in a single line.

In the example in FIG. 171B, the character size is changed, and in the example in FIG. 171B the typeface is chanted. For simplifying the explanation, the character spacing is not set.

In FIG. 171A, the typeface information change is set for "A" and "B" to change the character size from, for example, 40 mm to 60 mm.

In FIG. 171B, the typeface information change is set for "A" and "B" to change the typeface from, for example, Helvetica to Times.

When the typeface information is changed and the "set" button on the typeface information change panel 4401 is selected, the change of the typeface information is established. The typeface information change panel 4401 is canceled, and the character input panel 4001 is displayed again.

Then, the following control format is displayed at the cursor position of a character string that is entered in the character string input area on the character sting input panel 4001, and indicates that the typeface information has been changed.

typeface name change control: "¥FONT{typeface name}@"

character size change control: "¥h ˆ value @"
horizontal scale change control: "¥EX value @"
vertical scale change control: "¥CO value @"
oblique angle change control: "¥/value @"
character spacing change control: "¥# value @"
line spacing change control: "¥! value @"

The numerical value of the character size is represented by using a value relative to the preceding value. As a result, the size of the entire text can be enlarged or reduced only by changing the initial value, i.e., the size of the head character.

The control character string in FIG. 171A is as follows:
A¥hˆ1.50@BC.

The control character string in FIG. 171B is as follows:
A¥FONT{Times}@BC.

The processing for changing the initial value for the typeface information will now be explained.

The initial value of the typeface information is the typeface information that has been entered on the new text creation panel 3901 to create new text.

The initial value change button is selected on the character string input panel 4001, and the new text creation panel 3901 is displayed. To change the initial value, the character input area for a desired item is selected by using the keyboard 11 or the mouse 12, and numerical data for desired typeface information are entered using the keyboard 11. The contents of the individual items on the new text creation panel 3901 and the setting method have been described above.

When the initial value is changed and the "set" button on the new text creation panel 3901 is selected, the change of the initial value is established. Then, the new text creation panel 3901 is canceled, and the character string input panel 4001 is displayed again.

When the initial value is changed, the control format is not displayed for the character string that is entered in the character string input area of the character string input panel 4001.

The processing for restoring the initial value of the typeface information will now be described.

When the typeface information is changed by the previously mentioned method at a specific position of the text by the arbitrary number of times, and when the initial value of the typeface information is to be restored at a position following the specific position, the "initial value restore" button is selected on the character string input panel 4001.

At this time, the cursor is moved to a position where the initial value of the typeface information is to be restored for the character string that has been entered in the character string input area of the character string input panel 4001.

FIG. 172 is a diagram showing an example where the initial value of the typeface information of text is restored.

In this case, different basic character strings are provided before and after the position where the typeface information is changed, and before and after the position where the initial value of the typeface information is restored. In FIG. 172, the text is constituted by five basic character strings, AB, CD, EF, GH and JK.

Rectangles that enclose the character strings are text line layout-rectangles.

In FIG. 172, the character size between B and C is changed by 1.5 times, and the oblique angle between D and E is changed by 15 degrees. After the line is changed, the initial value is restored between H and J.

When the initial value of the typeface information is restored, the following control format is displayed at the cursor position of the character string that has been entered in the character string input area of the character string input panel 4001, and indicates that the initial value of the typeface information has been restored.

initial value restoring control: "¥DEF@"

In the example in FIG. 172, the control character strings are as follows:

"AB¥hˆ1.50@CD¥/15.00@EF
GH¥DEF@JK".

The control character strings in the character string input area of the character string input panel 4001 are displayed in different colors, so that the control format can be easily identified from the character that is actually displayed.

For example, in FIG. 172, "AB", "CD", "EF", "GH" and "JK," which are characters to be actually displayed, are provided in black, while "¥hˆ1.50@", "¥/15.00@" and "¥DEF@", which are control formats, are displayed in red.

A data preparation method for the point layout of the text will now be described.

An explanation will be given for the method for preparing text data and data for each basic character string that constitutes text when the text layout information, character string data, typeface information and information concerning kerning and typeface change are provided.

When the text layout information, the character string data, the typeface information and the information concerning the kerning and typeface change are all provided, the data is sorted into data for basic character strings and layout data is prepared for each basic character string.

The basic character string layout data are prepared for each basic character string that constitutes the text in order to lay out the basic character strings. As is shown in the previously described text data structure, the layout data may be stored as text data. Since the layout data can be prepared by using the text data, the layout data may not be stored to reduce the data volume.

The data structure for the basic character string layout data is as follows:
Alphabet/Japanese typeface: typef
Character height ratio: rhparm
Number of characters: nn
Width of character string: tw
Relative starting point: pw[2]
Horizontal character spacing kerning: dhx
Vertical character spacing kerning: dhy
Line spacing kerning: dln
Ascender height: has
Descender height: hds
Head character left side bearing: sbl
End character right side bearing: sbr The width of the character string is a distance in the character feed direction from the origin of the head character box of an object basic character string to the origin of the head character box of the succeeding basic character string. The character spacing is taken into account for this value, while the character spacing kerning is not taken into account.

The relative starting point is the relative coordinate value of the origin of the head character box of each basic character string when the origin of the head character box of the first basic character string in the first line of the text is defined as (0, 0) in the condition where the kerning is not set.

FIG. 142 is a flowchart for explaining the data preparation method for the point layout of the text.

FIG. 173 is a diagram showing example data that are prepared when the point layout process is performed for the text. The data preparation processing will now described by employing the example in FIG. 173.

Rectangles (solid lines) that enclose the individual characters area character boxes, and rectangles (broken lines) that enclose character strings in the individual lines are text line layout rectangles.

The text is created with typeface=Helvetica, reference character height=30 mm, baseline rotate angle=0 degree, horizonal scale=100%, vertical scale=100%, oblique angle=0 degree, character spacing=5%, line spacing=10 mm, entire length=0 mm (not specified), layout reference position=bottom left, height preference=no, automatic kerning=no, and set form=landscape. Then, the setting of kerning, the change of the typeface and the restoring of initial values are performed for the resultant text as follows:

"¥t <24@AB¥hˆ1.33@CD¥DEF@
EF¥t>24¥tv24@G
¥lv48@
¥t>24@HJ"

The bottom left point of a circumscribed rectangle of character "A" is designated as the layout reference point. While the layout reference point appears identical to the origin of the character box of "A", actually these points slightly differ.

In this example, since the basic character strings are AB, CD, EF, G and HJ, they are numbered as 1 to 5 in the named order.

First, relative starting points pw1 to pw5 of the basic character strings are calculated (step S3301).

Of the text character data, the basic character string data and the basic character string layout information, the following data are not yet set. Thee data must be calculated first.
(basic string character layout information)
relative starting point: pw[2]
(basic character string)
character string starting point coordinates:pt[2](text)
coordinates of text layout rectangle bottom left point: pll[2]
coordinates of text layout rectangle top right point: plr[2]

First, the relative starting point pw1 of the first basic character string of the first line is calculated as follows, while taking into account the character spacing kerning values dhx1 (negative value) and dhy1 (=0) and the line spacing kerning value dln1 (=0) of the object basic character string.

$$pw1[0]=dhx1$$

$$pw1[1]=dhy1+dln1 \quad (39)$$

Since the line spacing kerning is uniquely determined for each line, it is assumed that only data for the first basic-character string of each line is effective. In this case, only dln1, dln3 and dln5 are effective data. Also for the line spacing dflin of the character attribute data, only dflin1, dflin3 and dflin5 are effective data.

A method for obtaining the kerning value using the kerning parameter has been explained using equations (36) to (38).

The relative starting point pw2 of the second basic character string of the first line is calculated as follows, while taking into account the width tw1 of the preceding basic character string, the character spacing kerning values dhx2 (=0) and dhy2 (=0) of the object basic character string.

$$pw2[0]=pw1[0]+tw1+dhx2$$

$$pw2[1]=pw1[1]+dhy2 \quad (40)$$

The results by enlarging the character is reflected by the character string width tw1.

The relative starting point for the third and following basic character string for each line is calculated in the same manner by using the relative starting point of the preceding basic character string and the character string width. When the horizontal character spacing kerning is et after the end character of the last basic character string for each line, a basic character string having the width tw=0 and the horizonal character spacing kerning dhx is prepared for the convenience sake in order to be employed during the calculation of the text line width, which will be described later.

The relative starting point pw3 of the first basic character string of the second line is obtained as follows, while taking into account the relative starting point pw1 of the preceding basic character sting, the character spacing kerning values dhx1 and dhy1, the character spacing kerning values dhx3 (=0) and dhy3 (=0) of an object basic character string, the character string height th3, the line spacing dflin3 and the line spacing kerning dln3.

The character string height th3 of the object basic character string is obtained by multiplying the reference character height by the horizontal scale, as represented by equation (14).

The relative starting point pw3 of the first basic character string of the second line is represented by equation (15). While the character string height th3 and the lien spacing dflin3 are positive values, the line returning direction is the negative Y direction, so that the sign is changed. Since the kerning value is a numerical value having a sign, it can be added without changing the sign. When the line is returned, the values dhx1 and dhy1 are subtracted in order to invalidate the character spacing kerning of the preceding first basic character string.

$$th3 = hbox3 * rhparm3 * rexp3 \qquad (41)$$

$$pw3[0] = pw1[0] - dhx1 + dhx3$$

$$pw3[1] = pw1[1] - dhy1 + dhy3 - th3 - dftin3 + dln3 \qquad (42)$$

The relative starting point of the first basic character string of each of the following lines is calculated in the same manner by using the relative starting point of the head basic character string of the preceding line, the character string height and the character spacing kerning.

When equations (39) to (42) are calculated for each basic character string, the relative starting point pw[2] for each basic character string can be obtained.

The, the text line widths (widths of the text line layout rectangles) linew1 to linew3 are calculated for individual lines (step S3302).

The number of lines of the text and the numbers provided for the basic character strings that constitute each line have been notified at this time.

Basically, the text line width is the width of a visible portion of the text in an object line. As an exception, the horizontal character spacing kerning for the head and end of a line is taken into account. When the horizonal character spacing kerning is taken into account, the text line width is longer or shorter than the width of the visible portion of the text.

Figure 174A:
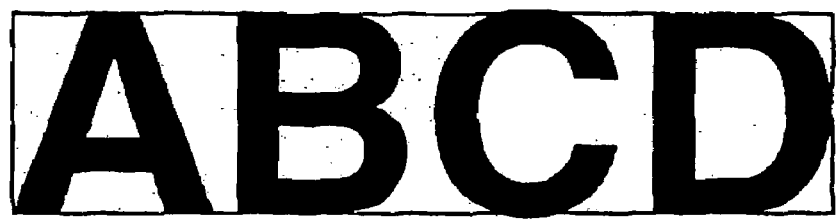

FIGS. 174A to 174E are diagrams showing this condition. In FIG. 174A, the horizontal character spacing kerning is not set at the head and end of a line; in FIG. 174B, the right character spacing kerning is set at the head of a line; in FIG. 174C, the left character spacing kerning is set at the head of a line; in FIG. 174D, the right character spacing kerning is set at the end of a line; and in FIG. 174E, the left character spacing kerning is set at the end of a line. The rectangles indicated by solid lines are text line layout rectangles. The broken lines indicate, as references, the positions of text line layout rectangles when the horizontal character spacing kerning is not set.

Figure 174B:
Figure 174C:
Figure 174D:
Figure 174E:

In FIGS. 174B and 174D, the text line width is longer than the width of the visible portion of the text, and in FIGS. 174C to 174E, the text line width is shorter than the width of the visible portion of the text.

Likewise, the empty characters at the head and end of a line are taken into account to calculate the width of the text line. However, since particularly for a alphabetical sentence the width of an empty character is not easy to obtain, it is difficult to control the output position by using the empty characters at the head and end of the line.

In FIG. 173, the text line width is calculated as follows, while taking into account the X coordinate of the relative starting point of the last basic character string of each lien, the width of the character string, the end character right side bearing, the character spacing, and the left side bearing of the first character of the first basic character string for each line.

$$linew1 = pw2[0] + (tw2 - dflet2) - sbl1 + sbr2$$

$$linew2 = pw4[0] + (tw4 - dflet4) - sbl3 + sbr4$$

$$linew3 = pw5[0] + (tw5 - dflet5) - sbl5 + sbr5 \qquad (43)$$

While the character spacing kerning does not seem to be taken into account in equation (43), it is included in the relative starting point obtained at step S3301.

When equation (43) is employed to calculate the text line width for each line, the maximum text line width and maximum text line width line number are obtained at the same time and are stored in the RAM 32.

Following this, text line heights (the heights of the text line layout rectangles) lineh1 to lineh3 are calculated for individual lines (step S3303).

The text line height is the maximum value of the height of the basic character string that constitutes the object line. In the example in FIG. 173, the text line height for each lien is represented by using the character string height obtained by equation (41).

$$lineh1 = tw2$$

$$lineh2 = tw3 \; (= tw4)$$

$$lineh3 = tw5 \qquad (44)$$

When equation (44) is employed to calculate the text line height for each line, the maximum text line width and maximum text line width line number are obtained at the same time and are stored in the RAM 32.

The character string starting points pt1 to pt5 are calculated for the individual basic character strings (step S3304).

For the point layout, the text line layout rectangle for the first line is employed as a layout reference. The character string starting point of each basic character string is adjusted so that the position indicated by the layout reference position flag for the text line layout rectangle of the first line matches the layout reference point coordinates designated by a user (pb[2] included in the text data).

First, parallel movement is performed in accordance with the position indicated by the layout reference position flag. When the text line width of the first line is linew1 and the text line height is lineh1, the parallel moving distances dvx and dvy of all the relative starting points are as follows in accordance with nine different values indicated by the layout reference position flag datum.

When datum=bottom left, dvx=0 and dvy=0;

when datum=bottom center, dvx=−linew1/2 and dvy=0;

when datum=bottom right, dvx=−linew1 and dvy=0;

when datum=left center, dvx=0 and dvy=−lineh1/2;

when datum=middle center, dvx=−linew1/2 and dvy=−lineh1/2;

when datum=right center, dvx=−linew1 and dvy=−lineh1/2;

when datum=top left, dvx=0 and dvy=−lineh1;

when datum=center top, dvx=−linew1/2 and dvy=−lineh1; and when datum=right top, dvx=−linew1 and dvy=−lineh 1 . . . (45)

Further, the parallel movement of the output position in the X direction is performed while the visible portion is used as a reference. The parallel movement distance of the relative starting point of each basic character string is as follows:

$$\text{dvx for each basic character string} = -(\text{left side bearing of the first character of the first basic character line of the object line}) \qquad (46).$$

The rotational movement or the parallel movement is performed for all the basic character strings, while taking into account the baseline rotate angle of the first basic character string of the first line (abas included in the character string attribute of the basic character string) and the layout reference point coordinates (pb[2] included in the text data).

Finally, the text layout rectangle is calculated (step S3305).

The text layout rectangle is obtained by using the text line layout rectangle for each line. The text layout rectangle width textw and the text layout rectangle height texth are obtained as follows by using the relative starting point at step S3301.

textw=maximum text line width texth=text line height of first line−(Y coordinate of the relative starting point of the first basic character string of the last line−vertical character spacing kerning of the first basic character string of the last line) (47).

FIGS. 175A to 175C are diagrams showing the examples obtained by calculating the text layout rectangles. The rectangles indicated by solid lines are text layout rectangles. The rectangles indicated by broken lines are text line layout rectangles for the individual lines.

In the example in FIG. 175A, the character spacing kerning is set. In the example in FIG. 175B, the character spacing kerning is set before the first line and after the last line. The line spacing kerning after the last line is ignored. In the example in FIG. 175c, an empty line is present before the first line and after the last line. The empty line after the last line is ignored.

The parallel movement in accordance with the layout reference position flag, the rotational movement in accordance with the baseline rotate angle, or the parallel movement in accordance with the layout reference point coordinates is performed to calculate the position of the text layout rectangle, i.e., coordinates of the text layout rectangle bottom left point: pll[2], and coordinates of the text layout rectangle top right point: plr[2].

An explanation will now be given for the data preparation method when the entire length of the text and the height preference are designated for the point layout of the text.

FIG. 143 is a flowchart for explaining the data preparation method performed when the entire length of the text and the height preference are designated for the point layout of the text.

As previously described, the new text creation panel 3901 is employed to designate the entire length and to instruct whether the height preference is set when the entire length is designated. These instructions are effective only for the point layout.

First, the relative starting point pw[2] of each basic character string is calculated (step S14301). This calculation is performed in the manner as performed at step S3301 when the entire length is not designated.

The text line width linew for each line is calculated (step S14302). This calculation is performed in the manner as performed at step S3302 when the entire length is not designated.

The text line height lineh for each line is calculated (step S14303). This calculation is performed in the manner as performed at step S3303 when the entire length is not designated.

The above processing is sorted into three types, depending on the determination at step S14304 as to whether the height preference is designated and the determination at step S14305 as to whether the maximum text line width is greater than the entire length:

* a process shown in FIG. 144 when the height preference is not designated;

* a process shown in FIG. 145 when the height preference is designated and the maximum text line width≦the entire length; and

* a process shown in FIG. 146 when the height preference is designated and the maximum text line width>the entire length.

FIGS. 176A to 176E are diagrams showing examples whether the entire length and the height preference are designated for the point layout of the text. The rectangles indicated by solid lines are text line layout rectangles.

Figure 176A:
Figure 176B:
Figure 176C:
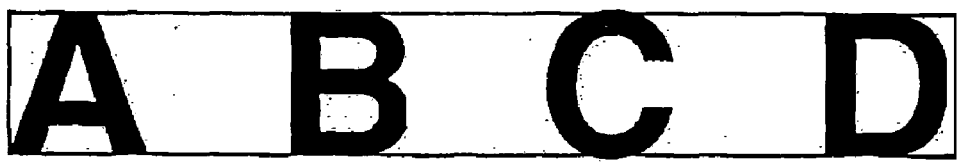
Figure 176D:
Figure 176E:

In FIG. 176A, the entire length is not designated (=0). In FIG. 176B, the height preference is designated, and the maximum text line width is greater than the entire length. In FIG. 176C, the height preference is designated, and the maximum text line width is equal to or smaller than the entire length. In FIG. 176D, the height preference is not designated, and the maximum text line width is smaller than the entire length. In FIG. 176E, the height preference is not designated, and the maximum text line width is equal to or smaller than the entire length.

The processing performed when the height preference is not designated will now be described while referring to the flowchart in FIG. 144.

As is shown in the examples in FIGS. 176D and 176E, the character size is so adjusted that the text for one line is fitted to the designated entire length. As is shown in FIG. 176D, when the maximum text line width is greater than the entire length, the character size is reduced. As is shown in FIG. 176E, when the maximum text line with is equal to or smaller than the entire length, the character size is increased.

First, a ratio scl (>1) of designated entire line length widln to the maximum text line width linewm that is obtained at step S14302 is calculated (step S3501):

$$scl = widln/linewm \quad (48).$$

Then, the character string attribute and the layout data for each of basic character strings that constitute the text are changed (step S3502). The data that are affected by the change of the character size are also changed. Specifically, data for the character size, the character spacing, the line spacing, the head character left side bearing, the end character right side bearing and the character string width are multiplied by the scl obtained at step S3501.

Following this, the relative starting points of the basic character strings are re-calculated (step S3503).

The same calculation method as at step S14301 is employed. The character string attribute and the layout data that are changed at step S3502 are employed for the re-calculation.

The kerning value is re-calculated according to equations (36) to (38) from the kerning parameter, while the data after being changed at step S3502 are employed.

Then, the text line width of each line is re-calculated (step S3504).

The same calculation method as at step S14302 is employed. The character string attribute and the layout data that are changed at step S3502 are employed for the re-calculation.

The text line height of each line is re-calculated (step S3505).

The same calculation method as at step S14303 is employed. The character string attribute and the layout data that are changed at step S3502 are employed for the re-calculation.

The calculation for the character string starting point of the basic character string (step S14309) and the calculation for the text layout rectangle (step S14310) are performed in the same manner as at steps S3304 and S3305 performed when the entire length is not designated.

While referring to the flowchart in FIG. 145, an explanation will now be given for the processing performed when the height preference is designated and the maximum line width is equal to or smaller than the entire length.

As is shown in FIG. 176C, specific character spacing is added for the adjustment, so that text for one line matches the designated entire length. In this embodiment, specific character spacing is added even when a different character spacing is set for basic character strings that constitute one line. The character spacing can be added so as not to change the ratio of the character spacing that is set between the individual basic character strings, or the character spacing can be added in accordance with the ratio of the character sizes of the basic character strings.

First, a difference dif (positive value) between the designated entire length widln and the maximum text line width linewm obtained at step S14302 (step S3601):

$$dif = widln - linewm \quad (49).$$

Then, the number of characters, nch, is acquired for the line having the maximum text line width that is obtained at step S3402. The nch is the sum of the characters nn of the individual basic character strings of the line having the maximum text line width. Since the number of character is nch, the number of character spaces is (nch−1), the additional character space difch for one character to adjust to the entire length is represented by equation (29) (step S3602):

$$difch = dif/(nch-1) \quad (50).$$

Then, the character string attribute and the layout data for each of basic character strings that constitute the text are changed (step S3603). The data that are affected by the change of the character spacing are also changed. Specifically, the difch obtained at step S3602 is added to the character spacing data, and the difch*nn is added to the character string width data.

Following this, the relative starting points of the basic character strings are re-calculated (step S3604).

The same calculation method as at step S14301 is employed. The character string attribute and the layout data that are changed at step S3603 are employed for the re-calculation.

The kerning value is re-calculated according to equations (36) to (38) from the kerning parameter, while the data after being changed at step S3603 are employed. In this case, since the reference character height, the vertical scale and the horizontal scale are unchanged, the kerning value is also not changed. Therefore, when the kerning data before being changed are stored, re-calculation is not necessary.

Then, the text line width of each line is re-calculated (step S3605).

The same calculation method as at step S14302 is employed. The character string attribute and the layout data that are changed at step S3603 are employed for the re-calculation.

The calculation for the character string starting point of the basic character string (step S14309) and the calculation for the text layout rectangle (step S14310) are performed in the same manner as at steps S3304 and S3305 performed when the entire length is not designated.

While referring to the flowchart in FIG. 146, an explanation will now be given for the processing performed when the height preference is designated and the maximum line width is greater than the entire length.

In this case, the vertical scale is adjusted (reduced), so that the text for one line is fitted to the designated entire length.

First, a ratio scl (>1) of the designated entire line length widln to the maximum text line width linewm that is obtained at step S14302 is calculated (step S3701). The calculation is as is shown by equation (48).

Then, the character string attribute and the layout data for each of basic character strings that constitute the text are changed (step S3702). Not only the vertical scale, but also the data for the width of the basic character string are also changed. Specifically, the character spacing, the head character left side bearing, the end character right side bearing and the character string width are multiplied by the Scl obtained at step S3701.

Following this, the relative starting points of the basic character strings are re-calculated (step S3703).

The same calculation method as at step S14301 is employed. The character string attribute and the layout data that are changed at step S3702 are employed for the re-calculation.

The kerning value is re-calculated according to equations (36) to (38) from the kerning parameter, while the data after being changed at step S3702 are employed.

Then, the text line width of each line is re-calculated (step S3704).

The same calculation method as at step S14302 is employed. The character string attribute and the layout data that are changed at step S3702 are employed for the re-calculation.

The calculation for the character string starting point of the basic character string (step S14309) and the calculation for the text layout rectangle (step S14310) are performed in the same manner as at steps S3304 and S3305 performed when the entire length is not designated.

Next, the data preparation method for the rectangle layout of text will now be described.

FIG. 147 is a flowchart for explaining the data preparation method for the rectangle layout of the text.

FIGS. 177A to 177D are diagrams showing example data that are prepared when the rectangle layout process is performed for the text.

Rectangles indicated by solid lines are object graphic patterns for the rectangle layout. Rectangles indicated by broken lines that enclose the character strings of the individual lines are text line layout rectangles.

Figure 177A:
Figure 177B:
Figure 177C:
Figure 177D:

In FIG. 177A, the left justification is designated; in FIG. 177B, the right justification is designated; in FIG. 177C, the center justification is designated; and in FIG. 177D, the full justification is designated.

The text line width for each line is calculated (step S3801).

The same method as used at step S14302 can be employed to calculate the text line width linew. However, since at this time the relative starting points of the individual basic character strings are not obtained, the text line width for an object line is calculated as follows, while taking into account the character string widths tw1 to twn of the basic character strings (n is the number of basic character strings of the object line), the vertical character spacing kerning values dhx1 to dhxn, the end character right side bearing sbrn of the last basic character string, the character spacing dfletn, and the head character left side bearing sbl1 of the first basic character sting.

$$linew=(dhx1+tw1)+\ldots+(dhxn+twn)-dfletn-sbl1+sbrn \quad (51)$$

In equation (51), the character spacing dfletn is subtracted because the character space after the end character of the last basic character string is removed.

The text line width for each line is compared with the width of the layout object rectangle (step S3802).

The width wrect of the layout object rectangle is stored as text data. This data is effective when at step S3107 a rectangle is selected to designate the layout position of the text, i.e., when the rectangle layout is instructed.

For each line, the text line width is compared with the width of the layout object rectangle. When the text line width is greater than the width of the rectangle, the CPU 21 automatically inserts a return, so that the text line width for the pertinent line does not exceed the width of the layout object rectangle and the text line width becomes maximum (step S3803).

Assume that, for text line of "ABCDEFG," when the text line width for "ABCDE" is calculated by using equation (24), the text line width is equal to or smaller than the width of the object rectangle and that, when the text line width for "ABCDEF" is calculated by using equation (24), the text line width is greater than the width of the object rectangle. In this example, a return is inserted between E and F and the text line "ABCDEFG" is divided into "ABCDE" and "FG".

When a return is inserted at step S3803, the basic character string is divided before and after that position. Thus, the basic character string data for the text and the basic character string layout data are prepared (step S3804).

When the text line width is smaller than the width of the layout object rectangle, the processes at steps S3803 and S3804 are not performed for the pertinent text line.

Then, the relative starting point pw[2] for each of the basic character strings is calculated (step S3805). The same calculation as at step S3301 for the point layout is performed.

The text line width linew for each line is calculated (step S3306). The same calculation as at step S3302 for the point layout is performed.

The text line height lineh for each line is calculated (step S3307). The same calculation as at step S3302 for the point layout is performed.

As are described above, there are four line justifications for the rectangle layout: left justification, right justification, center justification and full justification. For this line justification, one of the line justification position selection buttons 3907 is selected on the new text creation panel 3901, and the line justification flag adj is included in the text data.

The following processing differs when the justification flag indicates the full justification and when it indicates another justification, i.e., the left justification, the right justification or the center justification. A check is performed to determine the state of the flag (step S3808).

An explanation will be given for the processing performed when it is ascertained at step S3808 that the line justification flag indicates other than the full justification.

In this case, each text line is moved in the X direction in accordance with the width wrect of the layout object rectangle. When the text line width is denoted as linew[i], the traveling distance in the X direction for the first line dx[i] is represented by the following equation:

for left justification, $dx[i]=0$;

for right justification, $dx[i]=wrect-linew[i]$;

and for center justification, $dx[i]=(wrect-linew[i])/2 \quad (52)$, wherein the text line width linew[i] for the i-th line is obtained at step S3806.

The traveling distance dx[i] obtained by equation (52) is added to the X coordinate pw[0] at the relative starting point of each basic character string that is present in the i-th line, so that the relative starting point is corrected (step S3811).

When it is ascertained at step S3808 that the line justification flag indicates the full justification, the processing is performed as follows.

In this case, adequate character spacing is added to the basic character string of each text line in accordance with the width of the layout object rectangle wrect, so that both ends are aligned to the layout rectangle.

The total dif[i] of added character spaces is calculated as follows:

$$dif[i]=wrect-linew[i] \quad (53).$$

The total number nch[i] of characters of the i-th line is the sum of the characters nn of the individual basic character strings that are included in the i-th line. Since the number of character spaces is (nch[i]−1), the following equation represents the character space difch[i] that is to be added for each character in the i-th line in order to adjust to the width of the layout object rectangle:

$$difch[i]=dif[i]/(nch[i]-1) \quad (54).$$

It should be noted, however, that equation (54) is employed only when the total number nch[i] of characters for the i-th line is greater than 1. When nch[i] is 0 or 1, both ends of the text can not be aligned to the rectangle even though the character spacing is added. Therefore, the same process as performed for the center justification is performed for the pertinent line.

In equations (53) and (54), the difch[i] is added to the character spacing data for each of the basic character strings that are present in the i-th line, and the difch[i]*nn is added to the character string width data. Then, the X coordinate pw[0] of the relative starting point of each of the basic character strings on the i-th line is re-calculated, and the relative starting point is corrected (step S3809).

Following this, the text line widths of the individual lines are re-calculated (step S3810). The calculation performed at step S3302 is also performed by using the data for the relative starting point obtained at step S3809, the character spacing data and the data for the character string width.

The following process is performed in common, regardless of whether the line justification flag indicates the full justification, or other justification, i.e., the left justification, the right justification or the center justification.

The character string starting point pt[2] for each basic character string is calculated (step S3812).

For the rectangle layout as well as the point layout, the text line layout rectangle for the first line is employed as a layout reference. For the rectangle layout, all the relative starting points are moved in parallel in the Y direction, so that the text line layout rectangle for the first line are inscribed with the upper side, the left side and the right side of the layout object rectangle.

The traveling distances dvx and dvy are represented as follows:

$$dvx = 0$$

$$dvy = -lineh1 \quad (55),$$

wherein lineh1 denotes the text line height of the first line.

In addition, the output position is moved in parallel in the X direction, while the visible portion is used as a reference. The parallel traveling distances of the relative starting points of the basic character strings have been represented by equation (46).

The rotational movement and parallel movement are performed for all the basic character strings, while taking into account the inclination of the layout object rectangle (arect included in the text data), the layout reference point (rotational reference point for the rectangle layout), and the coordinates (pb[2] included in the text data).

Finally, the text layout rectangle is obtained (step S3813).

The text layout rectangle is obtained by using the text line layout rectangles for the individual lines. The text layout rectangle width textw and the text layout rectangle height texth are obtained from equation (47) by using the relative starting points obtained at step S3809 or S3811.

Then, the parallel movement in accordance with equation (55), the rotational movement in accordance with the inclination of the layout object rectangle, or the parallel movement in accordance with the layout reference point coordinates is performed to calculate the position of the text layout rectangle, i.e., coordinates of the text layout rectangle bottom left point: pll[2], and coordinates of the text layout rectangle top right point: plr[2].

The processing for correcting character data will now be described.

As previously described, the command menu 67 for the text commands includes:

(1) New: Create new text.
(2) Correct: Correct text already prepared.

An explanation will now be given when the "correct" menu is selected.

The text correction processing, as well as the text creation process, is performed according to the flowchart for the processing for the layout of text as printing data is shown in FIG. 140.

When the "correct" menu is selected, an instruction to designate text to be corrected is displayed in the guidance area 68. A user selects text to be corrected.

The current state of the selected text is sown in a text correction panel 4501, as is shown in FIG. 154.

Information required for preparing text is entered in the text correction panel 4501 by using the keyboard 11 or the mouse 12. This processing is the same as steps S3101 to S3103 performed when the "create" menu is selected. It should be noted, however, that for the correction of text, the editing process is performed only when the information that is already set is to be changed.

The information, such as layout reference position, the set form, the line justification, the entire length, the height preference and the automatic kerning, is entered on the text correction panel 4501 to lay out the text. When this information is designated, the current state of the selected text is displayed. The designated information is stored again as text data.

When the character string correction button is selected on the text correction panel 4501, the character string input panel 4001 is displayed. The character string data for the text are entered in the character string input area 4002 using the keyboard 11. Then, the current character string of the selected text is displayed. This information is stored again as the data of the basic character string.

Further, on the text correction-panel 4501, the name of a typeface, the baseline rotate angle, the horizontal scale, the vertical scale, the oblique angle, the character spacing, the line spacing, and the reference character height or the character size are entered as the printing attributes of the character data, i.e., the character string attributes. In response to this entry, the current state of the selected text is displayed. The above information is stored again as character string attribute data for the basic character strings that constitute the text.

When the above described processing has been completed, the user selects the "set" button on the correction panel 4501, and establishes the information required to prepare the text (text layout information, the character string data and the printing attributes of the character data).

For the selected text to be corrected, the height (the height of the text layout rectangle), the width (the width of the text layout rectangle), the line height of each line (the height of the text line layout rectangle) and the line width of each line (the width of the text line layout rectangle) are displayed on a text layout rectangle data display area 4508 to assist the user to correct the text. When the data are corrected on the text correction panel 4501 and the "re-calculate" button is selected, the text layout rectangle data are re-calculated in accordance with the corrected data.

Furthermore, whether the point layout or the rectangle layout has been performed for the object text is displayed on the layout data display are 4509 on the text correction panel 4501. AT this time, the point or the rectangle to be laid out is highlighted in read in the drawing area 62 to be identified.

The processes from steps 3104 to S3110 are performed in the same manner as for the creation of text. However, the process step S3107 for designating the layout position is not required if the layout position is unchanged.

The character string data entered on the character string input panel 4001 can be registered in the external storage device 33 together with the typeface information and the kerning information, and can be retrieved, as needed.

The method for storing the character string data will now be described.

Since there command menu 67 includes a "register" menu in addition to the "create" and "correct" menus, the "register" button is selected.

Then, since an instruction is displayed in the guidance area 68 to select text to be registered, the user selects desired text.

Then, a character string registration panel 4601 shown in FIG. 155 is displayed. The names of registered character string data are displayed on the registered name list 4602. When one of the items is pointed on the list 4602 by the mouse 12, the selected name is displayed in registered name input area 4603, and a memo entered at the registration is displayed in a memo input area 4604.

To change the contents of the registered character string data, the "register" button is selected. At this time, the contents in the memo input area 4604 can also be changed.

To register character string data with a new name, one item is pointed on the list 4602 by the mouse 12, the name for registration and the memo are edited, and the "register" button is selected. Or, the name for registration is entered directly in the registered name input area 4603, the memo is entered in the memo input area 4604, and the "register" button is selected.

When the character string data are registered, the typeface information and the kerning information are stored besides the character string data.

The methods for retrieving the registered character string data will now be described.

The first method is a method for selecting a "character string retrieval" button on the new text creation panel 3901. Then, the character string retrieval panel 4201 shown in FIG. 151 is displayed. According to the first method, character string data that are newly created are employed as data for the registered character string.

The second method is a method for selecting the "character string retrieval" button on the character string input panel 4001. Then, the character string retrieval panel 4201 shown in FIG. 151 is also displayed. According to the second method, the data for the registered character string are inserted at the cursor position of the character string input area.

Since the names of the character string data that are registered are displayed in the registered name list 4202, one of the names to be retrieved is pointed by the mouse 12, or is entered directly in the registered name input area 4203 using the keyboard 11. The name selected from the name list 4202 is displayed in the registered name input area 4203. On the contrary, if the name entered in the registered name input area 4203 is one that is already registered, the pertinent item in the name list 4202 is set to the selected state.

When the "accept" button or the "retrieve" button is selected while the name that is not registered is displayed in the registered name input area 4203, a warning screen to instruct re-entry is displayed. The suer must enter again the name of character string data to be retrieved.

When the character string data are to be retrieved, the user can select whether the typeface information and the kerning information should be retrieved together with the character string information.

An explanation will now be given for a case for retrieving the text shown in FIG. 173. As previously mentioned, the text is represented by the following control character strings:

"¥t<24@AB¥hˆ1.33@CD¥DEF@
EF¥t>24¥tv24@G
¥lv48@
¥t>24@HJ".

To retrieve only the character string data, "No" is selected using the typeface information retrieval selection button 4204, and "No" is selected using the kerning information retrieval selection button 4205.

The information that is retrieved is represented using the following control character strings:

"ABCD
EFG
HJ".

To retrieve the character string data with typeface information being added, "Yes" is selected using the typeface information retrieval selection button 4204, and "No" is selected using the kerning information retrieval selection button 4205.

The information that is retrieved is represented using the following control character strings:

"AB¥hˆ1.33@CD¥DEF@
EFG
HJ".

To retrieve the character string data with kerning information being added, "No" is selected using the typeface information retrieval selection button 4204, and "Yes" is selected using the kerning information retrieval selection button 4205.

The information that is retrieved is represented using the following control character strings:

"¥t<24@ABCD
EF¥t>24¥tv24@G
¥lv48@
¥t>24@HJ".

To retrieve the character string data with typeface information and kerning information being added, "Yes" is selected using the typeface information retrieval selection button 4204, and "Yes" is selected using the kerning information retrieval selection button 4205.

The information that is retrieved is represented using the following control character strings:

"¥t<24@AB¥hˆ1.33@CD¥DEF@
EF¥t>24¥tv24@G
¥lv48@
¥t>24@HJ".

When the "accept" button is selected on the character string retrieval panel 4201, the retrieval contents confirmation panel 15201 shown in FIG. 152 is displayed. Therefore, the user can confirm the contents of the character string data that are to be retrieved.

When the "retrieve" button is selected on the character string retrieval panel 4201, according to the first or the second method, the control character string data for the registered character string are retrieved in the character string input area of the character string input panel 4001.

The method for setting the character spacing kerning has been already described, and the character spacing kerning value can be set in advance for each typeface name. This is called automatic kerning. There are two types of automatic kerning: the setting of a kerning value for character spacing between two specific characters, and the setting of the kerning value for character spacing before or after a specific character.

To validate the automatic kerning, "Yes" is selected by the automatic kerning selection button 3905 on the new text creation panel 3901 or by the automatic kerning selection button 4505 on the text correction panel 4501. This information is stored as an automatic kerning flag for the text data.

The automatic kerning data are prepared in advance for each typeface name, and are stored as an automatic kerning data file in the external storage device 33.

An explanation will now be given for a format for setting the kerning value for character spacing between two specific characters. There are two methods for designating the character spacing kerning value: a designation method for enclosing a character with " and " and a designation method for enclosing a character code with < and >.

The designation method using a character is represented by the following format. "A" is a keyword to indicate the designation method using the character. This represents that the character spacing kerning parameter between "char1" and "char2" of a specific typeface is set to dxp in the X direction and dyp in the Y direction, while taking into account the positional relationship of the character.

A "char1" "char2" dxp dyp When, for example, the character spacing kerning parameter between character "A" and character "B" of a specific typeface is set to −2 in the X direction and to +2 in the Y direction, this is represented as follows:

A "A" "B" −2 2.

The designation method using a character code is represented by the following format. "C" is a keyword to indicate the designation method using the character code. This represents that the character spacing kerning parameter between <code1> and <code2> of a specific typeface is set to dxp in the X direction and dyp in the Y direction, while taking into account the positional relationship of a character.

C<code1> <code2> dxp dyp

When, for example, the character spacing kerning parameter between character code da and character code db of a specific typeface is set to 4 in the X direction and to 0 in the Y direction, this is represented as follows:

C<da> <db> 4 0.

The format for setting the kerning value for character spacing before or after a specific character will now be described. When the format for setting the kerning value for character spacing between two specific characters is employed to set the character spacing kerning before a specific character, " " is designated instead of "char1", or <00> is designated instead of <code1>. To set the character spacing kerning after a specific character, " " is designated instead of "char2", or <00> is designated instead of <code2>.

A " " "char2" dxp dyp
C<00> <code2> dxp dyp
A "char1" " " dxp dyp
C<code1> <00> dxp dyp When, for example, the character spacing kerning parameter before hyphen "−" (character code of 95, for example) of a specific typeface is set to −10 in the X direction and to +20 in the Y direction, one of the following expressions can be employed.

" " "−" −10 20
C<00> <95> −10 20

When, for example, the character spacing kerning parameter after hyphen "−" (character code of 95, for example) of a specific typeface is set to −10 in the X direction and to −20 in the Y direction, one of the following expressions can be employed.

A "−" " " −10 −20
C<95> <00> −10 −20

The automatic kerning data are added to the character spacing kerning data that the is entered by a user employing the above method in the character string input area of the character string input panel 4001. Therefore, the automatic kerning value is added to the horizontal character spacing kerning dhx and the vertical character spacing kerning dhy that are basic character string layout data.

The control format for the automatic kerning data is not displayed in the character string input area this prevents the user from easily changing the kerning value because the purpose of the automatic kerning is the provision of constant and adequate character spacing kerning, regardless of a user.

As is described above, according to the twelfth embodiment, the following effects are obtained.

First, the precise layout can be easily implemented to print graphic pattern data and especially character data that are printing data for a block copy.

In addition, not only graphic data or character data, but also group data, such as data for an illustration and a symbol, can be easily processed.

An adequate printing method, such as proof sheet printing or fair copy printing, can be selected depending on the printer type, such as a laser printer or an image setter.

As is described above, according to the twelfth embodiment, accurate printing data, especially including character data, can be easily and precisely prepared, without deteriorating the work efficiency of a user.

The present invention can be applied either for a system that is constructed by a plurality of apparatuses (e.g., a host computer, an interface device, a reader and a printer) or for an apparatus including a single device.

The following is also included within the scope of the present invention: a storage medium on which software program code is stored for implementing the functions in the previous embodiments is provided to a system or an apparatus, and a computer (or a CPU or an MPU) in the system or in the apparatus can read and execute the program code from the storage medium.

In this case, the program code read from a storage medium accomplishes the functions of the above described embodiments. And the storage medium on which such program code is recorded constitute the present invention.

A storage medium for supplying such program code can be, for example, a floppy disk, a hard disk, an optical disk, a magneto optical disk, a CD-ROM, a CD-R, a magnetic tape, a nonvolatile memory card, or a ROM.

In addition, not only for a case where the functions in the previous embodiments can be performed when program code is read and executed by the computer, but also for a case where, according to an instruction in the program code, an OS (Operating System) running on the computer, or another application software program, interacts with the program code to accomplish the functions in the above embodiments, this program code can be included in the embodiments of the present invention.

Furthermore, the present invention includes a case where program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

What is claimed is:

1. An information processing apparatus comprising:
   determination means for determining an output destination for a reverse video element for which a reverse video attribute is set;
   acquisition means for obtaining a background color for the output destination determined by said determination means; and
   output color setting means for designating for the reverse video element a color that differs from the background color obtained by said acquisition means,
     wherein said output color setting means includes:
     analysis means for analyzing the background color and extracting the color elements hue, brightness and saturation,
     correction means for coffecting the color elements, and
     synthesis means for synthesizing a new output color by using the corrected color elements,
     wherein the output color obtained by said synthesis means is determined to be a color for painting the reverse video element a solid color,
     wherein said correction means includes correction coefficient calculation means for calculating a correction coefficient using the color of a solid color graphic pattern that is arranged as a background for the reverse video element, and
     wherein said correction means employs the correction coefficient that is acquired by said correction coefficient calculation means to correct the values of the color elements that are extracted by said analysis means.

2. An information processing apparatus according to claim 1, further comprising:
output means for employing the color determined by said output color setting means to paint the reverse video element a solid color and to display the resultant solid color element.

3. An information processing apparatus according to claim 1, further comprising:
output means for employing the color determined by said output color setting means to display the contour of the reverse video element.

4. An information processing apparatus according to claim 1, further comprising:
attribute setting means for setting a reverse video attribute for desired character data or solid color graphic data and to regard the data as the reverse video element.

5. An information processing apparatus according to claim 1, wherein, when said determination means determines that the output destination is a display device, said output color setting means sets for the reverse video element a color different from the background color.

6. An information processing apparatus according to claim 1, wherein, when said determination means determines that the output destination is a display device, said output color setting means sets, as an output color for the reverse video element, a color different from the background color that is obtained by said acquisition means, and outputs the reverse video element; and wherein, when said determination means determines that the output destination is a printer, said output color setting means sets, as an output color for the reverse video element, the same color as the background color, and outputs the reverse video element.

7. An information processing apparatus according to claim 1, wherein said correction means corrects the color elements by multiplying, by a predetermined correction coefficient the brightness element that is extracted by said analysis means.

8. An information processing apparatus according to claim 1, wherein said correction means corrects the color elements by multiplying, by a predetermined correction coefficient the saturation element that is extracted by said analysis means.

9. An information processing apparatus according to claim 8, wherein said correction coefficient calculation means includes:
search means for searching for a solid color graphic pattern that overlaps a character string or a graphic pattern for which a reverse video attribute is set;
area calculation means for calculating an area wherein the reverse video element overlaps the solid color graphic pattern that is found by said search means; and
pattern color acquisition means for obtaining the color of the solid color graphic pattern that is found by said search means,
wherein the correction coefficient is calculated by using the said color obtained by said pattern color acquisition means and the area calculated by said area calculation means.

10. An information processing apparatus according to claim 9, wherein said pattern color acquisition means acquires a color for a solid color graphic pattern that has the largest area of those obtained by said area calculation means, and wherein the correction coefficient is calculated based on the color obtained by said pattern color acquisition means.

11. An information processing apparatus according to claim 1, wherein said correction means calculates a distance between a first color, which is obtained by correcting the background color using a predetermined correction coefficient, and a second color, which is employed for a solid color graphic pattern that is the background for the reverse video element, and wherein, when the distance is equal to or smaller than a predetermined value, said correction means corrects the background color by using the correction coefficient obtained by said correction coefficient calculation means.

12. An information processing apparatus according to claim 1, wherein the reverse video element is a character string or a graphic pattern for which the reverse video attribute is designated.

13. An information processing method comprising:
a determination step of determining an output destination for a reverse video element for which a reverse video attribute is set;
an acquisition step of obtaining the background color at the output destination, which was determined at said determination step; and
an output color setting step of designating for the reverse video element a color that differs from the background color obtained at said acquisition step,
wherein said output color setting step includes:
an analysis step of analyzing the background color and extracting the color elements hue, brightness and saturation,
a correction step of correcting the color elements, and
a synthesis step of synthesizing a new output color by using the corrected color elements,
wherein the output color obtained at said synthesis step is determined to be a color for painting the reverse video element a solid color,
wherein said correction step includes a correction coefficient calculation step of calculating a correction coefficient using the color of a solid color graphic pattern that is arranged as a background for the reverse video element, and
wherein at said correction step, the correction coefficient that is acquired at said correction coefficient calculation step is employed to correct the values of the color elements that are extracted at said analysis step.

14. An information processing method according to claim 13, further comprising:
an output step of employing the color determined at said output color setting step to paint reverse video element a solid color and to display the resultant solid color element.

15. An information processing method according to claim 13, further comprising:
an output step of employing color determined at said output color setting step to display the contour of the reverse video element.

16. An information processing method according to claim 13, further comprising:
an attribute setting step of setting a reverse video attribute for desired character data or solid color graphic data and to regard the data as the reverse video element.

17. An information processing method according to claim 13, wherein, when it is ascertained at said determination step that the output destination is a display device, a color different from the background color is set for the reverse video element at said output color setting step.

18. An information processing method according to claim 13, wherein, when it is ascertained at said determination step that the output destination is a display device, at said output color setting step, a color different from the background color that is obtained at said acquisition step is set as an output color for the reverse video element, and the reverse video element is output; and wherein, when it is ascertained at said determination step that the output destination is a printer, at said output color setting step, the same color as the background color is set as an output color for the reverse video element and the reverse video element is output.

19. An information processing method according to claim 13, wherein at said correction step, the color elements are corrected by multiplying, by a predetermined correction coefficient the brightness element that is extracted at said analysis step.

20. An information processing method according to claim 13, wherein at said correction step, the color elements are corrected by multiplying, by a predetermined correction coefficient the saturation element that is extracted at said analysis step.

21. An information processing method according to claim 20, wherein said correction coefficient calculation step includes:
  a search step of searching for a solid color graphic pattern that overlaps a character string or a graphic pattern for which a reverse video attribute is set;
  an area calculation step of calculating an area wherein the reverse video element overlaps the solid color graphic pattern that is found at said search step; and
  a pattern color acquisition step of obtaining the color of the solid color graphic pattern that is found at said search step,
  wherein the correction coefficient is calculated by using the said color obtained at said pattern color acquisition step and the area calculated at said area calculation step.

22. An information processing method according to claim 21, wherein at said pattern color acquisition step, a color is acquired for a solid color graphic pattern that has the largest area of those obtained at said area calculation step, and wherein the correction coefficient is calculated based on the color obtained at said pattern color acquisition step.

23. An information processing method according to claim 13, wherein at said correction step, a distance is calculated between a first color, which is obtained by correcting the background color using a predetermined correction coefficient, and a second color, which is employed for a solid color graphic pattern that is the background for the reverse video element, and wherein, when the distance is equal to or smaller than a predetermined value, at said correction step, the background color is corrected by using the correction coefficient obtained at said correction coefficient calculation step.

24. An information processing method according to claim 13, wherein the reverse video element is a character string or a graphic pattern for which the reverse video attribute is designated.

25. A computer-readable medium encoded with a control program for causing a computer to display a graphic or a character pattern, said control program comprising:
  code for a determination step of determining an output destination for a reverse video element for which a reverse video attribute is set;
  code for an acquisition step of obtaining the background color at the output destination, which was determined at said determination step; and
  code for an output color setting step of designating for the reverse video element a color that differs from the background color obtained at said acquisition step,
  wherein said output color setting step includes:
  code for an analysis step of analyzing the background color and extracting the color elements hue, brightness and saturation,
  code for a correction step of correcting the color elements, and
  code for a synthesis step of synthesizing a new output color by using the corrected color elements,
  wherein the output color obtained at said synthesis step is determined to be a color for painting the reverse video element a solid color,
  wherein said correction step includes code for a correction coefficient calculation step of calculating a correction coefficient using the color of a solid color graphic pattern that is arranged as a background for the reverse video element, and
  wherein at said correction step, the correction coefficient that is acquired at said correction coefficient calculation step is employed to correct the values of the color elements that are extracted at said analysis step.

\* \* \* \* \*